Figure 57:
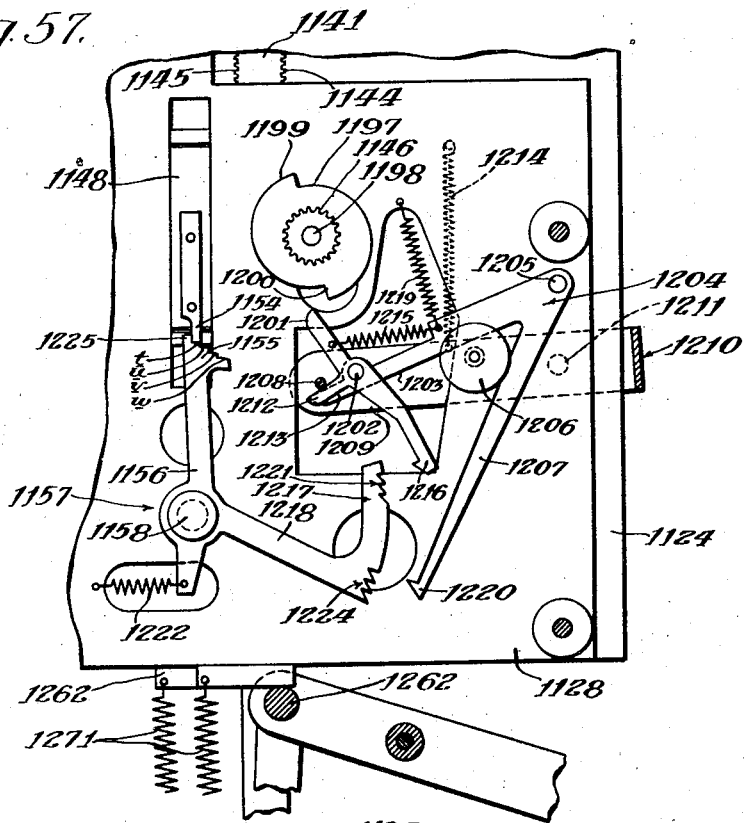

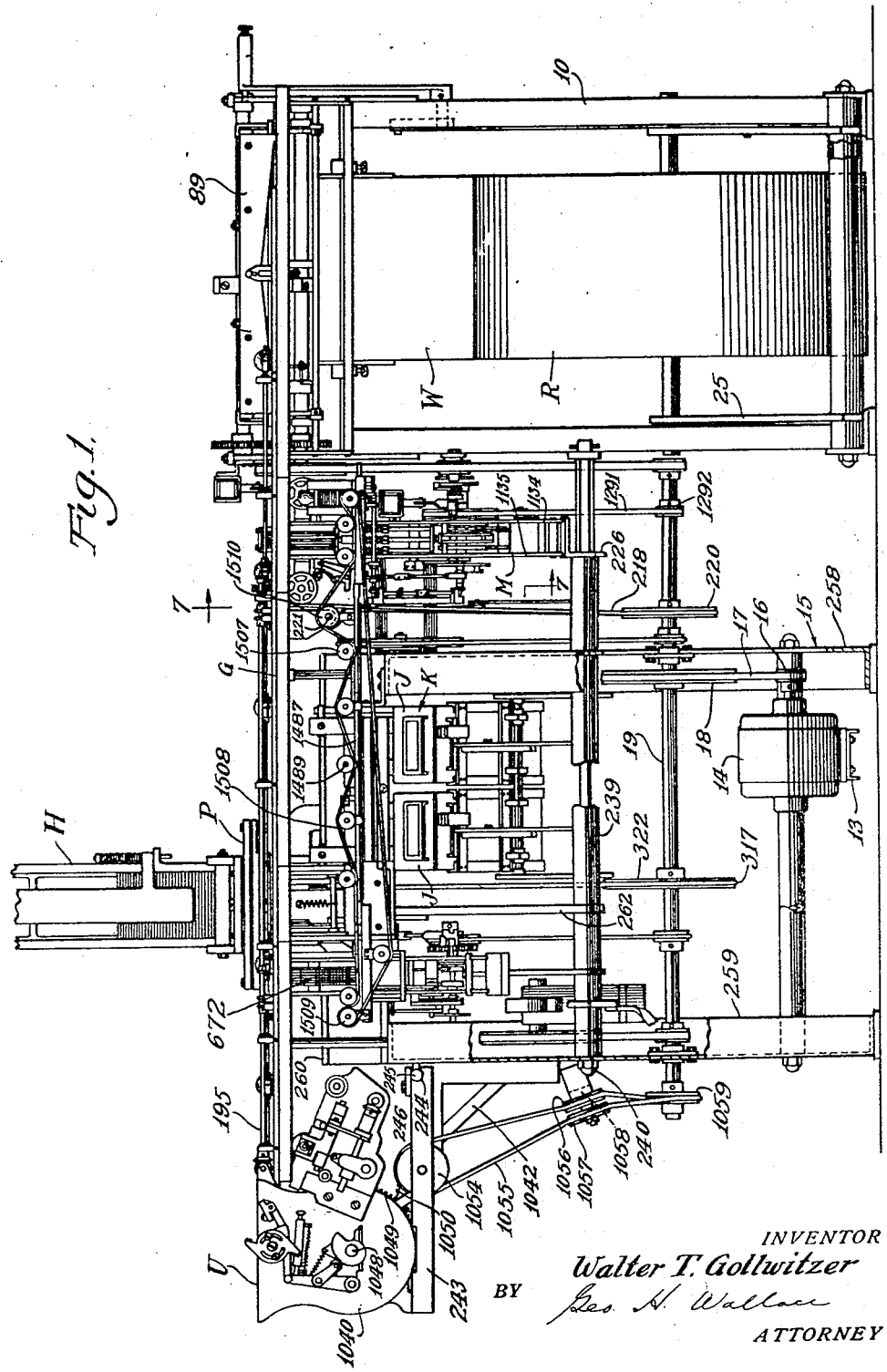

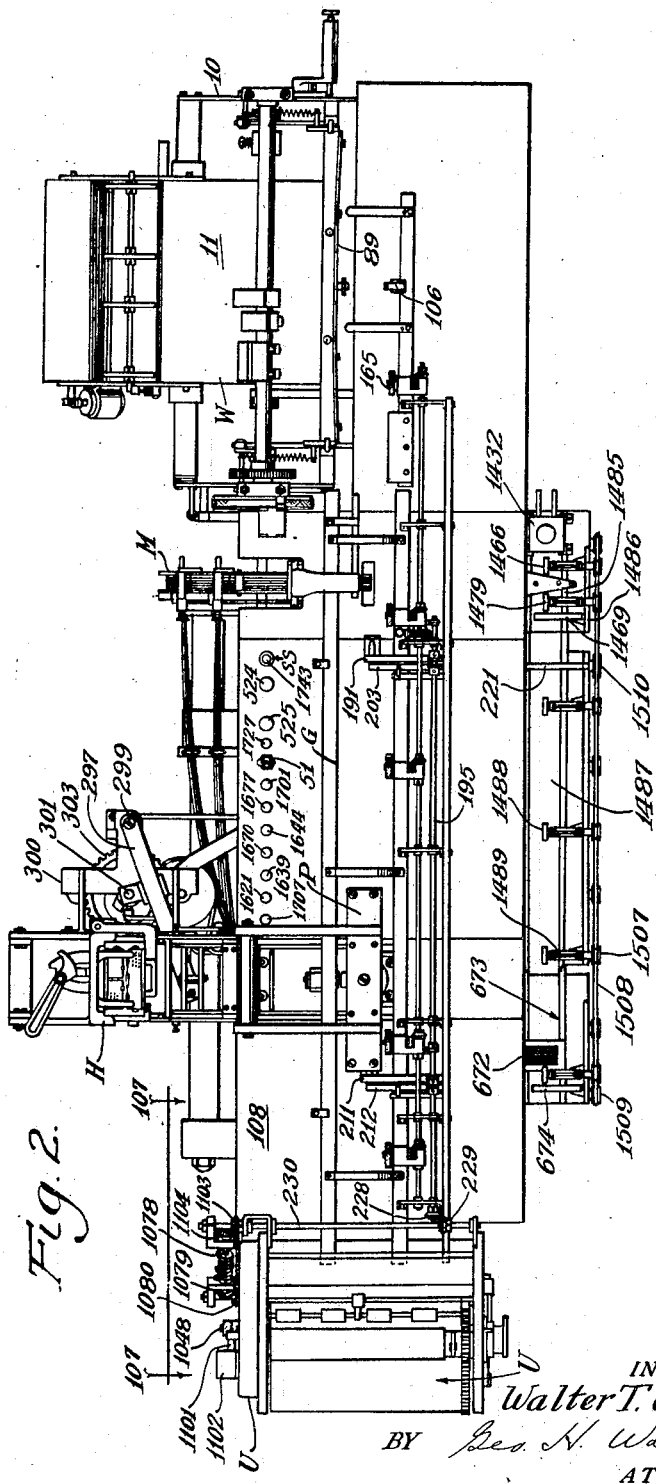

Sept. 22, 1942.     W. T. GOLLWITZER     2,296,276
CALCULATING MACHINE
Original Filed July 28, 1938     52 Sheets-Sheet 3
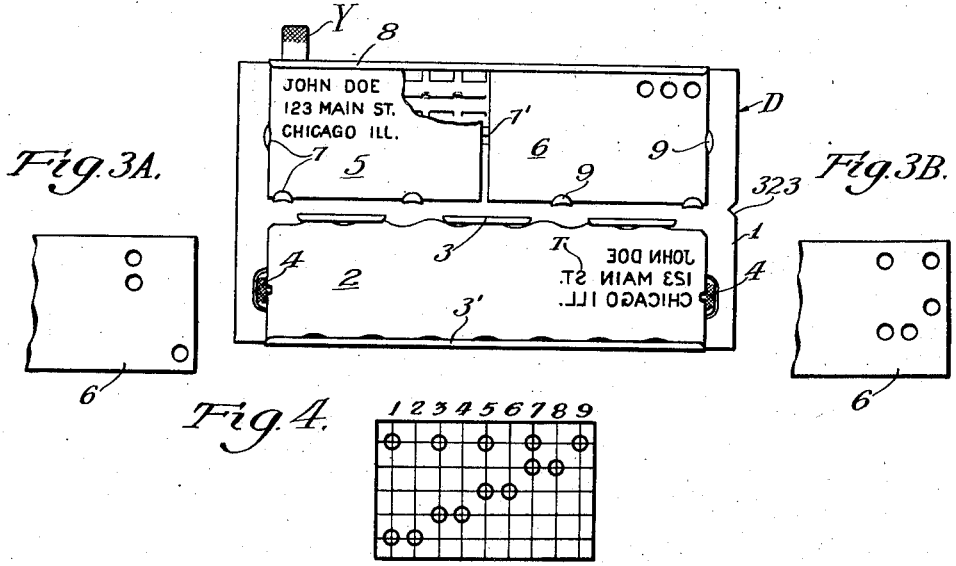
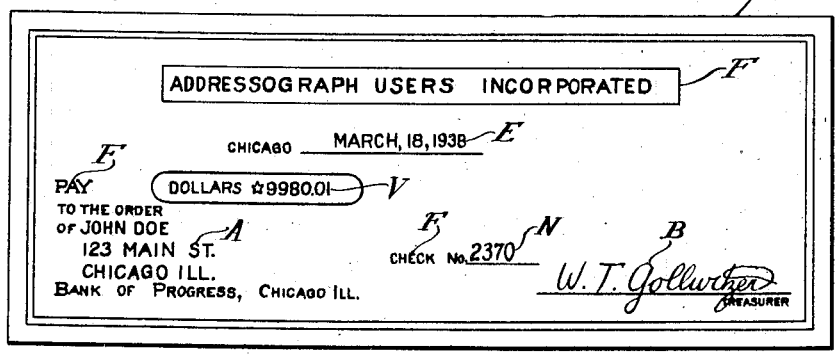
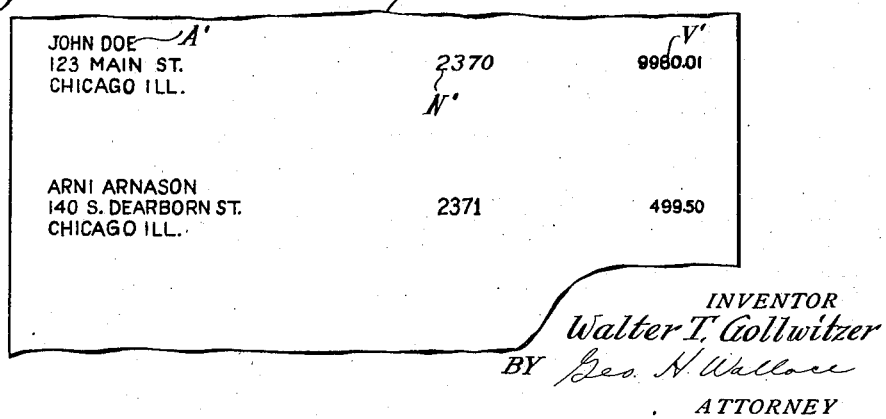
INVENTOR
Walter T. Gollwitzer
BY Geo. N. Wallace
ATTORNEY

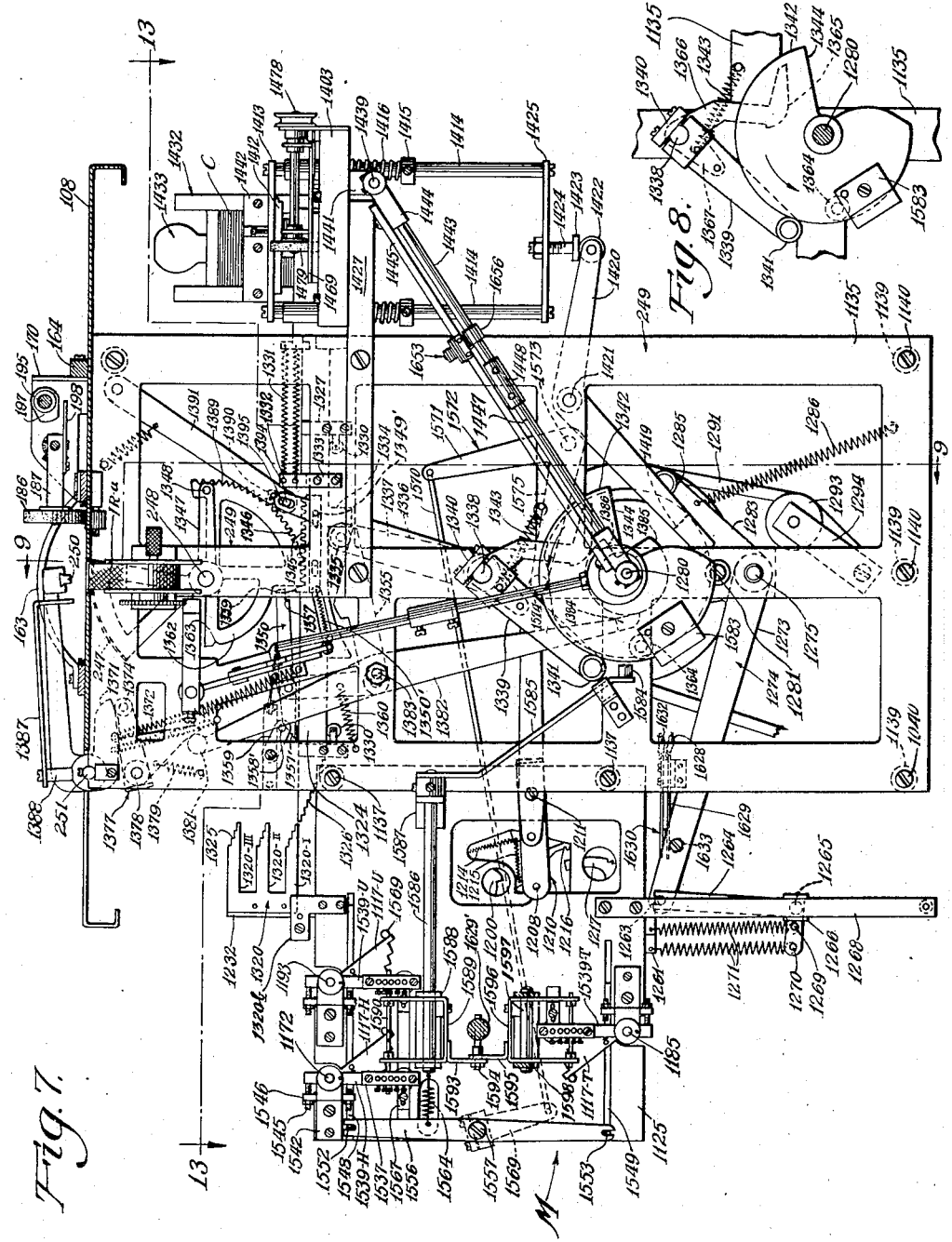

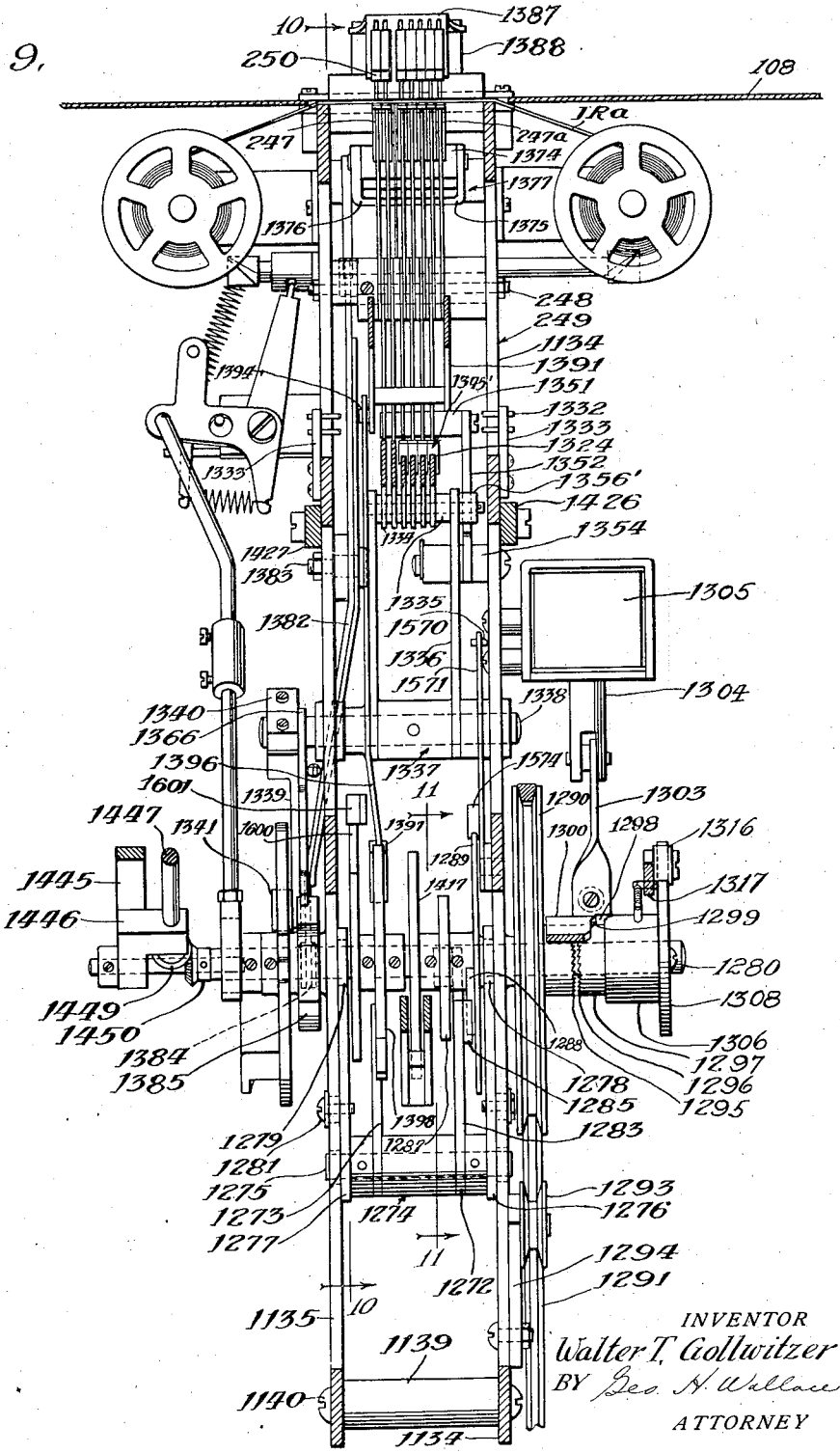

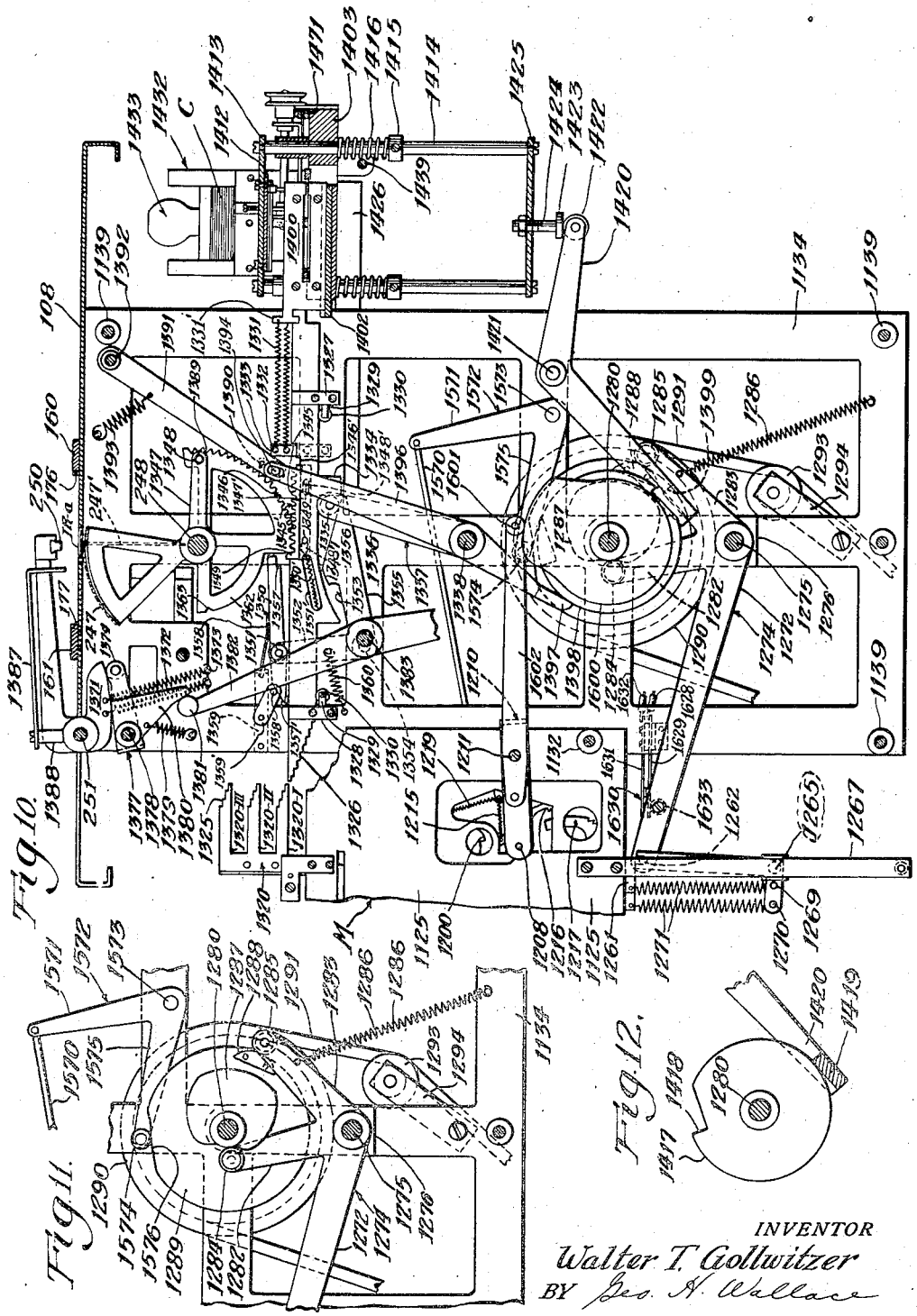

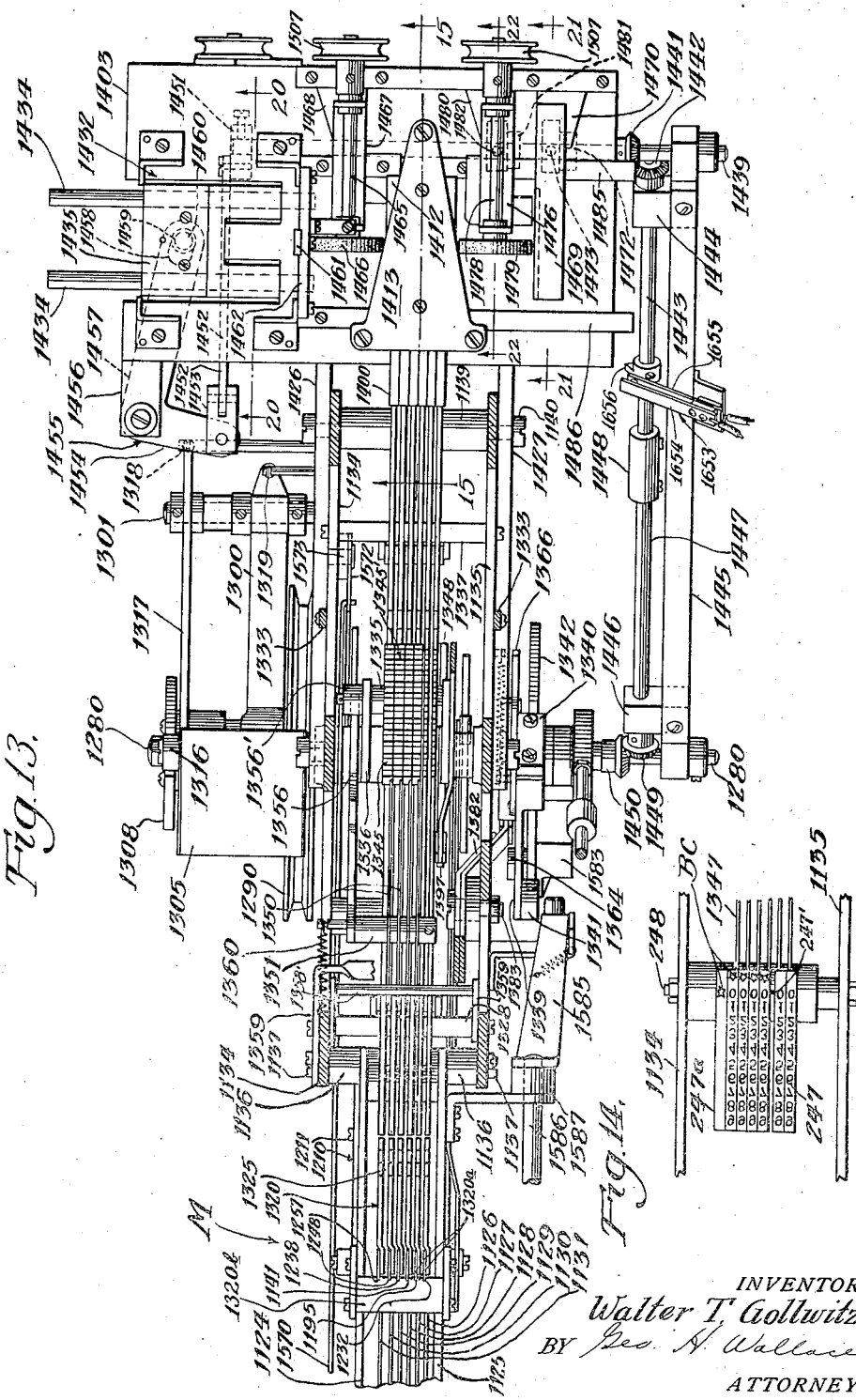

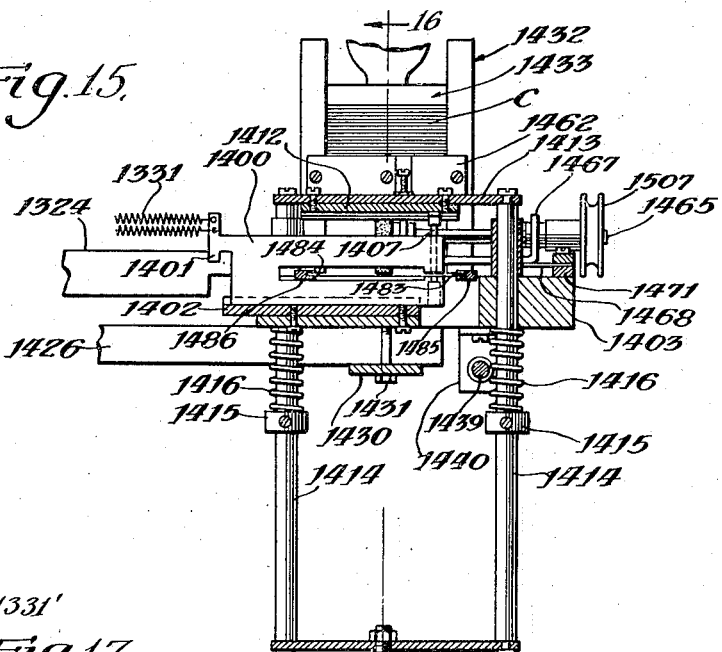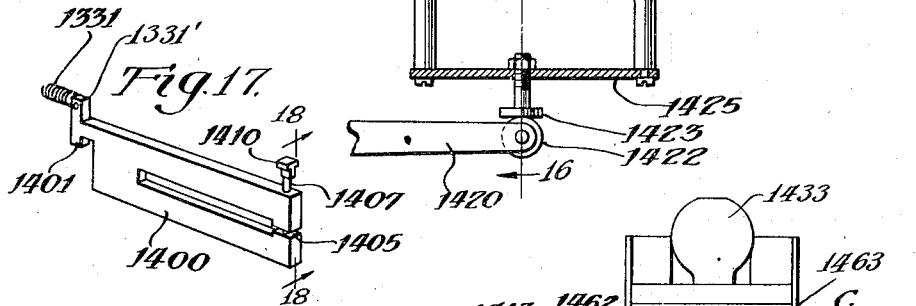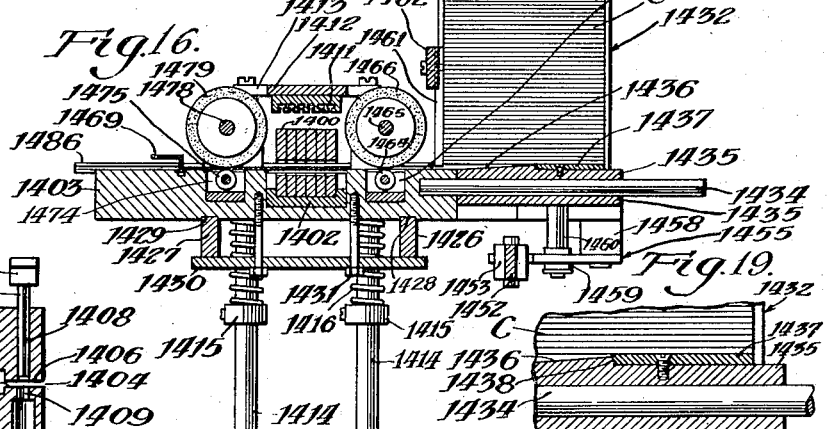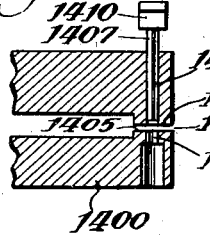

Sept. 22, 1942.  W. T. GOLLWITZER  2,296,276
CALCULATING MACHINE
Original Filed July 28, 1938   52 Sheets-Sheet 9
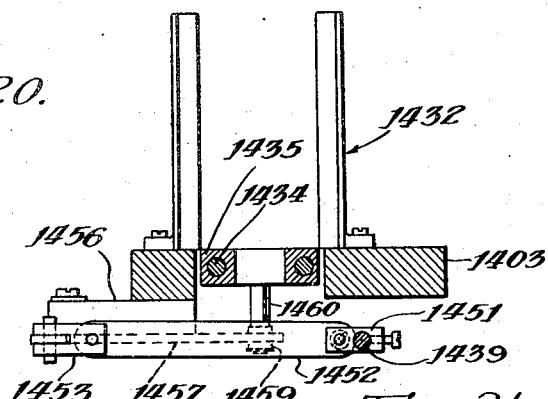
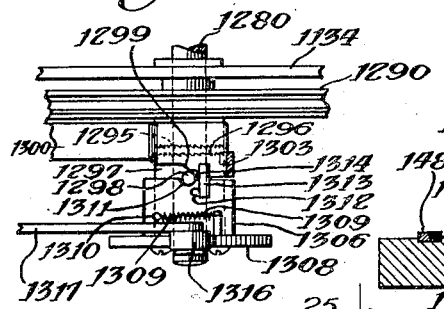
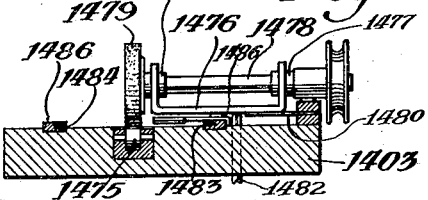
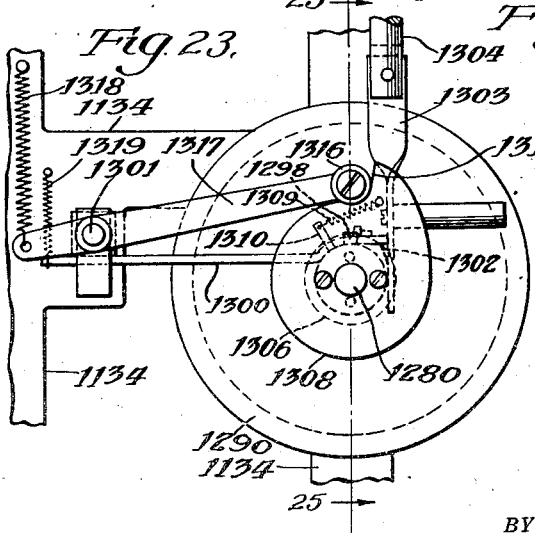
INVENTOR
Walter T. Gollwitzer
BY Geo. H. Wallace
ATTORNEY

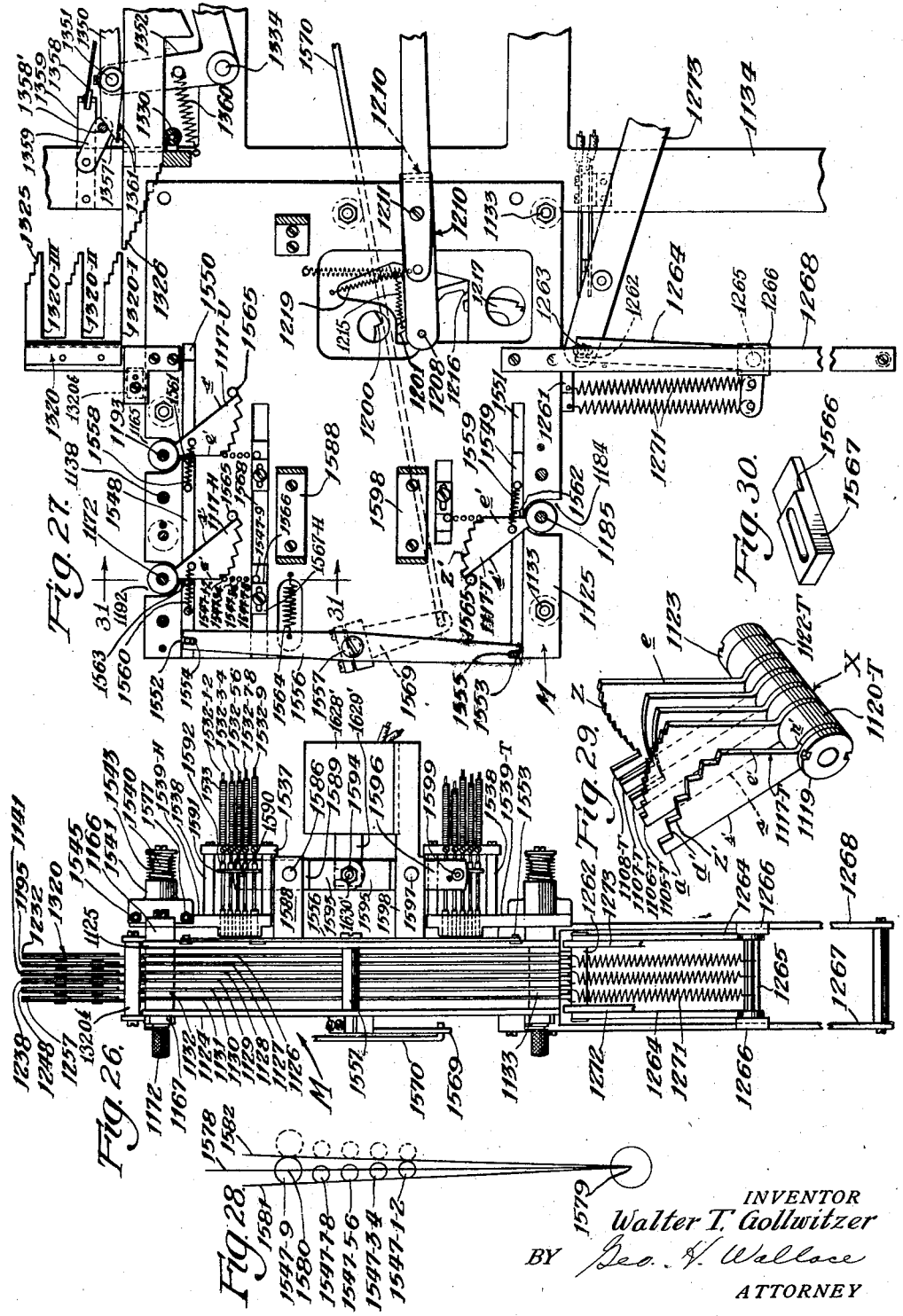

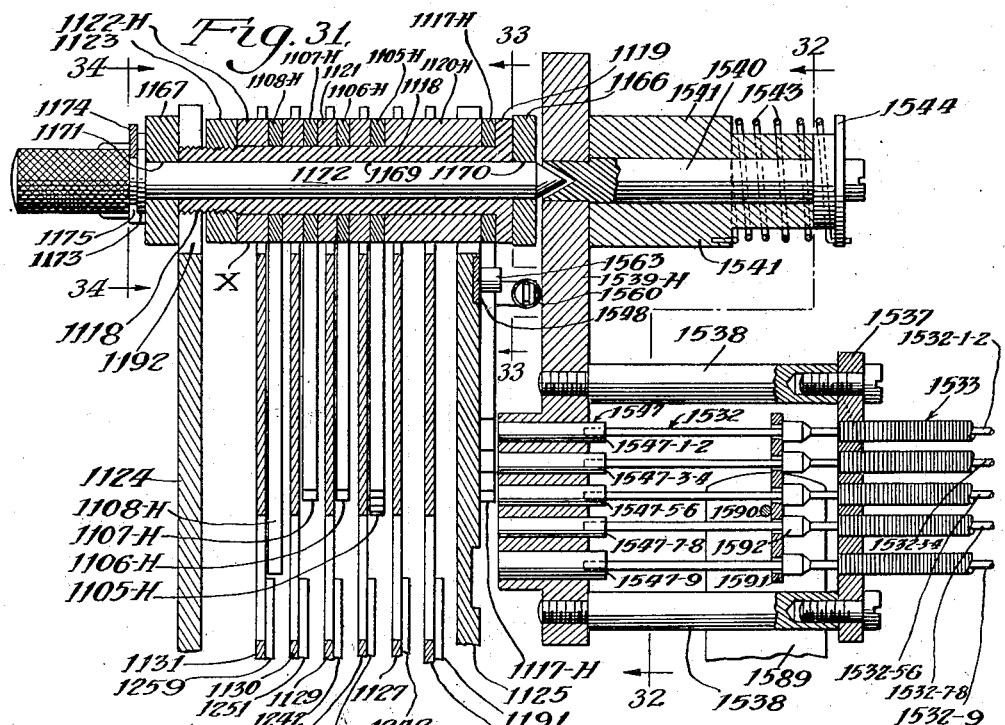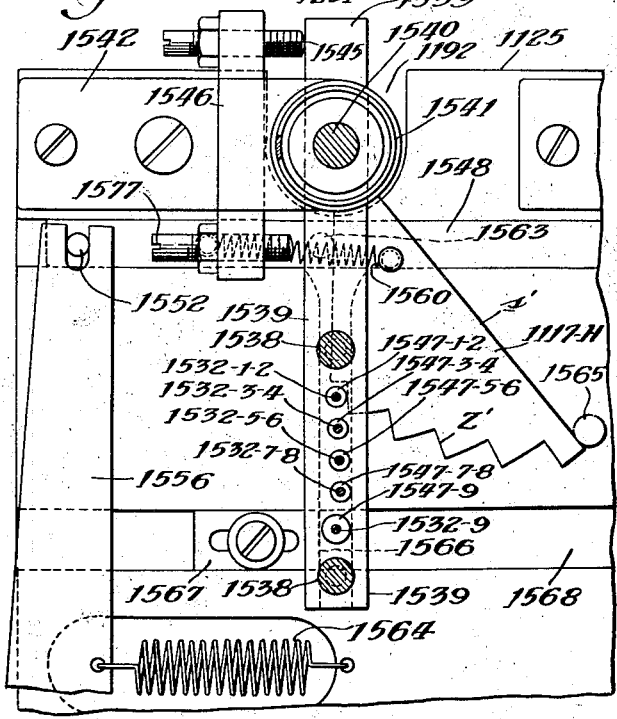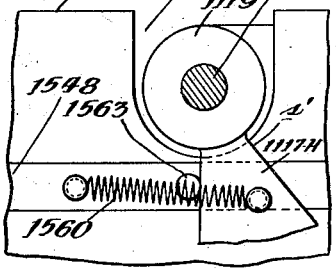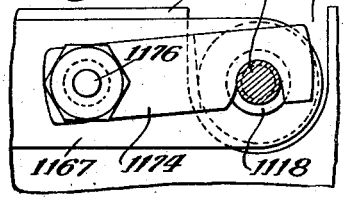

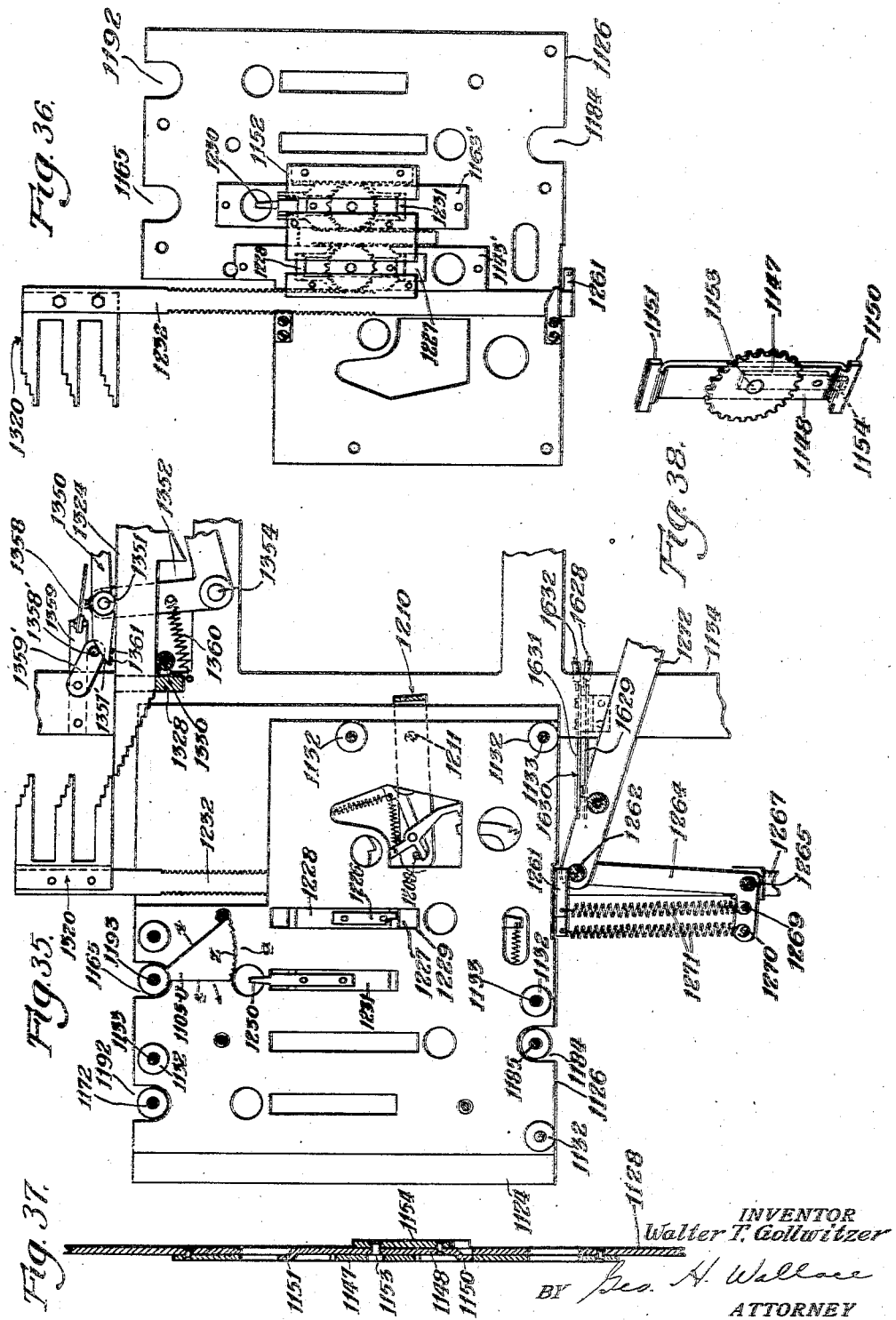

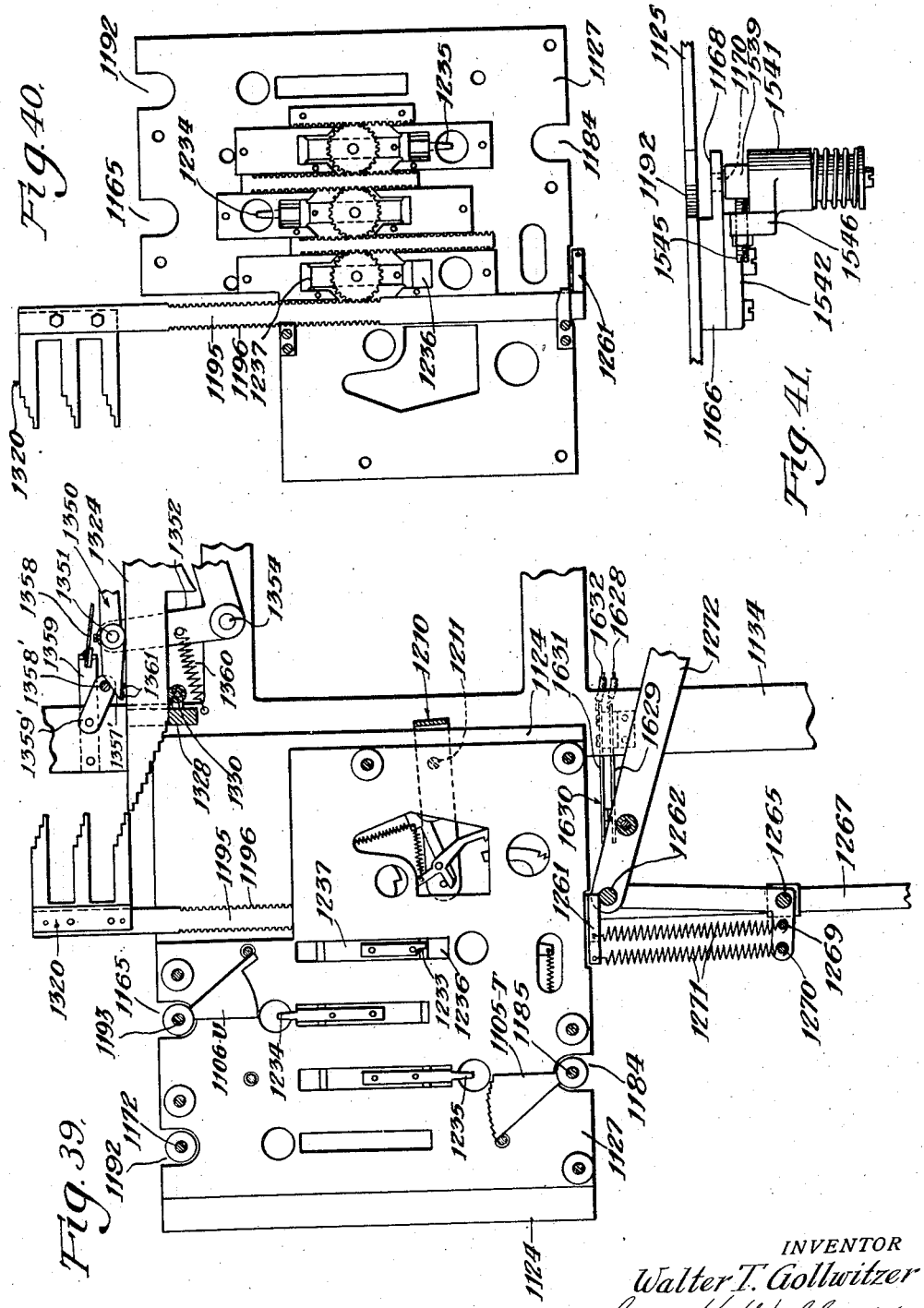

Sept. 22, 1942.  W. T. GOLLWITZER  2,296,276
CALCULATING MACHINE
Original Filed July 28, 1938  52 Sheets-Sheet 14
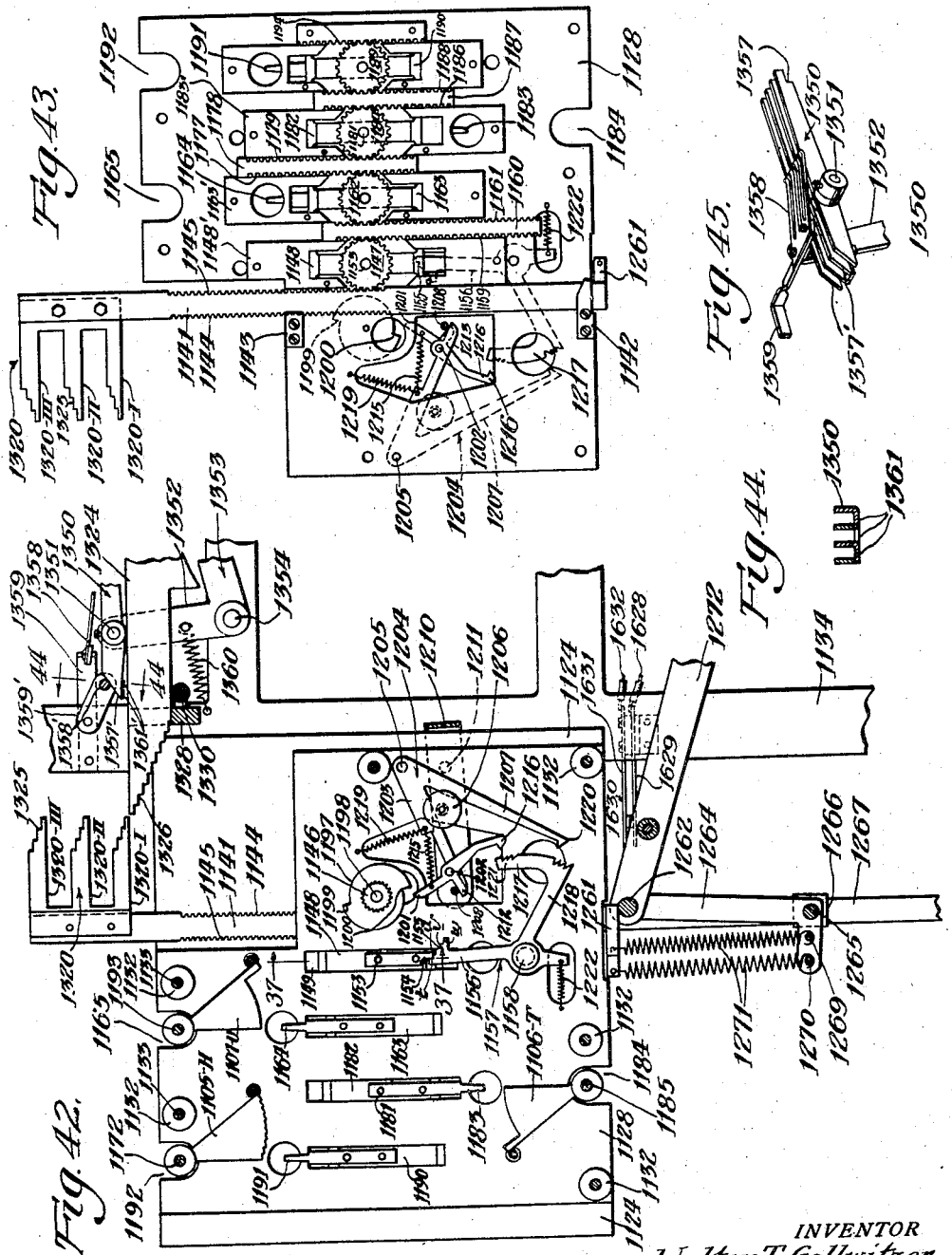
INVENTOR
Walter T. Gollwitzer
BY Geo. H. Wallace
ATTORNEY

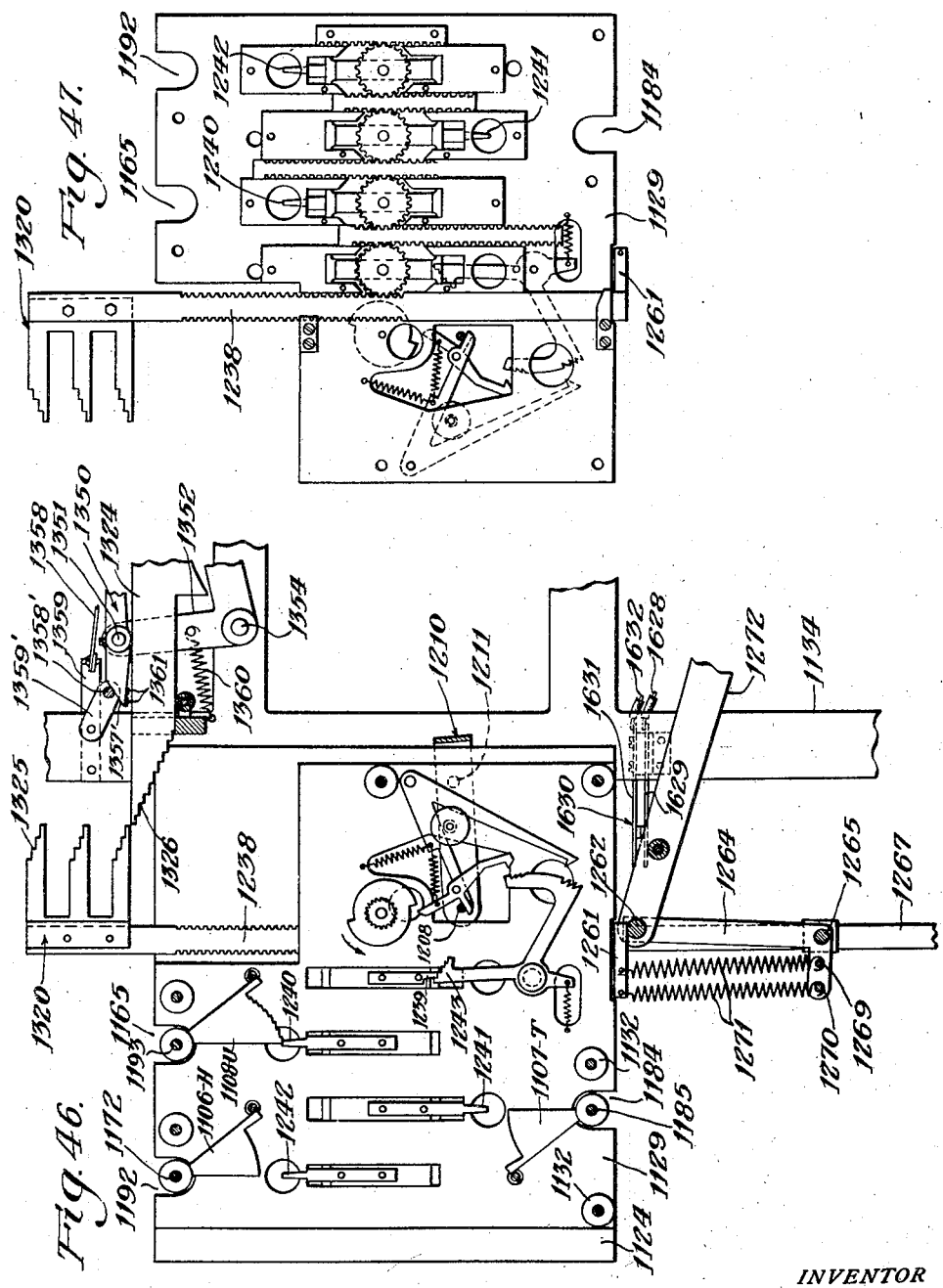

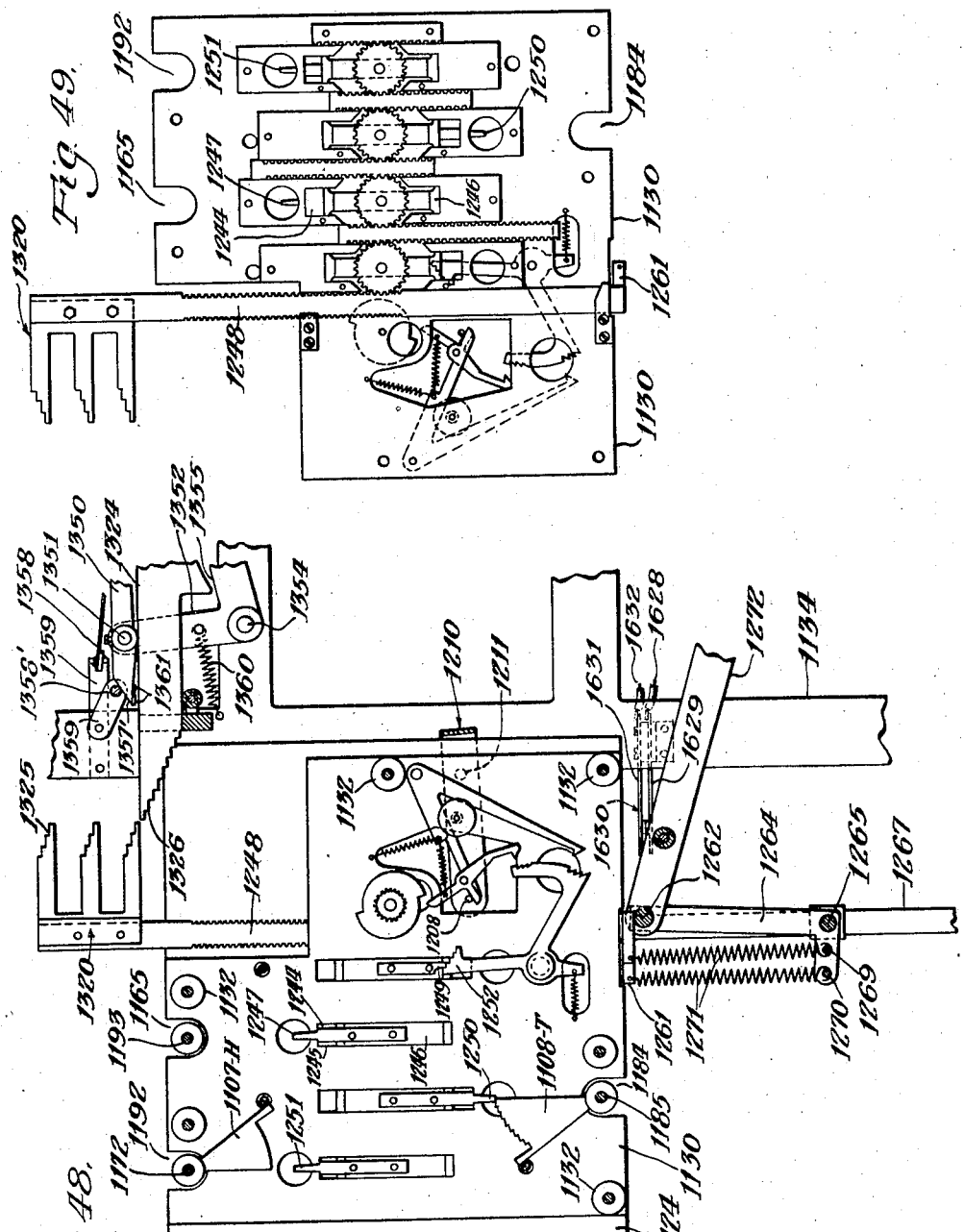

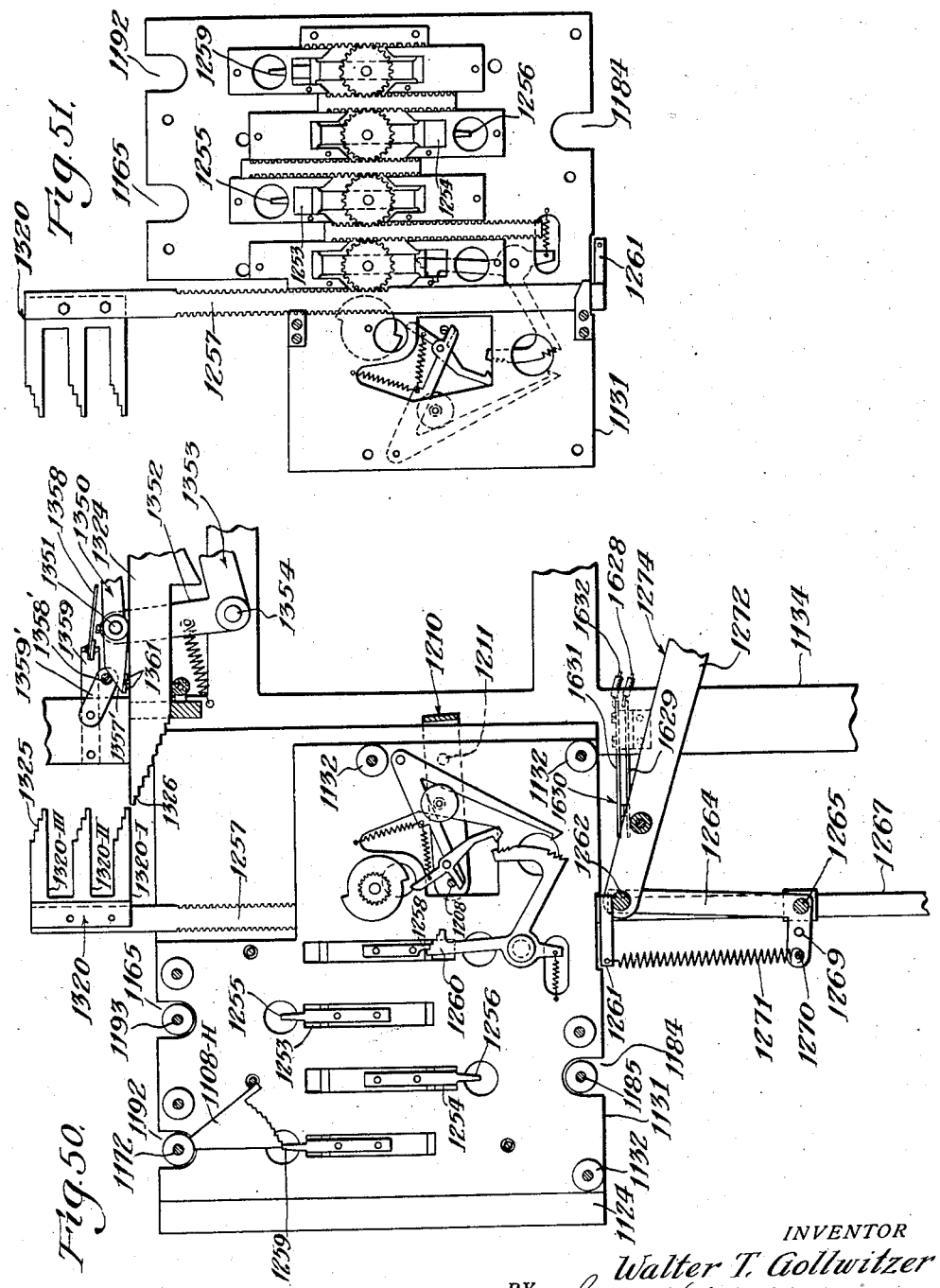

Sept. 22, 1942.   W. T. GOLLWITZER   2,296,276
CALCULATING MACHINE
Original Filed July 28, 1938   52 Sheets—Sheet 18
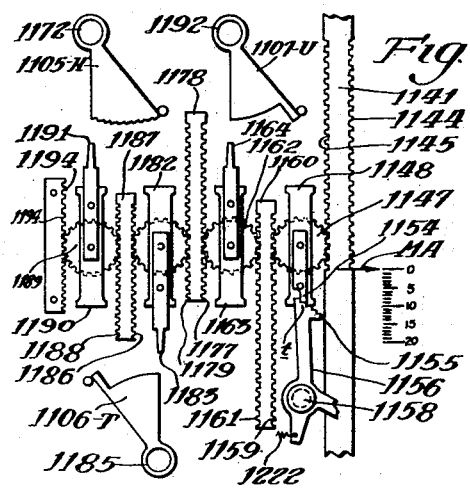
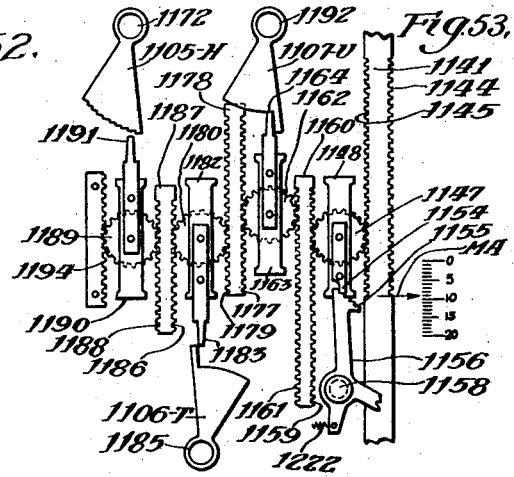
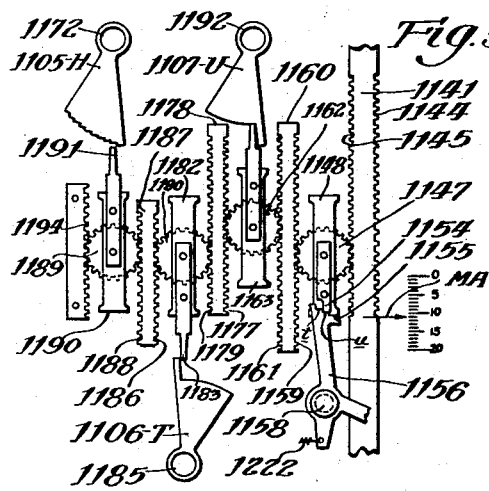
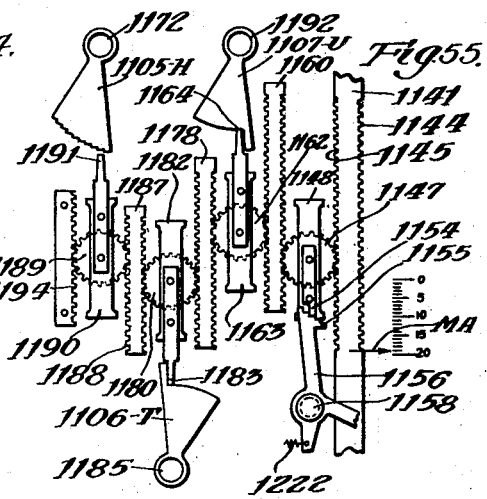
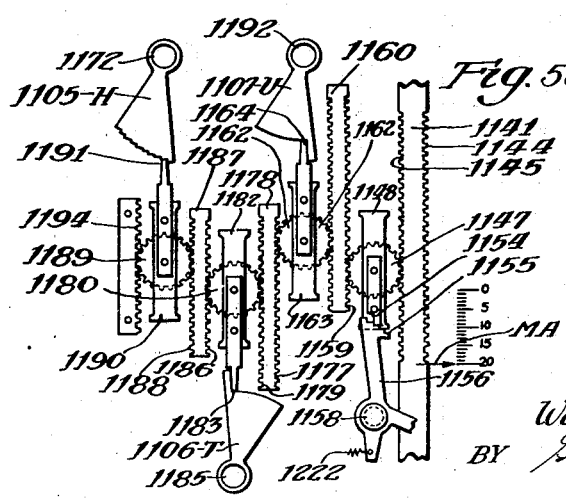
INVENTOR
Walter T. Gollwitzer
BY Geo. H. Wallace
ATTORNEY Sept. 22, 1942.  W. T. GOLLWITZER  2,296,276
CALCULATING MACHINE
Original Filed July 28, 1938   52 Sheets—Sheet 19

INVENTOR
Walter T. Gollwitzer
BY Geo. N. Wallace
ATTORNEY

Sept. 22, 1942.    W. T. GOLLWITZER    2,296,276
CALCULATING MACHINE
Original Filed July 28, 1938    52 Sheets-Sheet 20

INVENTOR
Walter T. Gollwitzer
BY Geo. N. Wallace
ATTORNEY

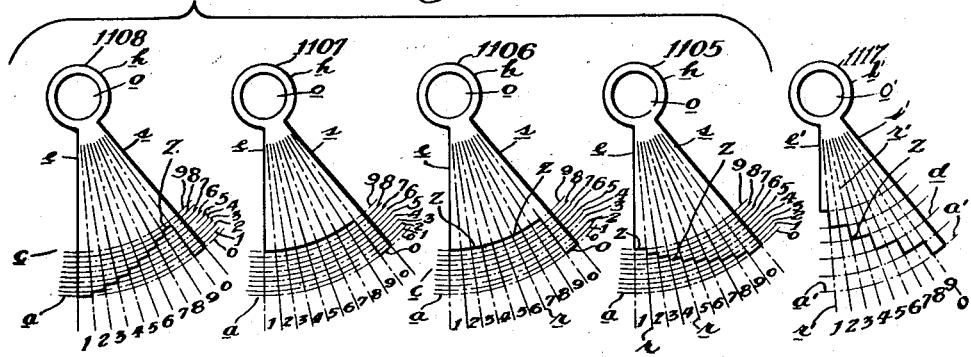
Fig. 62. For Reoccurring Factor 999
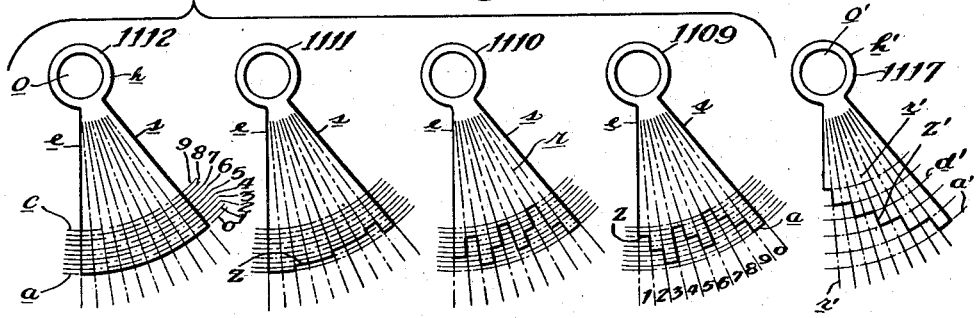
Fig. 63. For Reoccurring Factor 37
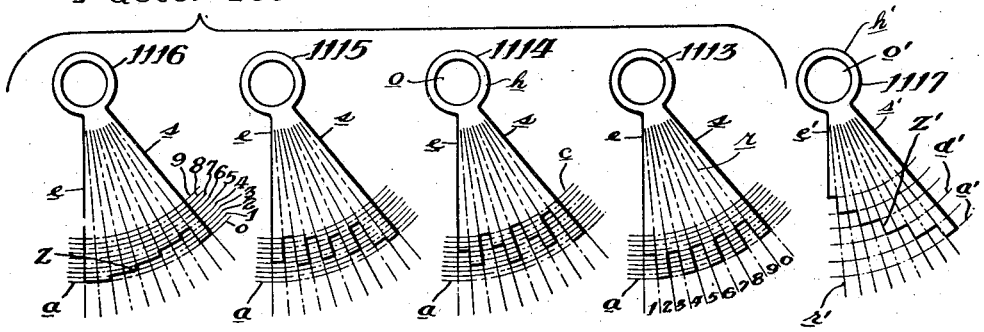
Fig. 64. For Reoccurring Factor 465

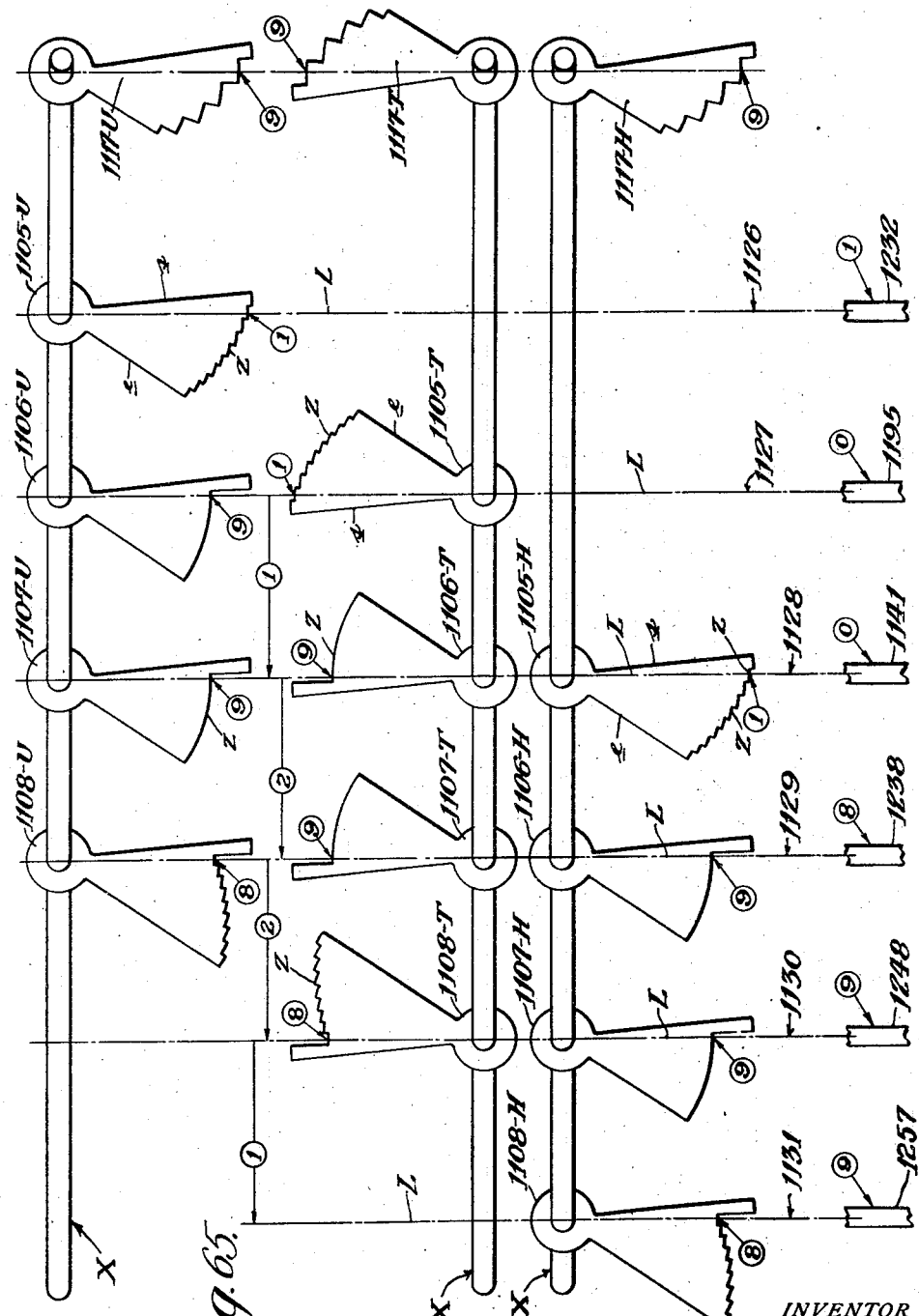

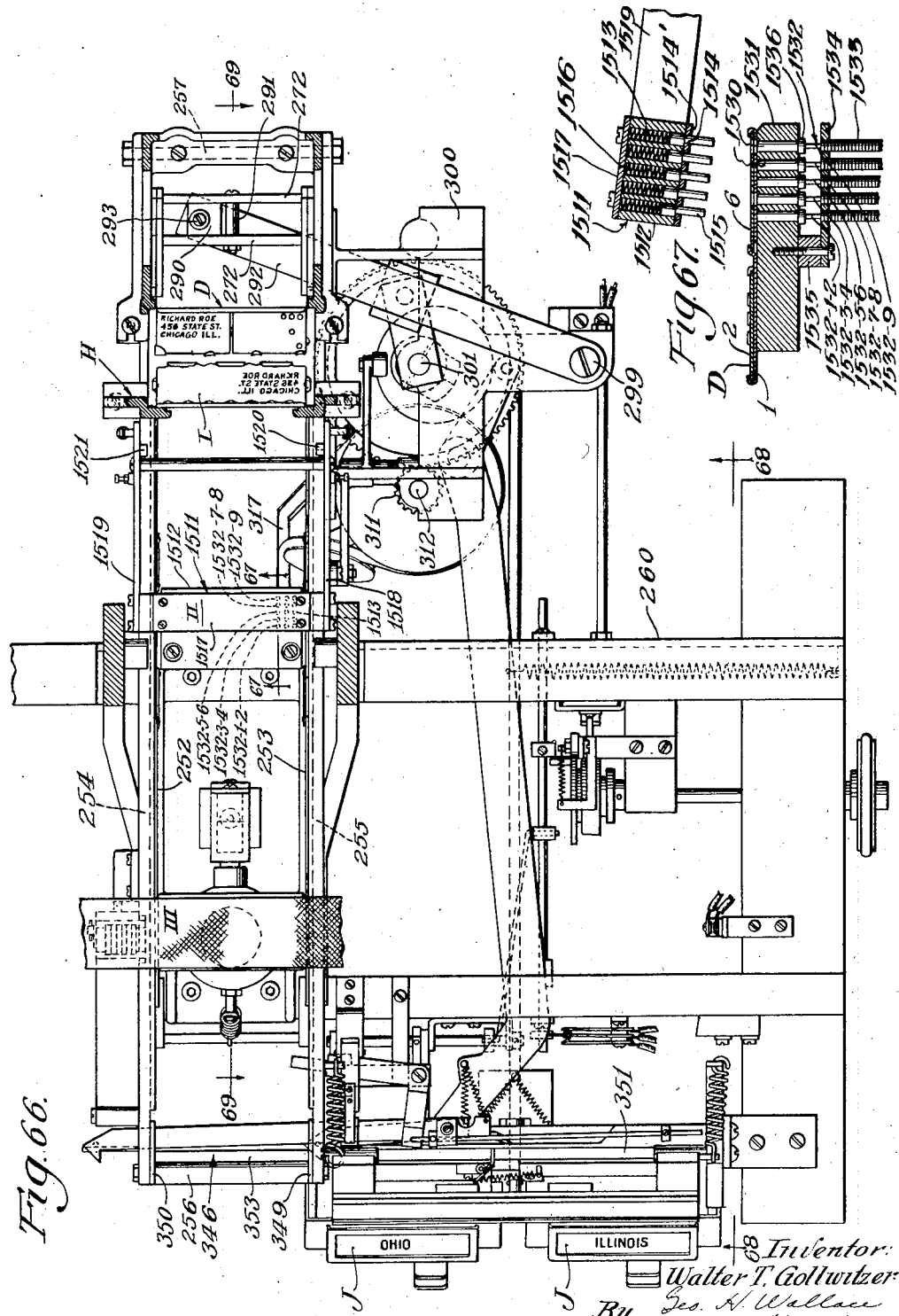

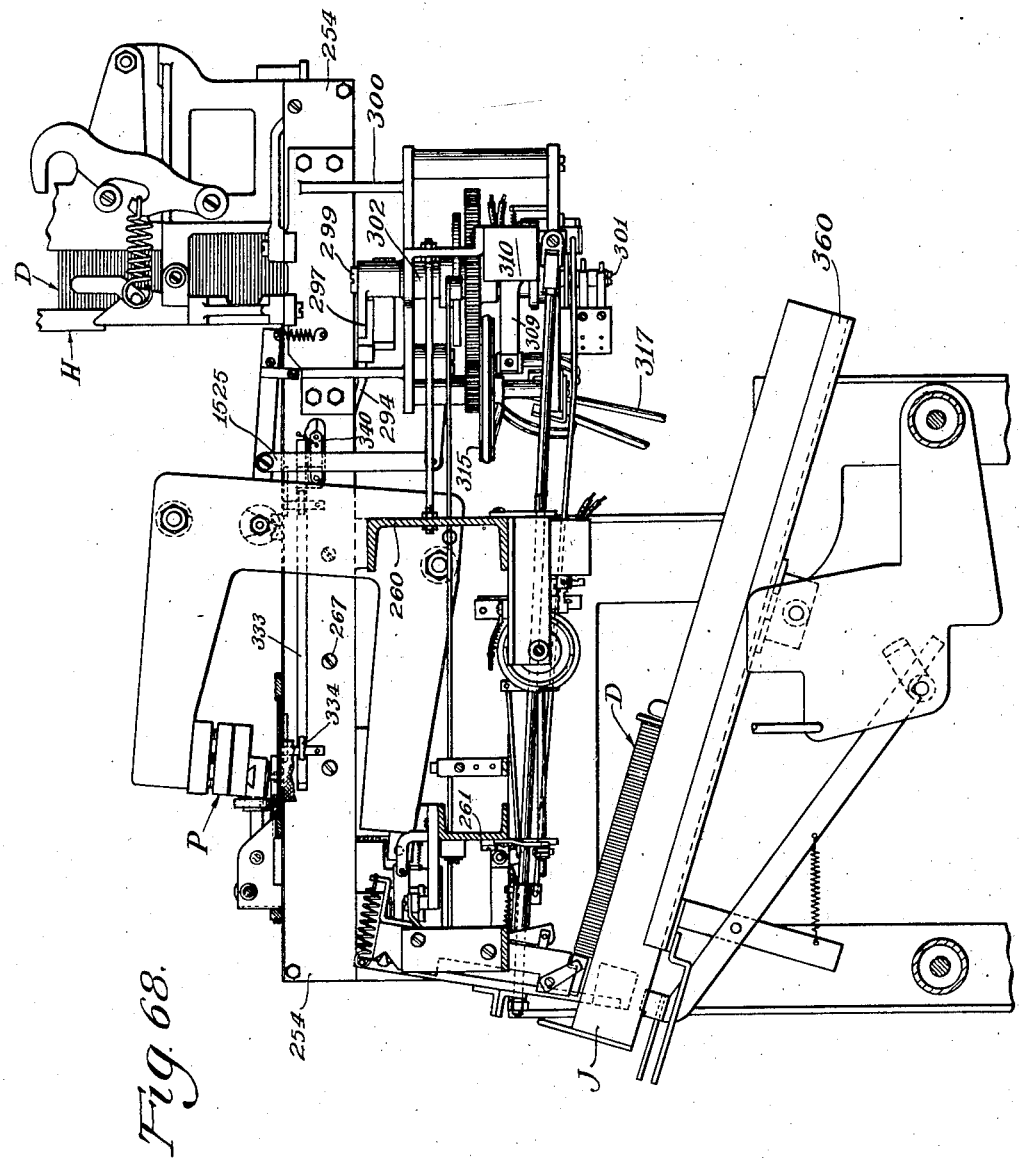

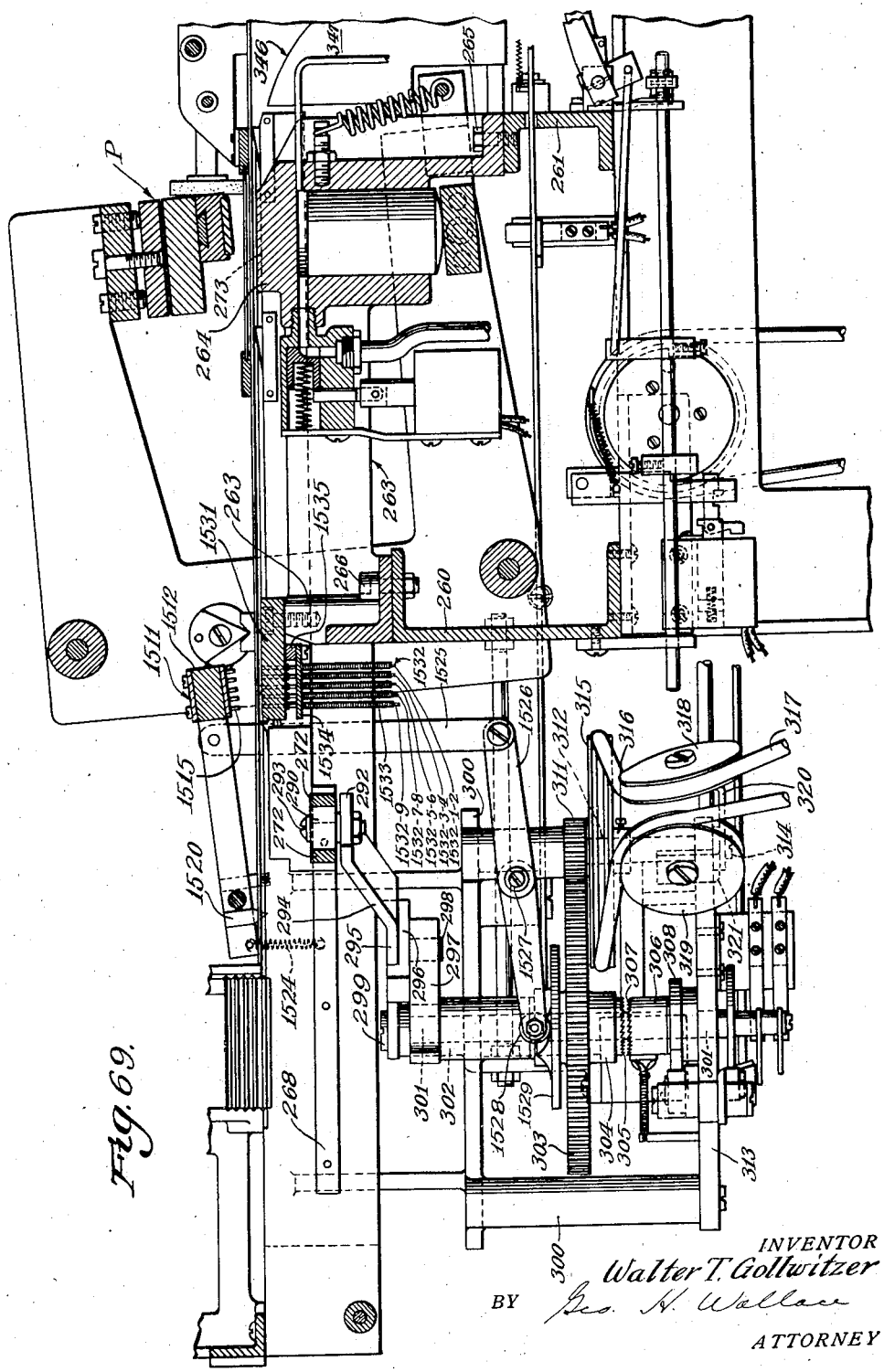

Sept. 22, 1942. W. T. GOLLWITZER 2,296,276
CALCULATING MACHINE
Original Filed July 28, 1938 52 Sheets-Sheet 26
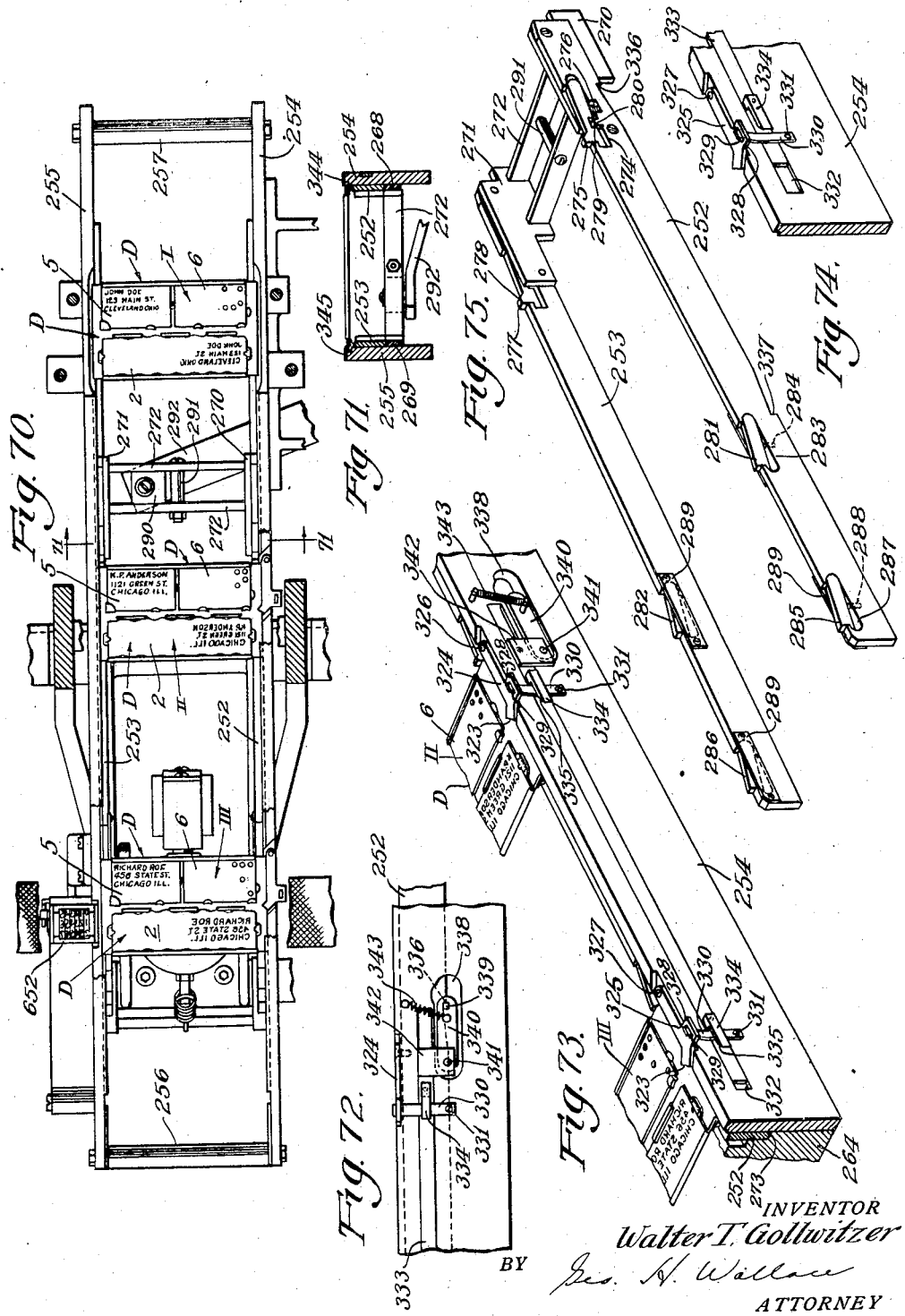
INVENTOR
Walter T. Gollwitzer
BY
ATTORNEY

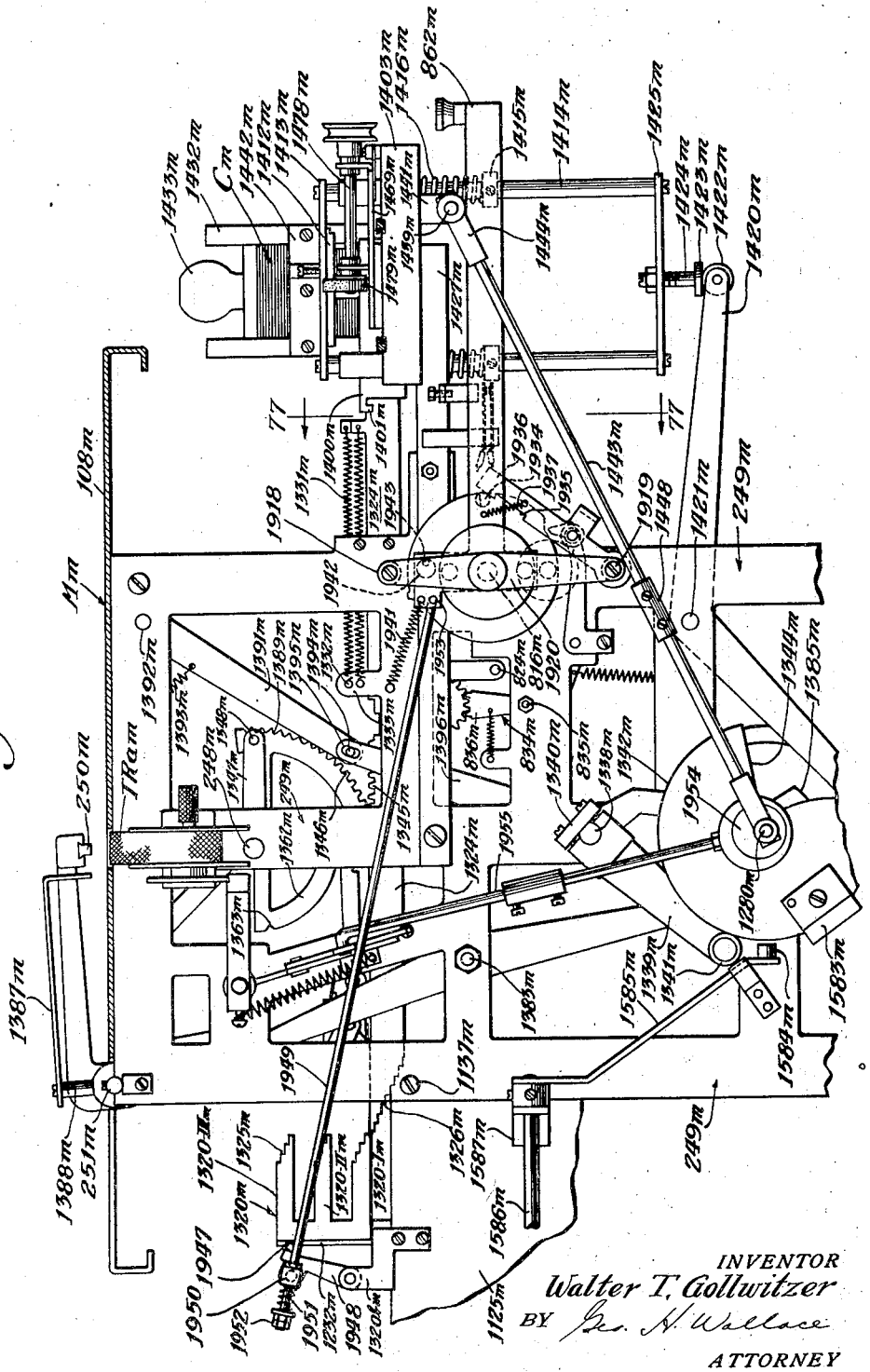

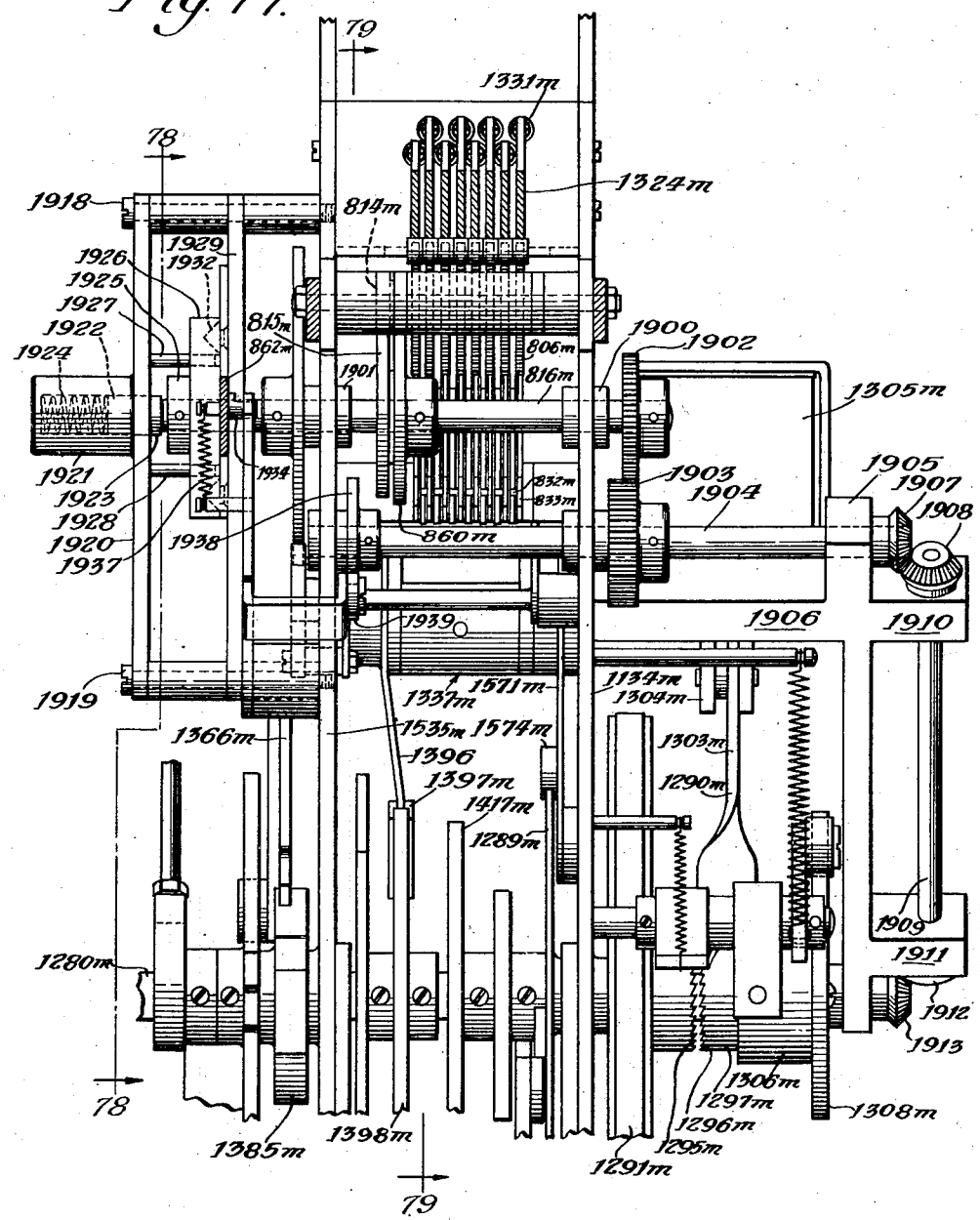

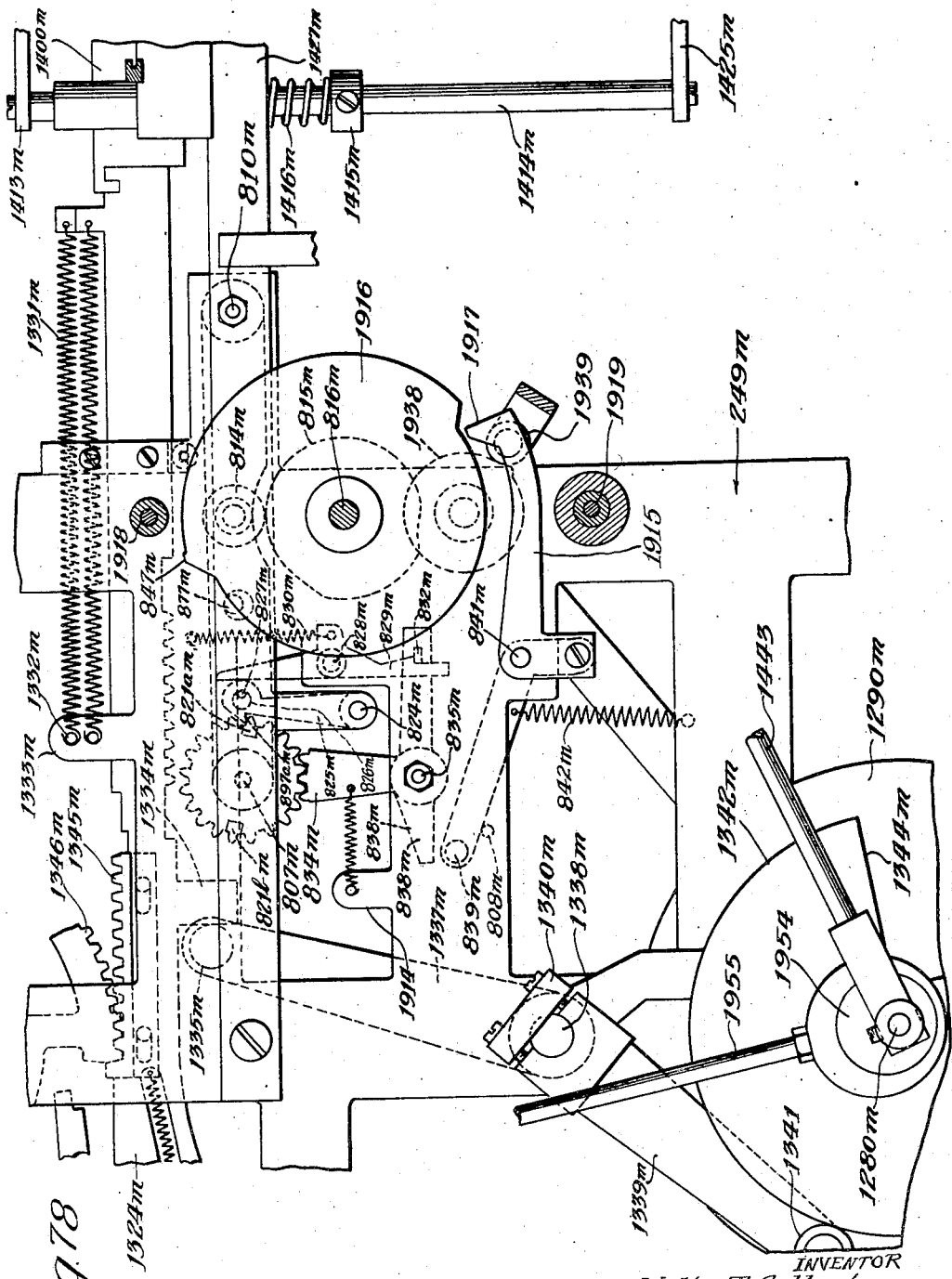

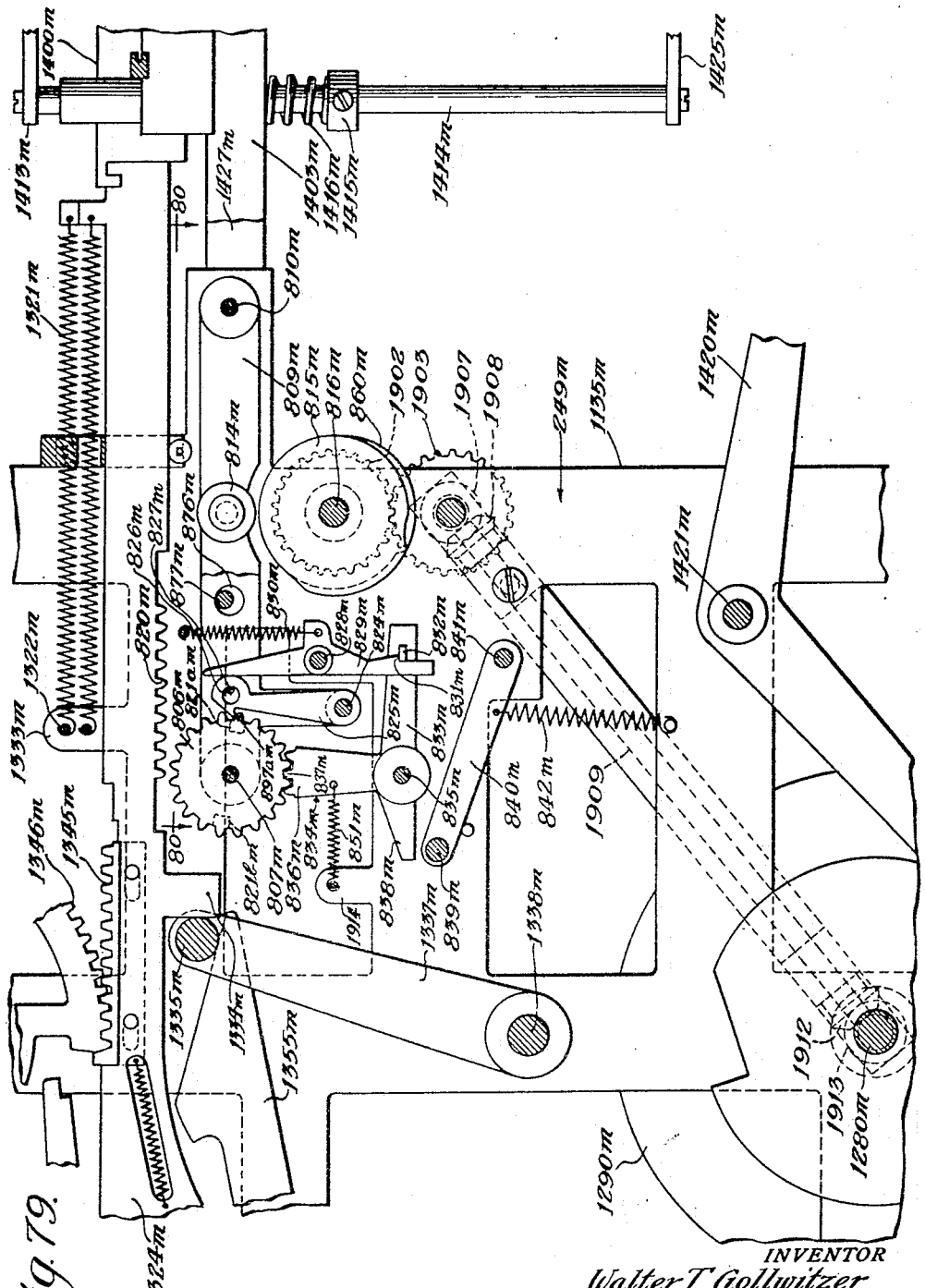

Sept. 22, 1942.  W. T. GOLLWITZER  2,296,276
CALCULATING MACHINE
Original Filed July 28, 1938  52 Sheets-Sheet 31
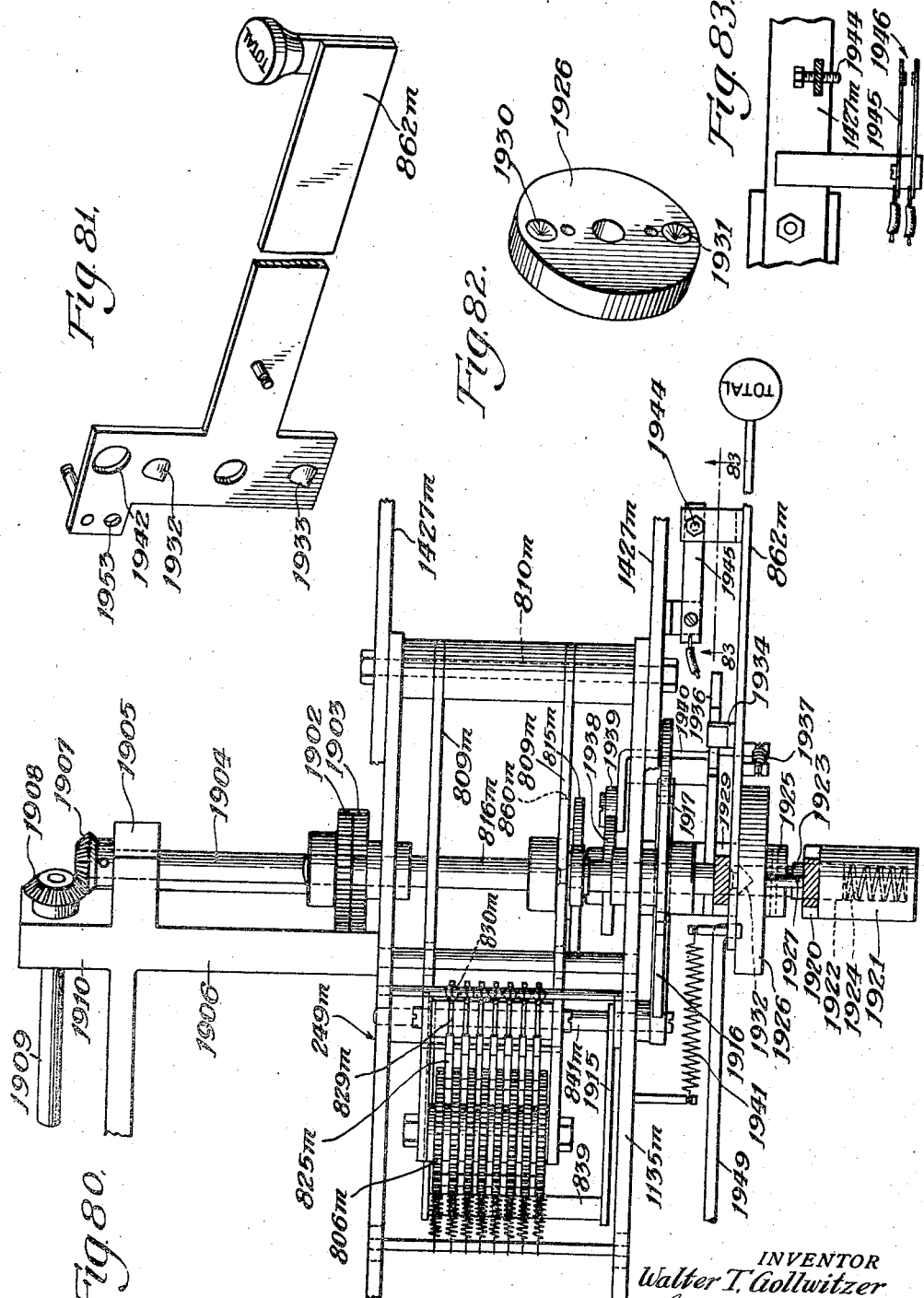
INVENTOR
Walter T. Gollwitzer
BY Geo. H. Wallace
ATTORNEY Sept. 22, 1942.   W. T. GOLLWITZER   2,296,276
CALCULATING MACHINE
Original Filed July 28, 1938   52 Sheets-Sheet 32

Inventor:
Walter T. Gollwitzer
By Geo. H. Wallace
Attorney

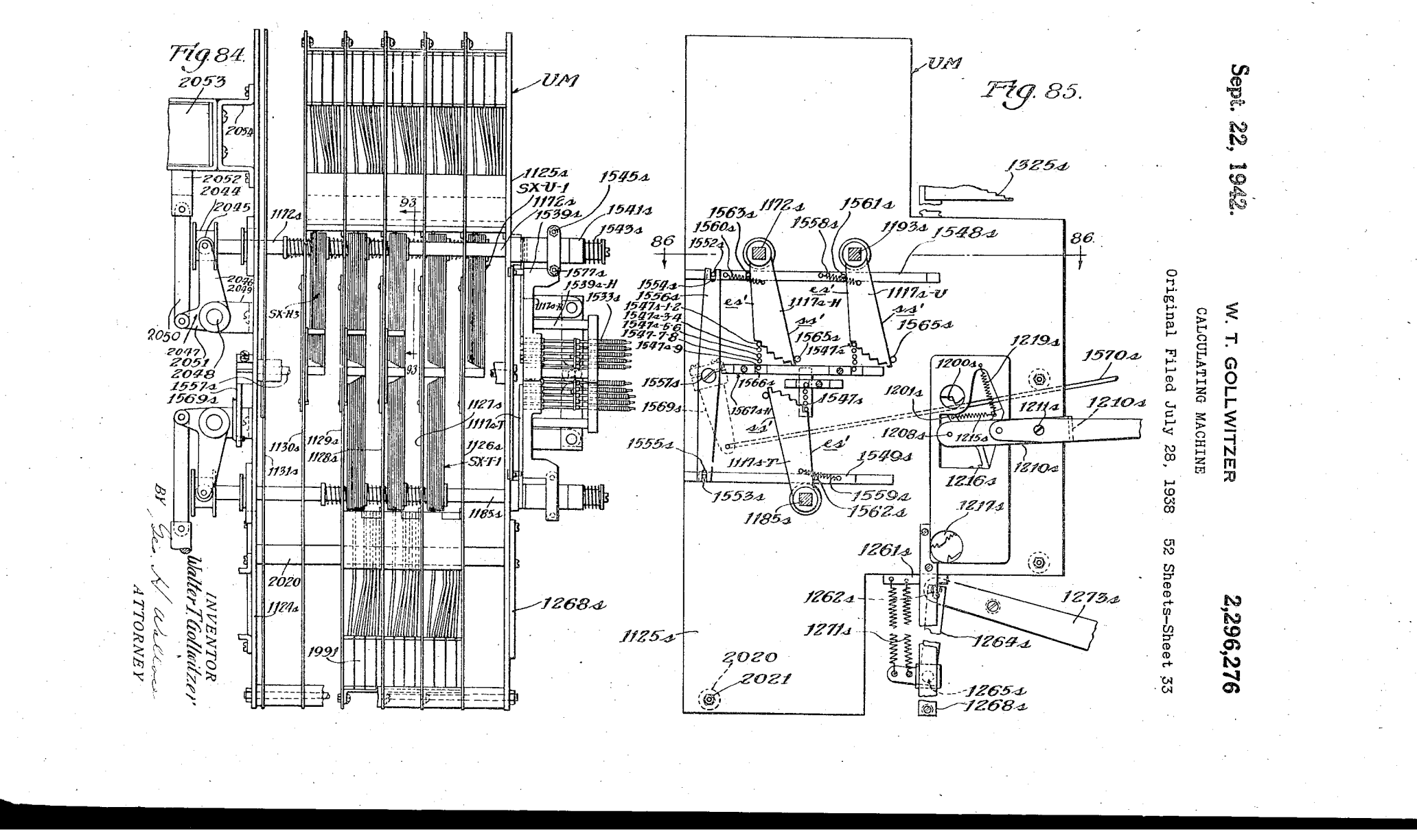

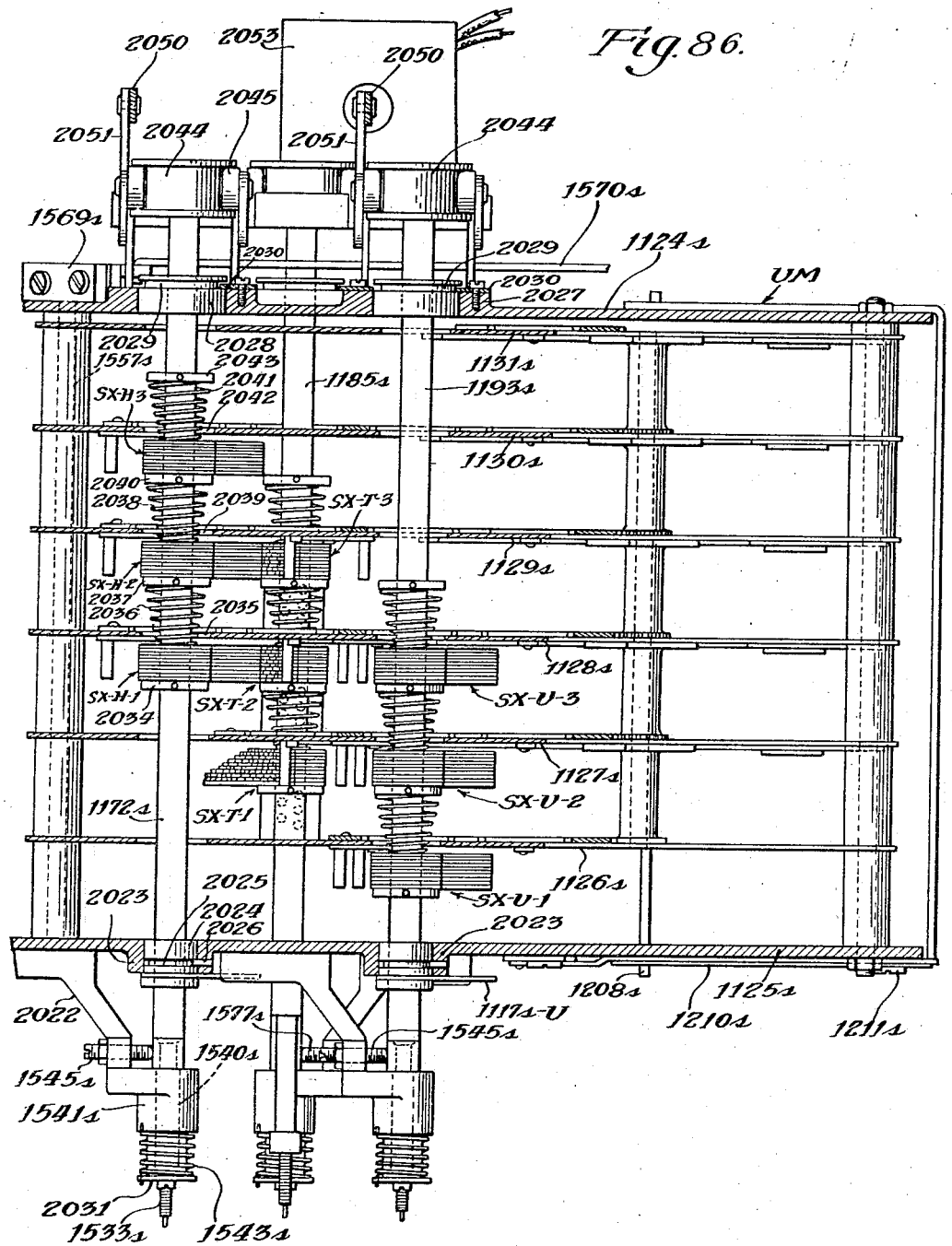

Sept. 22, 1942.　　　W. T. GOLLWITZER　　　2,296,276
CALCULATING MACHINE
Original Filed July 28, 1938　　52 Sheets-Sheet 35

INVENTOR
Walter T. Gollwitzer
BY
ATTORNEY

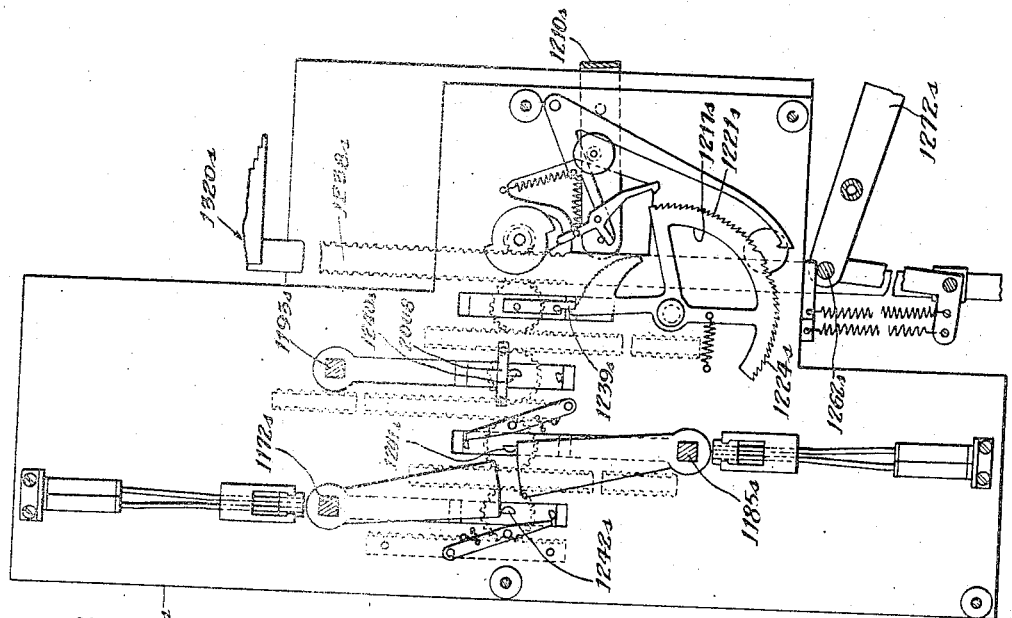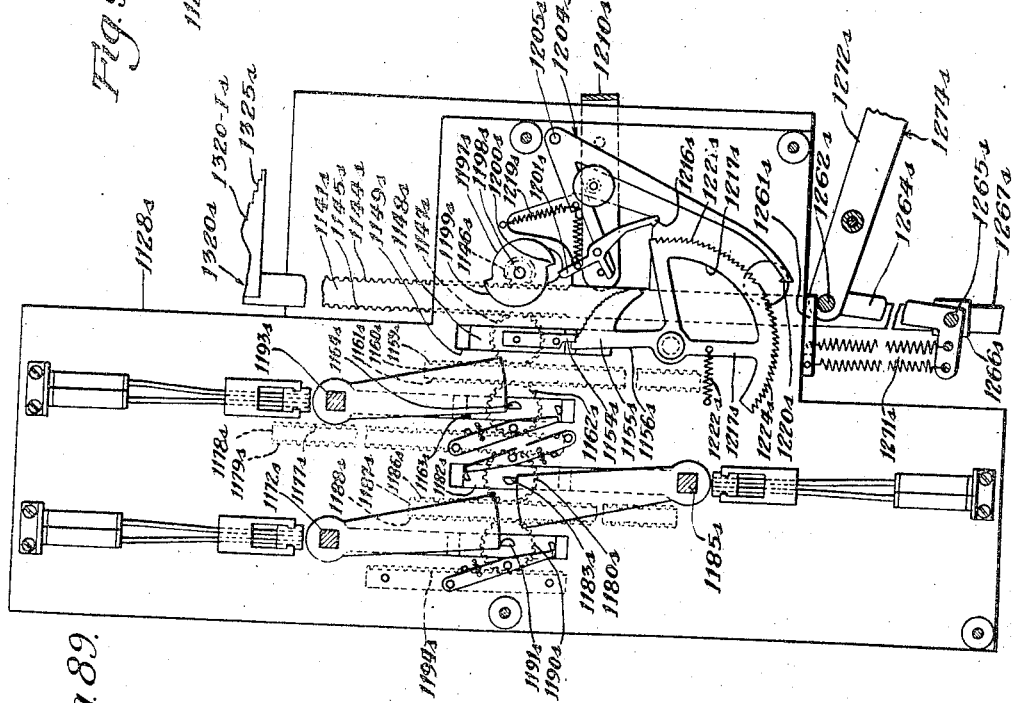

Sept. 22, 1942.   W. T. GOLLWITZER   2,296,276
CALCULATING MACHINE
Original Filed July 28, 1938   52 Sheets-Sheet 37

INVENTOR
Walter T. Gollwitzer
BY Geo. H. Wallace
ATTORNEY

Sept. 22, 1942.  W. T. GOLLWITZER  2,296,276
CALCULATING MACHINE
Original Filed July 28, 1938  52 Sheets-Sheet 38
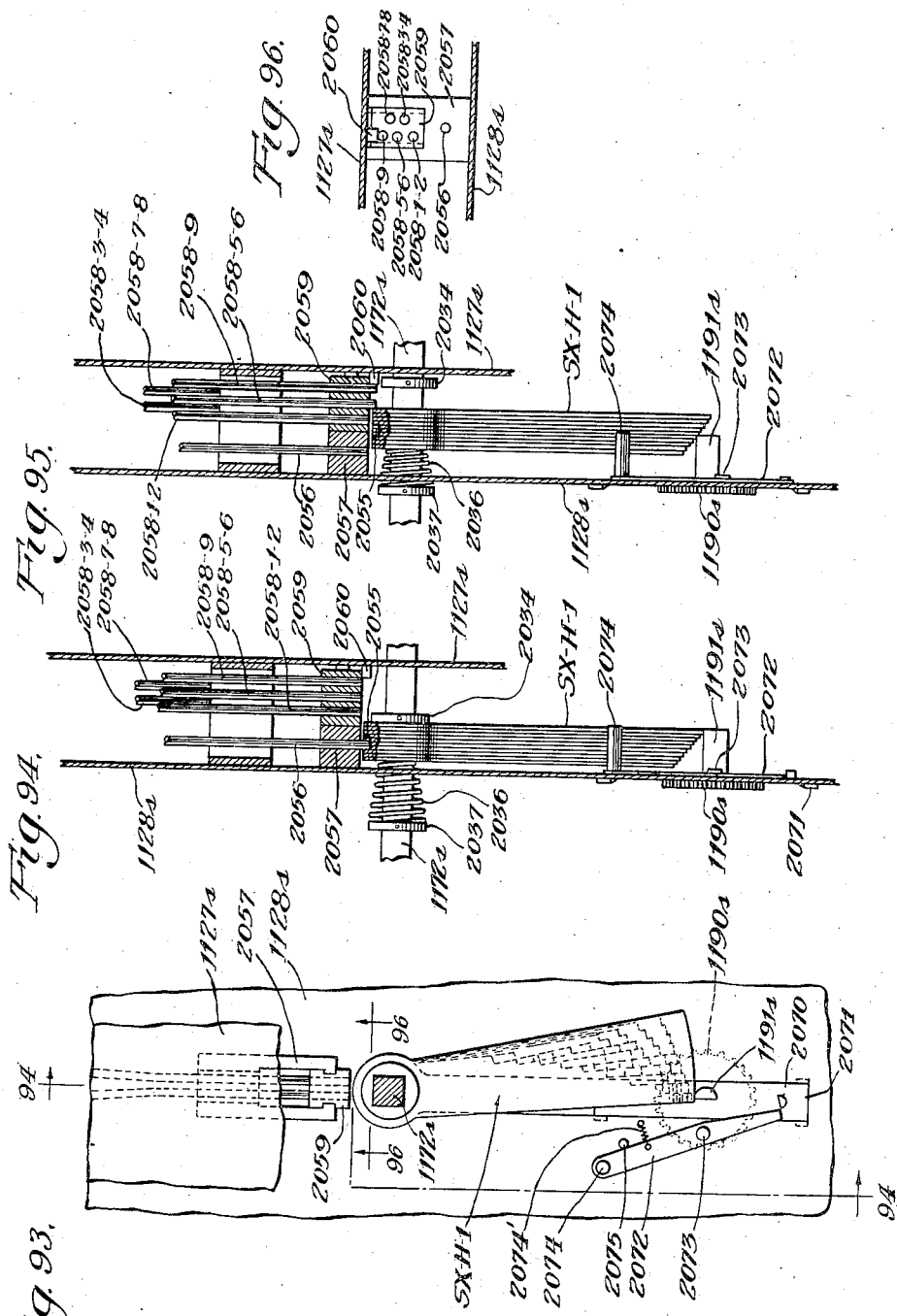
INVENTOR
Walter T. Gollwitzer
BY
ATTORNEY

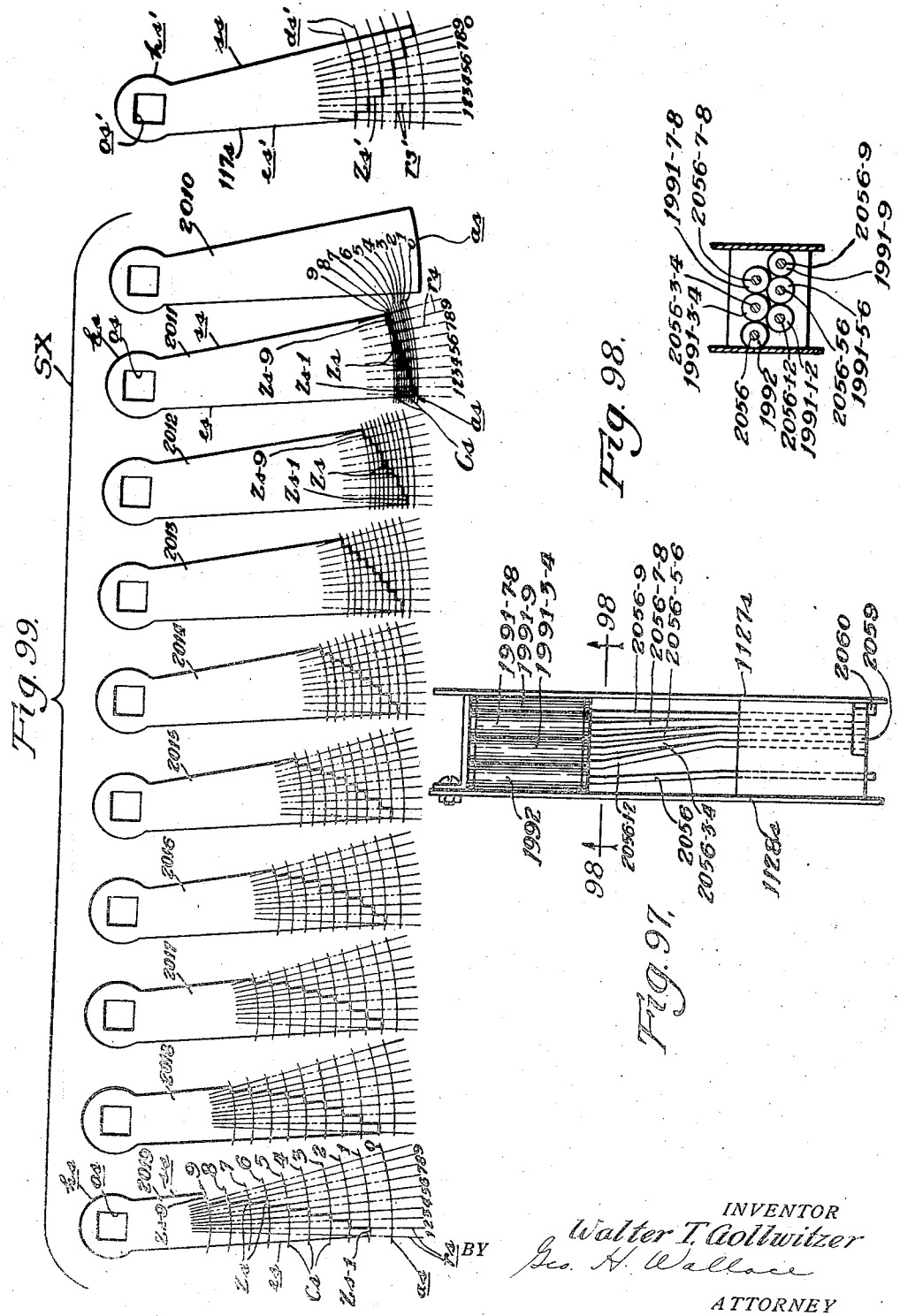

Sept. 22, 1942.  W. T. GOLLWITZER  2,296,276
CALCULATING MACHINE
Original Filed July 28, 1938   52 Sheets-Sheet 40

INVENTOR
Walter T. Gollwitzer
BY
ATTORNEY

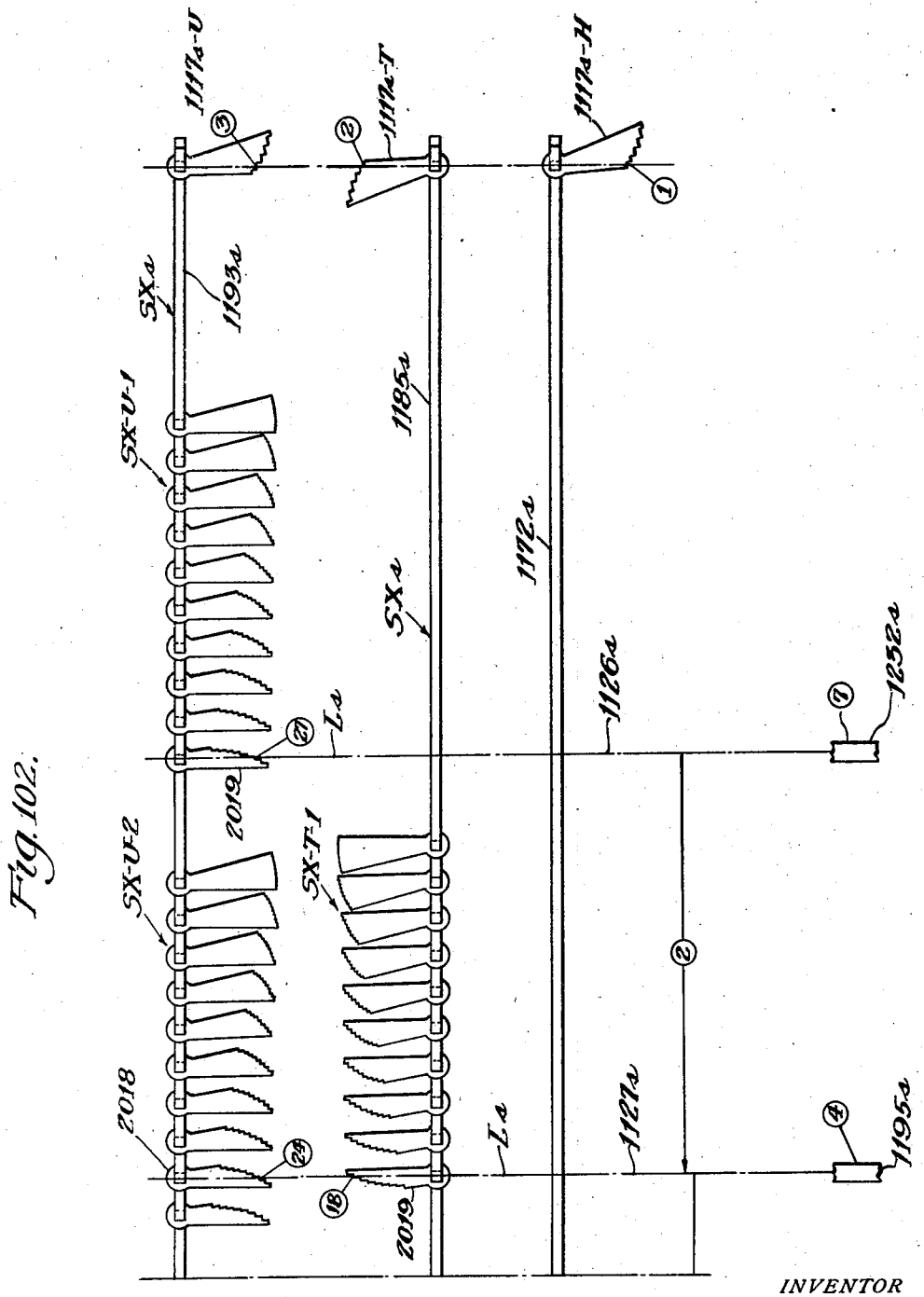

Sept. 22, 1942.  W. T. GOLLWITZER  2,296,276
CALCULATING MACHINE
Original Filed July 28, 1938   52 Sheets-Sheet 43
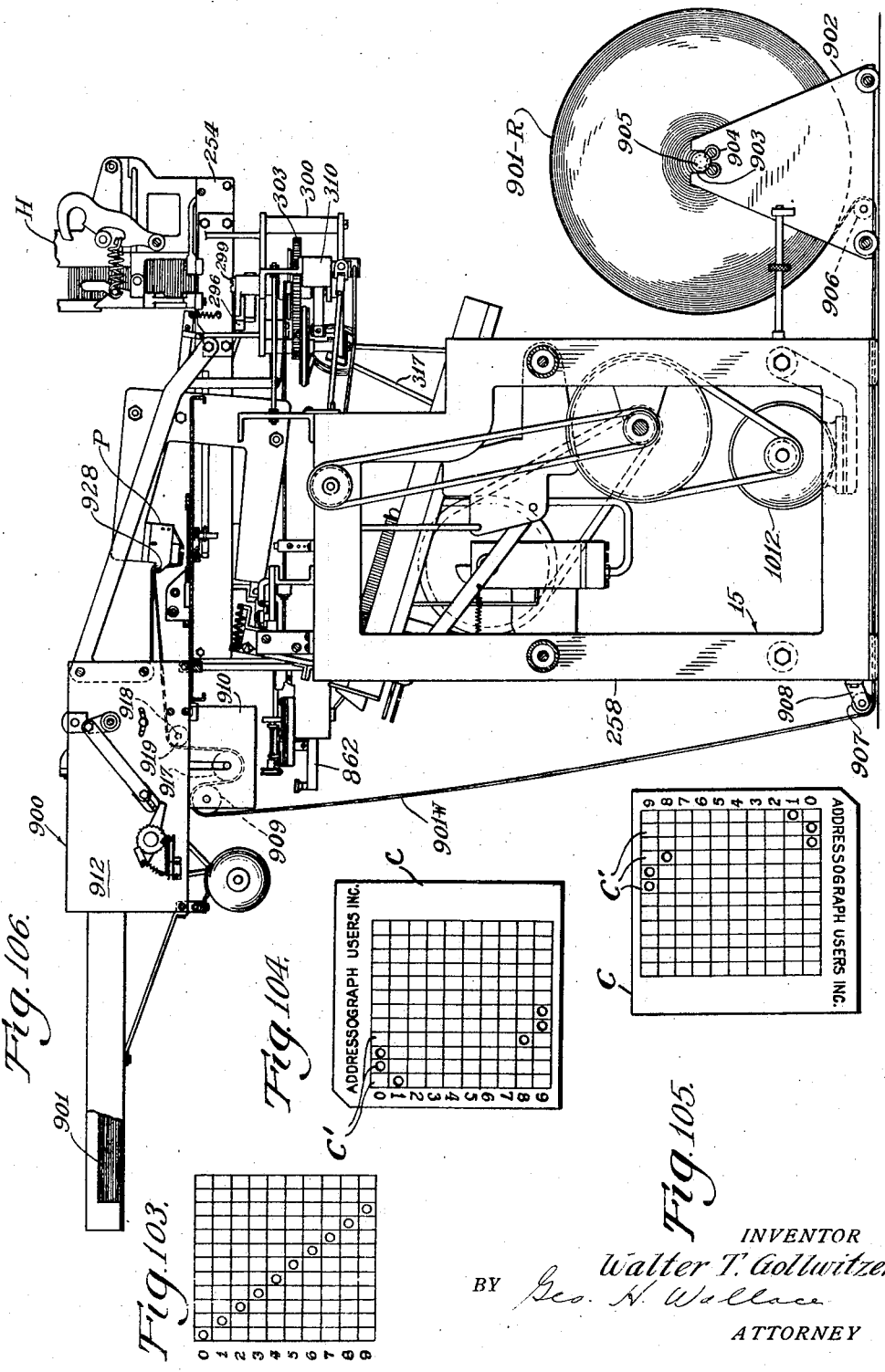
INVENTOR
Walter T. Gollwitzer
BY Geo. H. Wallace
ATTORNEY Sept. 22, 1942.  W. T. GOLLWITZER  2,296,276
CALCULATING MACHINE
Original Filed July 28, 1938   52 Sheets-Sheet 44

Inventor:
Walter T. Gollwitzer
By: Geo. H. Wallace
Attorney

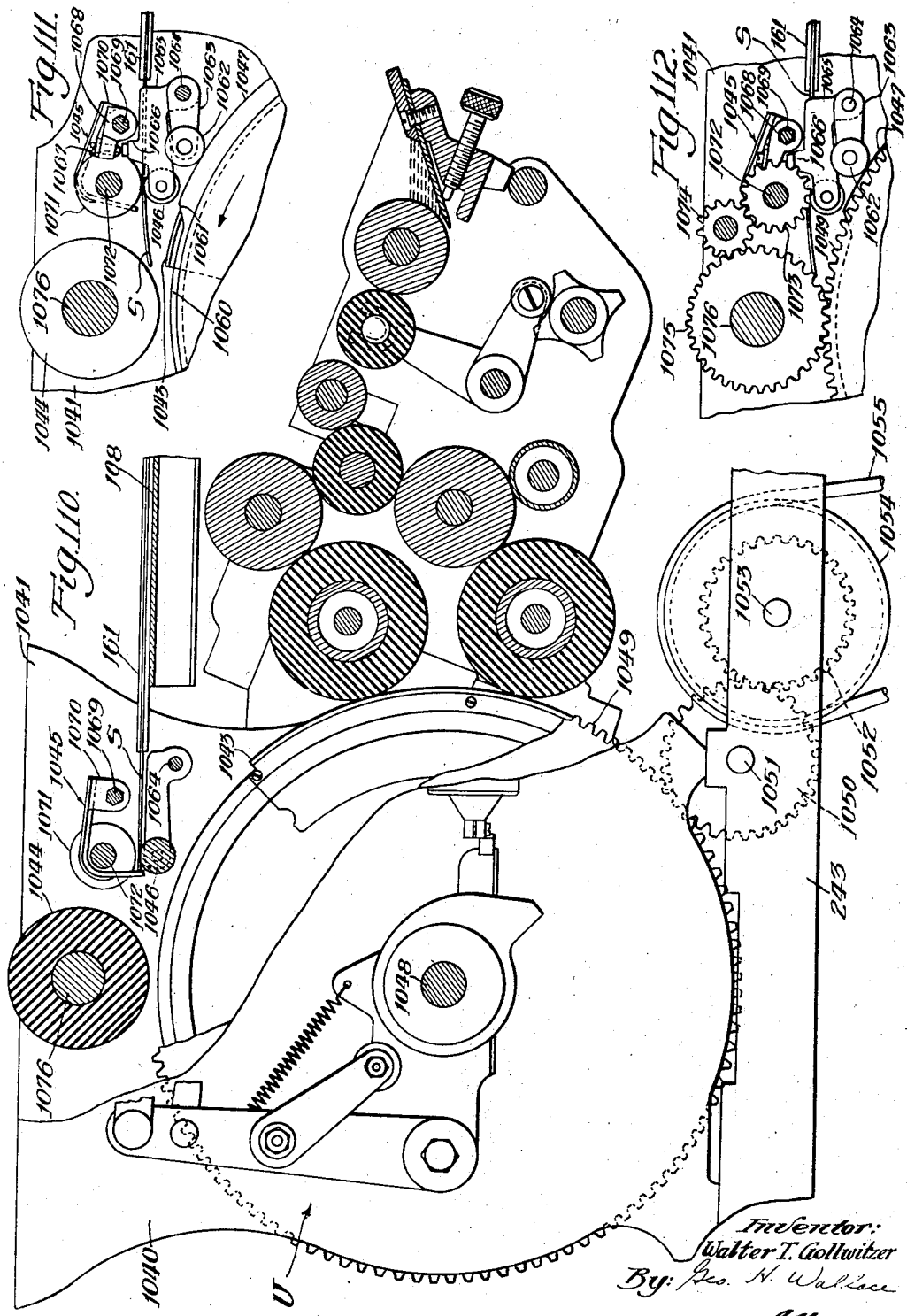

Sept. 22, 1942.   W. T. GOLLWITZER   2,296,276
CALCULATING MACHINE
Original Filed July 28, 1938   52 Sheets-Sheet 46
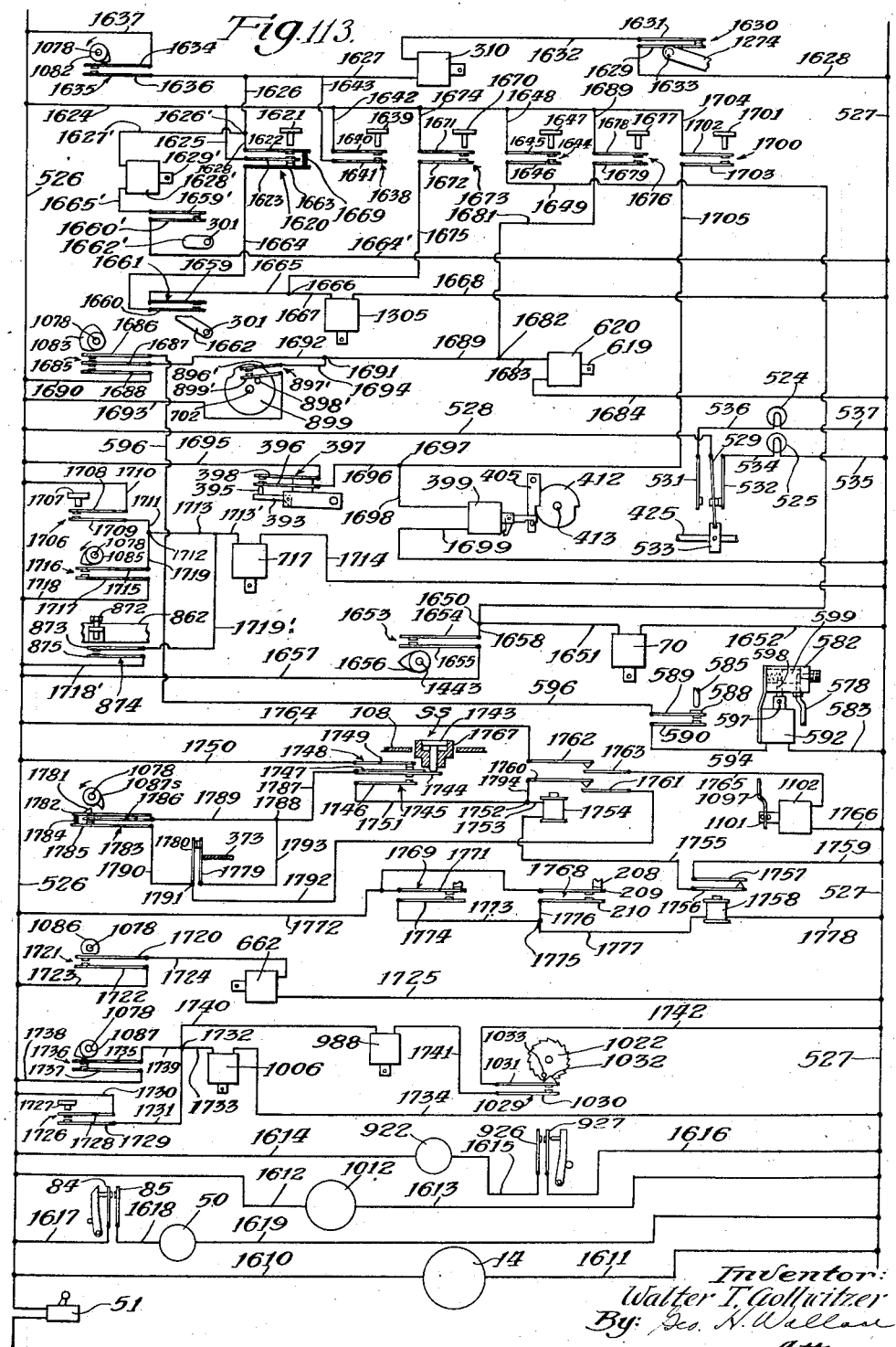

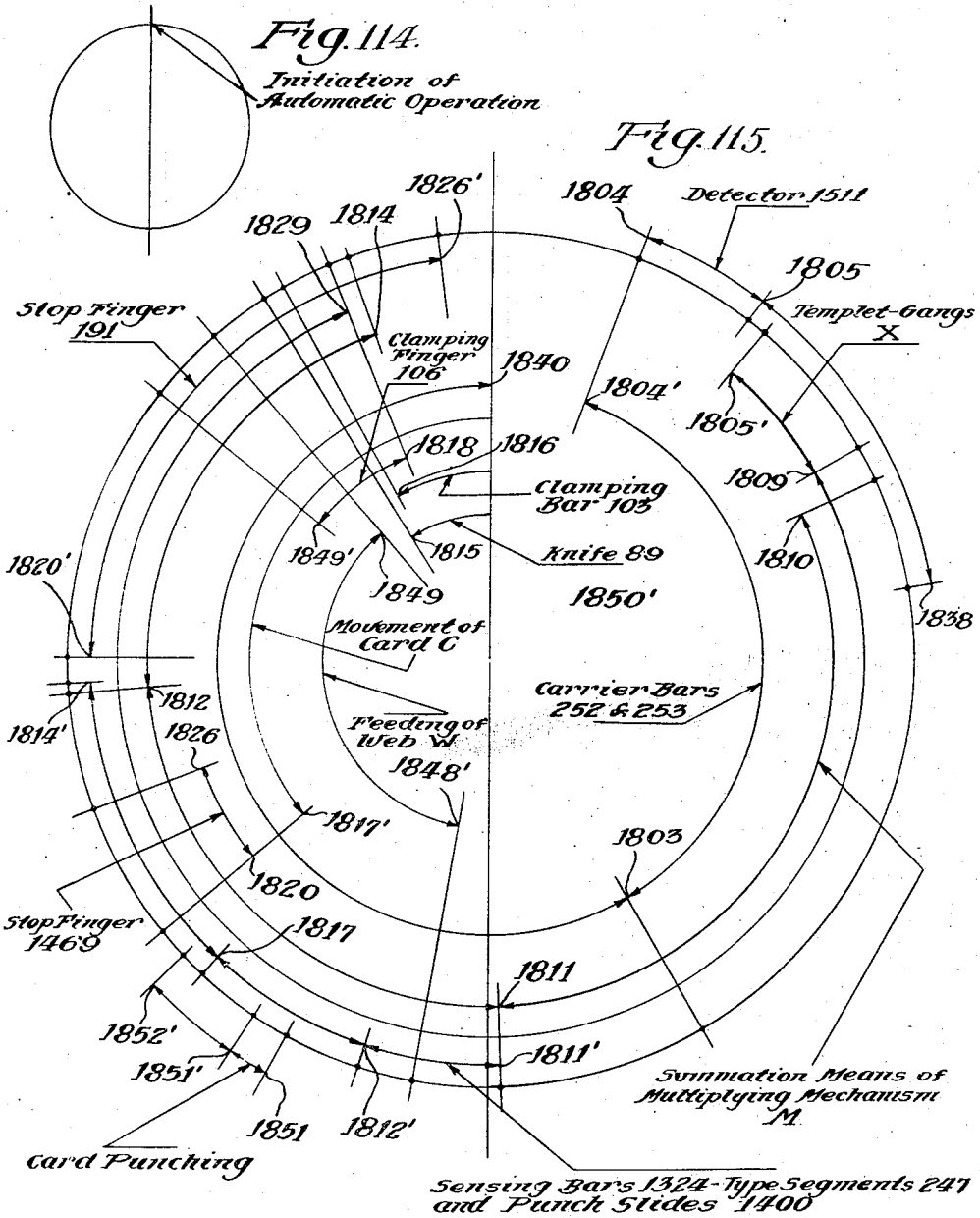

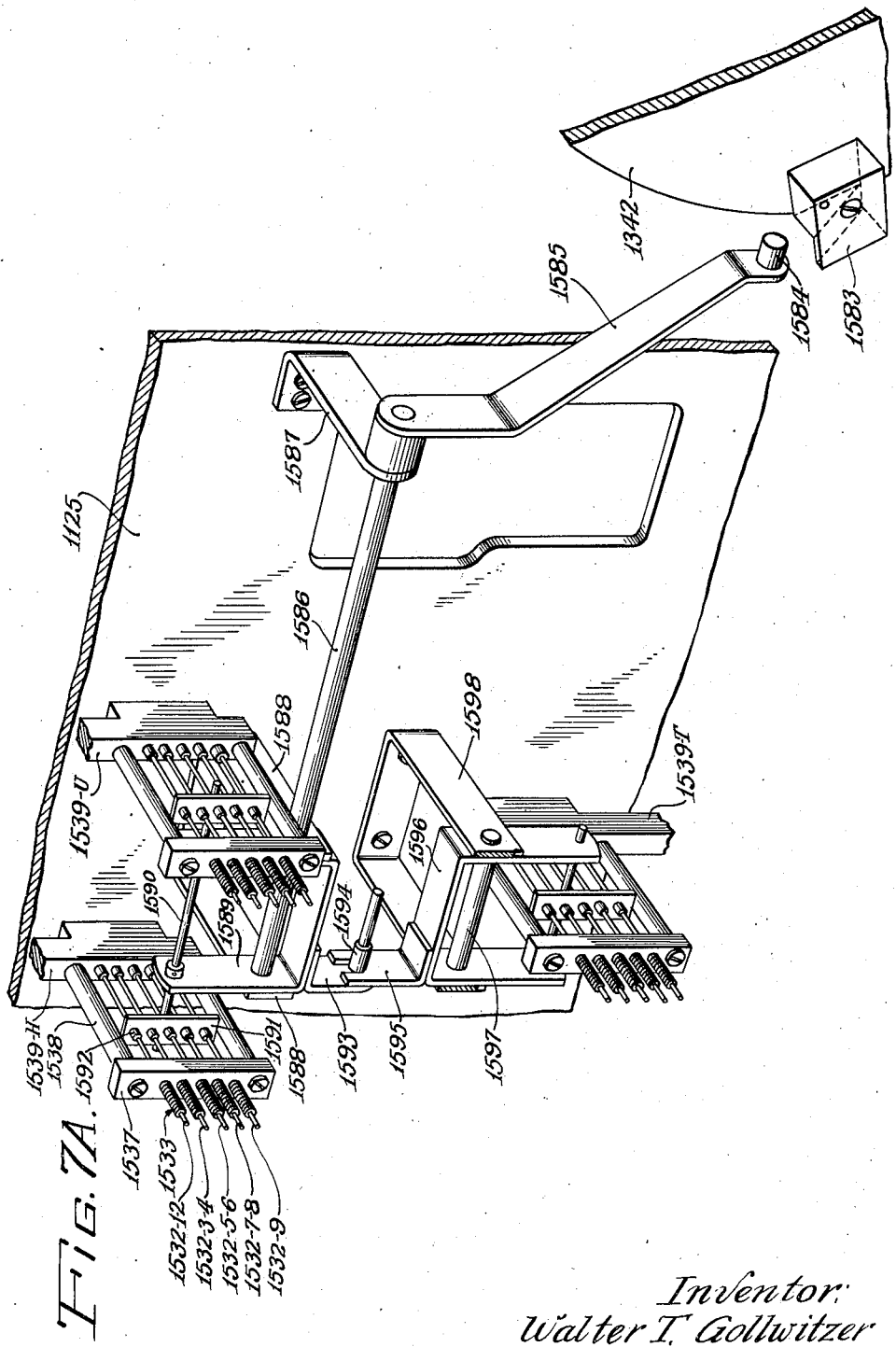

Sept. 22, 1942.  W. T. GOLLWITZER  2,296,276
CALCULATING MACHINE
Original Filed July 28, 1938  52 Sheets-Sheet 50
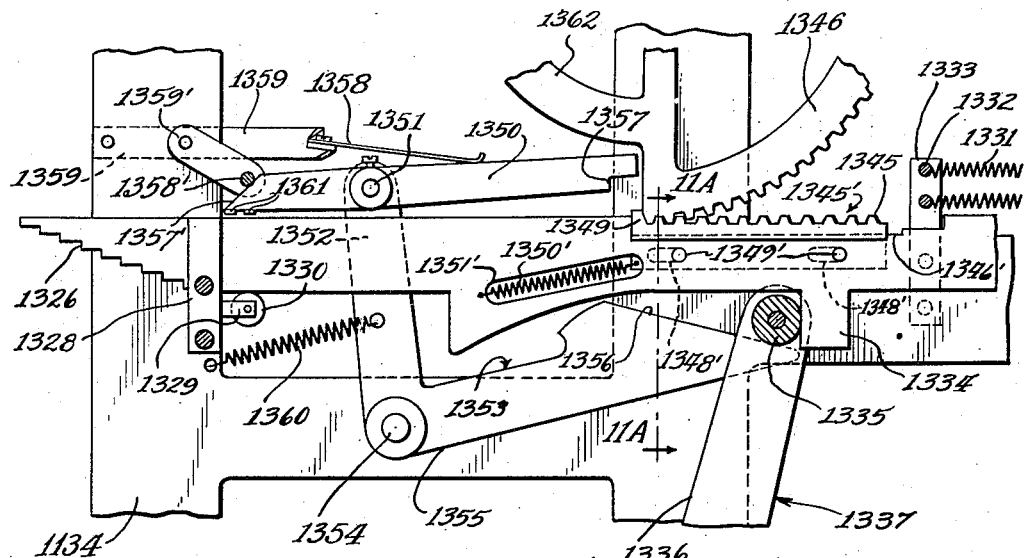
FIG. 10A.
FIG. 11A.
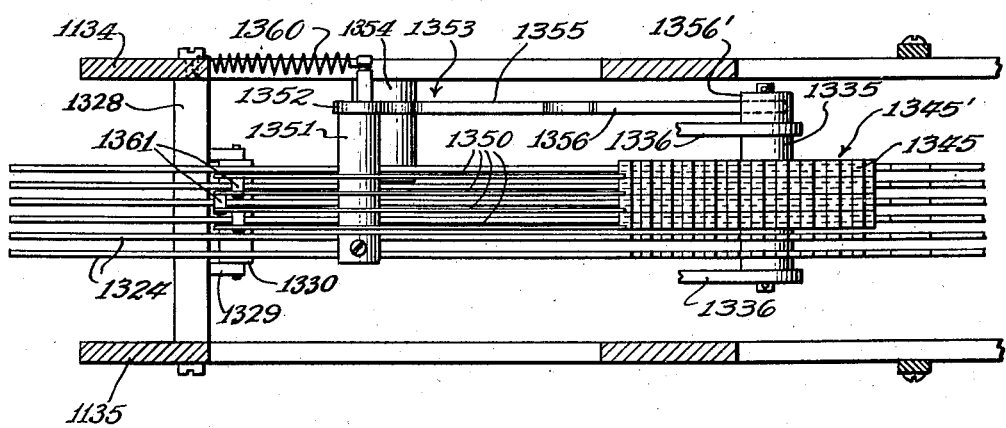
FIG. 12A.
Inventor
Walter T. Gollwitzer
By Geo. N. Wallace
Attorney Sept. 22, 1942. W. T. GOLLWITZER 2,296,276
CALCULATING MACHINE
Original Filed July 28, 1938 52 Sheets-Sheet 51

Inventor:
Walter T. Gollwitzer
By Geo. H. Wallace
Attorney

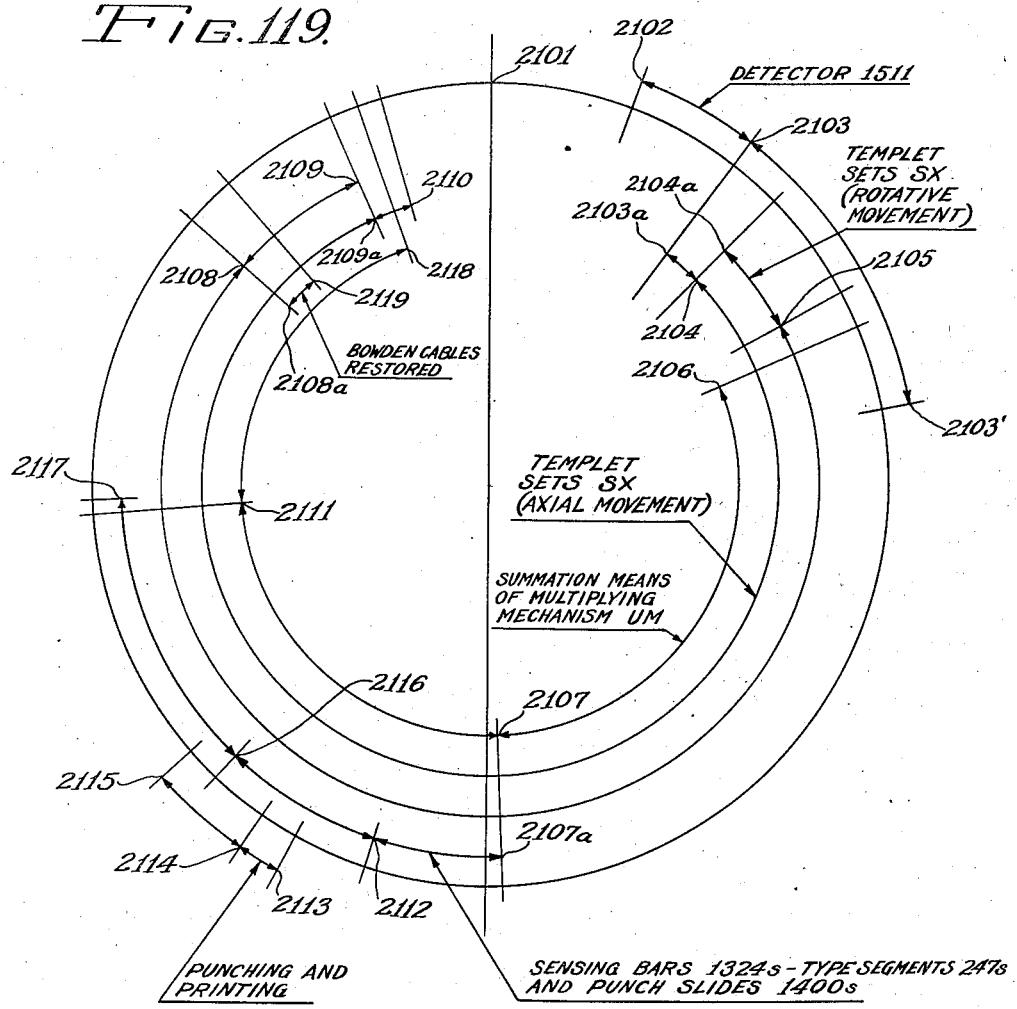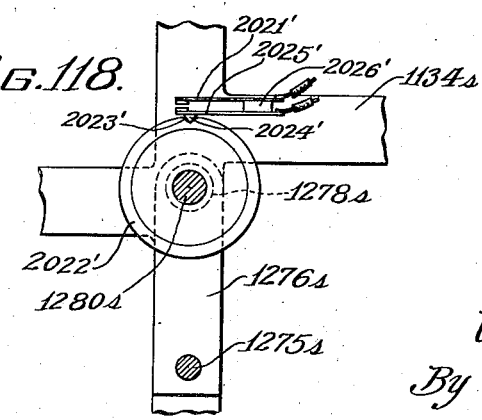

Patented Sept. 22, 1942

2,296,276

UNITED STATES PATENT OFFICE 2,296,276

CALCULATING MACHINE

Walter T. Gollwitzer, Euclid, Ohio, assignor to Addressograph-Multigraph Corporation, Wilmington, Del., a corporation of Delaware Original application July 28, 1938, Serial No. 221,841. Divided and this application January 9, 1940, Serial No. 313,146

30 Claims. (Cl. 235—61.6)

This application is a division of my co-pending application Serial No. 221,841, filed July 28, 1938.

The present invention primarily pertains to calculating machines and more especially to machines wherein products are ascertained and while reference will be made herein to multiplications being performed to ascertain the products, it is to be understood that the machines of the present invention are not multiplying machines in the sense that full and complete multiplications are performed therein in the course of ascertaining particular products, as is done in multiplying machines of the over-and-over addition type or of the partial product type, the machines of the present invention, on the contrary, merely functioning to select representations of certain products and to add or summarize or otherwise transfer the values so represented in the machine to means from which the final products may be printed or otherwise recorded or ascertained.

The present invention especially pertains to a calculating machine or apparatus particularly adapted for use in machines wherein business instruments, such as checks drawn on banks, public utility bills, insurance notices, invoices and the like, are prepared but, while the apparatus is particularly adapted for such usage, it will be apparent from the following description that the apparatus is capable of a wide variety of uses and that the principles of construction and operation entailed therein are susceptible of use in calculating machines of widely varying types adapted for numerous uses.

Exemplifications of machines of the kind in which the novel apparatus of the present invention is especially adapted for usage are to be found in, for example, United States Letters Patents 2,041,183, 2,083,061, 2,132,411 and 2,132,413. Usually a roll of paper is mounted in proper relation with machines of this kind and a web is withdrawn therefrom and led to the machine. Sheets cut from this web, or which are removed from a stack of pre-cut sheets stored in the machine, are fed through the machine past one or more printing positions whereat impressions are made thereon either directly from printing, printing and control, or like devices, that are sequentially fed through the machine, or from suitable printing mechanisms set up under control of printing and control or like devices or record cards or the like. Furthermore, in machines of this kind constantly reoccurring data are sometimes printed on the sheets both before and after pre-cut sheets are stacked in the machine or before the sheets are severed from a web or after such severance and ofttimes such impressions are made on the sheets both prior to and after severance thereof from a web.

The data printed on sheets, as business instruments such as those to which reference has been made, other than the constantly reoccurring data, may be conveniently classified as changeable data and variable data. The changeable data are usually those which are directly printed from printing, printing and control, or like devices and usually consist of an identification, such as a name and address, and the variable data are usually numerical accounting data, such as the amount of money to be paid pursuant to a check drawn on a bank or the amount of money due and owing a public utility, an insurance company or the like and also, sometimes, related data, and the present invention particularly pertains, in the herein described embodiment thereof, to the printing of such variable data.

Among the means which may be utilized in the printing of constantly reoccurring and variable data are printing and control devices, an example of which is disclosed in United States Letters Patent 2,132,412. Such printing and control devices include, for example, embossed type characters from which impressions may be made directly and also include a perforated or other area affording control means under control of which the variable data may be printed.

A specific example of the use of printing and control devices in the preparation of business instruments is the preparation of so-called dividend checks of a corporation by means of which dividends declared by the corporation are distributed to its shareholders. Heretofore where printing and control devices have been employed in the preparation of dividend checks, each printing and control device related to a particular shareholder whose name and address (changeable data) was directly printed from type characters or the like on a printing and control device relating to the particular shareholder and the control area of such device was arranged to bear representations of the amount of dividend to be paid to the particular shareholder. Now it will be recognized that in a long list of shareholders the changes in the holdings of the individual shareholders between payments of successive dividends is not likely to entail nearly as many variations in the records of the corporation as will occur when the dividend rate of the corporation varies for when the dividend rate varies it is necessary to change each and every printing and control device if the amount of dividend payable to the respective shareholders is directly represented in the control areas of the devices pertaining to such respective shareholders. It will be apparent from this that a marked advantage will accrue from representing the holdings of a shareholder in a corporation on the printing and control device pertaining to the shareholder rather than directly representing thereon the amount of dividend payable to the shareholder as has been done heretofore.

Thus it is an object of this invention to enable dividend checks and kindred business instruments to be prepared by the use of printing and control or like devices but to avoid the necessity of changing the basic data represented in the control areas of the printing and control or like devices, and an object ancillary to the foregoing is to enable that data which changes the least to be represented in the control areas of printing and control or like devices by equipping a machine responsive to such representations so that it will interpolate such representations, as by performing calculating operations based thereon, and a still further ancillary object is to enable certain variations entailed in the preparation of dividend checks and the like to be cared for in the machine rather than in the printing and control or like devices utilized in the machine.

It is to be understood, when reference is made herein to the preparation of dividend checks of a corporation, that this is merely an exemplary utilization of my invention but one which is common and convenient in describing the various aspects of my invention. Moreover, my invention, as stated heretofore, is capable of use in a wide variety of instances in which sheets are to be printed and among other instances may be cited the preparation of tax bills, public utility bills, insurance premium notices, chain store billings and allied and kindred operations. Therefore, while reference is made hereinafter to the preparation of dividend checks of a corporation, it is to be understood that this is merely exemplary and is not, therefore, to be taken as a limitation of my invention.

Perhaps the most frequent interpolation of data such as may be represented in the control areas of printing and control or like devices is a calculating operation entailing multiplication, one factor of each such multiplications, for example, being represented in the control area of a printing and control or like device, and the other factor may also be derived therefrom or elsewhere as will appear hereinafter. In the preparation of dividend checks of a corporation the factor represented in the control area of a printing and control device to be utilized in such preparation will be the number of shares of stock owned by the shareholder to whom the particular printing and control device relates, and the other factor, the dividend rate, may be included or set up in the machine. In an instance where the dividend rate will remain constant for a large number of calculations, multiplications in such an instance, this factor of the various multiplications may advantageously be, in effect, constantly represented in the machine and another important object of this invention is to enable this to be accomplished.

In those instances where one factor of multiplications will be utilized in a large number of multiplications, such factor may be represented in devices which may advantageously be replaceably mounted in the machine and such devices will need be changed only upon a variation in the reoccurring factor of the multiplications. In other instances both factors of multiplying operations may change frequently, even so much as in every multiplication, and to care for such instances it will be advantageous to enable the factor of the multiplication other than that derived from the printing and control or like devices to be varied as required. Therefore, in view of the foregoing, still another object of this invention is to care for various conditions which may be encountered in the preparation of business instruments or the like and which entails the multiplication of a factor represented in the control area of a printing and control or like device by a factor included, for example, in the machine, and an object ancillary to the foregoing is to enable the factor other than that derived from a printing and control or like device to be represented in a device or devices relatively permanently mounted in the machine, or to be representd by devices in the machine that may be operated to represent a wide variety of factors.

Where a large number of multiplications are to be made entailing an identical amount as one factor of the multiplications, it is possible to pre-compute the various products that will result from such multiplications and it will be apparent that if printing or other operations are performed from representations of pre-computed products rather than from devices set up as the result of individual multiplying operations, a high degree of accuracy may be attained inasmuch as operations and movements incidental to the setting up of variably settable devices in multiplying and like operations may be avoided, and consequently still another important object of this invention is to enable representations of pre-computed products to be utilized in setting up devices from or under control of which printing or other operations are performed or from which products may be otherwise ascertained.

Where devices representative of pre-computed products are employed, as aforesaid, it will of course be necessary to change such devices each time there is a variation in both factors of the multiplications. This will occur infrequently where a large number of multiplications are to be performed in each of which the same factor is involved, but even in such instances the need for substitution will arise when there is a change in the reoccurring factor, and consequently a further object of this invention is to enable subtitution of devices representative of one set of pre-computed products for another in an expeditious manner when the need so to do arises.

While reference has been made and will hereafter be made to representations of a factor of to be performed multiplications appearing in the control area of a printing and control device, it is to be understood that my invention is not limited to the use of printing and control devices for, among the objects of the present invention, is to render operative certain devices, included in the machine, under control of variable data representations, such as perforations, embossages or the like, irrespective of the type of device on which such representations may appear.

Other objects of this invention are to represent products in the machine in such a way that each and every product, that may result from all multiplications that may be performed within the capacity of a particular machine, will be represented in devices of which each pertains to but a single order of numbers; to so represent pre-computed products, where such are to be utilized, that each and every such product resulting from related multiplications will be represented in devices, each pertaining to but a single order of numbers, there being but one such device for each order of numbers; and to so represent the pre-computed products resulting from related multiplications that the carries arising in one order of numbers will be represented in a device pertaining to the next higher order of numbers along with and as a part of the representations appearing in such device of the digits of the products accruing from multiplications in that order without the incidental carries to the order next higher to this particular next higher order.

Where multiplication is performed in longhand the various digits in a multiplicand are multiplied separately by each digit in the multiplier and the products found by such multiplications are separately set down. Those respective products thus obtained by multiplication of the various digits of the multiplicand by the various digits of the multiplier may be conveniently referred to as "intermediate products" inasmuch as these products enter into, but are not, the final product, where there is more than a single digit in the multiplier, the final product in such instances being the sum of such intermediate products including whatever carry-overs there may be incidental to the summation of the various digits in various intermediate products in corresponding orders with respect to the final product. It will be readily apparent that the number of carries entailed in summarizing such digits of intermediate products will be far less than the number of carries entailed in the digit by digit multiplication of a multiplicand by the digits of a multiplier and from this it will be seen that if representations of intermediate products are utilized in a machine and the machine operates to select the proper intermediate products and to then summarize them to thereby, in effect, perform a multiplication, the operation may be effected rapidly and accurately inasmuch as the number of movements entailed will be relatively few, and so to do, including the use of representations of intermediate products in a machine, is an important object of this invention.

Where the intermediate products represented in a machine are those ascertained by the multiplication of a reoccurring factor by a number of other factors, the selection of the proper intermediate product or products for a particular multiplication may be effected under control of the digit or digits in the other factor of the multiplications and to do this is another of the objects of this invention. However, where the intermediate products represented in a machine are those which are ascertained by the multiplications of varying factors by other varying factors, the selection of the proper intermediate product or products must be effected under control of the digit or digits in both factors and the attainment of this is a further object of the present invention.

It is to be remembered that in most instances the selection of the proper intermediate products does not complete a particular multiplication, this being true where there is more than one digit in both factors of the multiplication, and these are instances where the intermediate products must be added to produce the final product, and to effect such addition or summarizing of intermediate products is still another important object of this invention, especially to effect this in a novel, rapid and accurate manner.

More specifically, further objects of this invention are to provide representations of intermediate products and to selectively dispose such representations in an operative position under control of either one or both of the factors of a particular multiplication; to effect such selection under control of representations of at least one factor of a multiplication provided in a printing and control or equivalent device and, more specifically, under control of representations in the control area of a printing and control device; to effect carry-overs incidental to the summarization of selected intermediate products by the same means as a part of the summarization of such intermediate products; to so set up the final product that it may be directly ascertained or may be utilized in a printing, perforating, accumulating or other operation; and to so support the devices representative of the intermediate products in the machine that a set of devices representative of one group of intermediate products may be expeditiously substituted for another group when the need so to do arises.

Additional objects of this invention are to provide representations of the various digits that may appear in corresponding orders in different intermediate products ascertained by multiplying a given multiplicand by the various digits that may appear in a given order of the multiplier in a single device or templet, as such devices are called hereinafter; to assemble those templets pertaining to such orders into what will hereinafter be called templet-gangs whereby a templet-gang is provided for each order of the multiplier; to provide sets of templets bearing representations of the digits that may appear in a particular order of all intermediate products that may be ascertained by multiplying a variety of multiplicands by the digits that may appear in a given order of the multiplier and to assemble such sets into templet-gangs, each pertaining to a given order of the multiplier; and to selectively dispose in operative position those representations of the proper intermediate product under control of the numerical value of the digit in the order of the multiplier to which a gang pertains when the templets bear representations of the intermediate products arising from multiplication of a given multiplicand and to effect such disposition under control of the multiplicand and the numerical value of the digit in the order of the multiplier to which the gang pertains when sets of templets are included in the gangs.

In those instances where the same factor enters into a large number of multiplications it is possible to provide a templet-gang including templets bearing representations of all of the intermediate products that accrue from the multiplication of the various digits in a reoccurring factor by all of the digits that may appear in the units order of the other factor of the multiplication. Another templet-gang may be provided which will include templets bearing representations of all intermediate products that will accrue from the multiplication of the various digits in the reoccurring factor by all of the digits that may appear in the tens order of the other factor. The number of templet-gangs that will be provided in any instance will be dictated by the capacity of the machine in so far as the number of digits that may appear in the aforesaid other factor (the multiplier factor in the machine as disclosed herein) of the multiplications is concerned. Thus in the instance where the factor other than the reoccurring factor is not to be more than a three-order number, three templet-gangs will be provided.

The arrangement of the templets in such templet-gangs relative to each other will follow the setting down of intermediate products in long-hand multiplication, which is to say that the most right-hand templet in the gang pertaining to the units order will be disposed in the position of the most right-hand digit of the final product but in so far as the gang pertaining to the tens order is concerned the most right-hand templet therein will be disposed in the first position to the left of the most right-hand digit in the final product or, in other words, in the position of the tens order of the final product, and this same arrangement progresses on for the various gangs pertaining to the hundreds and higher orders.

It is contemplated that the templets in such templet-gangs will assume, in so far as the operative positions thereof are concerned, positions representative of zero unless, in the course of a calculating operation, the templets are positioned in locations pertaining to significant digits entailed in the multiplication being performed so that if a summation means cooperates therewith, when zero positions on the templets are at the operative positions thereof, to set up a final product, such final product will be all zeros. By reason of this arrangement it is possible to utilize in a particular multiplication only one of a plurality of templet-gangs and to employ a single summation means to set up the final product, for those templet-gangs which are not set up in positions pertaining to significant digits will be in their zero positions and will, in effect, be ineffective and hence the product derived from the single set-up gang will be the correct final product, and this also applies where but two, or any number less than all templet gangs, are not set in positions pertaining to significant digits.

Thus in view of the foregoing, still further and somewhat specific objects of this invention are to enable multiplication to be effected by utilizing templet-gangs including templets bearing representations of the intermediate products that will accrue from the multiplication of the various digits of a reoccurring factor (multiplicand) by all of the digits that may appear in the other factor (multiplier) of a multiplication; to selectively dispose the representations of the intermediate products on the templets in the templet-gangs in an operative position under control of the digits in the factor other than the reoccurring factor; to sense the representations of intermediate products disposed in an operative position and under control of such sensing set up representations of the final product (such final product being the sum of the intermediate products in operative position together with any incidental carry-overs); and to sense the representations of intermediate products in an operative position and to effect carry-overs incidental to the summation of such sensed intermediate products as one continuous operation in so far as each order of the final product is concerned and to perform all such operations pertaining to different orders of the final product simultaneously.

In those instances where the digits in both factors of a multiplication may vary, representations of the various intermediate products that may accrue are formed on sets of templets, there being a set of templets for each order of the various intermediate products that accrue from multiplication of the various digits in one factor (multiplicand) by all of the digits that may apear in a particular order of the other factor (multiplier) of the multiplication and such sets of templets are also arranged in templet-gangs, each gang pertaining to an order of the other or multiplier factor, and further objects of this invention are to utilize such sets of templets and templet-gangs where both factors of the multiplications are subject to variation; to provide as many templet-gangs as will be required to care for the number of orders of digits that may appear in the multiplier factor of the multiplication; to include in each gang as many sets as there may be digits or orders of numbers in the resulting intermediate products; to selectively dispose the templets in the various sets in the various gangs in operative position under control of the value of the digits in the respective orders of each factor of the multiplication to which each respective set and gang pertains; and to sense the particular templets disposed in operative position and to accumulate the values represented thereby, together with any incidental carry-overs, to thereby ascertain the final product, and an object ancillary to this is to set up a representation of the final product so ascertained.

Yet further objects of the invention are to enable the parts operative to effect summation of the digits in the intermediate products pertaining to a particular order of the final product to be arranged on a plate or the like to constitute a unit; to arrange such units in side-by-side relation in the apparatus with each unit disposed relative to other parts in the apparatus in such a position that it represents the order of the final product to which it pertains; to so support such units that the number required within the capacity of the apparatus may be expeditiously accommodated therein and to enable the same supports to be employed in any event where less than a predetermined number of such units are to be employed whereby when, for example, the final product will extend through but four orders, but four of such units can be arranged in the apparatus and where, for example, the final product may extend through eight orders, eight such units can be accommodated; to utilize rectilinearly movable members for effecting the sensing of the representations of the digits of the intermediate products; to utilize rectilinearly movable members to represent the digits to appear in the respective orders of each final product; to so interconnect the rectilinearly movable sensing and representing members that free movement of such parts and of the interconnecting means will be assured and also to insure accurate operation of such parts; and to provide a novel, efficient, positive, accurate and rapid multiplying apparatus of small and compact arrangement and also of simple and economical construction.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 88:
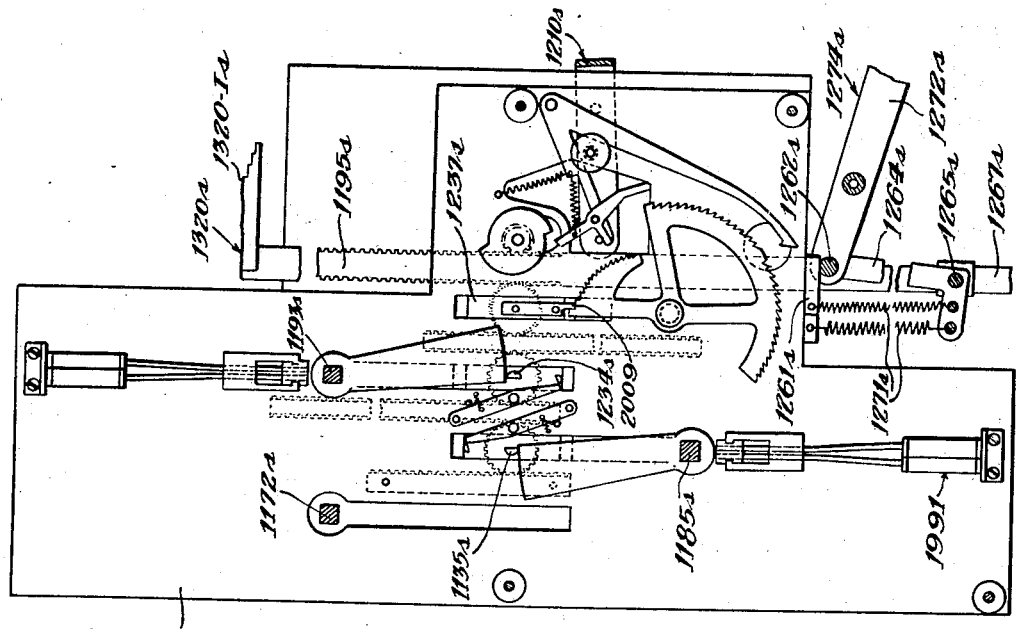
Figure 87:
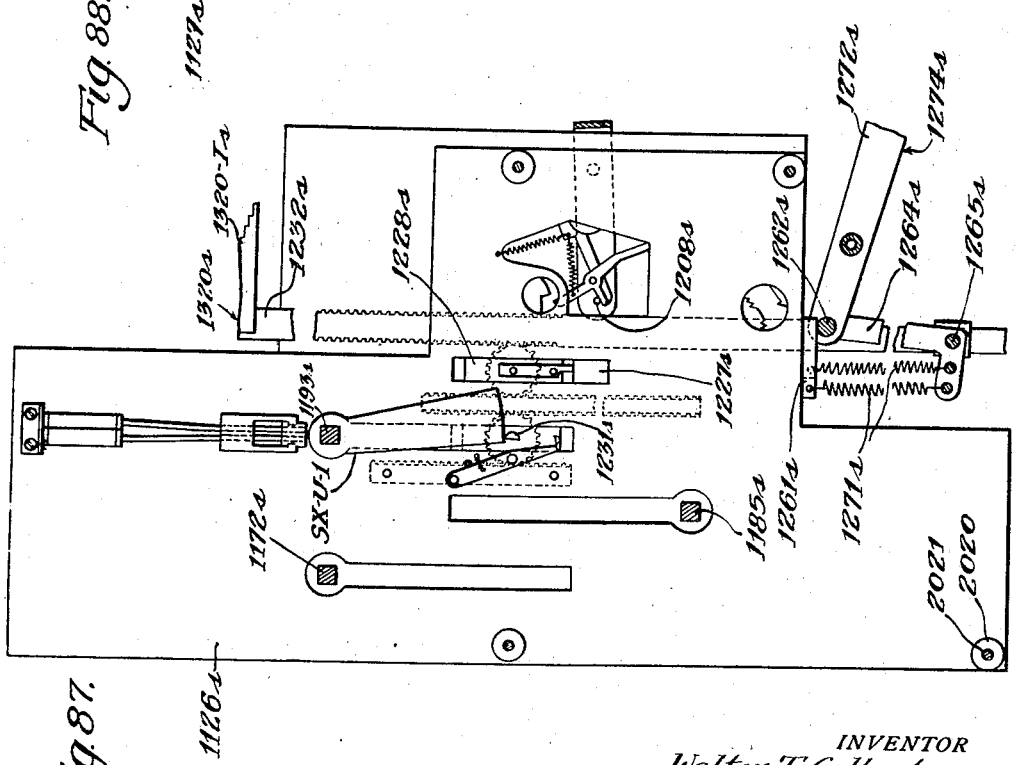
Figure 92:
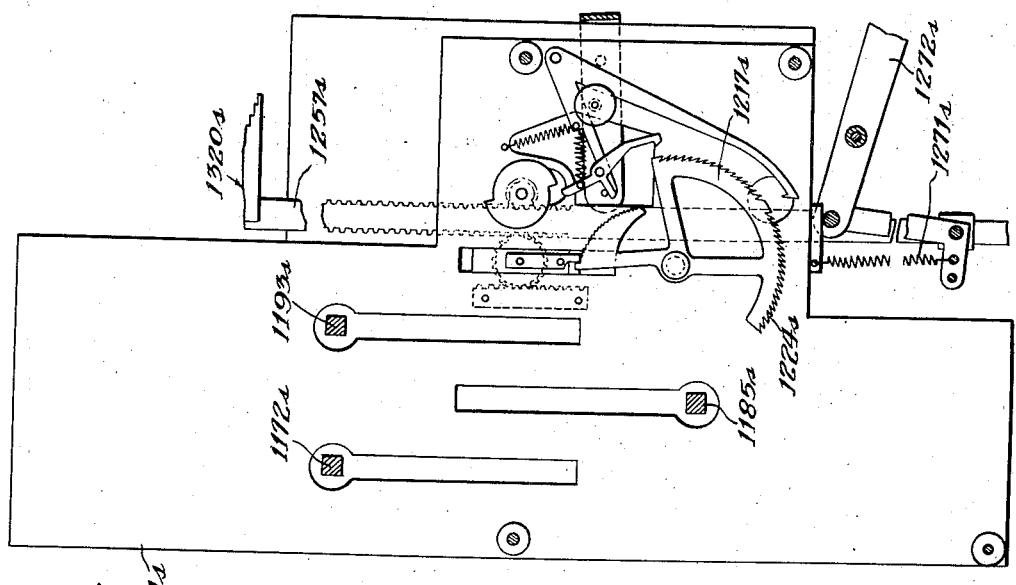
Figure 91:
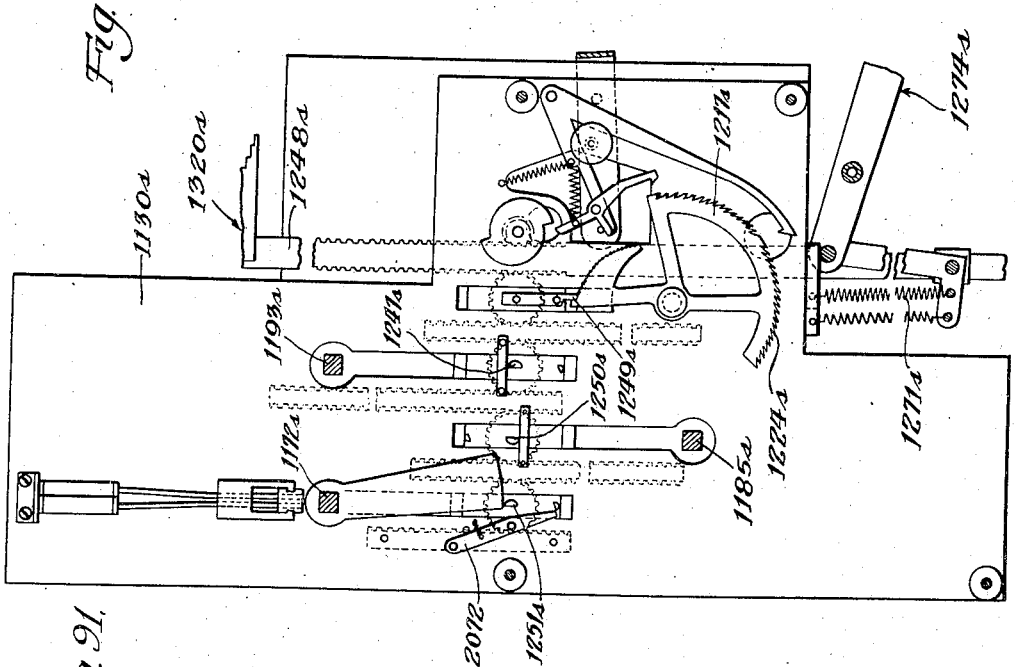
Figure 100:
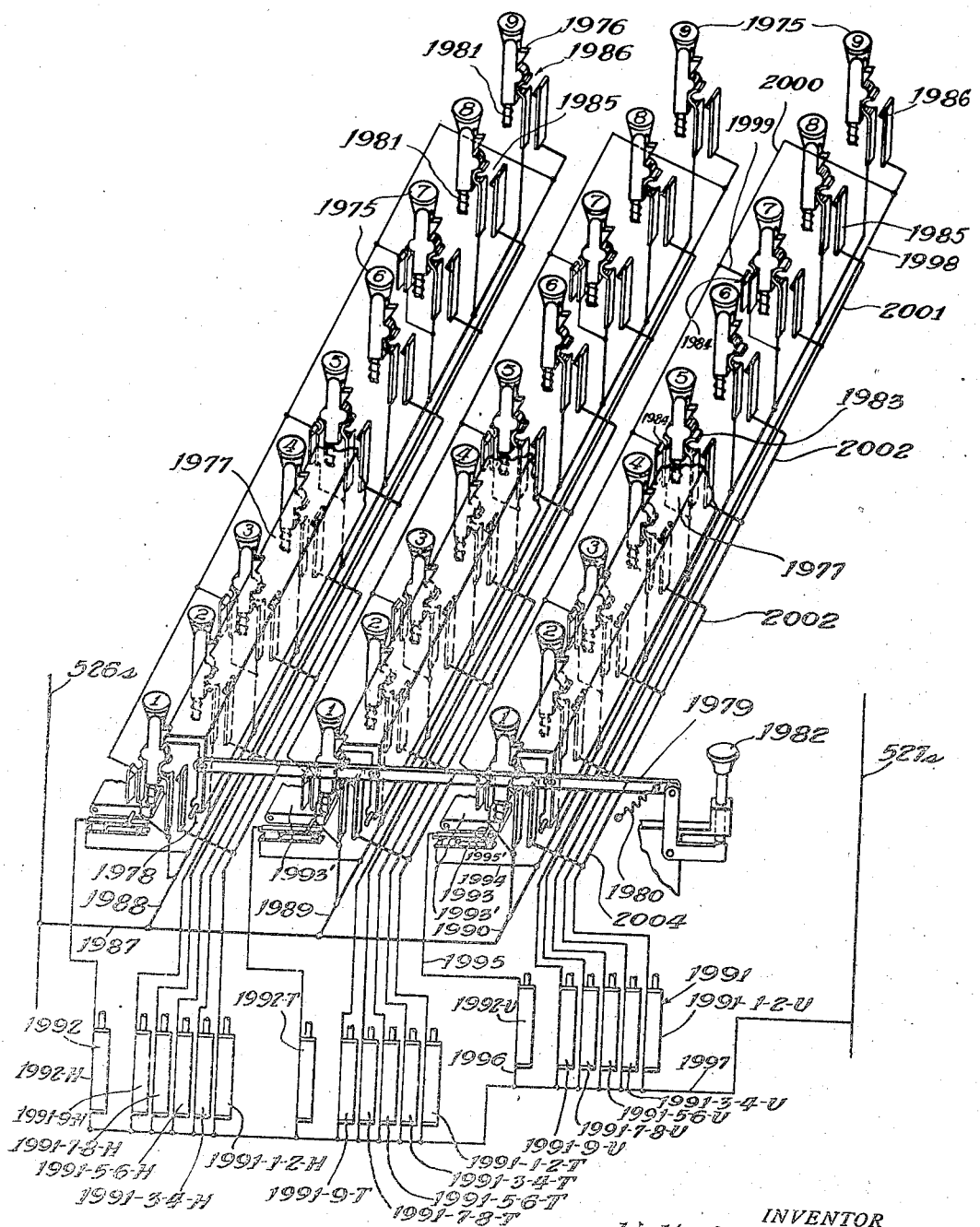
Figure 101:
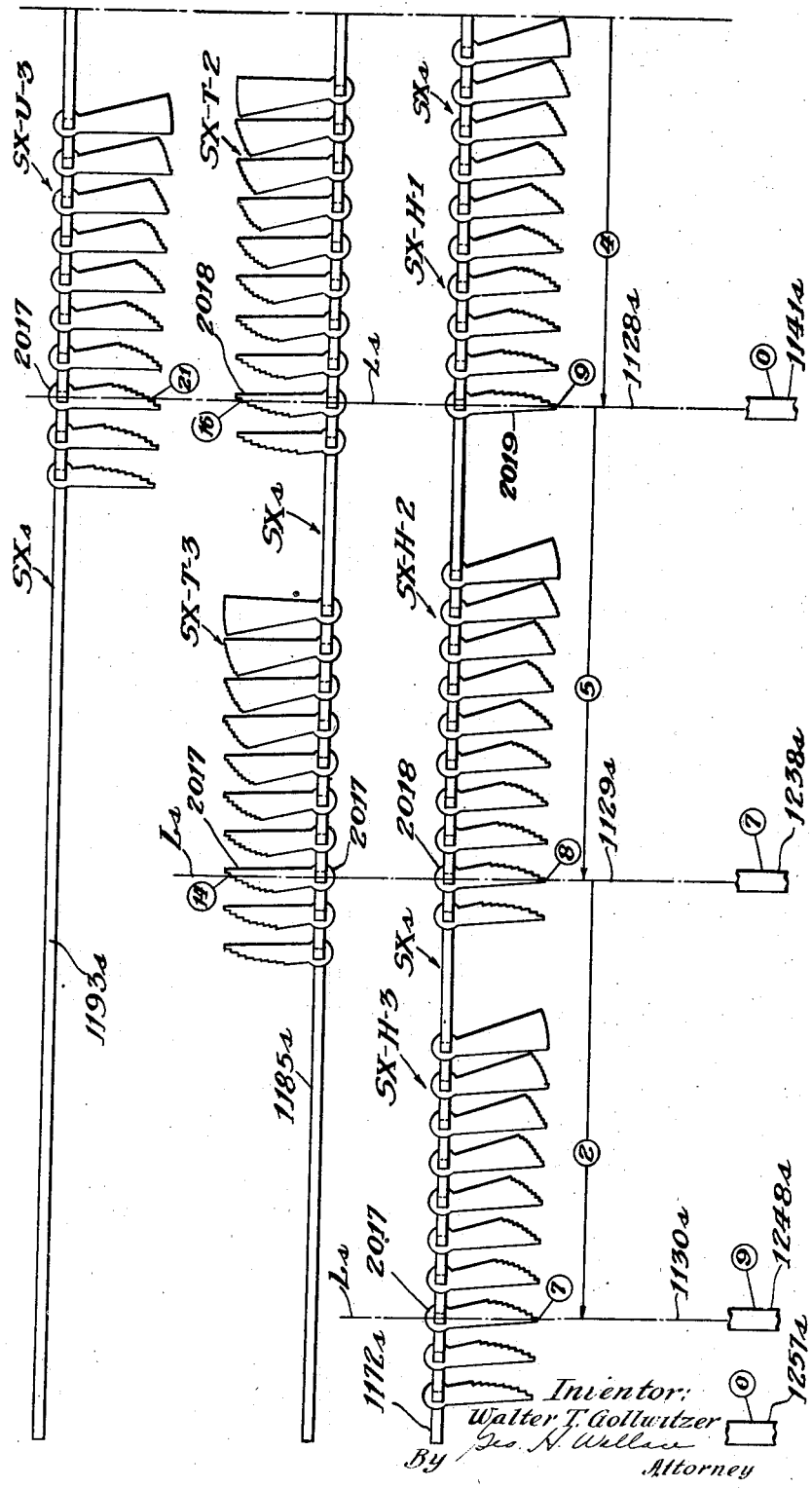
Figure 107:
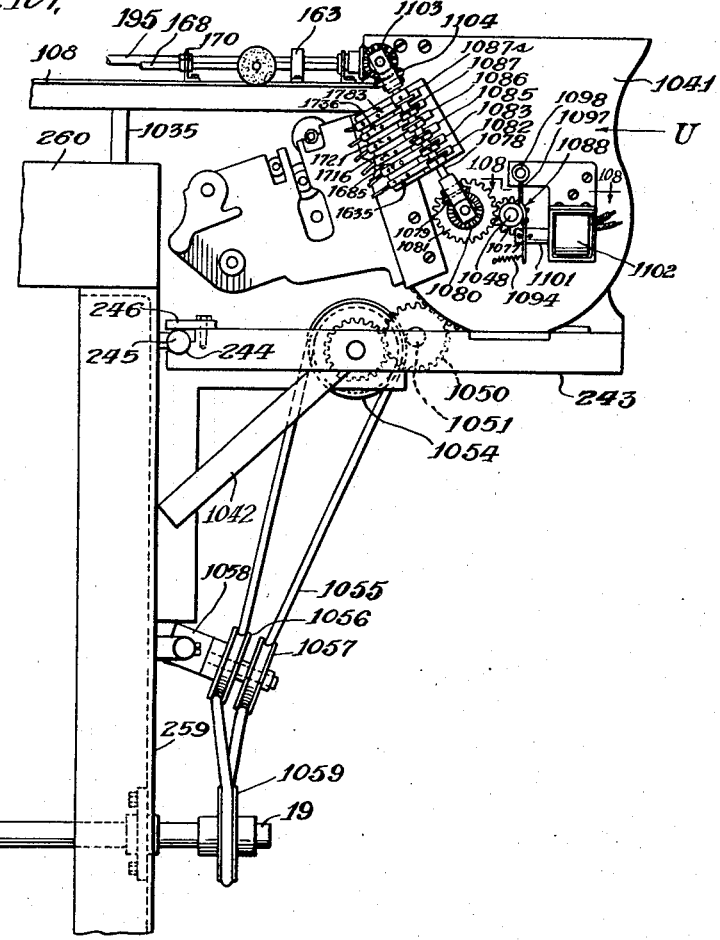
Figure 109:
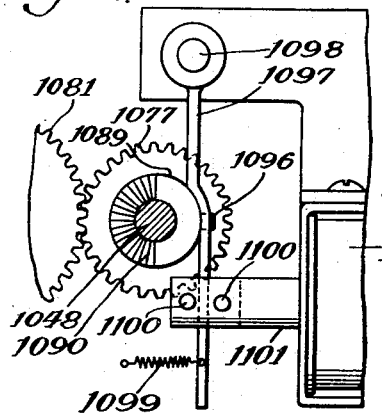
Figure 108:
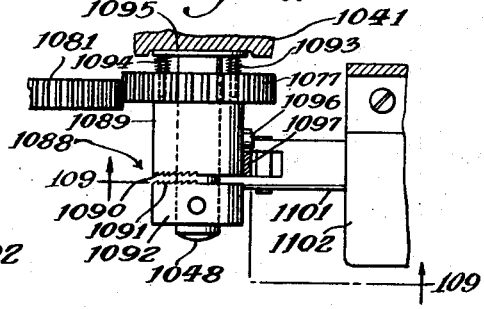

In the drawings,

Fig. 1 is a front elevation of the machine embodying the present invention with the cover plates of the machine removed; Fig. 2 is a top plan view of the machine as shown in Fig. 1; Fig. 3 is an elevation of a typical printing and control device which may be utilized in the present machine; Figs. 3A and 3B are fragmentary elevational views of control cards that may be used on the printing and control device shown in Fig. 3; Fig. 4 is a chart of the code under which perforations are made in the control areas of the printing and control devices such as is shown in Fig. 3; Fig. 5 is an elevation of a typical business instrument produced by the machine of this invention; Fig. 6 is a fragmentary elevation of a proof sheet such as may be produced in the machine described herein; Fig. 7 is a side view of a multiplying apparatus of the present invention that is included in the illustrated machine and which view is taken substantially on the line 7—7 on Fig. 1; Fig. 7A is a perspective view of the Bowden cable restoring devices shown in Fig. 7; Fig. 8 is a fragmentary detail view of a cam and cam follower employed in the mechanism shown in Fig. 7; Fig. 9 is a vertical sectional view taken substantially on the line 9—9 on Fig. 7; Figs. 10 and 11 are vertical sectional views taken substantially on the lines 10—10 and 11—11 on Fig. 9; Fig. 10A is a side view, drawn to an enlarged scale, of the parts for bringing the type character for printing a blanking character into printing position; Fig. 11A is a sectional detail view taken substantially on the line 11A—11A on Fig. 10A; Fig. 12A is a plan view of the parts shown in Fig. 10A; Fig. 12 is a detail view of a cam and cam follower arrangement employed in the apparatus illustrated in Fig. 10; Fig. 13 is a horizontal sectional view taken substantially on the line 13—13 on Fig. 7; Fig. 14 is a detail plan view of the type segments employed in the apparatus shown in Fig. 13; Fig. 15 is a vertical sectional view taken on the line 15—15 on Fig. 13; Fig. 16 is a vertical sectional view taken substantially on the line 16—16 on Fig. 15; Fig. 17 is a perspective detail view of a punch slide employed in the mechanism shown in Fig. 13; Fig. 18 is a sectional detail view taken substantially on the line 18—18 on Fig. 17; Fig. 19 is a sectional detail view, drawn to an enlarged scale, showing the card picker mechanism illustrated in Fig. 16; Figs. 20, 21 and 22 are sectional detail views taken substantially and respectively on the lines 20—20, 21—21 and 22—22 on Fig. 13; Fig. 23 is a side elevational view of the clutch employed to control the apparatus illustrated, for example, in Fig. 13; Fig. 24 is a fragmentary plan view of the clutch shown in Fig. 23; Fig. 25 is a sectional view taken substantially on the line 25—25 on Fig. 23; Fig. 26 is a rear elevation of the multiplying apparatus illustrated in plan in Fig. 13; Fig. 27 is a view looking in at the right-hand side of Fig. 26; Fig. 28 is a diagrammatic view illustrating alternative positions assumed by certain operative parts in the machine; Fig. 29 is a perspective view of a templet-gang employed in the multiplying apparatus; Fig. 30 is a perspective detail view of a block employed in the multiplying apparatus; Fig. 31 is a vertical sectional view taken substantially on the line 31—31 on Fig. 27; Figs. 32, 33 and 34 are sectional detail views taken substantially on the lines 32—32, 33—33 and 34—34 on Fig. 31; Fig. 35 is a view looking in at the right-hand side of the most right-hand of the group of plates of the multiplying apparatus as it is viewed in rear elevation in Fig. 26; Fig. 36 is a view similar to Fig. 35, but looking at the plate from the opposite side; Fig. 37 is a sectional view taken substantially on the line 37—37 on Fig. 42; Fig. 38 is a perspective detail view of a sensing finger employed in the summation means constituting a part of the multipling apparatus; Fig. 39 is a view, similar to Fig. 35, of the next plate to the left of the plate shown in said Fig. 35 as the apparatus is viewed in Fig. 26; Fig. 40 is a view showing the opposite face of the plate illustrated in Fig. 39; Fig. 41 is a fragmentary plan view of a mounting employed in the multiplying apparatus; Fig. 42 is a view, similar to Fig. 35, of the next plate to the left of the plate shown in Fig. 39 as the apparatus is viewed in Fig. 26; Fig. 43 is a view showing the opposite face of the plate illustrated in Fig. 42; Fig. 44 is a sectional detail view taken substantially on the line 44—44 on Fig. 42; Fig. 45 is a perspective detail view of a spring and pawl assembly which cooperates with mechanisms shown, for example, in Figs. 35, 39 and 42; Fig. 46 is a view, similar to Fig. 35, of the next plate to the left of the plate shown in Fig. 42 as the apparatus is viewed in Fig. 26; Fig. 47 is a view showing the opposite face of the plate illustrated in Fig. 46; Fig. 48 is a view, similar to Fig. 35, of the next plate to the left of the plate shown in Fig. 46 as the apparatus is viewed in Fig. 26; Fig. 49 is a view showing the opposite face of the plate illustrated in Fig. 48; Fig. 50 is a view, similar to Fig. 35, of the next plate to the left of the plate shown in Fig. 48 as the apparatus is viewed in Fig. 26; Fig. 51 is a view showing the opposite face of the plate illustrated in Fig. 50; Figs. 51A to 51J, inclusive, are views respectively illustrating positions assumed by certain operative parts of the mechanism in representing different digital values; Figs. 52 to 56, inclusive, are diagrammatic views illustrating operative steps in the course of operation of the summation means of the multiplying apparatus; Figs. 57 to 61, inclusive, are views illustrating operative steps in the operation of the carry-over mechanism constituting a part of the summation means of the multiplying apparatus illustrated in rear elevation in Fig. 26; Figs. 62, 63 and 64 are views illustrating sets of templets arranged to represent the intermediate products of the factors 999, 37 and 465, respectively; Fig. 65 is a diagrammatic view illustrating the manner in which the templets of the templet-gangs are arranged with respect to each other and the orders of the final product; Fig. 66 is a top plan view, with the cover plates and part of the platen structure removed, of the guideway through which the printing and control devices are advanced in the course of their movement through the machine and associated mechanisms; Fig. 67 is a sectional detail view taken substantially on the line 67—67 on Fig. 66; Figs. 68 and 69 are vertical sectional views taken substantially on the lines 68—68 and 69—69 on Fig. 66; Fig. 70 is a fragmentary plan view of the printing and control device guideway and in which a part of the platen structure and other mechanisms are broken away; Fig. 71 is a transverse sectional view taken substantially on the line 71—71 on Fig. 70; Fig. 72 is a side elevation of the printing and control device feeding mechanism; Fig. 73 is a perspective detail view of the mechanism shown in Fig. 72 and related mechanisms; Fig. 74 is a detail perspective view of a portion of the mechanism shown in Fig. 73 and illustrating the parts in another operative position; Fig. 75 is a perspective view of the reciprocating carrier bars for the printing and control devices; Fig. 76 is a view, similar to Fig. 10, showing an accumulator included in the multiplying apparatus; Fig. 77 is a view taken substantially on the line 77—77 on Fig. 76; Figs. 78 and 79 are vertical sectional detail views taken substantially on the lines 78—78 and 79—79 on Fig. 77; Fig. 80 is a horizontal sectional view taken substantially on the line 80—80 on Fig. 79; Figs. 81 and 82 are perspective detail views of parts employed in the mechanism illustrated in Fig. 80; Fig. 83 is a sectional detail view taken substantially on the line 83—83 on Fig. 82; Figs. 83A to 83E are fragmentary views showing different operative positions attained by certain of the parts shown, for example, in Fig. 79; Fig. 84 is a rear elevation of a modified form of a multiplying apparatus; Fig. 85 is a view looking in at the right-hand side of Fig. 84; Fig. 86 is a horizontal sectional view taken substantially on the line 86—86 on Fig. 85; Fig. 87 is a view looking in at the right-hand side of the most right-hand of the group of plates of the multiplying apparatus shown in rear elevation in Fig. 84; Fig. 88 is a view, similar to Fig. 87, of the next plate to the left of the plate shown in said Fig. 87 as the apparatus is viewed in Fig. 84; Fig. 89 is a view, similar to Fig. 87, of the next plate to the left of the plate shown in Fig. 88 as the apparatus is viewed in Fig. 84; Fig. 90 is a view, similar to Fig. 87, of the next plate to the left of the plate shown in Fig. 89 as the apparatus is viewed in Fig 84; Fig. 91 is a view, similar to Fig. 87, of the next plate to the left of the plate shown in Fig. 90 as the apparatus is viewed in Fig. 84; Fig. 92 is a view, similar to Fig. 87, of the next plate to the left of the plate shown in Fig. 91 as the apparatus is viewed in Fig. 84; Fig. 93 is a vertical sectional view taken substantially on the line 93—93 on Fig. 84; Fig. 94 is a vertical sectional view taken substantially on the line 94—94 on Fig. 93; Fig. 95 is a view, similar to Fig. 94, but showing the parts in another operative position; Fig. 96 is a horizontal sectional view taken substantially on the line 96—96 on Fig. 93; Fig. 97 is a fragmentary detail view, drawn to an enlarged scale, of the solenoids shown at the top of Fig. 84; Fig. 98 is a horizontal sectional view taken substantially on the line 98—98 on Fig. 97; Fig. 99 is a view of the templets employed in the sets thereof used in the multiplying apparatus shown in Fig. 84; Fig. 100 is a diagrammatic view showing the manner in which one factor of the multiplication as performed in the mechanism illustrated in Fig. 84 may be set up; Figs. 101 and 102, when joined with Fig. 102 at the right-hand end of Fig. 101, show the manner in which the sets of templets, employed in the multiplying apparatus illustrated in Fig. 84, are arranged relative to each other; Fig. 103 is a chart of the manner in which perforations are made in record cards of which Fig. 104 is an elevation; Fig. 105 is a view similar to Fig. 104 but showing the card in the position in which it is held to facilitate reading the data represented therein; Fig. 106 is a side elevational view of the pager and proofer which may be used with the machine disclosed herein; Fig. 107 is a view taken on the line 107—107 on Fig. 2; Fig. 108 is a detail view taken on the line 108—108 on Fig. 107; Fig. 109 is a sectional view taken substantially on the line 109—109 on Fig. 108; Fig. 110 is an elevational view, in which certain parts are broken away, of the printing unit provided at the left-hand end of the machine as it is viewed in Fig. 1; Figs. 111 and 112 are detail views of parts of the mechanism shown in Fig. 110; Fig. 113 is a wiring diagram showing the electrical circuits employed in the machine; Figs. 114 to 117 are timing charts illustrating different cycles of operation of the machine; Fig. 118 is a detail view of the switch for controlling axial movement of the templet gangs; and Fig. 119 is a timing chart of the universal multiplying mechanism.

PRELIMINARY DESCRIPTION

In the following detail description of the preferred forms of my invention, as shown in the accompanying drawings, a printing machine in which my invention may be used is first described and thereafter the details and modifications of the present invention are explained in full.

The novel machine depicted in Figs. 1 and 2 is constructed and arranged to produce dividend checks as S, Fig. 5, and is fully described in my co-pending application, Serial No. 221,841, of which application this application is a division. However, it is believed that explanation of the present invention will be facilitated if such a machine and the products thereof are first explained in a general way.

The dividend check produced in the illustrated machine includes constantly reoccurring data, constituting a form F, which in the present instance is the name and location of the company issuing the check, the words "Check No.," the name of the bank on which the check is drawn, and kindred data imparting characteristics to the check, including the border appearing thereon; changing data A, constituting an identification and specifically characterizing the check and, in the present instance, this is an address comprising a name, street and number, and city and State; variable data V which are the amount for which the check is to be payable; and other analogous data such as a date E, a number N and a signature B. The date and signature are the first data, in the machine as constructed, to be printed; next the variable data V are printed and thereafter the address A and number N are printed; and finally the form F is printed on the check.

The address, or changing data A, is printed on the check directly from a printing and control device such as the device D, Fig. 3, and the variable data V are printed under control of such a printing or like device. It is preferred to employ such printing and control devices for so to do eliminates the necessity of checking printing devices or the like against record cards or the like because the printing and control devices, such as are shown in Fig. 3, include both means from which an impression may be made directly and control means under control of which impression or other operations may be performed. It is to be understood, however, that when reference is made hereinafter to a printing and control device, save in those instances where the avoidance of checking is essential, this term is to be considered generic for, as will be apparent to those skilled in the art, many of the mechanisms provided in the present machine may be used with printing devices not equipped with control means. Furthermore, the means in the machine which are responsive to the control areas on printing and control devices could be responsive to perforations or other data representing means provided on record cards or the like. In view of this it is to be understood that while the devices will be described as printing and control devices, this term is used in the generic sense hereinafter, particularly in those instances where it is not essential that a printing and control device be employed.

The printing and control device shown in Fig. 3, which is typical of such devices, includes a carrier or, as it is called in the art, a frame 1 having, in this instance, a metallic plate 2 removably retained thereon by fixed retaining devices 3, a bead 3' at the lower edge of the frame, and yieldable or depressible retaining tongues 4. When one or the other of the tongues 4 is depressed the plate 2 may be slid endwise from the retaining devices 3 and the bead 3'. Type characters T are, in this instance, embossed in the metallic plate 2 so as to appear in relief on one face thereof and in intaglio on the opposite face, impressions being made from the relief faces of the type characters T when the printing and control device D is fed into printing relation with the platen P, Figs. 1 and 2, in the machine. The printing and control device shown in Fig. 3 also bears an identification card 5 on which an impression is made from the type characters T so that the data that are thus printed from these type characters may be read easily, thus facilitating handling of the device D. This card 5 is removably retained on the frame 1 above the plate 2 thereon by suitable retaining devices 7 and a bead 8 at the top of the frame. A control card 6 is retained on the frame 1, at one side of the card 5, by the retaining devices 9, the bead 8, and retaining devices 7' interposed between the cards 5 and 6. The card 6 and underlying portion of the frame 1 are adapted to have perforations formed therein in accordance with the code shown in Fig. 4 so as to afford control means or representations of data, and such perforations or control means are utilized in the production of the variable data V on the check S in a manner that will be described hereinafter. The perforations in the control card 6 and the underlying portion of the frame 1 may be conveniently produced in a machine such as that disclosed in my co-pending application Serial No. 210,897, filed May 31, 1938, now Patent No. 2,265,229, patented December 9, 1941.

Hereinafter a more complete description of the manner in which the card 6 and the underlying portion of the frame 1 are perforated is presented but at this time it may be well to note that when data represented by perforations in the card 6 need be changed all that need be done is to remove this card 6 and substitute another unperforated card therefor and this new unperforated card may then be perforated to afford representations of the data that are to be substituted for that which has been previously incorporated in the device D. It may be that in so doing the frame 1 will also be perforated and this will be done in all instances where the newly formed perforations are located differently than the supplanted perforations, the supplanted and unused perforations, in such instances, being covered and rendered ineffective by unperforated portions on the new card 6.

In Fig. 6 a fragment of a proof sheet that may be produced in the machine is illustrated and the characteristics of this proof sheet and the means in which it is produced are explained more fully in my co-pending application Serial No. 320,778, filed February 26, 1940, wherein the pager and proofer that may be incorporated in the machine to produce such sheet is shown and described, such a pager and proofer not being illustrated in the general views of the machine, Figs. 1 and 2, to avoid concealing other operative mechanisms incorporated in the machine but being shown in side elevation in Fig. 106.

The dividend check or sheet S is severed from a web W, Figs. 1 and 2, that is withdrawn from a roll R which is rotatably supported in the stand 10, which, in the machine as shown in Fig. 1, is positioned at the right-hand end of the machine. The web W is led from the roll R to suitable web withdrawing devices contained within the housing 11, Fig. 2, such devices being shown and described in detail in my co-pending application Serial No. 239,562, filed November 8, 1938. During passage of the web through the devices in the housing 11 the date E and signature B are printed thereon in the present machine but, as will be explained, these data could be printed along with the form F if so desired. The manner in which such printing is done is described in my co-pending application Serial No. 221,841, of which application this application is a division. Subsequently a portion of the web bearing these impressions is extended beyond a severing device including the knife 89, and upon operation of this device the check or sheet S is severed from the web to be deposited in the sheet guideway G, Figs. 1 and 2.

Once the sheet is deposited in the guideway G it is under control of the sheet feeding and stopping devices shown and described in detail in my co-pending application Serial No. 268,182, filed April 17, 1939, now Patent No. 2,211,772, patented August 20, 1940. These devices serve first to position the sheet in association with printing means included in the multiplying apparatus M, Figs. 1 and 2, movement of the sheet being interrupted while an impression is made thereon in such apparatus, this impression being the variable data V, Fig. 6. The printing means in the apparatus M are set up under control of control means on a printing and control device D located at detecting position in the machine, such device having been withdrawn from the magazine H, Figs. 1 and 2, and fed into detecting position by the means shown in Figs. 70 to 75, inclusive, and which are described more fully hereinafter.

After the data V have been printed, the sheet bearing these data is advanced into association with the platen P, Fig. 1, whereat an impression is made directly from the type characters T on the printing and control device bearing the control means under control of which the data V on the sheet were printed, this device having, in the meantime, advanced from detecting position into printing position below the platen P. In this operation the changeable data A, the address, are printed on the sheet S.

Next the sheet feeding and stopping devices operate to feed the sheet S into the printing unit U illustrated at the left-hand end of the machine, as it is viewed in Fig. 1, and upon passing through this printing unit the form F is printed on the sheet or check S and then the sheet passes into a suitable sheet collector (not shown).

At the start of operation of the machine a plurality of printing and control devices D is introduced into the magazine H from which the devices are withdrawn one at a time to be passed through the machine into detecting and printing positions therein by the mechanisms illustrated in Figs. 70 to 75, inclusive. After passing through these positions the printing and control devices pass into the device collecting mechanism K, Fig. 1, illustrated and described in my co-pending application, Serial No. 403,272, filed July 21, 1941, which mechanism operates to direct the devices into one or the other of the drawers J, Fig. 1, in which such devices are stored when not in use and from which they are removed when they are introduced into the magazine H. The mechanism K causes the printing and control devices to pass into the particular drawer or other storage means from which they are removed when introduced into the magazine H.

The multiplying apparatus M, to which the present application primarily pertains and a preferred form of which is illustrated in Figs. 7 to 65, inclusive, includes means for perforating cards C, Fig. 104, in accordance with the system illustrated in Fig. 103. These cards pass through a card guideway 1487, Figs. 1 and 2, to, in the present instance, the auxiliary printing mechanism illustrated and described in my aforesaid co-pending application, Serial No. 221,841, which mechanism under control of the cards C, in the present instance, accumulates totals and makes identifying impressions and total impressions on the proof sheet, Fig. 6.

It is advantageous to drive the various mechanisms employed in a machine, such as illustrated in Fig. 1, from a common source of power and to this end a bracket 13, Fig. 1, is provided which supports a motor 14 from the frame 15 of that part of my novel printing machine through which the printing and control devices D are sequentially fed. In the present instance a pulley 16 on the shaft of the motor 14 has a belt 17 directed thereabout, this belt also passing about a pulley 18 on the main drive shaft 19 that is journaled in the frame 15. Various pulleys are provided at spaced intervals along the main drive shaft 19, and the various mechanisms in the machine have belts leading therefrom to these pulleys so that these mechanisms are driven from the main drive shaft 19 and the motor 14.

PRINTING AND CONTROL DEVICES ADVANCING MEANS, FIGS. 66 TO 75

Printing and control devices such as are employed in the present machine are customarily stored in drawers, trays or the like when not in use, and when these devices are passed through printing machines of the kind to which this invention pertains they are introduced into a suitable receiver in the machine and in the present instance the printing and control devices D are introduced into an upstanding magazine H, Figs. 1, 2 and 66, that is provided at the rear side of the machine and at the rear end of the printing and control device guideway, through which guideway the printing and control devices advance to printing position below the platen P.

After the printing and control devices have passed through printing position below the platen P they are reintroduced into the drawer, tray or the like from which they were removed when introduced into the magazine H. Heretofore the printing and control devices and the like upon passing through machines of the kind to which this invention pertains have been collected in a galley provided in the machine and suitable markers were included in the series of printing and control devices to indicate the groups thereof which were removed from particular drawers and introduced into the magazine, it being understood that both the magazine and the galley were arranged to have a capacity for receiving more printing and control devices than are stored in a particular drawer when not in use. The galleys included a dumping means which could be operated to cause the printing and control devices removed from a particular drawer to be reintroduced into the drawer. There was always the likelihood that the printing and control devices might be spilled when they were being introduced into the drawer from the galley in this manner and there was also the possibility that the printing and control devices might not be returned to the proper drawer.

Hence in the present instance the machine is equipped with chutes as 360, Fig. 68, or the like into which a drawer or the like from which printing and control devices are removed when introduced into the magazine H, may be inserted and two such chutes are provided in the present machine. Indicating means are provided which indicate into which chute a drawer should be placed so that it will receive the printing and control devices that were removed therefrom, and placed in the magazine, and automatic means in the machine function to direct the printing and control devices into the drawer in one or the other of the two chutes, these chutes functioning when the drawers are inserted in accordance with the manner indicated by the indicating means to direct the printing and control devices into the drawer from which they were removed.

In the present machine the lowermost printing and control device in the magazine H is removed therefrom and is fed through positions or stations in the printing device guideway, in one of which stations the control areas on the printing and control devices are sensed to effect set-up of the multiplying apparatus M and in another of which stations impressions are made directly from the type characters provided on the printing and control devices. Included in the means which withdraw the printing and control devices from the magazine and move these devices through the aforesaid stations in the machine are means which positively retain the printing devices in position in the stations into which they are moved to have operations performed thereon or therefrom.

The various means and mechanism provided in the machine that enter into the accomplishment of the foregoing will now be described.

The magazine H is supported at the rear side of the frame 15 and projects upwardly above the bed plate 108. The printing and control devices D are introduced into this magazine and the lowermost of the printing and control devices D is withdrawn therefrom by the reciprocal carrier bars 252 and 253, Figs. 66, 70, 71 and 75. These carrier bars are disposed between the side plates 254 and 255, Fig. 70, which are spaced apart by spacer bars 256 and 257, openings being provided in the side plates 254 and 255 and bolts being passed through these openings and threaded into tapped openings in the ends of the spacer bars to interconnect the side plates.

The side plates 254 and 255 are rigidly supported in the frame 15 and to this end the frame 15 includes two uprights 258 and 259, Fig. 1. A rear girder 260, Figs. 1, 66, 68 and 69, extends between the uprights 258 and 259 and a front girder 261, Fig. 69, extends from the upright 258 to a support member 262, Fig. 1, which is carried by the front tie rod 239 that interconnects certain of the mechanisms included in the machine. The girders 260 and 261 afford a firm support for the casting 263, Fig. 69, on which the anvil 264 is provided, the printing and control devices resting on this anvil at the time impressions are made directly therefrom by the platen P in a manner described hereinafter. As shown in Fig. 69 the casting 263 is bolted to the girder 261 as indicated at 265 and this casting is also bolted to the girder 260 as indicated at 266. The side plates 254 and 255 are screwed to the casting 263 by suitable countersunk flat head screws as 267, Fig. 68. Thus, the side plates 254 and 255 are firmly secured to the casting 263 which in turn is firmly connected to the girders 260 and 261 and these girders in turn are firmly fixed to the frame 15 whereby a rigid support for the side plates is afforded. The magazine H, as will be seen best in Fig. 66, is mounted on and carried by the side plates 254 and 255 at the rear ends thereof.

The carrier bars 252 and 253 are supported for reciprocal movement over the inner faces of the side plates 254 and 255 by strips 268 and 269, Figs. 69 and 71, the carrier bars merely resting on the upper edges of these strips, as best shown in Fig. 71. A plate 270, Fig. 75, is fast to the inner side of the carrier bar 252 at the rear end thereof and a similar plate 271 is fast to the inner face of the carrier bar 253 at the rear end thereof. Bars 272 are secured to, as by being welded thereto, and extended between the plates 270 and 271 and serve to maintain the rear ends of the carrier bars 252 and 253 in permanent spaced relation, this spaced relation being such that the carrier bars are held in a tight sliding fit against the inner faces of the side plates 254 and 255, respectively.

The anvil 264 is recessed at its sides and below the top surfaces thereof, on which the printing and control devices D rest when impressions are being made therefrom. The forward ends of the carrier bars 252 and 253 rest in these recesses as 273, Fig. 69, and in this way the forward ends of the carrier bars are supported for reciprocal movement over the inner faces of the side plates 254 and 255 and at the same time are maintained in properly spaced relation.

In the present machine the lowermost of the printing and control devices is withdrawn from station or position I thereof, Figs. 66 and 70, in the magazine H and first comes to rest in what will be referred to hereinafter as the sensing position or station, this position or station being indicated at II, Figs. 66 and 70. In the course of movement of the printing and control devices through the machine they also come to rest in printing position above the anvil 264, which position or station is indicated at III in Figs. 66 and 70. After passing from station III over anvil 264 the printing and control devices pass into the printing and control device collecting means to be described hereinafter. It will be apparent from the foregoing that the printing and control devices come to rest in two different positions or stations after movement thereof from the magazine H.

By referring to Fig. 70 it will be seen that the distance between the printing and control device in station I and the printing and control device in station II is less than the distance between the printing and control device in station II and the printing and control device in station III. Hence each printing and control device moves a lesser distance as it moves from station I, in the magazine H, to station II than it does when it moves from station II to station III. The carrier bars 252 and 253 have a uniform reciprocal movement imparted thereto, which is to say, the distance travelled by the carrier bars 252 and 253 thereof in each operation is uniform. This uniform movement, however, is utilized for moving the printing and control devices both the distance between stations I and II and the distance between stations II and III.

Thus, the printing and control devices are advanced through the machine by imparting to the carrier bars 252 a stroke which is just slightly greater than the greatest distance between the stations as I and II and II and III and by so positioning or spacing the various printing and control device engaging means or pawls on the carrier bars that when these bars are in their most advanced or forward positions, the printing and control devices are located in the desired positions or stations by the pawls. This requires that the pawls be variantly spaced one from the other along the bars. Therefore, in the course of the advancing movement of the carrier bars 252 the various printing and control devices are engaged successively by the pawls or other engaging means. In the present machine, where the greatest distance the devices are to be moved is between station II and III, the advancing movement of a device D from station II to station III is first initiated and the pawls, other than those engaging this device, move idly in such a way that the advancing movements of the other devices are initiated subsequently as determined by the distance which they are to be moved. The particular means employed to accomplish the foregoing will now be described.

A slot 274, Fig. 75, is provided in the carrier bar 252 near the rear end thereof and a pawl 275 mounted in this slot is acted on by a spring 276 which urges the forward end of the pawl upwardly so that this end of the pawl normally extends above the top edge of the carrier bar 252. A pawl 277 is similarly mounted in the carrier bar 253, the pawls 275 and 277 being in transverse alignment. The pawls 275 and 277 serve to withdraw the lowermost printing and control device D, in station I in the magazine H, from this station and advance such device to station II. The pawls 275 and 277 are free to pivot downwardly during the rearward movement of the carrier bars so that they will pass below the lowermost printing and control device in the magazine and then spring up behind this device into position to engage the rear edge of such lowermost printing and control device when the carrier bars 252 and 253 start to move forwardly. In order to facilitate movement of the pawls underneath the lowermost printing and control device during rearward movement of the carrier bars these pawls are beveled as indicated at 278, this serving as a cam surface to insure depression of the pawls against the action of the springs as 276.

It will be recognized that appreciable downward force will be exerted especially when a relatively large number of printing and control devices D are stacked in the magazine H. It is, of course, essential that the pawls remain engaged with a printing and control device during forward movement of the carrier bars. Now particularly at a time when a printing and control device is almost entirely removed from the magazine H, the downward force exerted by the stack of printing and control devices D can be effective on the pawls and in some instances this might so depress the pawls that they would be urged from engagement with the lowermost printing and control device which would not therefore be fed out of the magazine. Hence the pawls 275 and 277 are so mounted in the slots as 274 that they are capable of movement longitudinally of the bars. Then as an incident to the first part of the forward movement of the carrier bars, at which time the pawls are engaging the lowermost of the printing and control devices in the magazine H, these pawls are forced rearwardly of the carrier bars in the slots as 274. Such rearward movement causes the notches as 279 in lower edges of the pawls 275 and 277 to be moved from alignment with the projections as 280 on the lower edges of the slots as 274 and that part of each of the pawls immediately forward of these notches thereupon rests on these abutments during the forward movement of the carrier bars. By reason of the seating of the pawls on these abutments the downward force exerted by the printing and control devices D in the magazine H does not disengage the pawls from the lowermost printing and control device which is therefore fully fed out of the magazine from position I to position II by the pawls 275 and 277. When, however, the pawls move rearwardly with the carrier bars, the beveled edges 278 engage the lowermost printing and control device in the magazine H as an incident to such rearward movement and prior to the time the pawls are cammed downwardly, they are moved slightly forwardly in the slots as 274 to thereby align the notches as 279 with the abutments as 280 so that during the rearward movement of the carrier bars, the pawls 275 and 277 may be cammed down against the action of the springs as 276 and at this time the abutments 280 pass into the recesses 279.

The pawls 275 and 277 are so located in the carrier bars 252 and 253 that they pick up and start to carry the lowermost printing and control device in the magazine H (position I) during forward movement of the carrier bars in the reciprocation thereof and therefore the lowermost printing and control device in position I moves along with the carrier bars during the balance of the forward movement and in so doing the printing and control devices are moved from position I to position II.

Another pair of pawls 281 and 282 are respectively mounted in slots as 283 in the carrier bars 252 and 253 and are acted on by springs as 284 to have the forward ends thereof projected above the top edges of the carrier bars. These pawls 281 and 282 are spaced forwardly of the pawls 275 and 277 in an appreciable amount and in such a position that when the carrier bars come to rest in their forwardmost position these pawls will dispose a printing and control device in position III above the anvil 264. It will be recalled that the distance from position II to position III is greater than the distance from position I to position II. Thus when the carrier bars 252 and 253 move rearwardly, the pawls 281 and 282 come to rest at the end of the rearward movement in a position just to the rear of the rear edge of a printing and control device in position II. Hence during the first part of the forward movement of the carrier bars the pawls 281 and 282 are effective to move a printing and control device and immediately upon initiation of the forward movement of such carrier bars these two pawls engage the printing and control device in position II and carry it forward to position III. It will be understood that during the rearward movement of the carrier bars, the pawls 281 and 282 are forced downwardly against the action of the springs as 284 during the time they pass under the printing and control device in position II and that these springs reposition the pawls in device engaging position as soon as the pawls pass beyond a device in position II in the rearward movement of the carrier bars.

Another pair of pawls 285 and 286 are mounted in slots as 287 in the carrier bars 252 and 253 and are acted on by springs 288 to be urged upwardly. The pawls 285 and 286 are spaced forwardly of the pawls 281 and 282 in but a relatively short amount and in the forward or at rest position of the carrier bars these pawls are located in a position slightly forwardly of the printing and control device in position III, as shown in Fig. 70. In fact these pawls are so disposed on the carrier bars with respect to position III that when the carrier bars are in their forward at rest position, these pawls are positioned just beyond the forward edge of the printing and control device in position III. Hence as soon as the carrier bars start to move rearwardly, the pawls 285 and 286 are pivoted downwardly as they pass under the printing and control device disposed in position III, and in the course of such rearward movement and prior to the time it is completed the pawls 285 and 286 are disposed well to the rear of the rearwardmost edge of the printing and control device in position III. However, in the course of forward movement of carrier bars 252 and 253 the pawls 285 and 286 move into engagement with the rearwardmost edge of the printing and control device in position III, which is above the anvil 264, and carry this printing and control device to the printing and control device discharge chute to be described presently.

It will be recalled that the various pawls mounted in the carrier bars 252 and 253 have been described as being mounted in slots in the carrier bars. These pawls are retained in these slots by plates as 289, Fig. 75, that are mounted on the inner faces of the carrier bars in alignment with the slots in which the pawls are mounted, and these plates serve to prevent inward movement of the pawls. Outward movement of the pawls is prevented by reason of the fact that the carrier bars 252 and 253 are mounted for sliding movement over and against the inner faces of the side plates 254 and 255 and the pawls engage the inner faces of these side plates to be retained in the slots in which they are mounted.

In the foregoing description reference has been made to reciprocation of the carrier bars 252 and 253 and this reciprocal movement is imparted to the carrier bars in the following manner: A block 290, Fig. 66, is mounted between the bars 272 for reciprocal movement between the plate 271 and a spacing pin 291 that extends between the bars 272. The free end of an arm 292 extends beneath the block 290 and affords a support for said block, the block being pivotally connected to the arm as indicated at 293.

As best shown in Fig. 69, the end of the arm 292, to which the block 290 is pivotally connected, is offset upwardly, this offset portion being interconnected by an inclined portion 294 in the arm. That portion of the main extent of the arm 292 adjacent the inclined portion 294 is reciprocally mounted in a recess 295 in a block 296 pivotally mounted on an arm 297, as indicated at 298. The end of the arm 292 opposite that at which the block 290 is pivotally connected is pivotally mounted as indicated at 299 on a bracket 300, Figs. 2, 68 and 69.

The block 296, the arm 297 and the pivotal connection therebetween indicated at 298 afford a scotch yoke connection for the arm 292, the arm 297 being fast to a vertical shaft 301, Figs. 2, 66 and 69. The shaft 301 is journaled in a vertical bearing 302 that is carried by the bracket 300. A gear 303 is rotatably mounted on the shaft 301 and includes a hub 304 having clutch teeth 305 thereon. A sleeve 306 is slidably but non-rotatably mounted on the shaft 301 and includes clutch teeth 307 which are urged toward the clutch teeth 305 by springs acting between the sleeve 306 and a collar 308 rotatable on the shaft 301, the sleeve 306 being connected to the collar 308 for rotation therewith.

The clutch teeth 305 and 307 and the sleeve 306 are part of a clutch such as is disclosed in my co-pending application, Serial No. 239,561, filed November 8, 1938. A pin (not shown) on the sleeve 306 cooperates with a cam surface (not shown) on the arm 309 to hold the clutch teeth 307 separated from the clutch teeth 305. A solenoid 310, Fig. 68, is adapted to be energized to attract its core whereupon the cam surface on the arm 309 is retracted from cooperation with the pin on the sleeve 306 to thereby enable the clutch teeth 307 to engage the clutch teeth 305 and in this manner the gear 303 is connected to the shaft 301. The clutch including the clutch teeth 305 and 307 is a one-revolution clutch for after the solenoid 310 has been energized to enable engagement of the clutch teeth, the pin on the sleeve 306 acts to again dispose the cam surface on the arm 309 in position to be engaged by this pin near the end of a revolution so that as the pin moves over the cam surface the clutch teeth 307 are separated from the clutch teeth 305 to interrupt rotation of the shaft 301 at the end of a rotation thereof.

The gear 303 meshes with a pinion 311 rotatably mounted on a rod 312, Figs. 66 and 69, that is driven into a socket in the bracket 300, the cross member 313, Fig. 69, being fixedly attached to the lower end of this rod as indicated at 314. A pulley 315 is also rotatable on the rod 312 and is fixedly connected to the pinion 311, the pulley 315 being mounted below the pinion 311 and said pulley and pinion are supported in operative position by a collar 316 secured to the rod 312.

A belt 317, Figs. 3, 68 and 69, is passed about the pulley 315 and over guide pulleys 318 and 319 carried by arms 320 and 321 that are secured in position at the point of inter-connection of the cross member 313 with the rod 312, as indicated at 314. From the guide pulleys 318 and 319 the belt 317 passes to a pulley 322, Fig. 1, fast on the main drive shaft 19.

Thus whenever the main drive shaft 19 is rotating the pinion 311 and the gear 303 are rotating so that when the solenoid 310 is energized to cause the clutch teeth 307 to engage the clutch teeth 305, as described above, the arm 297 is caused to make a complete revolution whereupon through the connection of the arm 292 with the block 296 a reciprocatory movement is imparted to the end of the arm 292 to which the block 290 is pivoted and thereupon reciprocatory movement is imparted to the carrier bars 252 and 253 to advance the printing and control devices through the guideway therefor.

While the printing and control devices are in position II a sensing means cooperates therewith to effect set-up of the multiplying apparatus in the manner hereinafter described and it is advantageous to accurately locate the printing and control device when it is in position II and this sensing means is to cooperate therewith. Furthermore, when the printing and control devices are in position III above the anvil 264 and impressions are being made therefrom it is desirable to firmly hold the printing and control devices in position for so to do enables accurate location of the impressions made therefrom and this also enables clear-cut impressions to be produced.

By referring to Fig. 3 it will be seen that a notch 323 is provided in one side edge of the printing and control devices D. This notch 323 is accurately positioned with respect to the control area on the printing and control devices, as explained in United States Letters Patent No. 2,132,412, and it is also located accurately with respect to the printing plate 2 on the printing and control devices. Inasmuch as notches as 323 are accurately located with respect to other parts on the printing and control device it is possible, by locating means in the machine adapted to cooperate with these notches accurately with respect to parts in the machine adapted to cooperate with the printing and control devices, to insure that the machine parts will cooperate with the printing and control devices parts in an accurate manner. The means in the machine adapted to cooperate with the notches 323 in the printing and control devices D are, in the present instance, pawls 324 and 325, Fig. 73, the pawl 324 being positioned to cooperate with the notch in the printing and control devices at the station II and the pawl 325 being positioned to cooperate with a notch in the printing and control devices at the station III.

The pawl 324 is pivotally connected to the upper edge of the side plate 254, as indicated at 326, and the pawl 325 is similarly mounted, as indicated at 327. In order to insure seating of these pawls in the notches in which they are adapted to seat, these pawls are urged toward the edges of the printing and control devices by applying spring pressure thereon. It will be apparent, however, that if the pawls are spring-urged toward the printing and control devices they will drag thereover and that they might, therefore, subject the printing and control devices to undesirable wear. Hence I have arranged these pawls in such a manner that the pressure exerted thereon may be varied so that appreciable pressure will be effective on these pawls only at the time the pawls are to be operative and at all other times, and especially when the printing and control devices are moving past these pawls, but very light pressure is applied thereon so that objectionable wear on the printing and control devices is avoided. To accomplish this entails arranging the springs effective on the pawls in such a way that the effective force of the springs may be varied and this is accomplished in the following manner.

As best shown in Fig. 73, each pawl 324 and 325 includes an ear 328 having an opening 329 therein and the free upper end of a leaf spring 330 is passed through this opening. The lower end of each leaf spring is firmly connected to the outer face of the side plate 254 as by a screw 331.

A groove 332 is provided in the outer face of the side plate 254 and a slide 333 is mounted in this groove, said slide passing behind each leaf spring 330 and these springs serve to retain the slide 333 in the groove 332. A lug as 334 is fast on the slide 333 in position to cooperate with each spring 330, each lug 334 including an overhanging portion which may pass over the outer face of the adjacent spring. The forward edge of the overhanging portion of each lug 334 is beveled, as indicated at 335, to insure passage of the overhanging portion of this lug over the outer face of the adjacent spring 330 upon reciprocation of the slide 333.

By referring to Fig. 75, it will be seen that a notch 336 is provided in the lower edge of the carrier bar 252 and that another notch 337 is provided in the lower edge of this bar forwardly of the notch 336. These notches are arranged to define oppositely facing shoulders, the shoulder defined by the rear notch 336 facing forwardly and the shoulder defined by the front notch 337 facing rearwardly. An opening 338 is provided in the side plate 254 and a pin 339, Fig. 72, projects through this opening to be engageable in the notches 336 and 337. The pin 339 is fast in a finger 340, pivoted at 341 to the lower end of a plate 342 secured to the slide 333. A spring 343 extends between spring anchors respectively located on the side plate 254 and the finger 340 and acts on this finger to urge the pin 339 into engagement with the lower edge of the carrier bar 252.

In the latter part of the rearward movement of the carrier bar 252 the shoulder thereon defined by the notch 337 engages the pin 339 and through the finger 340 and plate 342 moves the slide 333 rearwardly, and thereupon the lugs as 334 assume the position shown in Fig. 74. This disposes the beveled edges 335 on these lugs in alignment with, but free of, the springs 330. Hence the fulcrum for each spring 330 is the screw 331 wherefore the extent of each spring between its fulcrum and the point where it applies its effective pressure is relatively elongated and by reason of this each spring exerts but very little pressure on the pawl to which it is connected. Hence, after the carrier bars attain their rearwardmost position and start to move forwardly to advance the printing and control devices in the manner above described, both the pawls 324 and 325 exert but very little pressure on the edges of the printing and control devices moving past them.

However, just before the carrier bars attain their forwardmost position, the pin 339 enters the notch 336 and engages the shoulder thereof whereby, as the carrier bars complete their forward movement, the shoulder of the notch 336 acts through the pin 339, finger 340 and plate 342 to move the slide 333 forwardly. In this movement the slide 333 moves the lugs 334 over the outer faces of the springs 330 with the result that the springs fulcrum on the lugs rather than on the screws 331. This changing in the point of fulcruming of the spring decreases the effective length and thereby substantially increases the effective pressure thereof and at the time this is effected the pawls 324 and 325 are moving into the notches as 323 in the printing and control devices in stations II and III. Therefore effective pressure is applied on the pawls to positively seat these pawls in the notches wherefore the printing and control devices in stations II and III are accurately located, by reason of the fact that the configuration of the pawls and the notches with which they cooperate are complementary, and furthermore, the printing and control devices are firmly held in position. The slide 333 will be moved rearwardly so as to withdraw the lugs 334 from association with the springs 330 prior to the time the printing and control devices start to move forwardly in the next advancing thereof and hence the effective pressure applied on the pawls is relieved prior to the time the printing and control devices are to be moved relative thereto.

During the time the printing and control devices are being carried along by the carrier bars 252 and 253, they are held down on these carrier bars by thin strips 344 and 345, Fig. 71, respectively fastened to the upper edges of the side plates 254 and 255, these thin strips projecting inwardly beyond the inner faces of these side plates and defining the upper surfaces of the printing and control device guideway.

During rearward movement of the carrier bars at which time the pawls 281 and 282 are passing under the printing and control device in position II and the pawls 285 and 286 are passing under the printing and control device in position III the above described pawls 324 and 325 are seated in the notches in the edges of the printing and control devices in these positions and this seating of the pawls together with the strips 344 and 345 insures that the printing and control devices remain in positions II and III until the rearward movement of the carrier bars 252 and 253 has been completed. However, as explained above, the spring pressure effective on the pawls 324 and 325 is relieved prior to the time the carrier bars 252 and 253 start to move forwardly and therefore when these carrier bars do move forwardly the pawls 324 and 325 are cammed out of the notches in the printing and control devices in the course of the forward movement of the carrier bars, the strips 344 and 345 preventing the printing and control devices riding upwardly away from the carrier bars as the pawls 324 and 325 are being so cammed out.

It has been stated that the pawls 285 and 286, Figs. 69 and 70, eject the printing and control device from the position III above the anvil 264 into the printing and control device discharge chute which is indicated by 346, Fig. 69. This discharge chute includes two plates as 347 secured to the inner faces of the side plates 254 and 255 near the front ends thereof and the upwardly and forwardly disposed faces of these plates are arcuate as shown in Fig. 69. The forwardmost position attained by the pawls 285 and 286 is such that, since these pawls will be engaged with the rear edge of a printing and control device that has been located at station III, these pawls, in the course of moving into their forward position, will move the aforesaid printing and control device from position III out over the upwardly and forwardly disposed arcuate edge of the plates as 347, and as this device attains this position it falls in such a way that its leading edge drops downwardly onto the aforesaid edges of the plates as 347. To insure passage of the printing and control devices onto these edges of the plates as 347, still other plates 349 and 350, Fig. 66, are secured to the side plates 254 and 255 at the front ends thereof and the rearwardly disposed edges of these plates are also curved for a short distance to define a throat through which the printing and control devices fall, this throat constituting the discharge chute 346. It will be understood that the plates as 347 are spaced to cooperate with the opposite side edges of the printing and control devices as are the plates 349 and 350.

A bar 351, Fig. 66, is secured to the upright 258 at its right-hand end by a suitable bracket 352 and this bar is disposed below the lower end of the discharge chute 346. A bar 353 is secured to the lower portion of the forwardly disposed face of the bar 351 well below the lower ends of the plates as 347 and 349 and 350, Fig. 66. The upper edge of this bar 353 provides the floor or bottom of the discharge chute 346 and as the printing and control devices fall through this chute they come to rest on the upper edge of this bar.

As has been explained, printing and control devices are customarily stored in drawers or other suitable storage means when not in use and where drawers are employed they are intended to be mounted in suitable cabinets. The printing and control devices are removed from these drawers and introduced into the magazine H and when this is done the drawer as J from which the plates were removed is placed in the machine in a position to receive the printing and control devices which were removed from such drawer and introduced into the magazine so that when these devices fall down through the discharge chute 346, they may be passed back into this drawer.

The capacity of the magazine H for receiving printing and control devices is preferably more than the capacity of a single drawer J, thus enabling an ample number of printing and control devices to be arranged in the magazine to insure that the machine may be continued in operation once it has been started. Hence, during a substantial portion of the operation of the machine printing and control devices from at least two drawers or other storage members will be in the machine. The drawers or other storage members are usually labeled to identify the printing and control devices that are stored therein and in order that this identification will not be disturbed, which would of course interfere with the system under which the printing and control devices are filed or arranged, it is essential that the printing and control devices pass back into the particular drawer from which they were removed and the present machine automatically operates so as to insure this.

Inasmuch as printing and control devices from at least two drawers will usually be in the machine of my invention I have arranged the machine so that two drawers J may be supported therein in position to permit printing and control devices to pass thereinto after the devices pass onto bar 353. However, the specific manner in which this is accomplished is not important in so far as the present invention is concerned and hence is not described in detail herein. A full and complete description of this apparatus, however, will be found in my co-pending application, Serial No. 403,272, filed July 21, 1941.

When the printing and control devices are in position II, the apparatus shown in Fig. 67 is operative thereon to effect set-up, in the present instance, under control of perforations in a card 6 on the printing and control device D at this position, of the multiplying apparatus, to which the present invention particularly pertains and which will now be described in detail.

MULTIPLYING APPARATUS, FIGS 7 TO 65

Reference has been made heretofore to the printing of the variable data V on the sheets, such as the check S and this is done by platens 250, Fig. 7, from type characters on the type segments 247 mounted on the shaft 248. These type characters are selectively positioned in printing position below the ink ribbon IRa by the multiplier apparatus M which is now to be described.

*Analysis of principle employed*

In order to clearly define the nomenclature used in the following description of the multiplying apparatus, reference is made to the following example of the longhand multiplication of 999 by 999, wherein the terms hereinafter employed are associated with typical numerical data to which the terms are hereinafter applied:

999—Multiplicand factor
999—Multiplier factor

8991—Intermediate product
8991 —Intermediate product
8991 —Intermediate product

998001—Final product

It will be understood from the foregoing example that an intermediate product is a product which is obtained by multiplication of all of the digits in one factor (the multiplicand) by a digit in a particular order of the other factor (the multiplier). In ascertaining an intermediate product it is usually necessary to perform carry-overs. For example, in the following multiplication 999
9

8991 when the 9 in the units order of the multiplicand is multiplied by the multiplier 9, the product is 81. So far as the units order is concerned the result of this multiplication is 1, it being necessary in this multiplication to carry over 8 into the tens order. Therefore in so far as the various digits that must be handled in the course of the last above example of multiplication are concerned, what is actually done is as follows:

999
9

81
81
81

8991

It will be seen that this multiplication entails three carry-overs but in longhand multiplication the necessary carry-overs are performed mentally rather than being set down so that, to ascertain a final product in longhand multiplication, in an instance where the multiplier extends through but a single order, no carry-overs are apparent in so far as set down digits are concerned.

However, in most instances where a two digit multiplier is entailed, for instance in the following example:

999
99

8991
8991

98901 it will be seen that, in so far as set down digits are concerned, it is necessary to make carry-overs from the tens order (referring to the final product), to the hundreds order and from the hundreds order to the thousands order and from the thousands order to the ten thousands order to ascertain the final product for the set down intermediate products are added with reference to orders of the final product to determine the final product and the required carry-overs are incidental to this addition.

I have found that the performance of multiplication in a machine may be effected expeditiously and accurately if intermediate products, such as those which appear in longhand multiplication, are utilized for this avoids the necessity of performing carry-overs incident to the multiplication of the various digits of the multiplicand by the respective digits of the multiplier and in my novel apparatus I utilize representations of intermediate products and summarize or add such intermediate products to ascertain the final product. The representations of intermediate products employed in my novel multiplying apparatus are provided in what will be called templets hereinafter, but it is to be understood that such representations could be afforded in a wide variety of ways without departing from the underlying principle of my invention.

In contradistinction to partial product multiplication, I provide representations of the actual intermediate products that may be ascertained in the multiplication of the various digits of the multiplicand factor by the respective digits of the multiplier factor. This is done in such a way that both the digit which is found for the particular order in which a multiplication is performed and any carry-over into this order from a multiplication in a lower order are represented by a single representation. Thus, in one form of my invention, if templets are to bear representations of the result of the following multiplication $$\begin{array}{r} 9 \\ 9 \\ \hline 81 \end{array}$$

the 1 resulting from this multiplication would be incorporated in a templet pertaining to the units order of the final product and the 8 would be incorporated in a templet pertaining to the tens order of the final product. This is in contradistinction to the practice that has heretofore been resorted to where, in an instance such as the foregoing, two templets pertaining to the units order would be provided, in one of which templets a representation of the 1 would be formed and in the other of such templets a representation of the 8 would be formed.

Another illustration of the manner in which representation of intermediate products in templets are formed in accordance with the present form of my invention is the instance where the following multiplication is performed:

$$\begin{array}{r} 99 \\ 9 \\ \hline 891 \end{array}$$

It is to be noticed that in reality this multiplication is as follows:

$$\begin{array}{r} 99 \\ 9 \\ \hline 81 \\ 81 \\ \hline 891 \end{array}$$

As in the instance above where 9 is multiplied by 9, the representation pertaining to the 8 is to appear in a templet pertaining to the tens order of the final product but, in the immediately preceding example, in addition to this a representation of the 1 resulting from the multiplication of 9 in the tens order of the multiplicand (which in reality is 90) is also to be incorporated in this same templet. The result of this multiplication of 90 by 9, so far as the tens order of the final product is concerned is 1. However, in accordance with my invention, instead of individually representing the 8 and 1, the sum of which is to appear in the tens order of the final product, as is done in partial product multiplying apparatus, the sum of these two numbers or 9 is represented. Hence, templets formed in accordance with my invention bearing representations of the intermediate product resulting from the multiplication of 99 by 9 would bear representations of the digits 8, 9 and 1, these representations appearing in templets respectively pertaining to the hundreds, tens and units order of the final product.

Reference has been made above to the templets being formed in the manner just described in accordance with one form of my invention and this is the form that is shown in Figs. 7 to 65. This form of my invention is of the character capable of performing a large number of multiplications in which one factor is constantly reoccurring. In an instance where one factor of a large number of multiplications is constantly reoccurring it is possible to incorporate in templets representations of all of the intermediate products that may accrue from the multiplication of such a factor by all of the digits that may appear in a limited number of orders in the other factor. Then such templets may be placed under control of means responsive to representations of the digits of the varying factor of the multiplications to selectively position the various intermediate product representations on the templets in an operative position where the sensing means of a summation means, which functions to add the intermediate products and thereby ascertain a final product, will cooperate with such representations.

Thus in the example above where 99 is multiplied by 9, 99 may be considered to be the reoccurring factor. In preparing templets for this factor representations would be formed in the templets representing the intermediate products ascertained upon the multiplication of 99 by the respective digits 0 to 9 and such representations are utilized by disposing in operative position only the representations of the intermediate product ascertained when the reoccurring factor is multiplied by a given digit of the other factor, representations of such a given digit being utilized for this purpose as will be explained hereinafter.

Templet formation

A convenient way of affording representations of intermediate products is to utilize templets, as has been explained hereinabove, and this is particularly true where there is to be a reoccurring factor in the to be performed multiplications. Such templets are illustrated in Figs. 62, 63 and 64. Reference will now first be made to Fig. 62 wherein the templets 1105, 1106, 1107 and 1108 bear representations of the intermediate products ascertained when the multiplicand 999 is multiplied by the various significant digits and 0.

Each templet, in accordance with the present disclosure of my invention, initially has substantially the outline of the sector of a circle and includes a hub as $h$ having an opening as $o$ therein Each sector initially includes an arcuate edge as $a$ which is spaced from the center of the opening $o$ a predetermined distance, and additionally each sector includes a radial edge as $e$ and a stop edge as $s$, each of these edges lying on radii intersecting each other at the center of the opening $o$. The angularity between these edges $e$ and $s$ is such that the initial edge $a$ may be conveniently divided into ten equal spaces, as by radii as $r$, each of such radii intersecting the center of the opening $o$ and crossing the edge $a$ at equidistantly spaced positions, which is to say, along the edge $a$, the radius $r$ first inwardly of the edge $e$ is spaced from this edge in the same amount as the next radius $r$ is spaced from the first radius $r$, and this continues on across the edge $a$ so that the stop edge $s$ is spaced from the ninth radius $r$ in the same amount as this ninth radius is spaced from the eighth radius $r$ which is also the amount the first radius as $r$ is spaced from the radial edge as $e$. The ten spaces into which the edge as $a$ is so divided, inwardly from the stop edge as $s$, respectively pertain to the digits 0—9—8——2—1 as these digits occur in the multiplier (the varying factor of the multiplications that are to be performed in the mechanisms shown in Figs. 7 to 65, inclusive, the other factor being reoccurring).

Additionally each sector has arcs as $c$, struck from the center of the opening $o$, extending thereacross at equally spaced intervals inwardly from the edge $a$ to define points at which step or stop edges may be formed to represent the various significant digits which may appear in intermediate products, 0 being represented on the edge $a$, the digit 1 is represented by a stop edge on the first arc $c$ inwardly of the edge $a$ while the digit 2 is represented by a step or stop edge on the next inwardmost of the arcs $c$, the remaining significant digits being respectively represented by stop edges located on the successive arcs inwardly of the aforesaid arcs, a stop edge on the inwardmost arc $c$ pertaining to the digit 9.

It is to be understood that the radii $r$ and the arcs $c$ are not actually provided on the sectors, these merely being intangible divisions in the sectors, the radii and arcs being shown in Figs. 62, 63 and 64 merely for the purpose of this description.

In order to prepare sectors such as have just been described to afford templets representing particular intermediate products, a chart is prepared. The constantly reoccurring factor, which will be the multiplicand in the present apparatus, is, of course, known and in preparing a chart this multiplicand is multiplied by zero and the various significant digits to ascertain what intermediate products will accrue when the particular multiplicand is multiplied by the various digits. Thus for example, where the constantly reoccurring factor is 999, the following chart is prepared:

| Digit in multiplier | Fourth templet | Third templet | Second templet | First templet |
|---|---|---|---|---|
| 1 | 0 | 9 | 9 | 9 |
| 2 | 1 | 9 | 9 | 8 |
| 3 | 2 | 9 | 9 | 7 |
| 4 | 3 | 9 | 9 | 6 |
| 5 | 4 | 9 | 9 | 5 |
| 6 | 5 | 9 | 9 | 4 |
| 7 | 6 | 9 | 9 | 3 |
| 8 | 7 | 9 | 9 | 2 |
| 9 | 8 | 9 | 9 | 1 |
| 0 | 0 | 0 | 0 | 0 |

In preparing the sectors to afford templets to represent the intermediate products, a sector is devoted to each order that may appear in the various intermediate products so that in the above instance where the intermediate products of 999 times the various digits are ascertained four sectors are utilized. One such sector, 1105, pertains to the most right-hand or units order of the intermediate products, the second sector 1106 to the tens order, the third sector 1107 to the hundreds order, the fourth sector 1108 to the thousands order. If the intermediate product extended through more than four orders of numbers additional sectors would be provided.

As has been stated heretofore, the spaces defined along the edge $a$ by the radii $r$ respectively pertain to the digits in the multiplier, and starting from the edge $e$ these spaces respectively pertain to the digits 1—2—3——8—9—0. Thus, for example, when the sector 1105 is to be prepared reference is made to the chart and it is first ascertained what value is to be represented in the space between the stop edge $e$ and the adjacent radius $r$, which space pertains to the digit 1 in the multiplier. When reference is thus made to the chart and comparison is made across from the first digit in the multiplier to the column in which the digit to be represented in the first sector appears, it will be ascertained, in the present instance, that the digit 9 is to be represented. It has also been stated that in so far as the digits appearing in the intermediate products are concerned these are represented by stop edges disposed on the arcs $c$. It has also been explained that the inwardmost of these arcs pertains to the digit 9. Thus since the digit 9 is to be represented in the first space, which is to say, the space between the edge $e$ and the adjacent radius $r$, the material of this space is cut away inwardly of the edge $a$ to the inwardmost arc $c$ in such a way as to form a step $Z$ representative of 9. The material of the next space which, as has been explained, pertains to the digit 2 in the multiplier is next cut away and in this instance this material is cut away from the edge $a$ to the next to the inwardmost of the arcs $c$, which arc pertains to the digit 8 and in this way a step $Z$ representative of 8 is defined.

This process is continued on across the various spaces and in each instance the material in the space is cut away inwardly of the edge $a$ to whatever arc pertains to the digit that is to be represented. This process is also followed in the production of the sectors 1106, 1107 and 1108 as can be ascertained by comparing the location of steps $Z$ on the various templets with the above chart. Of course, in commercial production of templets from sectors or the like, suitable dies or equivalent tools would be utilized and the steps $Z$ would not be cut individually as just described, such description being merely explanatory of the underlying principle.

In an instance where the value of both the multiplicand and the multiplier is 9, as can be seen by referring to the sector 1105 and the above chart, the steps appear in regular order, this being a peculiarity of the multiplication of 9 by 9. This condition, however, does not always prevail. Thus, for example, where the reoccurring factor is 37, the preparation of a chart in accordance with the principles above set forth, and the application thereof to a set of templets results in an irregular arrangement of the steps as shown in Fig. 63.

By way of further example, a set of templets is shown in Fig. 64 to illustrate the form assumed when the reoccurring factor or multiplicand is 465.

By referring back to the above chart and to similar chart prepared as examples of the multiplication of reoccurring factors, and by reference to Figs. 62 to 64, it will be noticed that in each and every instance the digits that are to be represented and are represented in the first templet are the digits which are ascertained when the digit appearing in the units order of the constantly reoccurring factor or multiplicand is multiplied by the various digits of the multiplier but without any carries that may be incidental to such multiplications. In so far as the second templet is concerned it will be noted that while this templet is to bear representations of the digits ascertained when the second digit in the constantly reoccurring factor, that is, the one in the tens order, is multiplied by the various digits of the multiplier, without any carry-overs that may accrue in such multiplications, it bears, instead of merely representations of such digits, representations of the sum of such digits and any carry-overs which may occur by reason of the multiplication performed to ascertain the digit for the corresponding position in the first templet. Hence corresponding multiplier digit positions on templets of a set pertaining to a given reoccurring factor bear representations of the actual digits that appear when the reoccurring factor is multiplied by a particular multiplier digit.

The specific description thus far given with reference to the preparation of the templets as 1105 particularly pertains to the preparation of templets where the significant digits appear in the units order of the multiplier. It, however, should be noted that if, for example, 999 were multiplied by 90, the digits in the resulting products would be identical with those included in the above set forth chart of such multiplication except that a fifth order would appear to the right of the most right-hand order, but each and every digit appearing in such fifth or most right-hand order would be 0. The foregoing would also apply in so far as a constantly reoccurring factor of 37 and a constantly reoccurring factor of 465 or any other constantly reoccurring factor are concerned. From this it will be seen that in so far as the formation of the respective templets to represent intermediate products is concerned these templets are formed in precisely the same manner whether the significant digits appear in the units, tens, hundreds and so on orders of the multiplier, which is to say, the most right-hand templet (in which significant digits are to be represented) in any set will correspond to a similar templet in any other set and this applies to all similarly located templets in the various sets.

When sets of templets are being prepared to represent the intermediate products ascertained by the multiplication of a given multiplicand (a constantly reoccurring factor) by zero and the significant digits that may appear in the various orders of the multiplier, as many sets are prepared as there is to be accommodation for orders in the multiplier. Thus where the reoccurring factor is 999 and digits may appear in any one of three orders of a multiplier, three sets of templets are prepared and in the present instance templets 1105—U, 1106—U, 1107—U and 1108—U, Fig. 65, are prepared for the units order, another set 1105—T, 1106—T, 1107—T and 1108—T is prepared for the tens order and still another set 1105—H, 1106—H, 1107—H and 1108—H is prepared for the hundreds order. As stated heretofore, the most right-hand templets in the respective sets are identical as are the next templets to the left, and so on. Furthermore, as will be explained, the templets of each such set are assembled into what will be called hereinafter a templet-gang.

In each such templet-gang the various templets included therein are uniformly spaced one from the other. In a templet set or gang pertaining to the units order the most right-hand templet is located in the most right-hand templet position thereof and the remaining templets are successively located in proper order in other templet positions until all are located. In a set pertaining to the tens order, however, the most right-hand templet is located in the next to the most right-hand position, or better, if the sets pertaining to the tens and unit order were positioned with their templet positions in alignment, the most right-hand templet in the tens set would be aligned with the next to the most right-hand templet in the units set. Such locating of the templets corresponds to the manner in which the digits of intermediate products are set down in longhand multiplication.

By referring to Fig. 65, wherein the relative positioning of the various templets of the various sets in the present apparatus is diagrammatically illustrated, it will be apparent that the arrangement of the templets is such that the templet 1105—T is aligned with the templet 1106—U, the templet 1105—H is aligned with the templet 1106—T and, further, the templets 1108—U, 1107—T and 1106—H are aligned with each other, the reason for such alignment of the templets is that the various digits of the intermediate products must be added to ascertain the final product.

By referring to Fig. 65 it may be seen that the various templets are so arranged that the steps Z thereon may be moved into operative positions represented by dot-dash lines L and that when so positioned the digital values represented by such steps Z will be aligned with proper orders of the final product. The specific example illustrated in Fig. 65 is the multiplication of 999 by 999 which in longhand is as follows:

```
    999
    999
    ———
   8991—First intermediate product
  8991 —Second intermediate product
 8991  —Third intermediate product
 ——————
 998001
```

In Fig. 65 steps Z on the templets 1105—U to 1108—U on lines L respectively represent the digits of the above "first intermediate product;" steps Z on the templets 1105—T to 1108—T on lines respectively representing the digits of the above "second intermediate product"; steps Z on the templets 1105—H to 1108—H on lines L respectively representing the digits of the above "third intermediate product." Thus, a step Z on templet 1105 representative of 1 is on the line L pertaining to the units order of the final product. A step Z on the templet 1106—H representative of 9 and a step Z on the templet 1105—T representative of 1 lie on the line L pertaining to the tens order of the final product. This same arrangement progresses on across the various templets on the lines 1 and it will be found that the steps Z that lie on the various lines L represent the various digital values which when added along the lines L, in the manner usual in longhand multiplication, afford the final product 998001.

It has just been stated that steps Z on the various templets may be moved into operative position on the lines L to dispose the representations of the proper intermediate products in operative position. It has also been explained that the positions intermediate the edges e and s, Fig. 62, defined by the radii r pertain to the digits of the multiplier in the order of 0, 9, 8, 7, 6, 5, 4, 3, 2, 1 inwardly away from the edge s.

To effect proper positioning of the templets when a multiplication is to be performed a positioning templet as 1117, Fig. 62, is associated with each set of templets as 1105 to 1108. Such a positioning templet is produced from a sector having a configuration similar to the other sectors hereinabove described, which is to say, such a sector includes a hub h' having an opening o' therein at the center of which the radii on which the edges e' and s' lie intersect. This sector is also divided into spaces or positions along the arcuate edge a' by radii r' that are congruent to the radii r on the sectors as 1105. Arcs d' struck from the center of the opening o' are spaced inwardly from the edge s' at regular intervals, this spacing being greater than the spacing of the arcs c on the sectors as 1105. In the case of the positioning sectors as 1117 the steps which are to be effective in the operation of the machine are not located on the arcs d' with respect to the edge a' but rather are located on selected of the radii r' with respect to the edge e', such steps being generally indicated by Z'.

For a purpose which will be explained hereinafter and which arises by reason of the code under which representations of the multiplier are produced in the control areas of the printing and control devices as D each step Z' except the one most remote from the edge e' represents two significant digits. The first of such steps Z' located inwardly from the edge e', lies on the immediately adjacent radius r' and serves to represent the digits 1 and 2. In forming this step, the material in the area between the edge e' and the immediately adjacent radius r' is cut away to the inwardmost of the arcs d'. In forming the next of the steps Z', the material intermediate the first radius, that is, the radius immediately adjacent to the edge e', and the third radius away from this edge is cut away down to the next inwardmost of the arcs d' and the second step thus formed to lie on the third radius r' pertains to the digits 3 and 4. The next step Z' is defined by cutting away the material intermediate the third and fifth of the radii r' down to the next inwardmost of the arcs d' and thus the third of the steps Z' lies on the fifth of the radii r' and pertains to the digits 5 and 6. The next step Z' is defined by cutting away the material intermediate the fifth and seventh of the radii r' down to the next inwardmost of the arcs d' and thus the fourth of the steps Z' lies on the seventh of the radii r' and pertains to the digits 7 and 8. The next and last of the steps Z' is defined by cutting away the material intermediate the seventh and ninth of the radii r' down to the arc d' closest the edge a' and thus the fifth and last step Z' lies on the ninth of the radii r' and pertains to the digit 9. Furthermore, when this last step Z' comes to rest, under certain conditions, in an operative position in which the other edges come to rest to represent one or the other of the digits to which they pertain, this step, in effect, represents 0. Under these conditions, however, means other than those which position the other steps cause this fifth and last step to come to rest in the position in which it is representative of 0.

With regard to the just described formation of the positioning templet 1117, it should be noted that each and every positioning templet employed in the machine is identical in construction, this being due to the fact that the steps Z' defined on such templets pertain to the digits which can appear in any order of the multiplier which digits of course will always be the same.

It has been explained that the steps Z are located on the templets as 1105 in definite relation with respect to the arcuate edges a to thereby represent a particular digital value, the particular value being determined by the particular one of the arcs c on which the particular step Z lies. It has also been explained that these steps Z lie in certain positions intermediate adjacent of the radii r and that these positions respectively inwardly of the edges as e pertain to the digits 1, 2, 3, 4, 5, 6, 7, 8, 9, 0, in that order. It has also been explained that the steps Z' are located on radii r' and that these steps inwardly of the edges as e' pertain, in the manner above explained, to the digits 1, 2, 3, 4, 5, 6, 7, 8, 9, 0 in that order.

Thus, if positioning templets as 1117 are associated with a set of templets as 1105 to 1108, and if the various positions on such templets inwardly of the edges e and e' are fixed in definite relation with each other, it will be possible by locating the steps Z' in given positions, to similarly locate the positions on the templets as 1105 to 1108 in given positions, and it is an arrangement such as this that enables selected of the steps Z to be disposed in operative position, diagrammatically illustrated in Fig. 65 as being on the lines L.

In order that such positioning of sets of templets as 1105 to 1108 may be effected by determining the position of positioning templets as 1117, a set of templets such as 1105 to 1108 and a positioning templet as 1117 are tied together to provide what is referred to herein as a "templet-gang," such a templet-gang being generally indicated by X and being shown, for example, in Fig. 29.

A convenient way of tying together a set of templets as 1105 to 1108 and a positioning templet as 1117 to afford a templet-gang X is illustrated in detail in Fig. 31 wherein the templets 1105—H to 1108—H (see Fig. 65) are shown, as well as a positioning templet which will be referred to hereinafter as 1117—H. The templets that are to constitute this templet-gang, as are the templets in all other templet-gangs X, are tied together on a sleeve 1118 which has a unitary collar 1119 at one end thereof.

*Templet-gang assembly*

In assembling a templet-gang the positioning templet 1117 is always the first that is installed on the sleeve 1118, Fig. 31. To this end a sleeve 1118 is passed through the opening o' in the positioning templet 1117—H (pertaining to the hundreds order of the multiplier to which the templet-gang X shown in Fig. 31 pertains), and the hub h' of this templet is engaged with the shoulder 1119.

It will be recalled that each templet in each set of templets is to be disposed in alignment with devices pertaining to a given order of the final product and that the particular order of final product with which the most right-hand templet of a set or gang is aligned is determined by the order of the multiplier to which the particular templet-gang pertains. Thus in the present instance where the templet-gang shown in Fig. 31 pertains to the hundreds order, the most right-hand templet, to wit, 1105—H, is to be disposed in a position such that it will be aligned with devices pertaining to the hundreds order of the final product when the templet-gang is installed in the machine. Such a most right-hand templet is always positioned next to the positioning templet on a sleeve 1118.

When a templet-gang is installed in the machine, in a manner described hereinafter, the various positioning templets are located in a given position and in view of this it is possible to locate the most right-hand templet as 1105—H of a templet-gang in definite relation with the positioning templet as 1117—H of the particular gang. So to do will insure that the most right-hand templet as 1105—H will be aligned with devices pertaining to the order of the final product to which it pertains. This is accomplished by employing spacing collars as 1120—H, the spacing collar 1120—H being of such length that when it is engaged with a positioning templet as 1117—H, and a most right-hand templet as 1105—H is engaged therewith, it will so space the templet as 1105—H from the positioning templet 1117—H that when the device is installed in the machine the templet 1105—H will occupy its proper position, that is, be located to cooperate with parts in the machine that pertain to the hundreds order of the final product.

The various templets in a set thereof such as 1105 to 1108 are to be uniformly spaced one from the other and this is accomplished, in assembling a templet gang, by interposing spacing collars as 1121 of uniform width intermediate the various templets as 1105—H to 1108—H, it being understood that such spacing collars and templets are mounted on a sleeve 1118.

It is desired to tightly clamp the various templets in position on the sleeves 1118, and in view of this another spacing collar 1122—H is mounted on the sleeve 1118. The combined length of the spacing collars as 1120—H and 1122—H is uniform and these collars are used in sets. By way of example, in a templet-gang pertaining to the tens order such as is shown in Fig. 29, the most right-hand templet 1105—T therein is to be spaced from the positioning templet 1117—T therein by a spacing collar 1120—T, and in this templet-gang the spacing collar 1122—T is of a width equal to the width of the spacing collar 1120—T. However, in the templet-gang shown in Fig. 31, the spacing collar 1120—H is longer than the spacing collar 1122—H but in both instances, which is to say, in both the templet-gangs shown in Figs. 29 and 31, the combined length of the end spacing collars as 1120 and 1122 used therein, is equal. By reason of this arrangement it is possible to utilize sleeves 1118 of uniform length, and yet clamp the various templets and spacing collars constituting a templet-gang tightly in position on such a sleeve. Such tight clamping is effected by running a nut 1123 onto the threaded end of sleeve 1118 (such threaded end being located on the sleeve opposite the end at which the shoulder 1119 is provided thereon), after the templets and spacing collars have been positioned thereon and then by tightening the nut 1123 the various templets and spacing collars in a templet-gang X are tightly clamped together.

Prior to the time the nut 1123 is seated in tight clamping engagement on the sleeve 1118 the edges s and s' of the various templets are accurately seated on a flat surface for so to do insures accurate positioning of the various multiplier digital positions on the various templets in accurate relation with each other in related axial planes. As soon as this accurate positioning is attained the clamping nut 1123 is screwed home to tightly clamp the various templets and spacing collars together. It may be desirable in some instances, in order to positively insure against displacement of the various templets with respect to each other on a sleeve 1118, to braze, solder, weld or otherwise secure the templets and spacing collars together after the above described clamping on the sleeve 1118 but since, in the machine, as will be described hereinafter, the various stop edges s and s' on the various templets are returned to engagement with an accurately oriented and sized stop in the course of each cycle of operation, I have found that the various templets will remain in accurate relation with each other throughout prolonged operation of the machine without being secured other than by the clamping effected as above described.

The templet-gangs, generally indicated by X, are a convenient way of affording representations of those intermediate products that are ascertained when the same, that is, a reoccurring factor is used in a large number of multiplications. These gangs are so mounted in the machine that upon variation of a reoccurring factor one such set of templet-gangs pertaining to one such factor may be quickly and easily removed from the machine and another set pertaining to another such factor may be quickly and easily substituted therefor, such mounting of the templet-gangs being described in detail presently.

*Multiplying apparatus assembly*

The multiplying apparatus M in which the templet-gangs X are employed includes a pair of side plates 1124 and 1125, Fig. 26, between which the templet-gangs X are adapted to be mounted as well as the sensing means of the summation means that are adapted to cooperate therewith. It is, of course, desirable to arrange the multiplying apparatus M in as compact a manner as possible and in this connection it is to be noted that while this desired arrangement of the multiplying apparatus is attained in the present instance it is at the same time unnecessary to fan out parts to afford accommodations for either the means initiating movement or the means receiving movement, that is, that are set up by the multiplying apparatus. By way of example as to what is meant by this there have been instances where parts have been arranged in compact relation but, for example, where printing members receiving motion were included in such arrangements it was usually necessary to fan out the members operable to set up such printing members in order that the operable members could be accommodated. Fanning out and the like to operative parts is avoided in my novel mechanism and this is primarily accomplished by providing a series of units, each pertaining to an order of the final product and referred to hereinafter as plates and which are described presently, and by providing directly on each of such plates those means which cooperate with the steps Z on templets of the templet-gangs, such means being the above referred to sensing means and the summarizing means of which the sensing means are a part.

It will be recognized that when the steps Z on the templets are disposed in operative position, indicated by the lines L in Fig. 65, that in order to ascertain the final product it is necessary, in effect, to add or summarize the digits represented by the steps Z. In summarizing such digits it will frequently be necessary to perform carry-overs from a lower to a higher order such as is necessary when the digits represented by the steps Z on the second line L from the right, Fig. 65, pertaining to the tens order of the final product are added, such digits being 9 and 1, which when added require a carry-over of 1 into the next higher or hundreds order.

To add, in effect, digits represented by steps Z on the lines L, a summation means is provided for each order of the final product, there being, therefore, such a summation means for each line L of Fig. 65. These summation means are mounted on the plates as 1126 to 1131, Fig. 26, that are mounted between the side plates 1124 and 1125 of the multiplying apparatus M.

The disclosed multiplying apparatus M is of such capacity that a three-order multiplicand may be multiplied by a three-order multiplier. The largest three-order multiplication that can be effected is 999 times 999, which results in the product 998001. This product extends through but six orders and therefore in an apparatus having a capacity for three-order multiplicands and multipliers there must be accommodation, in so far as the final product is concerned, for six orders. It is for this reason that six plates, 1126 to 1131, are provided in the present apparatus.

The plates 1126 to 1131, inclusive, and the side plates 1124 and 1125 are substantially rectangular in outline and are preferably formed from sheet metal of sufficient thickness to impart the required rigidity to these plates. These rectangular plates are mounted in side by side relation and are spaced one from the other by having spacing collars as 1132 interposed therebetween at suitable positions as, for example, the positions shown in Fig. 35. Bolts as 1133 pass through the side plates 1124 and 1125 and the plates 1126 to 1131 and the spacing collars 1132 therebetween, and by tightening nuts on these bolts these plates are secured together to provide a unitary structure. This unitary structure is mounted in the machine in the following manner.

Side frames 1134 and 1135, Figs. 1, 13 and 27, are provided which, at their lower ends, are secured to the bracket 226 which is adjustably secured to the tie rods as 239 of the frame 15 of the machine. The side frames 1134 and 1135 are spaced from each other in an amount greater than the spacing of the side plates 1124 and 1125 in the present instance so that in event it is desired to provide a multiplying apparatus having a capacity for more than six orders such multiplying apparatus can be supported between the side frames 1134 and 1135. The side plates 1124 and 1125 are disposed between the side frames 1134 and 1135 and spacing collars as 1136, Fig. 13, interposed between, for example, the side frame 1134 and the side plate 1124 and the side plate 1125 and the side frame 1135, these spacing collars being located at suitable positions on the side plates. Bolts as 1137 are freely passed through the side frames 1134 and 1135 and the spacing collars as 1136 and are threaded into tapped openings as 1138, Fig. 27, in the side plates 1124 and 1125, and in this manner the unit including the side plates 1124 and 1125 is firmly secured in the machine. In order to positively space and reenforce the side frames 1134 and 1135, spacing sleeves as 1139 are disposed therebetween at suitable positions and bolts as 1140 are freely passed through the side frames 1134 and 1135 and are threaded into tapped ends of these spacing sleeves.

The summation means on each of the plates 1126 to 1131 are each, as fully explained hereinafter, arranged to cooperate with the templets that pertain to a particular order of the final product, which is to say, templets such as are shown on each of the lines L in Fig. 65. Thus in mounting the templet-gangs in the machine the arrangement is such that the templets in the various gangs that pertain to a particular order of the final product lie alongside of the plate that pertains to the same order of the final product to thereby be positioned for cooperation with the summation means on such plate.

In the machine as disclosed, the plate 1126 pertains to the units order of the final product, the plate 1127 pertains to the tens order of the final product, the plate 1128 pertains to the hundreds order of the final product, the plate 1129 pertains to the thousands order of the final product, the plate 1130 pertains to the ten thousands order of the final product, and the plate 1131 pertains to the hundred thousands order of the final product.

Therefore, in mounting the templet-gangs in the machine the templet 1105—U lies alongside of the plate 1126 to cooperate with the summation means provided on this plate, and as can be ascertained by reference to Fig. 65 it is only necessary to associate the templet 1105—U with the plate 1126 for only digits represented on the templet 1105—U will pertain to the units order of the final product.

In so far as the plate 1127 is concerned, the templets 1106—U and 1105—T will be arranged to cooperate with the summation means on this plate for, as again can be ascertained by reference to Fig. 65, it is only representations afforded by steps Z on these templets that enter into determination of the digit to appear in the tens order of the final product.

In so far as the plate 1128 is concerned the templets 1107—U, 1106—T and 1105—H are arranged to cooperate with the summation means thereon. In so far as the plate 1129 is concerned, the templets 1108—U, 1107—T and 1106—H are arranged to cooperate with the summation means thereon. In so far as the plate 1130 is concerned, it is only the templets 1108—T and 1107—H that are arranged to cooperate with the summation means on this plate. And in so far as the plate 1131 is concerned, it is only the templet 1108—H that is arranged to cooperate with the summation means on this plate. The association of the templets 1107—U to 1108—H, as just described, with the plates 1128 to 1131 is the arrangement which enables the proper templets to cooperate with the proper summation means to ascertain the values to appear in the orders of the final products to which the respective templets and plates pertain.

In connection with the foregoing, it is to be remembered that carry-overs incidental to the summation of digital values represented by steps Z on the various templets disposed in operative position will not be represented but are made in the course of summarizing the various digital values, these carry-overs being made in a manner described hereinafter. It has been explained that templets in the various templet-gangs are arranged to be properly aligned with each other in so far as the orders of the final product to which they pertain is concerned at the time the templet-gangs are assembled, and it has also been explained that in various templet-gangs the positioning templet is arranged in identical position. It will follow from this that if the positioning templets of the various templet-gangs are arranged in a given location with respect to each other then the various templets in the templet-gangs will be in proper relation with each other, which is to say, will be in proper relation with respect to the summation means on the plate that pertains to the same order of the final product as that to which related templets in different templet-gangs pertain. In the present machine the foregoing is assured by mounting the templet-gangs in association with the side plates 1124 and 1125 and the plates 1126 to 1131 in the following manner:

Bifurcations 1165, 1184 and 1192, Figs. 27, 32, 39 and 40, are provided in the outer edges of the plates 1124 to 1131 in which the templet-gangs X respectively pertaining to units, tens and hundreds orders of the multiplier are mounted. As can be seen best in Fig. 41, a bearing block 1166 is secured to the outer face of the side plate 1125 and extends past the bifurcation 1192 in this side plate. A similar bearing block 1167, Fig. 31, is secured to the outer face of the side plate 1124 and this bearing block extends past the bifurcation 1192 in this side plate. The bearing block 1166, Fig. 41, is relieved, as indicated at 1168 to afford clearance for the shoulder 1119 on the sleeve 1118 of the templet-gang X that is to be mounted in the bifurcation 1192.

The templet-gang that is to be mounted in the bifurcation 1192 pertains to the hundreds order of multiplier and in mounting such templet-gang in position it is passed into the bifurcation 1192 until the opening 1169, Fig. 31, in the sleeve 1118 of this gang is aligned with openings 1170 and 1171 respectively provided in the bearing blocks 1166 and 1167. When these openings are in alignment the headed pin 1172 is passed first through the opening 1171 and then through the opening 1169 and finally through the opening 1170 and, as best shown in Fig. 31, the leading end of this pin is pointed to facilitate insertion thereof through these openings. When the pin is extended into the opening 1170 a collar 1173 thereon engages the outer face of the bearing block 1167. To prevent displacement of the pin and therefore the templet-gang X mounted in the bifurcation 1192 an edge of a plate 1174, Figs. 31 and 34, is passed into a groove 1175 in the pin 1172, this plate 1174 being mounted for such pivotal movement on the block 1167 by the screw 1176.

Whenever it is desired to replace one templet-gang, such as the templet-gang X mounted in the bifurcations 1192, it is only necessary to pivot the plate as 1174 from the groove as 1175 and thereupon the headed pin 1172 may be withdrawn from supporting position whereupon the templet-gang X may be removed and another mounted in place thereof in the manner above described.

When the templet-gang X pertaining to the hundreds order is positioned in the bifurcation 1192 in the manner just described, the positioning templet 1117—H of this templet-gang is disposed to lie on the outwardly disposed face of the side plate 1125 which locates the other templets in the templet-gangs in proper relation with the plates of the group of plates 1126 to 1131 with which they are to cooperate for the plates 1126 to 1131 are located accurately with respect to the plate 1125 and, as has been explained hereinabove, the various templets in the templet-gangs are located accurately with respect to the positioning templets thereof.

Thus when the templet-gang X pertaining to the hundreds order is mounted in the bifurcation 1192 with the positioning templet 1117—H thereof on the outer face of the side plate 1125, the templet 1105—H is positioned, as shown best in Fig. 31, in such location that it will cooperate with summation means provided on the plate 1128 while the templet 1106—H of this templet-gang is positioned to cooperate with the plate 1129 and the templet 1107—H is positioned to cooperate with the plate 1130 and the templet 1108—H is positioned to cooperate with the plate 1131.

The templet-gang pertaining to the units order of the multiplier is mounted in the bifurcation 1165, Figs. 27, 39 and 40. Both the bifurcations 1165 and 1192 are provided in the upper edges of the plates 1124 and 1131, these bifurcations being located in a definite spaced apart relation. Another bifurcation 1184, Figs. 27, 39 and 40, is provided in the lower edges of the plates 1124 to 1131 and this bifurcation is provided in the plates to lie between vertical planes intersecting the bifurcations 1184 to 1192. The templet-gang pertaining to the tens order of the multiplier is mounted in the bifurcation 1184.

The templet-gang for the units order of the multiplier that is disposed in the bifurcation 1165 is mounted on a pin 1193 which, in the manner shown in Fig. 31 and described hereinabove with respect to the templet-gang pertaining to the hundreds order, supports this templet-gang in operative position. A pin 1185 correspondingly supports the templet-gang pertaining to the tens order of the multiplier in the bifurcation 1184. When these templet-gangs pertaining to the units and tens orders are mounted in bifurcations 1165 and 1184; respectively, on the pins 1193 and 1185, the positioning templets 1117–U and 1117–H of these gangs are arranged on the outer face of the side plate 1125, as shown in Fig. 27, and the other templets of these templet-gangs are arranged to cooperate with sensing means on the proper plates in the manner hereinafter described.

As can be seen by referring to Fig. 27, the bifurcation 1165 which receives the templet-gang pertaining to the units order is located in an inner position with respect to the location of the bifurcations 1184 and 1192 and the reason for this is that if any multiplications at all are to be performed digits must appear in the units order of the multiplier. Hence the templet-gang which pertains to the units order of the multiplier is arranged in a position to cooperate with the inwardmost of the templet sensing means on the various plates. It will also be recognized that if a multiplier extends through more than one order it will extend into the tens order, and it is for this reason that the bifurcation 1184 to receive the templet-gang pertaining to the tens order is mounted in a position next outwardly of the bifurcation 1165. If a multiplier extends through three orders, it will extend into the hundreds order and it is for this reason that the bifurcation 1192 is in the present instance the outwardmost of the templet-gang receiving bifurcations for, as explained above, the present machine has a capacity for no more than a three-order multiplier. If additional orders of the multiplier were to be accommodated, additional templet-gang receiving bifurcations would be provided outwardly of the bifurcation 1192 and the next bifurcation would be provided in the lower edges of the plates 1124 and 1131, the bifurcations being alternately provided in the plates in the upper and lower edges thereof.

The location of the bifurcations 1165, 1184 and 1192 is such that sensing means on the various plates will cooperate with templets of templet-gangs in these positions and such means, as will be described hereinafter, adapted to cooperate with the respective templets in each templet-gang, lie in the vertical center plane of the pin supporting the templet-gang, such sensing means moving vertically in such plane, as explained in full detail hereinafter. In order to bring the proper intermediate product representing steps Z into proper relation with the sensing means it is necessary to pivot the templet-gangs about their supporting pins and so to do brings the steps Z thereon pertaining to a particular digit, in the order of the multiplier to which the gang pertains, into operative position on the center plane of the gang, as aforesaid, such operative positions on such center planes corresponding to the positioning of the steps Z on the lines L, as shown in the diagrammatic view, Fig. 65. Such pivoting of the templet-gangs to dispose the steps Z representative of particular intermediate products in such positions is brought about in a manner described presently, the means for detecting the value of the multiplier digits and the code under which representations of such digits are produced being first described.

*Multiplier digit representation and detection*

As has been explained with reference to Fig. 62, the various steps Z on the templets as 1105, 1106, 1107 and 1108, defined between the radii $r$, are related to the steps Z' disposed on the radii $r'$ on the positioning templets as 1117. It has also been explained that each step Z' on the positioning templets pertains to two digits in the multiplier and the reason for this can be ascertained by reference to Fig. 4 which is a chart of the code under which the control areas of the printing and control devices D are perforated for use in the present machine.

By referring to Fig. 4 it will be seen that each of the odd digits 1, 3, 5 and 7, in accordance with the code, is represented by two perforations while each of the even digits 2, 4, 6 and 8 and the odd digit 9 is represented by a single perforation, the perforation representative of 9 cooperating with another perforation when the odd digits 1, 3, 5 and 7 are to be represented.

The code shown in Fig. 4 provides for five potential positions in columns at which perforations may be made. If a perforation is made in a column in the lowermost of any of such five potential positions, the various potential positions being indicated at the intersections of the horizontal and vertical lines in Fig. 4, as well as at the uppermost of such positions, then the digit 1 is represented. However, if a perforation is made in such lowermost position and no perforation is made in the uppermost position, the digit 2 is represented. To continue, if a perforation is located in the next to the lowermost and in the upper position in a column, the digit 3 is represented, but the omission of a perforation at the uppermost position affords a representation of the digit 4. The digit 5 is represented by a perforation in the medial position in a given column and a perforation in the uppermost potential position in this column, but the omission of a perforation at this uppermost position with a perforation at the medial position affords a representation of the digit 6. Perforations in the next to the uppermost and the uppermost positions in any column represent the digit 7, but a perforation in this column next to the uppermost position in the absence of a perforation in the uppermost position affords a representation of the digit 8. A perforation in only the uppermost position affords a representation of the digit 9. Only the significant digits are represented by perforations and the absence of a perforation in any particular column denotes zero.

The printing and control device D illustrated in Fig. 3 which, in the operation of the machine described in detail hereinafter, will be the first to pass through the machine, is perforated to represent 999 so that three perforations are provided in the uppermost positions of the three most right-hand columns on the card 6 on this printing and control device. However, the card shown in Fig. 3B is perforated, as will be ascertained by reference to the code shown in Fig. 4, to represent 345, and the card 6 shown in Fig. 3A is perforated to represent 702, and it will be noted that the second of the columns on this card is devoid of perforations which, as has been stated, is indicative of zero.

Now when printing and control devices D are withdrawn from the magazine H and come to rest in position II, Figs. 66 and 70, in the course of the step by step advancing thereof through the printing and control device guideway, these devices are in position for cooperation with the detector mechanism which ascertains the value of the multiplier, the digits appearing in the various orders of such multiplier determining which steps Z on the templets in the templet-gang pertaining to the same order of the multiplier are to come to rest in operative position.

The detector to which reference has just been made is generally indicated by 1511 in Figs. 66, 67 and 69 and comprises a block 1512 which has a plurality of columns of openings 1513 therein, Fig. 66, there being five openings 1513 in each column. Restricted openings 1514, Fig. 67, are provided in a plate 1514' secured to the bottom of the block 1512 and headed sensing pins 1515 project through these restricted openings. Springs 1516 are disposed in the openings 1513 and act on the heads of the pins 1515 to normally project the pins beyond the openings 1514, a plate 1517 acting as a reaction abutment for the springs 1516 and the plate 1514' being engaged by the heads of the pins to limit outward movement thereof.

When a printing and control device is in position II, Figs. 66 and 70, the columns of sensing pins 1515 are aligned with the columns in cards 6 in which perforations may be formed under the code shown in Fig. 4 and there are as many columns of sensing pins 1515 as there are to be active columns on the cards 6. In the present instance where multiplication is confined to multiplication in no more than three orders in the multiplier, but three columns of sensing pins 1515 are provided (see Fig. 66) inasmuch as perforations will appear only in the three most right-hand columns on the cards 6, as such cards are viewed in Fig. 3.

The block 1512 is mounted between a pair of arms 1518 and 1519, Fig. 66, which are provided with knife edges 1520 and 1521, Figs. 66 and 69, near their rear ends which seat in substantially V-shaped notches respectively formed in the side plates 254 and 255 of the printing and control device guideway. Springs as 1524 act on the arms 1518 and 1519 and normally urge the sensing pins 1515 upwardly out of their operative position.

A link 1525, Figs. 68 and 69, is pivotally connected to the arm 1518 and one end of a medially mounted lever 1526, Fig. 69, is pivotally connected to the lower end of this link 1525, the lever 1526 being pivotally mounted as indicated at 1527 on the bracket 300. A roller 1528 is provided at the other end of the lever 1526 and under the effect of the springs as 1524 this roller is urged toward a face cam 1529, Fig. 69, fast on the shaft 301. In the course of rotation of the shaft 301 which is brought about by the engagement of the clutch teeth 305 with the clutch teeth 307, Fig. 69, a rise on the cam 1529 engages the roller 1528 and thereupon the lever 1526 is so pivoted that the link 1525 is moved downwardly to thereby bring the sensing pins 1515 into cooperating relation with the card 6 on the printing and control devices D disposed at position II. In the course of such downward movement these sensing pins 1515 which do not move into alignment with perforations in the card 6 come to rest on the face of this card and are forced upwardly against the action of the springs 1516. Those pins however which move through perforations in the card 6 come into cooperation with the devices which bring about setting up of the multiplier in the multiplying mechanism M.

The devices with which sensing pins 1515 cooperate include push pins 1530, Fig. 67, mounted in a block 1531 carried by the casting 263. There are as many columns of push pins 1530 as there are columns of sensing pins 1515 and there are five push pins 1530 in each column, and each push pin 1530 is respectively aligned with a sensing pin 1515. Thus, when a sensing pin 1515 passes through a perforation in a card 6 on a printing and control device at position II it moves into engagement with a push pin 1530 and under the influence of a spring 1516 pushes the aligned push pin 1530 downwardly.

Connection between the sensing device 1511 and the multiplying mechanism M is established through Bowden cables for so to do affords the required flexibility in the mounting of the various parts of my machine in operative association with each other for, as will be understood, varied lengths of Bowden cables may be employed and inasmuch as these cables are flexible they may be directed as required.

In the present instance, the ends of the Bowden cables 1532 that are to receive movement are respectively aligned with the push pins 1530, as shown in Fig. 67, these ends of these cables being maintained in proper relation with these push pins by having the casings 1533 of the cables secured in a supporting plate 1534 carried by a block 1535 secured to the underside of the block 1531. Each Bowden cable is slightly longer than the distance between the push pins that impart movement thereto and the devices in the multiplying apparatus M receiving movement from the cables, and therefore each push pin 1530 is provided with a head 1536 so that when the push pins are in their normal at rest position with the Bowden cables effective thereon these pins are firmly seated against the bottom of the block 1531 in which the push pins are mounted.

The other ends of the casings 1533 of the Bowden cables 1532 are secured in a plate as 1537, Fig. 31, that is carried by posts as 1538 secured to an arm 1539, Figs. 31 and 32, carried by a pin as 1540 journaled in a bearing as 1541 carried by a plate as 1542, Fig. 41, that is fast to the bearing block 1156 on the side plate 1125, which bearing block, as stated, carries the templet-gang X pertaining to the hundreds order. It should be noted that the Bowden cable ends and the parts associated therewith shown in Figs. 31 and 32 pertain to the hundreds order templet-gang and, while these parts are now described in detail, it is to be remembered that similar arrangements are provided for the units and tens orders templets-gangs.

The bearing 1541 is shouldered, as shown in Fig. 31, and a torsion spring 1543, disposed about this shouldered portion, has one end thereof anchored in the bearing 1541, the other end of this spring being anchored in a collar 1544 fast on the pin 1540. The torsion spring 1543 is placed under tension so that it constantly tends to unwind and it thereby acts on the arm 1539 to tend to pivot it counterclockwise, as viewed in Fig. 32. This action of the spring 1543 is limited by a stop screw 1545, Figs. 32 and 41, mounted in a plate 1546 that is carried by the plate 1542, the position of the stop screw 1545 being accurately adjusted in a manner that will be described presently.

It will be understood that there is a Bowden cable beneath each push pin 1530, Fig. 67, and it will be remembered that the push pins 1530 are arranged in columns. The column of push pins 1530 arranged below the most right-hand column on a card 6, as this card is viewed in Fig. 3, pertains to the units order of the multiplier as do the Bowden cables cooperating with the push pins in this column. The push pins 1530 aligned with the next column to the left on the card 6 pertain to the tens order of the multiplier as do the Bowden cables aligned with these push pins, and the push pins aligned with the next column to the left or the third from the right-hand end, as viewed in Fig. 66, pertain to the hundreds order of the multiplier as do the Bowden cables cooperating with this column of push pins.

There is an arm 1539—U, Fig. 7 (which corresponds to the above described arm 1539), in which the casings 1533—U for the Bowden cables 1532—U are fast, positioned for cooperation with the templet-gang X that pertains to the units order of the multiplier; there is an arm 1539—T, having casings 1533—T anchored therein, in association with the templet-gang pertaining to the tens order of the multiplier; while there is an arm 1539—H, having casings 1533—H anchored therein, in association with the templet-gang pertaining to the hundreds order of the multiplier, this being the above described arm 1539.

Referring to Figs. 32 and 67, it will be seen that there is a Bowden cable 1532—1—2 which leads from the push pin 1530 that is the lowermost push pin in the column of push pins pertaining to the hundreds order. There is also a Bowden cable 1532—3—4 that leads from the push pin 1530 in the next lowermost row in the column pertaining to the hundreds order and, additionally, there is a Bowden cable 1532—5—6 that leads from the push pin 1530 in the medial row in the column of push pins pertaining to the hundreds order, and there is also a Bowden cable 1532—7—8 that leads from the push pin 1530 in the next to the uppermost position in the hundreds order, while the Bowden cable 1532—9 leads from the push pin 1530 aligned with the uppermost position in the hundreds order. The suffixes added to the reference character 1532 immediately preceding designate the digits in the multiplier to which the particular cable pertains for if the push pin 1530 engaged by any one of these cables is pushed by a sensing pin 1515 that passes through an opening in the card C then the particular Bowden cable pushed indicates one or the other of the two digits to which it pertains, it being understood that under the code illustrated in Fig. 4 where an odd digit 1, 3, 5 or 7 is to be indicated that the Bowden cable 1532—9 is also pushed. In the absence of a pin 1515 pushing a push pin 1530 aligned with the Bowden cable 1532—9, the pushing of any one of the other Bowden cables indicates the even digit 2, 4, 6 or 8.

Now, for example, if the sensing pins 1515 pass through the card 6 shown in Fig. 3B, the Bowden cables 1532—3—4 and 1532—9 pertaining to the hundreds order would be pushed to designate the digit 3, the Bowden cable 1532—3—4 pertaining to the tens order would be pushed, but since the Bowden cable 1532—9 would not be pushed in this instance the digit 4 would be indicated, and the Bowden cables 1532—5—6 and 1532—9 would be pushed as far as the units order is concerned to indicate the digit 5. Such pushing of the Bowden cables either singly or in pairs cooperates with the positioning templets as 1117 to dispose the steps Z on the templets in the templet-gang, of which the particular positioning templet is a part, in operative position, and those steps Z pertaining to whatever digit is represented by pushed cables are disposed in operative position to lie on the vertical center plane of the templet mounting, which is to say, these steps are disposed on the lines L, Fig. 65, and the manner in which this is effected is as follows.

Referring to Fig. 31, it will be seen that each Bowden cable is led into a pin as 1547, the pins 1547 being slidably journaled in an enlarged portion at the lower end of the arm 1539. The uppermost of the pins as 1547 is designated at 1547—1—2 and the succeeding of the pins downwardly have suffixes associated therewith designating the digits to which they pertain. It will be noted that the lowermost pin 1547—9 is larger in diameter than the other of the pins and this is utilized to determine whether, depending upon conditions arising when one of the other pins is also pushed, an odd or even digit is designated. The pushed of the pins 1547 cooperate with the steps Z' on the positioning templet 1117 to dispose the positioning templets and therefore the other templets in the templet-gangs in operative position to represent whatever digits appear in the intermediate product found upon multiplication of the reoccurring factor by the multiplier digit represented by the pushed of the pins 1547. In order that this will be accurately brought about it is of course essential that the templets of each templet-gang be normally and accurately disposed in a normal at rest position and this is effected in the following manner.

Slides as 1548 and 1549, Fig. 27, are slidably mounted in slots as 1550 and 1551 in the side plate 1125 and have pins 1552 and 1553 provided in corresponding ends thereof that extend into bifurcations 1554 and 1555 at opposite ends of an arm 1556 that is fast on a shaft 1557 journaled in the side plates 1124 and 1125. A spring 1558 extends between the slide 1548 and the positioning templet 1117—U of the templet-gang pertaining to the units order of the multiplier; a spring 1559 extends between the positioning templet 1117—T and the slide 1549; and a spring 1560 extends between the positioning templet 1117—H and the slide 1548. The spring 1558 pulls the positioning templet 1117—U into engagement with a stop pin 1561 on the slide 1548 while the spring 1559 pulls the positioning templet 1117—T into engagement with a stop pin 1562 on the slide 1549 and the spring 1560 pulls the positioning templet 1117—H into engagement with a stop pin 1563 on the slide 1548. In the just described manner an operative connection between the slides 1548 and 1549 and the positioning templets of the various templet-gangs is established through the springs 1558, 1559 and 1560 and the pins 1561, 1562 and 1563.

A spring 1564 acts on the arm 1556 and tends to pivot this arm in such a direction that it acts on the pin 1552 to urge the slide 1548 toward the right, as viewed in Fig. 27, and through the pin 1553 to urge the slide 1549 toward the left, as viewed in Fig. 27. The templet-gangs X are so mounted in position that the steps thereon in their ascending order face toward the left in Fig. 27 on those templet-gangs associated with the slide 1548, these being the templet-gangs mounted at the tops of the plates 1125 to 1131 in the bifurcations 1165 and 1192. The steps on the templet-gang at the bottom of the plates 1125 to 1131, which is the templet-gang that pertains to the tens order of the multiplier, in their ascending order, face toward the right, as viewed in Fig. 27. When the spring 1564 acts to urge the slides 1548 and 1549 toward the right and left, respectively, the slides act through the stop pins engaged with the associated positioning templets to dispose the various templets in the templet-gangs in their normal at rest positions, these positions being very slightly beyond the positions thereof pertaining to the digit 1 in the multiplier to afford clearance for the pins as 1547 in their operative movement, as will be described presently. When the templets in the various templet-gangs are urged into their normal at rest positions they engage stop pins as 1565 which are fast in the side plates 1124 and 1125 and which freely pass through the plates 1126 and 1131, these stop pins projecting slightly beyond the outer face of the side plate 1125 to afford stops for the positioning templets which are mounted outwardly of this face.

Now again referring to the card shown in Fig. 3B, when the cables 1532—3—4 and 1532—9, Figs. 67 and 31, pertaining to the hundreds order of the multiplier, are pushed by reason of sensing pins 1515 passing through perforations to push the push pins 1530 aligned with these cables to push the pins 1547—3—4 and 1547—9, it should be noted that such pushing occurs at a time when the templets in the various templet-gangs are engaged with the stop pins as 1565, or in other words when the templets are in their at rest position.

When the enlarged pin 1547—9 is pushed at this time it moves into engagement with the shoulder 1566 on the block 1567, Figs. 30 and 32, that is mounted in a slot 1568 in the side plate 1125, the particular block shown in Fig. 32 being designated as 1567—H in Fig. 27 and pertaining to the hundreds order. This block (as well as similar blocks pertaining to the units and tens orders) is disposed in such position in the slot 1568 that when the large pin 1547—9 pertaining to the hundreds order is pushed inwardly it will just clear the shoulder 1566, this also being assured by the engagement of the arm 1539 with the stop screw 1545. It is only after the enlarged pin has had time to engage the shoulder 1566 that the arm 1556 is rocked to move the slide 1548 toward the left as viewed in Fig. 27 and the slide 1549 toward the right as there viewed, this being effected in the manner now to be described and being the movement that results in disposing the templets, or better the proper steps Z thereon, in operative position.

An arm 1569, Fig. 27, is fast on the shaft 1557 and one end of a link 1570 is connected to this arm, the other end of this link being connected to the arm 1571, Figs. 10 and 11, of a bell crank lever 1572 that is pivotally mounted as indicated at 1573 on the side frame member 1134. A roller 1574 is carried by the other arm 1575 of this bell crank and under the influence of the spring 1564, Fig. 27, is urged into engagement with the periphery of the cam 1289 that is fast on the multiplying mechanism cam shaft 1280. When the parts are in their at rest position the roller 1574 rests on a dwell 1576, Fig. 11, on the cam 1289. Very shortly after the cam shaft 1280 is set in rotation the roller 1574 rides off the dwell 1576 onto the periphery of the cam and it is this that moves the slide bars 1548 and 1549 in the above described manner whereupon, through the springs 1558, 1559 and 1560, the templet-gangs pertaining to the units, tens and hundreds orders, respectively, are swung clockwise, as viewed in Fig. 27, and this brings the steps Z' on the positioning templets of these templet-gangs into cooperating relation with pushed of the pins 1547 to thereby set up the templets.

Now in so far as the hundreds order of the card 6 shown in Fig. 3B is concerned, the pin 1547—3—4 was pushed as well as the pin 1547—9 and, as stated, the pin 1547—9 is engaged with the shoulder 1566. Thus as the positioning templet 1117—H moves clockwise as above described, the second step thereon moves into engagement with the pushed pin 1547—3—4, it being understood that the various pins 1547 are respectively aligned with the steps Z' on the positioning templets of corresponding values, that is, which pertain to similar digits. When the second step Z' on the positioning templet 1117—H engages the pushed pin 1547—3—4 the templets in the templet-gang pertaining to the hundreds order come to rest with the steps Z thereon, pertaining to the intermediate product found when the multiplier is the digit 3 in the hundreds order, in operative position.

By referring to the card shown in Fig. 3B it will be seen that in so far as the tens order is concerned the enlarged pin 1547—9 will not be pushed but only the pin 1547—3—4 because an even digit is designated in the tens order in the card shown in Fig. 3B and therefore there is no perforation in the card through which a sensing pin 1515 may pass to cause the pin 1547—9 for the tens order to be pushed. In this instance, the enlarged pin is not pushed forwardly to engage the shoulder as 1566, Fig. 32, and hence when the templet-gangs swing clockwise, as above described, the second step on the positioning templet 1117—T moves into engagement with its cooperating pin 1547—3—4 and upon engagement of this step with this pin the arm 1539—T pertaining to the tens order is pivoted in a clockwise direction, as viewed in Fig. 7. Such pivoting movement is limited by a stop screw as 1577, Fig. 32, carried by the plate 1546 which also carries the stop screw 1545. It will be recalled that when the second step Z' on the positioning templet 1117—H engaged its associated pushed pin 1547—3—4, the pin 1547—9 was engaging the associated shoulder 1566 and hence the arm 1539—H was prevented from pivoting and it remained in engagement with the associated stop screw 1545. However, when the second step Z' on the positioning templet 1117—T engaged its associated pushed pin 1547—3—4 the arm 1539—T swung into engagement with the associated stop screw 1577 because the associated pin 1547—9 was not pushed forwardly to engage the associated shoulder 1566. Thus the positioning templet 1117—T can move a greater distance than did the positioning templet 1117—H and this results in positioning the positioning templet 1117—T and the other templets in its templet-gang in such a location that the steps Z on such other templets pertaining to the digit 4 are disposed in operative position as above described.

It will be seen from the foregoing that the arms as 1539 are disposed either in engagement with the stop screw 1545 or the stop screw 1577 when positioning templets 1117 are cooperating with pushed pins 1547 and that the arm 1539 is therefore capable of angular displacement, the magnitude of which is regulated by the positions of the stop screws 1545 and 1577. This angular displacement is equal to the angular displacement of one step Z from another on segments as 1105 along the arcs c, Fig. 62.

With respect to the alternative positions that may be assumed by the arms as 1539 attention is directed to Fig. 28 wherein a vertical center line 1578 is shown. A pivot center 1579 is defined on this vertical center line 1578 and at a predetermined point along the center line with respect to the pivot center 1579 the center 1580 of an enlarged pin 1547—9 is located. Two tangential lines 1581 and 1582 are drawn from the pivot center 1579 as tangents to the diameter of the enlarged pin 1547—9. The spacing of the center 1580 from the pivot center 1579 is such that the angle between the points of tangency of the lines 1581 and 1582 with the periphery of the pin 1547—9 is equal to the angle subtended between two radii r on a sector as 1107. Furthermore, the point of tangency of the tangent 1581 with the diameter of the pin 1547—9 is such that when the step Z' on a positioning templet 1117 pertaining to 9 is engaged with a pin 1547—9 the steps Z pertaining to the digit 9 on the other templets in the templet-gang, of which this particular positioning templet is a part, are in operative position, that is, in the aforesaid vertical center plane of the pivot of the templet-gang of which each such templet is a part. The other pins 1547—7—8, 1547—5—6, 1547—3—4 and 1547—1—2 are located so as to be spaced from the pivot center 1579, which is the pivot center of the arm 1539, such that when these pins are tangent to the line 1581 the engagement of the corresponding steps Z' on a positioning templet as 1117 disposes those steps Z on the templet-gangs in operative position that relate to the odd digits, the particular steps so positioned being those to which the engaged pin pertains. The line 1581 therefore represents the stopping position of the steps Z when a pin 1547—9 engages a shoulder 1566, which is to say, this is the position defined by the stop screw 1545.

When, however, a pin 1547 does not engage a shoulder 1566 then the position assumed by the arm 1539 will be such as to lie along the tangent 1582 and the engagement of the pins 1547—7—8 to 1547—1—2 with the step Z' disposes the steps Z on the templet-gang corresponding to the even digit represented by the engaged pin in operative position. When the arm 1539 assumes this latter position it is engaged with the stop screw 1577.

It will be seen from this that it is the angle subtended by movements of the arms as 1539 between the stopping positions defined between locations of the screws 1545 and 1577 that determines whether the odd or even digit represented by a particular sensing pin is to be effective in locating the steps Z on the templets in operative position.

In connection with the foregoing, reference is again made to Figs. 30 and 32 and to the shoulder 1566. It will be recognized that there will be instances where a significant digit will not appear in some particular order of the multiplier and in such an instance no push pin 1530 would be pushed and as a result none of the pins 1547 would be pushed forward. In such an instance however the templet-gangs are swung as above described and the step Z' on the positioning templet for which no pins 1547 have been pushed forwardly, and which step would normally engage the enlarged pin 1547—9, engages the shoulder 1566. The engagement of this step Z' with this shoulder positions the templets as 1105 to 1108 associated with this particular positioning templet in such location that the steps Z thereon representative of zero are disposed in operative position which is effective to prevent operation of the summation means in so far as these particular templets are concerned.

As has been explained hereinabove, when the roller 1574 carried by the arm 1575 of the bell crank 1572, Fig. 11, has moved off the dwell 1576 and onto the periphery of the cam 1289, the link 1570, Fig. 27, will be pulled to the right and the arm 1556 will be caused to rotate counterclockwise, as viewed in Fig. 27, against the tension of the spring 1564, and this effects shifting of the slide 1548 to the left a predetermined distance and shifting of the slide 1549 to the right an equal distance. Thereupon the templet gangs are freed to the action of the springs 1558, 1559 and 1560, and they thereupon are positioned in accordance with the settings of the pins 1547. The templet gangs are retained in such operative positions for a predetermined period of time and until the roller 1574 again rides onto the dwell 1576 of the cam 1289, Fig. 32. This permits the spring 1564, Fig. 27, to act upon the arm 1556 and swing this arm clockwise to thereby restore the slides 1548 and 1549 to their normal positions. In this restoring movement of the slides 1548 and 1549, the pins 1561, 1562 and 1563 carried thereon engage the positioning templets 1117 and thereupon the templet-gangs are swung to their normal at rest positions, such return swinging movement being limited by engagement of the edges s' of the positioning templets 1117 with the stationary stop pins 1565. The normal inoperative position of each templet gang is slightly beyond its "1" position, to provide clearance for the 1547—1—2 pin in the event it is pushed in during the succeeding pin setting operation.

Practically concurrently, but slightly thereafter, with this restoration of the templet-gangs to their normal at rest positions, a block 1583 on the cam 1342, Figs. 7 and 13, moves into engagement with a roller 1584 carried by an arm 1585, Fig. 7A, fast on a shaft 1586 which has one end journaled in a bearing 1587 carried by the side plate 1125. The other end of this shaft is journaled in a U-shaped bracket 1588 also secured to the outer face of the side plate 1125.

A double-armed rocker 1589 is fast on the shaft 1586 in the bracket 1588 and carries a pin 1590, Figs. 7, 7A, 26 and 31, which extends across one face of plates 1591 hung on the Bowden cables 1532 that pertain to the units and hundreds orders of the multiplier, each Bowden cable in these sets having an abutment as 1592, Fig. 31, fast thereon, these abutments being disposed on the face of each plate 1591 opposite that engaged by the pin 1590. The engagement of the block 1583 with the roller 1584 rocks the shaft 1586 in such a manner that the pin 1590 engages the plate 1591 and forces it into engagement with the abutments 1592, wherefore all of the just-mentioned Bowden cables 1532 are forced back into a zero position and in so doing any push pins 1530, Fig. 67, which were forced downwardly in the preceding detecting operation are restored to their zero, that is to say, normal at rest positions.

An arm 1593, Figs. 7 and 7A, depends from the rocker 1589 below the shaft 1586 and carries a screw 1594 which loosely fits into a bifurcation in the upper end of an arm 1595 that extends upwardly from a substantially U-shaped rocker 1596 that is pivotally mounted on a shaft 1597 carried by a U-shaped bracket 1598 that is secured to the outer face of the side plate 1125. The interconnection afforded by the screw 1594 is such that when the rocker 1589 is pivoted in the manner above described a pin 1599, Fig. 26, carried by the rocker 1596 engages a plate, corresponding to the above described plate 1591, that is hung on the cables 1532 pertaining to the tens order of the multiplier and thereupon abutments corresponding to the above described abutments 1592 on these tens order cables are engaged, and these cables as well as their cooperating push pins 1530 are restored to their normal at rest position thereof shown in Fig. 67.

When the steps Z on the templets as 1105—U are moved into operative position, as above described, to lie in the vertical center planes of the pivot axes of the templet-gangs on the pins 1172, 1193 and 1185 (see Fig. 27) they are in position to cooperate with the sensing means on the adjacent plates 1126 to 1131 to which the templets respectively pertain, that is, with which they are respectively adapted to cooperate.

*Summation means*

The structural characteristics of the various plates 1126 to 1131 are identical and to a certain extent the means mounted thereon are identical and in those instances where such means are not required in the operations required of the particular plate, such means as are not needed are rendered ineffective. Hence, for the purpose of this explanation reference will first be made to a plate on which all of the means are operative and, as can be ascertained by reference to Fig. 65, the first such plate will be the plate pertaining to the hundreds order of the final product, which is to say, the plate 1128, Figs. 42 and 43, this being the first plate to cooperate with three positioned templets.

The plate 1128, Figs. 42 and 43, includes a product receiver 1141 that is in the form of an elongated strip and which lies against one face of the plate 1128, this strip being held against this plate by retaining blocks 1142 and 1143. The receiver 1141 has a rack 1144 on one edge thereof and another rack 1145 on the opposite edge thereof. The rack 1144 is adapted to mesh with the carry receiving pinion 1146 on the plate pertaining to the next higher order and in this instance this would be the plate 1129, this arrangement being explained in detail hereinafter.

The rack 1145 meshes with a pinion 1147, Fig. 43, rotatably mounted on a pinion slide 1148 that is slidably mounted in a slot 1149 in the plate 1128, this slot being so located with respect to the position of the receiver 1141 that the pinion 1147 will properly mesh with the rack 1145. By referring to Fig. 38 it will be seen that the slide 1148 includes upturned end portions 1150 and 1151. These portions are upturned in an amount equal to the thickness of the plate 1128 so that the intermediate extent of the slide 1148 may be disposed in the slot 1149. Ears on the upturned portions 1150 and 1151 are then engaged with one face of the plate 1128. This prevents movement of the slide in one direction with respect to the plate 1128. Movement in the opposite direction with respect to the plate 1128 is prevented by providing retaining plates as 1152, Fig. 36, which plates overlie the ears on the upturned portions of the slide 1148. Plates as 1152 are only shown in Fig. 36, these retaining plates having been eliminated from the remaining similar views because such plates conceal substantial portions of the operative mechanisms. It is to be understood, however, that such plates overlie all slides as 1148. The retaining plates as 1152 also overlie the pinions as 1147, which are mounted on studs as 1153 fast in the slides as 1148, these studs ending flush with the disclosed face of the pinions or, in other words, being of a height equal to the thickness of the pinions. The retaining plates as 1152 serve to hold the pinions in engagement with the faces of the pinion slides on which they are mounted. A retaining plate as 1152 overlies the pinion 1147 on both sides of the slide 1148 and it is this that prevents the pinions from so canting as to be displaced from the stud 1153 on which it is mounted.

A sensing finger 1154 is fast to the slide 1148 at the lower end thereof and is adapted to seat on a stop on the carry templet 1155 (described in detail hereinafter) on an arm 1156 of a bell crank, generally indicated by 1157, that is pivotally mounted, as indicated at 1158, on the face of the plate 1128 opposite that on which the pinion 1147 is disposed, it being understood that the sensing finger 1154 projects from the slide 1148 over the same face of the plate 1128 as that on which the bell crank 1157 is mounted in order to seat on the first step on the carry templet 1155 when the parts are in at rest position. The sensing finger 1154 remains seated on the first step of the carry templet 1155 until a carry-over is made from the tens order, this being effected in a manner described hereinafter and for the purpose of the present description the sensing finger 1154 will be considered as being stationarily engaged with the first step on the carry templet 1155.

The pinion 1147 not only meshes with the rack 1145 but it also meshes with a rack 1159 on the rack slide 1160 which is held against the same face of the plate 1128 as that on which the pinion 1147 is mounted by retaining plates as 1152 referred to hereinabove. The rack slide 1160 also has a rack 1161 thereon which in turn meshes with a pinion 1162 mounted on a pinion slide 1163 which, in structural characteristics, corresponds to the slide 1148 except that the sensing finger 1164 thereon is mounted at the upper end of the slide 1163. The pinion 1162 on the slide 1163 is held on the slide and against the plate 1128 by retaining plates as 1152, Fig. 36.

The rack slide 1160, as are other rack slides, is guided for movement over the face of the plate 1128, against which it is held by retaining plates 1152, by guide blocks as 1148' and 1163' that are pinned to the face of the plate 1128 on which the pinions as 1147 and 1162 are disposed. The guide blocks 1148' and 1163' are spaced from each other just sufficiently to accommodate the rack slide 1160 which is therefore held against canting in the course of its movement described hereinafter. The guide blocks as 1148' and 1163' are discontinuous, as can be seen by referring to Fig. 43, to provide clearance for the pinions as 1147 and 1162 so as to permit movement of these pinions with the pinion slides on which they are mounted.

The sensing finger 1164 is movable in the vertical center plane of the pivotal axis of the templet-gang X pertaining to units order of the multiplier so as to cooperate with the templet in this gang that is to cooperate with the plate 1128. This, in the present instance, is the templet 1107—U. In this connection it is to be noted that when reference has been made to disposing a step Z on the templet 1107—U in operative position it was, of course, meant that such a step was positioned for cooperation with a sensing finger as 1164, the nature of such cooperation being explained presently.

It will be recalled that all of the plates as 1128 correspond in structural characteristics. What, in part, is meant by this is that each plate includes a sensing finger corresponding to the sensing finger 1164 and each such corresponding sensing finger is arranged to lie in the vertical center plane of the pivotal axis of the templet-gang pertaining to the units order of the multiplier. It will also be recalled, and as can be ascertained by reference to Fig. 65, that a templet in the templet-gang pertaining to the units order of the multiplier is not associated with each plate 1126 to 1131. Nevertheless, each plate is equipped with a sensing finger in a location corresponding to the location of the sensing finger 1164 on the plate 1128, but in those plates which do not have a templet in the templet-gang in the units order of the multiplier associated therewith such sensing finger is permanently fixed against movement to be constantly held in its at rest position, the specific manner in which this is effected being explained presently.

It has been explained that the sensing finger 1154 is provided at the lower end of the slide 1148 and that the sensing finger 1164 is provided at the upper end of the slide 1163. A reason for this is that in the operation of the summation means, of which these sensing fingers are a part, the receiver 1141 is moved downwardly and by reason of the disposition of the pinion 1147 the racks 1145 and 1159 and the racks 1161 and 1177 and the pinion 1162 such downward movement tends to cause the slide 1148 and therefore the sensing finger 1154 to move downwardly but causes the slide 1163 and therefore the sensing finger 1164 to move upwardly.

As will be explained presently, the sensing finger next in line beyond the sensing finger 1164 moves downwardly and the sensing finger next in line beyond this last-named sensing finger moves upwardly. It is because of such opposite movement of the sensing fingers that the templet-gangs are mounted in the bifurcations 1165, 1184 and 1192, in the manner hereinabove described, at the top and bottom edges, alternately, of the plates 1124 to 1131. This alternate direction of movement of the sensing fingers and such disposition of the templet-gangs also enables a more compact arrangement to be provided for it permits location of the templet-gangs in close relation with one another along the plates for it will be obvious that if all of the templet-gangs were arranged along corresponding edges of the plates 1124 to 1131 then it would not be possible to attain the close spacing that is realized when the templet-gangs are alternately positioned at the top and bottom of the plates.

Mention has been made of a rack 1177. This rack is provided on the rack slide 1178, which rack slide also has a rack 1179 thereon. The rack slide 1178 is guided between guide blocks 1163' and 1183' and this rack slide and the pinion slide 1162 are retained in position by retaining plates as 1152, Fig. 36. A pinion 1180 meshes with the rack 1179, this pinion being mounted on a stud 1181 provided on a pinion slide 1182 which corresponds in its structural characteristics with the slide 1148 and this slide has a sensing finger 1183 provided at the lower end thereof. The pinion slide 1182 and the pinion 1180 are retained in engagement with the face of the plate 1128 by retaining plates as 1152. The sensing finger 1183 is movable toward the templet 1106—T which is one of the templets in the templet-gang X pertaining to the tens order of the multiplier, the templet 1106—T being the templet of this gang that pertains to the hundreds order of the final product as has been described and as can be ascertained by reference to Fig. 65. The sensing finger 1183, and correspondingly located fingers on the other of the plates 1124 to 1131 equipped with such a sensing finger, lies in the vertical center plane of the pin 1185, this pin being retained in position in the same manner as that in which the pin 1172 is retained in position, and supporting the templet-gang pertaining to the tens order of the multiplier for pivotal movement as above described.

The pinion 1180 also meshes with a rack 1186 on a rack slide 1187 which also has a rack 1188 thereon with which a pinion 1189 mounted on the pinion slide 1190 meshes. The slide 1190 corresponds in structural characteristics to the above described slide 1148 except that it has a sensing finger 1191 fast at the upper end thereof, it being understood that the rack slide 1187, the pinion 1189 and the slide 1190 are retained in position by retaining plates as 1152 which, for reasons stated hereinabove, are eliminated from Fig. 42.

The sensing finger 1191 is movable toward the templet 1105—H that is included in the templet-gang that pertains to the hundreds order of the multiplier. This is the templet-gang that is mounted in bifurcations 1192 in the upper edges of the plates 1124 to 1131 and being the templet-gang that is pivotally supported on the pin 1172 which is mounted and retained in position in the manner above described. Thus the sensing finger 1191 is movable in the vertical center plane of the templet-gang pertaining to the hundreds order of the multiplier.

In the present instance where the multiplications are to be performed involving no more than a three-order multiplier, it is only necessary to provide three templet-gangs. If, for example, a four-order multiplier were to be accommodated, then another templet-gang would be provided to the left, as viewed in Fig. 42, of the templet-gang carried by the pin 1172, but this templet-gang would be mounted in bifurcations in the lower edges of the plates 1124 to 1131. However, in the present instance where the pinion 1189 is the last pinion mounted on a pinion or sensing finger slide it is meshed with a rack 1194 fast to the face of the plate 1128.

The receiver as 1141, the pinion or sensing finger slides as 1148, 1163, 1182, 1190, the pinions as 1147, 1162, 1180 and 1189, the rack slides as 1160, 1178, 1187 and the fixed rack as 1194 constitute a unit of the summation means, that is effective to summarize the digits in the various intermediate products that pertain to the hundreds order of the final product and additionally, as will be explained presently, to add in any carry-overs from a substantially similar summation means that pertains to the tens order of the final product.

Mention has been made that all the plates 1126 to 1131 are of substantially similar structure and further explanation of this is now presented. Since all of the plates are to be of uniform structure, a plate pertaining to the units order of the final product, the plate 1126 in this instance, Figs. 35 and 36, includes a carry receiving position but, as will be understood, no carries will be made into such first or units order plate and thus in this instance the sensing finger 1226, which corresponds to the carry sensing finger 1154 described hereinabove, is at all times maintained in a fixed position, and to this end a block 1227 is interposed between the slide 1228 on which the finger 1226 is mounted and the end of the slot 1229 in which the slide 1228 is mounted, this block being interposed between the slide and the end of the slot disposed in the direction in which the finger 1226 would move if it were to be free to move and this arrangement therefore enables uniformity of construction to be maintained but at the same time positively insures that undesired movement of a sensing finger as 1226 will be prevented.

The first plate 1126 which pertains to the units order of the final product will cooperate with but one templet inasmuch as, just as in longhand multiplication, only a single digit will appear in alignment with the units order of the final product in any given multiplication, this being apparent from the examples of multiplication set forth hereinabove and also being shown in Fig. 65 where the arrangement of the various templets with respect to the orders of the final product is diagrammatically illustrated. The plate 1126 includes a sensing finger 1230 which in the present instance cooperates with the templet 1105—U and it is only the movement of this sensing finger 1230 with its slide 1231 that controls the positioning of the receiver 1232, in a manner to be explained, associated with the plate 1126. The finger 1230 is movable in the vertical center plane of the pivotation of the templet-gang X pertaining to the units order of the multiplier just as was the finger 1164, as described above.

In order that the uniformity of construction of the plates 1126 to 1131 may be further realized each and every plate includes slots for receiving pinion or sensing finger slides to afford accommodation for sensing fingers in alignment with each and every templet-gang that is to be associated with the sets of plates, which is to say, accommodation for a sensing finger on every plate in every vertical center plane of the pivotation of every templet-gang. While, if desired, sensing finger, finger slides, pinions, rack slides and the like could be provided in all plates 1126 to 1131 for those orders above the highest order of the multiplier which will have a templet associated with the particular plate and while such devices could be rendered inoperative by the use of blocks as 1227, it is not, as a matter of economy, necessary or desirable to provide such arrangements in those orders above the last active order. Hence, on the plate 1126, which pertains to the units order, sensing fingers and associated mechanisms are not provided to cooperate with templet-gangs, in the present instance, for the tens and hundreds orders of the multiplier for in so far as this particular plate is concerned no templets in these templet-gangs will be associated with the plate 1126. Therefore, as shown in Figs. 35 and 36, sensing fingers and the like for cooperation with templets and templet-gangs pertaining to orders above units order of the multiplier are eliminated.

As a further example of the uniformity of the plates, and at the same time the elimination of those parts which are unnecessary in so far as a particular plate is concerned, the plate 1127 shown in Figs. 39 and 40 may be considered and it will be noted that this plate includes a carry sensing finger 1233, a sensing finger 1234 for cooperation with a templet pertaining to the units order of the multiplier, and a sensing finger 1235 for cooperation with a templet pertaining to the tens order of the multiplier. As can be seen by referring to the examples of longhand multiplication as set forth hereinabove and as shown in Fig. 65, but two digits in any multiplication pertain to the tens order of the final product. Thus, a sensing finger for cooperation with a templet pertaining to the hundreds order is eliminated from the plate 1127 which pertains to the tens order of the final product.

Since only one digit will pertain to the units order of the final product in any particular multiplication there will be no carry-overs from such units order to the tens order and therefore a block 1236, corresponding to the block 1227, is provided to block the slide 1237 on which the sensing finger 1233 is mounted to prevent movement of this sensing finger for the purpose stated hereinabove. The receiver 1195, as has been described hereinabove, is associated with the plate 1127 and the digital positions that may be assumed by this receiver, as explained hereinafter, are controlled by the cooperation of the sensing finger 1234 with a templet as 1106—U and the cooperation of the sensing finger 1235 with a templet 1105—T.

Figure 59:
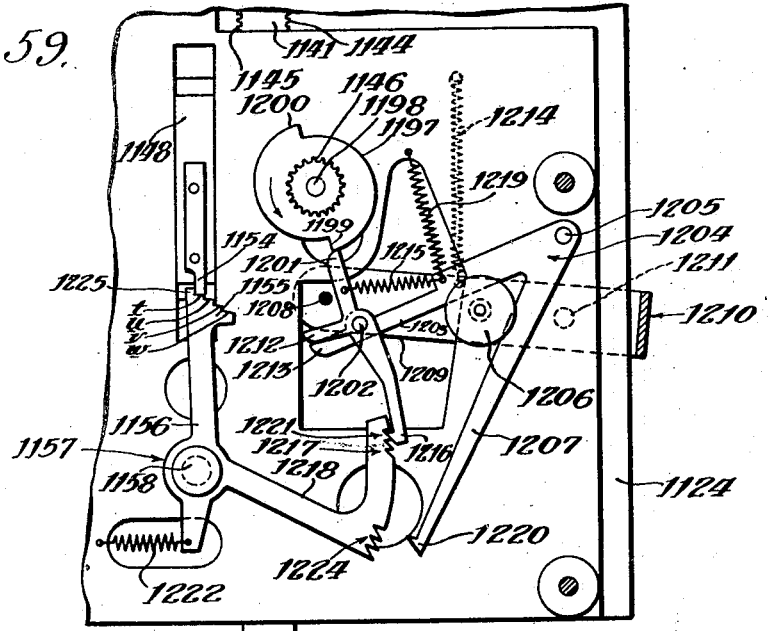

Another reason for employing blocks as 1227 and 1236 in those instances where no carries are to be received in a particular plate is that carry-over effecting devices, such as shown for example in Fig. 59, are not associated with plates pertaining to orders from which and to which no carries need be made and the use of blocks as above described avoids the necessity of providing these carry effecting means. Moreover, it is necessary to provide a pinion at the carry receiving position on a plate to establish interconnection between racks as 1145 and 1159, Fig. 43. The use of blocks as 1227 and 1236 enables this to be done in a manner that enables all plates to be of uniform structural characteristics.

The plate 1128 pertaining to the hundreds order has been explained in detail heretofore and hence reference will now be made to the plate 1129 which pertains to the thousands order of the final product and which is shown in Figs. 46 and 47. In this plate, just as in the instance of the plate 1128, all mechanisms that can be accommodated are provided and utilized, which is to say, none of the sensing fingers in the plate 1129 is blocked so as to be rendered inoperative for in the course of a multiplication of a three-order number by a three-order number it will be necessary to totalize three digits pertaining to the thousands order of the final product. Furthermore, in the course of such a multiplication, carry-overs may originate in the hundreds order to be carried over into the thousands order and carries may originate in the thousands order that will need be carried over into the ten thousands order. Thus carry templets and carry-over effecting means are associated with both the plates 1128 and 1129, it being understood that such carry devices are explained in detail hereinafter.

A receiver 1238 is associated with the plate 1129 and the positioning of this receiver is controlled by the sensing fingers 1239, 1240, 1241 and 1242. The sensing finger 1239 cooperates with a carry receiving templet 1243 that is positioned under control of the advancing of the receiver 1141 of the hundreds order. The positioning of the sensing finger 1240 is determined by cooperation thereof with the templet 1108—U. The positioning of the sensing finger 1241 is determined by cooperation thereof with the templet 1107—T and the positioning of the sensing finger 1242 is determined by cooperation thereof with the templet 1106—H, the reason for the association of these particular templets with this particular plate having been described hereinabove.

The plate 1130, Figs. 48 and 49, pertains to the ten thousands order and so far as structural characteristics are concerned corresponds to the hereinabove described plate 1128, which is to say, it has a full complement of parts. However, as can be ascertained by reference to the above set forth examples of longhand multiplication, and as is shown in Fig. 65, in an instance where a three-order number is multiplied by a three-order number there will be no digits, so far as multiplication of the multiplicand by the digit in the units order of the multiplier is concerned, appearing in the ten thousands order and for this reason no templet is provided pertaining to the ten thousands order and to which the plate 1130 pertains in the templet-gang pertaining to the units order of the multiplier. It will therefore be recognized that the sensing finger on this plate which would under normal circumstances cooperate with a templet in the templet-gang for the units order of the multiplier must be rendered inoperative, so as to prevent inaccurate operation, and to this end a block 1244 is interposed between the end of the slot 1245, toward which the slide 1246 therein is movable, and the adjacent end of this slide 1246, this block and all other similar blocks serving, as will be explained, to retain the sensing finger mounted on the finger slide so blocked in zero position, this being the sensing finger 1247 in the present instance.

A receiver 1248 is associated with the plate 1130 and sensing fingers 1249, 1250 and 1251 determine the positions into which the receiver 1248 may move, the sensing finger 1249 cooperating with a carry templet 1252 that is positioned under control of the receiver 1238, the sensing finger 1250 cooperating with the templet 1108—T, and the sensing finger 1251 cooperating with the templet 1107—H.

In the present instance the sixth and last plate 1131, Figs. 50 and 51, pertains to the hundred thousands order of a final product and where a three-order number is multiplied by a three-order number, as can be seen by reference to Fig. 65, only one digit will appear pertaining to this order of the final product and hence it is necessary to arrange but a single templet 1108—H in association with the plate 1131, such templet being included in the templet-gang that pertains to the hundreds order of the multiplier. Thus in this instance blocks 1253 and 1254 are positioned in the manner described hereinabove, as for example in connection with the block 1227, to render inoperative the sensing fingers 1255 and 1256, respectively, that are positioned to cooperate with templets pertaining to the units and tens orders of the multiplier inasmuch as, as stated hereinabove, no such templets will be associated with the plate 1131.

The positions into which the receiver 1257 may move are controlled by sensing fingers 1258 and 1259, the sensing finger 1258 cooperating with a carry templet 1260, the positioning of which is controlled by the receiver 1248, and the sensing finger 1259 being positioned under control of the templet 1108—H included in the templet-gang pertaining to the hundreds order of the multiplier.

Each receiver as 1141, Figs. 42 and 43, is to be moved downwardly when a summation of significant digits pertaining to the order of the final product to which the receiver pertains is to be effected. To enable such movement the various receivers are mounted for vertical movement, the receiver 1141, for example, being retained against a face of the plate 1128 by retaining blocks 1142, 1143, Fig. 43, this having been explained hereinabove, and each other receiver is similarly mounted on the plate with which it is associated.

Each receiver as 1141, Figs. 42 and 43, has a foot as 1261 thereon and the foot on each of these receivers bears on a shaft 1262, Figs. 26, 27 and 42, mounted in bifurcations as 1263, Figs. 7 and 27, at the upper ends of arms as 1264, these arms being pivotally mounted on a shaft 1265 journaled in slide blocks 1266, Fig. 26, mounted for reciprocation on vertically extending bars 1267 and 1268 that are secured to and which depend from the side plates 1124 and 1125. Two spring anchor pins 1269 and 1270 (see Fig. 42) extend between and are carried by lugs on the arms 1264, and springs as 1271 alternately extend between the pins 1269 and 1270 and the feet as 1261, on the receivers as 1141, these springs being effective to hold such feet in engagement with the shaft 1262.

The arms 1272 and 1273, Figs. 42 and 27, of a rocker generally indicated by 1274, Fig. 7, are connected to the shaft 1262. The arms 1272 and 1273 of the rocker 1274 are pivotally mounted on a shaft 1275, Figs. 7 and 9, mounted at the lower ends of plates 1276 and 1277, Fig. 9, mounted for pivotal movement about the hubs 1278 and 1279 of the bearings for the shaft 1280, the plates 1276 and 1277 extending along the inner faces of the side frame members 1134 and 1135, respectively, and being secured thereto by having screws as 1281 passed through an enlarged opening in the adjacent side frame member and tapped into these plates. The adjustable mounting thus afforded for the rocker 1274 enables this rocker to be disposed in such a position that the shaft 1262, in the course of operation of the machine, will always be returned into a position such that it will so act on the foot portions 1261 that the respective receivers as 1141 will be forced into an upper position in which each receiver will so act on the summation means associated therewith that each and every sensing finger of each sensing means will be positively seated in its zero position.

*Operating devices for the multiplying apparatus*

Two arms 1282 and 1283, Fig. 11, formed on the arm 1272 of the rocker 1274 carry cam followers 1284 and 1285, a spring 1286 extending between the arm 1283 and the adjacent side frame member 1134 and urging the cam follower 1284 toward the periphery of the cam 1287 fast on the cam shaft 1280 of the multiplying apparatus M. A block 1288 is provided on the side face of the cam 1289 that is mounted on the cam shaft 1280 adjacent the cam 1287 and as the parts move into their at rest position this block engages the cam follower 1285 and in so doing pivots the rocker 1274 to dispose the shaft 1262 in the position in which it urges the receivers as 1141 into the upper position described above to insure proper positioning of all the sensing fingers of the summation means associated with the various receivers in their respective zero positions.

Power is imparted to the main cam shaft 1280 of the multiplying apparatus M through a pulley 1290, Figs. 9 and 10, rotatably mounted on the shaft 1280 by a belt 1291 that passes about this pulley and about a pulley 1292, Fig. 1, fast on the main drive shaft 19, a pulley 1293 on the arm 1294, Fig. 7, acting on a pass of the belt between these pulleys to serve as a belt tightener.

A clutch, which is a modification of that shown in my co-pending application Serial No. 239,561, filed November 8, 1938, now Patent No. 2,265,133, patented December 9, 1941, serves to connect the pulley 1290 with the shaft 1280, this clutch being shown herein in Fig. 9 and being illustrated in detail in Figs. 23 to 25, inclusive.

Clutch teeth 1295 are provided at the free end of the hub of the pulley 1290 and are adapted to be engaged by clutch teeth 1296 on the adjacent end of a sleeve 1297 slidably but non-rotatably mounted on the shaft 1280. A pin 1298 extends from the periphery of the sleeve 1297 and is engageable with a cam surface 1299 on the arm 1300 that is pivotally mounted as indicated at 1301, Fig. 23, on the side frame member 1134. A lug 1302 on an arm 1303 extends beneath the free end of the arm 1300 when the parts are in their at rest position. The arm 1303 is pivotally connected to the core 1304 of a solenoid 1305, Fig. 9, which is energized to set the multiplying apparatus M in operation. Upon energization of the solenoid 1305 the lug 1302 pivots the arm 1300 upwardly to disengage the cam surface 1299 from the pin 1298 and when this occurs the clutch teeth 1296 are engaged with the clutch teeth 1295, this being effected in the following manner.

A collar 1306 is passed about the periphery of collar 1307 and extends part way over the periphery of the sleeve 1297 and is rotatable about this collar and sleeve, the collar 1307 being fast to the shaft 1280 (see Fig. 25). A cam 1308 is fast to the collar 1307, and one end of a spring 1309, Fig. 23, is fast to a spring anchor on this cam 1308 and to a pin 1310 extending from the periphery of the collar 1306, the spring 1309 tending to rotate the collar 1306 clockwise as viewed in Fig. 23. A notch 1311, Fig. 24, is provided in the edge of the collar 1306 extended toward the clutch teeth 1296 and when the parts are in an at rest position the notch 1311 is aligned with the pin 1298 so that the cam surface 1299 may force the pin 1298 into this notch whereby the clutch teeth 1296 are maintained disengaged from the clutch teeth 1295.

Another pin 1312, Fig. 24, is fast in the collar 1306 and engages a plate 1313 carried by the arm 1300 when the arm 1300 is resting on the periphery of the sleeve 1297. When the arm 1300 is in this position the plate 1313 is in position to engage the pin 1312, this pin engaging this plate near the end of a revolution of the shaft 1280 and thereupon the collar 1306 is rotated counterclockwise, as viewed in Fig. 23, against the action of the spring 1309, to bring the notch 1311 into alignment with the pin 1298.

However, when the solenoid 1305 is energized and the arm 1300 is pivoted upwardly, against the action of the spring 1319 that urges it toward the sleeve 1297, not only is the cam surface 1299 disengaged from the pin 1298 but the plate 1313 is disengaged from the pin 1312 and as soon as this plate disengages this pin the spring 1309 acts to rotate the collar 1306 clockwise as viewed in Fig. 23. Thereupon the notch 1311 is moved out of alignment with the pin 1298 to engage the adjacent edge of the collar 1306 with this pin whereupon the clutch teeth 1296 are forcibly engaged with the clutch teeth 1295 and thereby the shaft 1280 is connected to the pulley 1290 to rotate therewith.

Shortly after the sleeve 1297 starts to rotate with the source of power the pin 1296 engages the arm 1303 and pivots this arm to disengage the lug 1302 from the end of the arm 1300. When this occurs the arm 1300 is reseated by the spring 1319 in engagement with the periphery of the sleeve 1297. Then near the end of a complete revolution of the shaft 1280 the pin 1312 reengages the plate 1313 and immediately thereafter the pin 1298 engages the cam surface 1299. As soon as the pin 1312 engages the plate 1313 the collar 1306 stops rotating and at this same time the pin 1298 will be riding up the cam surface 1299 and when the parts attain their at rest position the collar 1306 will be in such a position that by the time the pin 1298 engages the stop edge 1314 on the arm 1300, at the end of the cam surface 1299, the parts will be in such a position that the pin 1298 will be seated in the notch 1311. When this pin is so seated the clutch teeth 1296 are fully disengaged from the clutch teeth 1295. It will be noted that this arrangement avoids the necessity of using springs to effect engagement of the clutch teeth as 1296 with the clutch teeth 1295, and that positive movement of a sleeve as 1297 along a shaft as 1280 to engage and disengage the aforesaid clutch teeth is brought about.

It is essential that the shaft 1280 of the multiplying apparatus M make a complete revolution each time it is set in operation and it is for this reason that the cam 1308 is provided. This cam includes a drop 1315, Fig. 23, that is so located thereon that when the shaft 1280 is in its normal at rest position the roller 1316 on the arm 1317, that is pivotally mounted at 1301, is seated in the bottom of the drop 1315, this being assured by the action of the strong spring 1318 on the arm 1317. In event the shaft 1280 does not make a complete revolution, the roller 1316 will be positioned near the drop 1315 and in this event the spring 1318 will pivot the arm 1317 to cause the roller 1316 to move along the edge of the drop 1315 and bring the shaft 1280 into its normal at rest position.

A predetermined time after the solenoid 1305 is energized and the cam shaft 1280 is set in rotation, those receivers as 1141 that are to move start to move downwardly. To this end a rise on the cam 1287, Figs. 10 and 11, engages the cam follower 1284 and thereupon the rocker 1274 is pivoted in such a direction that the shaft 1262 starts to move downwardly and therefore the springs 1271 act on the foot portions as 1261 to urge the receivers as 1141 downwardly.

Each receiver as 1141 of a summation means including sensing fingers aligned with templets having steps Z thereon representative of significant digits in operative position will move downwardly, upon such downward movement of the shaft 1262, but each receiver as 1141 of a summation means in which the sensing fingers are aligned only with templets having steps Z representative of zero in operative position or whose sensing fingers are held against movement by blocks as 1227, in a manner as described hereinabove, will be prevented from moving downwardly so that the springs 1271 associated with such receivers will merely stretch as the shaft 1262 moves downwardly. Furthermore, when every seansing finger associated with a particular receiver is seated, further movement of this receiver with the shaft 1262 is interrupted and thereafter, as the rocker 1274 completes its downward movement controlled by the cam 1287, the springs 1271 connected to receivers, whose further movement is arrested, merely stretch. The cam 1287 includes a dwell that causes the receivers to remain in the positions so attained, in which positions, as will be explained, the receivers represent the digit of the final product in the order to which the particular receiver pertains, until the receivers have been sensed, in a manner to be explained, to enable set-up of means from which the final product is ascertained. Later, as the cam 1287 returns to its normal at rest position, shown in Fig. 11, in the course of rotation of the cam shaft 1280, the shaft 1262 moves upwardly and in the course of such upward movement engages those foot portions 1261 on those receivers that are out of zero position and moves these receivers back into their zero position, the block 1288 engaging the cam follower 1285 near the end of such return movement of the cam 1287 and forcing the shaft 1262 into the upper position which assures that each receiver and its associated sensing fingers return to their zero positions, the templet-gangs X having been returned to their normal at rest positions before such restoration of the receivers is completed.

When the receivers as 1141 are in their upper positions, hereinabove referred to as their zero positions, these receivers, and the positioning members generally indicated by 1320 provided at the upper ends of the receivers, are in reality in a position slightly beyond zero position, this affording clearance for various operative mechanisms associated with the receivers and included in the summation means of which each receiver is a part. In the present mechanism, even though the final products may be ascertained from the positioned receivers as 1141, other means are set up to produce records of such final products. Such other means are set up from the just-mentioned positioning members 1320 which will now be described.

*Positioning members of the summation means*

In the present mechanism where the capacity of the machine is such that a three-order number may be multiplied by a three-order number, the maximum operation a summation means will be called upon to perform will be the addition of three nines, plus a carry of two from the next lower order, in so far as any particular order of the final product is concerned so that under no circumstances will a receiver as 1141 be moved into a position indicative of an amount greater than 29. It will be remembered that the receivers as 1141 each pertains to but a single order of the final product and it will be apparent that but a single digit may appear in any such order. Thus, when it is stated that a receiver as 1141 is set to represent a number as 29, it is to be understood that in reality only the digit appearing in the units order of such a number will be represented by the receiver as 1141. Hence, when a receiver as 1141 is said to be set to represent a number as 29, it is to be understood that the value appearing in the tens order of such a number will have been carried over into the next higher order. However, when the sum of the digits pertaining to a single order of the final product is greater than 9, the receiver pertaining to such order will move beyond the positions at which it stops to represent the numbers of the first of the presently described notations that include the digits 0 to 9, which, in reality, are the only digits that such a receiver can actually be set to represent. Hence, as a receiver advances from a position in which it would represent 9 to a position in which it should represent 10, in which position it will only really represent 0, a carry of 1 is made into the next higher order. Therefore, the digits in the tens order of numbers above and including 10 pertaining to a single order of the final product are really represented by a receiver when it comes to rest in a position in which it should represent such numbers, for in assuming such positions it causes the digits in the tens order of numbers to be represented on the receiver pertaining to the next higher order, wherefore when a receiver attains a position representative of 10 or more it actually causes such number to be represented even though the particular receiver itself only represents whatever digit appears in the units order of such number.

Reference has been made to numbers as 29 falling in notations and the number 29 will fall in what may be called the third notation, the numbers 0 to 9 constituting the first of such notations, the numbers 10 to 19 constituting the second of such notations, and the numbers 20 to 29 constituting the third of such notations. It is because of this that the positioning members generally indicated by 1320 at the upper ends of receivers as 1141 each includes three positioning fingers as 1320—I, 1320—II and 1320—III, Figs. 42 and 43. The fingers as 1320—I are moved into operative position to represent numbers falling in the first of the above explained notations, the fingers as 1320—II are moved into operative position to represent numbers falling in the second of the above explained notations, and the fingers as 1320—III are moved into operative position to represent numbers falling in the third of the above explained notations. Of course, the fingers 1320—II and 1320—III on each receiver only represent the digit appearing in the units order of the number they are set to represent, the value to appear in the tens order of such number having been carried over into the next higher order as such fingers move into operative position.

In the present mechanism the fingers 1320—I, 1320—II and 1320—III are selectively moved into operative position with respect to the sensing bars 1324 of the multiplying apparatus M which are operative to effect set-up of the means that produce records of the final products which the receivers as 1141 and the fingers thereon are set to represent. However, before describing such record producing means and the aforesaid sensing bars 1324 pertaining thereto, a description of the means which effect carry-overs from one order to another and the manner in which the receivers as 1141 are set up to represent a final product are first presented.

*Carry mechanism*

In the above description it has been stated that the sensing finger 1154 remains seated on the first step of the carry templet 1155. Now by referring to Fig. 65 it may be ascertained that in summarizing the digits pertaining to the tens order of the final product it will be necessary to effect a carry-over of 1 from this tens order into hundreds order. Such a carry-over, in the illustrated mechanism, is effected by so advancing the carry templet 1155 that the finger 1154 will seat on the second step on the carry templet 1155 rather than on the first step as described above. Such advancing of the position of the carry templet 1155, so as to cause the sensing finger 1154 to engage with the second step of the carry templet rather than the first step thereon, has the effect of including the carry of 1 from the tens order in the sum attained in the hundreds order because the steps on the carry templet 1155 correspond to the steps on the templets as 1105 or, in other words, the carry templet 1155 is, in effect, another templet as 1105.

The templet 1155 or segment has steps as $t$, $u$, $v$, $w$ thereon, Fig. 57. These steps are spaced from each other in amounts equivalent to the spacing of the steps X on templets as 1105 and are positioned similarly to such steps Z. Thus, the step $t$ corresponds to a step Z lying on the edge $a$ of a templet as 1105. The step $u$ is equivalent to a step Z lying on the first arc $c$ inwardly of the edge $a$ on a templet as 1105. The step $v$ corresponds to a step Z located on the second of the arcs $c$ inwardly of such an edge $a$. The step $w$ corresponds to a step Z located on the third of the arcs $c$ located inwardly of an edge $a$. Thus the steps $t$, $u$, $v$, $w$, respectively, pertain to the digits 0, 1, 2, 3.

As has been explained, all of the receivers as 1141 are concurrently moved downwardly, if the receivers are to move, by the springs 1271 under control of the cam 1287 and therefore the receiver 1195 for the tens order of the final product moves downwardly concurrently with the receiver 1141 when the summation means of these receivers cooperate with representations of significant digits. As can be seen by reference to Figs. 65, 39 and 42, in summarizing the intermediate products of the multiplication illustrated in Fig. 65, which is 999 by 999 (999 being the reoccurring factor on which the templets 1105 to 1108, Fig. 62, are based and these being the templets that are shown in Figs. 35, 36, 39, 40, 42, 43, 46, 47, 48, 49, 50 and 51 and these templets being shown in most of these views as being positioned by a multiplier of 999), the sensing finger 1234, associated with the receiver 1195, is to engage a step Z representative of 9 on the templet 1106—U while the sensing finger 1235 is to engage a step Z on the templet 1105—T representative of 1. The result of this will be a total of 10. Further, the sensing finger 1164, Fig. 42, is to engage a step Z on the templet 1107—U representative of 9, the sensing finger 1183 is to engage a step Z on the templet 1106—T representative of 9, and the sensing finger 1191 is to engage a step Z on the templet 1105—H representative of 1. The result of this, without carry-over from the tens order, will be a total of 19. Now the length of time and the distance a receiver moves under the influence of the springs 1271 is directly proportionate to the total to be represented thereby. Hence the receiver 1195, which is to receive the aforesaid total of 10, ceases movement prior to the receiver 1141, which is to receive the aforesaid total of 19. But as the receiver 1195 is so ceasing movement it is moving into a position representative of 10 and thereupon, through means now to be described, the carry templet 1155 is advanced from the position in which the sensing finger 1154 engages the first or zero step t thereon to a position where this sensing finger engages the second, or step u thereon, which, as explained above, pertains to the digit 1, and in this way the receiver 1141 is caused to stop in a position representative of 20, the true total in the hundreds order in the multiplication shown in Fig. 65. The manner in which this is effected will now be explained.

The receiver for the tens order which is shown in Figs. 39 and 40, and which is indicated by 1195, has a rack 1196 thereon which corresponds to the rack 1144 on the receiver 1145. This rack 1196 meshes with the pinion 1146 on the plate 1128, Fig. 42, when the plates are assembled in operative relation and this is true of all other similar racks and pinions, which is to say, the rack as 1196 on the receiver pertaining to the order in which a carry may originate meshes with a pinion 1146 on the plate pertaining to the order to receive such a carry. The pinion 1146 is unitary with a cam 1197, Figs. 42 and 57 to 61, and this pinion and cam are rotatably mounted on a pivot pin 1198 fast in the plate 1128, the end of the pivot pin 1198 resting against the adjacent face of the adjacent plate 1127, and thereby displacement of the aforesaid pinion and cam from this pivot pin is prevented.

The cam 1197 has two lobes 1199 and 1200 provided thereon which are successively engageable with the end of an arm 1201. The cam 1197, which will be referred to hereinafter as the carry cam, has two lobes thereon in order that a pinion of appreciable size may be associated therewith and if the multiplying apparatus were made to such a scale that a pinion having but ten teeth could be conveniently associated with this cam then the cam would have but one lobe. In the present instance, however, the pinion 1146 has twenty teeth thereon and, as has been explained, this pinion meshes with the rack 1196 on the receiver 1195. This arrangement is such that each time the receiver 1195 moves the equivalent of ten digits, the pinion acts to rotate the carry cam 1197 one hundred eighty degrees.

In its at rest position, in which the carry segment 1155 is positioned to dispose the step t thereon in alignment with the finger 1154, the carry cam 1197 and its associated mechanism is in the position shown in Fig. 57. Now when the receiver 1195 starts to move downwardly, through the rack 1196, it acts on the pinion 1146 to rotate it in a counterclockwise direction as this pinion is viewed in Fig. 57. It will be noted that the rises of the lobes 1199 and 1200 are gradual and that when the parts are in the at rest position shown in Fig. 57 the rises of both of these lobes are disengaged from the arm 1201, especially since, when the parts are in the at rest position, the arm 1201 and the two-armed lever 1204 on which it is pivotally mounted have not yet been restored to operative position.

The arm 1201 is pivotally mounted, as indicated at 1202, on the arm 1203 of a two-armed lever generally indicated by 1204 that is pivotally mounted, as indicated by 1205, on the plate 1128. The lever 1204 is held against the adjacent face of the plate 1128 by a retaining disc 1206 that is fast to the plate 1128 and which overlies both the arm 1203 and the arm 1207 of the lever 1204.

The arm 1201 and the two-armed lever 1204 on which it is mounted are retained out of operative position, shown in Fig. 57, by a pin 1208 on the arm 1209 of a lever generally indicated by 1210, Fig. 7, that is pivotally mounted as indicated at 1211. The lever 1210 is under control of a roller 1601, Fig. 10, that rides on a cam 1600 fast on the shaft 1280. When the pin 1208 holds arm 1201 and lever 1204 in the position shown in Fig. 57, the roller 1601 is engaged by a rise on the cam 1600 but in the first part of a cycle of operation of the multiplying apparatus M this roller rides off this rise and thereupon the pin 1208, under the influence of the spring 1214, described presently, moves from the position shown in Fig. 57 into the portion shown in Fig. 58. Thereupon the arm 1201 and the two-armed lever 1204 are restored, which is to say, are again rendered operative, and in the course of such restorations the arm 1201 and lever 1204 attain a position such as that shown in Fig. 58. The arm 1201 and the lever 1204 are retained in the unrestored position thereof shown in Fig. 57 by the engagement of the pin 1208 on the arm 1209 with the arm 1212 on the arm 1201 and by the engagement of this pin with the arm 1213 on the arm 1203 of the lever 1204. When the pin 1208 moves upwardly with the arm 1209, which is induced by the spring 1214, the two springs effective on the arm 1201 and the lever 1204 cause this arm and lever to assume the operative position thereof shown in Fig. 58, which is to say, the spring 1215 that extends between the arm 1201 and the arm 1203 acts on the arm 1201 to engage the nose 1216 thereon with the face of the ratchet member 1217 carried by the arm 1218 that is unitary with the arm 1156 with which the carry templet 1155 is also unitary. At this same time the spring 1219, which extends between the arm 1203 and the plate 1128, acts on the lever 1204 to engage the nose 1220 on the arm 1207 of the lever 1204 with the ratchet member 1217.

Figure 60:
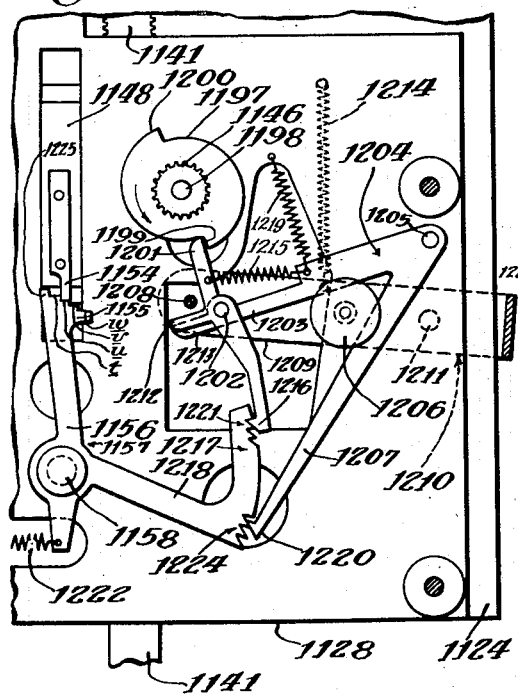

In the course of such restoration of the arm 1201 and the lever 1204, the receiver 1195 will move downwardly, if it is to move into a position representative of significant digits and in the present instance it is to so move, and by the time it has moved in an amount equivalent to nine digits the rise of the lobe 1199 will have attained a position with respect to the arm 1201, such as is illustrated in Fig. 59, wherein it will be seen that the arm 1201 is spaced but a short distance away from the end of the lobe 1199. It will, of course, be understood that when the arm 1201 was restored, as above described, it seated on the lobe 1199 near the start of this lobe and that the arm 1201 rode up this lobe as the receiver 1195 advanced and through the rack 1196 and pinion 1146 rotated the cam 1197. Now if the receiver 1195 continues downward movement, so as to move from the aforesaid position representative of nine digits into a position representative of ten digits, which means that a carry of 1 into the hundreds order is to be effected, the carry cam 1197 will be advanced into a position such as is shown in Fig. 60. In the course of such movement the arm 1201 will drop off of the lobe 1199 into engagement with the start of the lobe 1200 and, in the course of movement incidental to the arm 1201 so dropping off of the lobe 1199, the carry templet 1155 will be so moved that the step $t$ thereon will be moved out of alignment with the sensing finger 1154 and the step $u$ will be moved into alignment therewith, it being remembered that the step $u$ is representative of the digit 1, and the manner in which this is effected will now be described.

Figure 58:
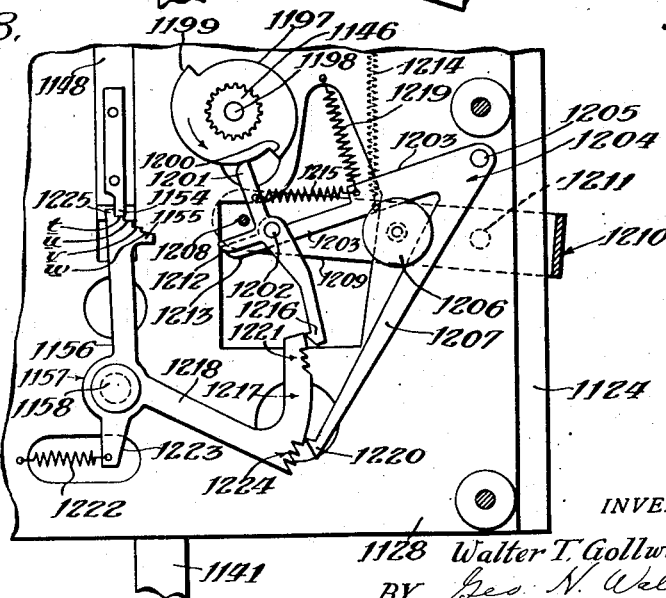

When the arm 1201 was freed to the action of the spring 1215 in being restored to operative position it moved into engagement with the face of the ratchet member 1217, Fig. 58, above the set of teeth 1221 thereon. There are as many teeth in this set as there are steps on the carry templet 1155 that pertain to significant digits and, since there are three such steps on the carry templet 1155, three teeth are provided in the set of teeth 1221. The first tooth in this set is disposed in such a position on the ratchet member 1217 that when a carry of 1 is to be made from the tens order to the hundreds order, the nose 1216 on the arm 1201 will seat in this first tooth.

Now in the present instance where a carry of 1 is to be made from the tens order to the hundreds order, the engagement of the rise of the lobe 1199 with the end of the arm 1201 will cause the nose 1216 to move along the face of the ratchet member 1217, and by the time the carry cam 1197 has been rotated in such an amount that it corresponds to an advancing of the receiver 1195 into a position representative of 9, the nose 1216 will already be seated in the first of the teeth 1221 as shown in Fig. 59. Thus, when the receiver 1195 advances from a position representative of 9 into a position representative of 10, in the course of which movement the arm 1201 disengages the lobe 1199 and moves into engagement with the start of the lobe 1200, the carry of 1 into the hundreds order will be effected for when the arm 1201 moves from engagement with the end of the lobe 1199 it is moved upwardly along with the arm 1203 of the lever 1204 by the spring 1219.

A spring 1222 acts on an arm 1223, that is unitary with the arms 1156 and 1218 and which depends below the pivot 1158, to urge the carry templet 1155 clockwise, as viewed in Fig. 57. When a carry is to be effected by reason of the fact that the arms 1203 and 1201 have been freed to the action of the spring 1219 by the disengagement of the arm 1201 from the end of a lobe on the carry cam 1197, the spring 1219 overcomes the effect of the spring 1222 and enables the nose 1216 to so rock the structure, of which the ratchet member 1217 and arms 1218 and 1156 and the carry templet 1155 are a part, that one of the steps on the carry templet is moved from alignment with the sensing finger 1154 and the next step on such a carry templet is moved into alignment therewith.

A carry action brought about by the effect of the spring 1219 occurs very rapidly and in some instances it is possible that instead of the spring merely causing but one of the steps $u$, $v$ or $w$ to be brought into alignment with the sensing finger 1154, the device might overrun and one step might entirely pass beyond the sensing finger 1154 and the succeeding step would therefore be aligned therewith. This would cause the carry of 2 from the tens order to the hundreds order rather than the carry of 1, which is to be effected each time the arm 1201 disengages the end of a lobe on the carry cam 1197, and in order to prevent this the following mechanism is provided.

Another set of teeth 1224 is provided on the ratchet member 1217 below the set of teeth 1221, and the nose 1220 on the arm 1207 of the two-armed lever 1204 is adapted to cooperate therewith. As shown best in Fig. 58, when the arm 1201 and lever 1204 are restored by the disengagement of the pin 1208 from the arms 1212 and 1213, the nose 1220 moves into engagement with the face of the ratchet member 1217 above the first of the teeth 1224. In the course of the advancing of the rise of the lobe 1199, in this instance, the double-armed lever 1204 is pivoted downwardly about its pivot 1205 and in the course of this the nose 1220 moves from engagement with the face of the ratchet member 1217. By the time the hereinabove described position shown in Fig. 59 is attained the nose 1220 is in a position substantially like that shown in Fig. 59.

The arm 1201, as has been explained, is mounted on the arm 1203 of the lever 1204 and, as has also been explained, the spring 1219 is active on this arm 1203. Thus when the arm 1201 rides off the end of a lobe 1199, the spring 1219 not only moves the arm 1201 upwardly but also pivots the lever 1204 about its pivot 1205. Thus the upward movement of the arm 1201 and the pivoting of the lever 1204 occur concurrently. The leverages involved in the mounting of the arm 1201 on the arm 1203 of the lever 1204, the length of the arm 1207, as well as the location of the nose 1220 and the teeth 1224, are such that by the time the end of the arm 1201 has engaged the start of the succeeding lobe, as above described, the end of the nose 1220 will have passed beyond the adjacent face of the ratchet member 1217 and will be extending into, in the present instance, the first tooth of the set of teeth 1224 substantially as is shown in Fig. 60. Such positioning of the nose 1220 insures that the spring 1219 will not cause overrunning in so far as the steps of the carry templet 1155 are concerned. Thus the arm 1207, the nose 1220 and the teeth 1224 are, in effect, an escapement.

Figure 61:
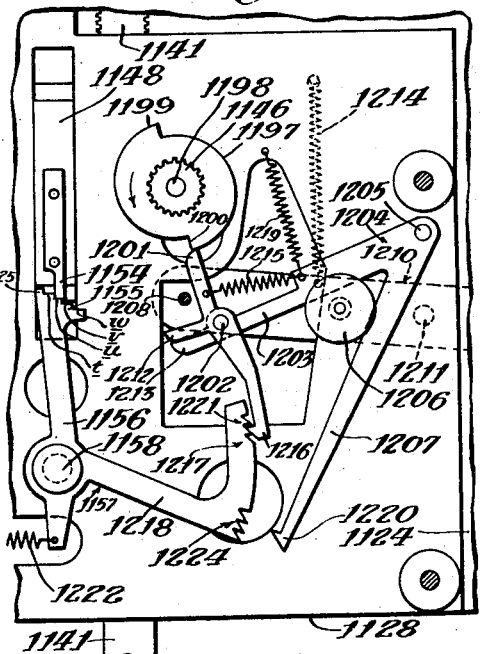

Now if the receiver 1195 should continue on past the position in which it is representative of 10 into a position representative of 19 (which will not occur in the illustrated machine since no more than two digits will ever be represented to pertain to the tens order of the final product, but which condition is now disregarded for the purpose of this description), the various parts will be moved into a position such as that shown in Fig. 61. Now if the receiver 1195 advances from this position into a position representative of 20, the end of the arm 1201 will ride off the end of the lobe 1200 into engagement with the start of the lobe 1199. In the course of the movement of the parts into the position shown in Fig. 61, the nose 1216 will seat in the second tooth of the set of teeth 1221 and the positioning of this nose in this tooth, upon upward movement of the arm 1201, advances the carry templet 1155 in such a manner that the step $u$ is advanced from alignment with the sensing finger 1154 and the step $v$ is moved into alignment therewith. It will be recalled that the step $v$ is representative of the digit 2 or, in other words, the "2" of "20" in the instance of carries from the tens order to the hundreds order.

If the need should arise for making an additional carry from the lower order to the higher order, the lobe 1199 would again move into association with the arm 1201 and in this instance the nose 1216 would be seated in the third of the teeth 1221 and the parts would function in the manner above described, it being understood that the nose 1220 in each instance seats in a tooth in the set 1224 corresponding to the position of the tooth in the set 1221 engaged by the nose 1216.

At the end of a cycle of operation of the multiplying apparatus M, if the carry templet 1155 has been actuated so as to move the step $t$ thereon out of alignment with the sensing finger 1154 it is essential that the carry templet be restored into a position such that the step $t$ will again be aligned with the sensing finger 1154. To this end, near the end of a cycle of operation of the multiplying apparatus M, the rise on the cam 1600, Fig. 10, moves into engagement with the roller 1601, rotatably mounted on the arm 1602 fast to the rocker 1210. This occurs practically concurrently with the return of the templet-gangs X to zero positions, described hereinabove. When the roller 1601 rides onto the rise on the cam 1600 the arm 1209 of the rocker 1210 is moved downwardly, as is viewed in Fig. 58 into the position shown in Fig. 57. In the course of the movement of the arm 1209 into this position the pin 1208 thereon engages the arms 1212 and 1213 and moves the arm 1201 and the lever 1204 into the position shown in Fig. 57. This entirely disengages the noses 1216 and 1220 from the sets of teeth 1221 and 1224, respectively. When this is done the carry templet 1155 is freed to the action of the spring 1222. By this time, due to the upward movement of the shaft 1262, described hereinabove, the sensing finger 1154 will be restored to its normal at rest position. Therefore the spring 1222 may so pivot the arm 1156, and therefore the carry templet 1155, that the step $t$ is moved back into alignment with the sensing finger 1154, a stop 1225, Fig. 57, on the carry templet 1155 and projecting above the step $t$ engaging the sensing finger 1154 to arrest pivotal movement of the arm 1156 induced by the spring 1222.

It will be noted that the sensing finger 1154 and the cooperating carry templet 1155 are located in the position nearest the receiver 1141 and it will be observed that if the carry templet 1155 is advanced so as to bring some step thereon, other than the step $t$, into alignment with the sensing finger 1154, that thereupon the sensing finger may move downwardly until it engages the newly positioned step. This will cause an additional digit to be included in whatever sum the receiver 1141 is being set to represent, as will be additionally explained presently. This may occur at any time in the course of a summarizing operation of the summation means of which the receiver 1141 is a part. During the time the sensing finger 1154 advances from one step to another on the carry templet 1155 all other movements in the summation means associated with the receiver 1141 will cease but as soon as the finger 1154 reseats on the step as $u$ whatever movement was progressing in the summation means will resume. It will also be understood that if the summation means had been at rest at the time a step as $u$ was brought into alignment with the sensing finger 1154 a carry would still have been entered into the receiver 1141 if the associated spring 1271 was acting on this receiver by reason of downward movement of the shaft 1262.

The foregoing description particularly pertains to the means which effect carries from the tens order to the hundreds order but it will be understood that similar means are provided for effecting carries from the hundreds order to the thousands order, from the thousands order to the ten thousands order and from the ten thousands order to the hundred thousands order, it of course being understood that orders here referred to are the orders of the final product. Such means of course are not provided for effecting carries from the units order to the tens order since such means are not necessary. However, the plates 1124 and 1125, which respectively pertain to such orders, are nevertheless so constructed that such means could be associated therewith, the reason for this being the desired uniformity for the construction of the plates. However, as has been explained hereinabove, the sensing portions of such carry effecting means are incorporated in these plates but these portions are held against movement so as to be ineffective.

*Operation of summation means*

The manner in which the summation means associated with each of the plates 1124 to 1131 function as well as the carry-over mechanisms associated therewith can probably best be ascertained by referring to Figs. 52 to 56 which are diagrammatic views of the summation means pertaining to the hundreds order of the final product. In Figs. 52 to 56 these means are disclosed as performing the operation entailed in the multiplication of 999 by 999.

When a multiplication is to be performed the various templet-gangs X are rotated into selected positions under control of the digits appearing in the various orders of the multiplier, each templet-gang being positioned according to the value of the digit in the order of the multiplier to which it pertains, this being effected in a manner described hereinabove. Such positioning of the templet-gangs disposes steps Z thereon in position for cooperation with sensing fingers mounted on the plates 1124 to 1131 in the manner described hereinabove.

In the multiplication of 999 by 999, as may be readily ascertained by reference to the following longhand example of such multiplication:

```
    999
    999
   ----
   8991
  8991
 8991
 ------
 998001
``` in so far as the hundreds order of the final product is concerned, a step Z on the templet 1107—Z representative of 9 is to be disposed in position to cooperate with the sensing finger 1164, a step Z on the templet 1106—T representative of 9 is to be arranged for cooperation with the sensing finger 1183, a step Z on the templet 1105—H representative of 1 is to be arranged for cooperation with sensing finger 1191, this positioning of these templets being shown in Figs. 53 to 56, the position of these templets prior to this, that is, the at rest position thereof being shown in Fig. 52. Prior to the time the operation of summarizing the digits represented by the above positioned steps Z is initiated, the receiver 1141, the finger slides 1163, 1182 and 1190 and the respective sensing fingers 1164, 1183 and 1191 thereon and the rack slides 1160, 1178 and 1187 are disposed in the positions shown in Figs. 42, 43 and 52.

The summarizing operation is initiated by causing the receiver 1141 to move downwardly, this being effected by the spring 1271 effective thereon and being under control of the cam 1287, as described above. At the start of the operation the sensing finger 1154 on the slide 1148 is engaged with the first step t on the carry templet 1155. Thus when the slide 1141 starts downwardly the slide 1148 is held against movement and therefore downward movement imparted to the receiver 1141 will be transmitted through the rack 1145 thereon to the pinion 1147 which will start to rotate as soon as the rack 1145 starts to move relative thereto. When the pinion 1147 starts to rotate, its movement is imparted to the rack 1159 whereupon the rack slide 1160 starts to move upwardly, and this movement is imparted to the pinion 1162 from the rack 1161.

The pinion 1162 is mounted on the pinion or finger slide 1163 to be movable toward the step Z on the templet 1107—U that is in operative position, which means, aligned with the finger 1164. When movement is imparted to the pinion 1162 it starts to roll over the rack 1177 and in so doing carries the slide 1163 and the sensing finger 1164 upwardly. The sensing finger 1164 continues to move upwardly until it engages the step Z on the templet 1107—U aligned therewith. Now if the digit represented by the step Z aligned with the finger 1164 had been zero, the just-described movement which is imparted to the sensing finger would only have been sufficient to take up the operating clearance between the edge a of the segment 1107—U and the finger 1164, which movement is not sufficient for the receiver to move to a position in which it would represent a significant digit. However, if the step Z in operative position had been disposed on the first arc c inwardly of the edge a on templet 1107—U, then the sensing finger 1164 and hence the receiver 1141 would have moved an amount equivalent to the value of one unit by the time this finger seated on this step.

In order to indicate the movement of the receiver 1141, as controlled by the seating of the sensing fingers as 1164 on steps Z in operative position a marking arrow MA is shown on the receiver 1141 in Figs. 52 to 56 and a scale is shown associated therewith, it being understood that this is solely for the purpose of this description. As shown in Fig. 52, when the receiver 1141 is at rest, prior to the initiation of its downward movement, the arrow MA is aligned with zero position on the aforesaid scale.

Now since the step Z aligned with the finger 1164 is disposed on the inwardmost of the arcs c on the templet 1107—U, which represents 9, the sensing finger 1164, in this operation, continues to move until it engages this step and in so moving this finger and the receiver 1141 move the equivalent of nine units since a step Z disposed on the inwardmost of the arcs c on any templet pertains to the digit 9, as has been explained hereinabove. The position of the various parts at the time the finger 1164 seats on the step Z aligned therewith is shown in Fig. 53 and it will be noted, by reference to Fig. 53, that the arrow MA has advanced from 0 to 9 position on the associated scale. Thus the receiver 1141 is in a digital position representative of 9.

Referring to Figs. 39 and 42 it will be seen that the first sensing fingers 1234 and 1164 on the plates there illustrated, that are aligned with templets in templet-gangs X, are both aligned with steps Z representative of 9. Hence both the receivers 1195 and 1141 move synchronously not only until the first fingers thereon seat on aligned steps Z but also thereafter because all of the sensing fingers of these summation means will not yet be seated in the present example of the multiplication of 999 by 999. After the receiver 1195 attains its ninth position it continues to move toward its tenth position and in so doing the rack 1196 thereon acts through the pinion 1146 to so position the carry cam 1197 on the hundreds order plate 1128 that the carry templet 1155 associated with this plate is advanced to move the step t thereon from alignment with the sensing finger 1154 and to move the step u thereon into alignment with this sensing finger, this being effected in the manner hereinabove described. Concurrently with this the rack 1146 on the receiver 1141 advances a carry templet associated with the plate 1129 in a similar manner to effect a carry from the hundreds order into the thousands order.

Now when the sensing finger 1164 seated on the step Z aligned therewith the pinion 1162 was prevented from rolling further over the rack 1177 and thereupon, since the receiver is still being pulled downwardly, this pinion starts to rotate whereupon the rack 1177 and hence the slide 1178 on which it is provided start to move downwardly. Such movement is effective through the rack 1179 on the rack slide 1178 to set the pinion 1180 on the slide 1182 in rotation if the sensing finger 1183 on this slide 1182 is not aligned with a step Z on the templet 1106—T representative of zero, which is not the case in the present instance. If this step were representative of zero and the remaining sensing fingers were similarly seated then further downward movement of the receiver 1141 would be prevented and it would be held in the position shown in Fig. 53 representative of 9, the value of the step Z engaged by the finger 1164. In the instance illustrated in Figs. 52 to 56, however, the step Z aligned with the sensing finger 1183 pertains to the digit 9 wherefore as soon as the sensing finger 1164 comes to rest, the sensing finger 1183 starts to move toward the step Z on the templet 1106—T aligned therewith as soon as the pinion 1180 starts to rotate, as above described, and this pinion rides over the teeth of the rack 1186.

Thus as soon as the finger 1164 seated on the step Z aligned therewith the finger 1183 started to move toward the step Z which is aligned with it and in so doing the receiver 1141 advanced from its ninth to its tenth position and, as stated above, the receiver 1195 similarly moved. Thus it was during the time that the receiver 1141 was moving from its ninth to its tenth position that the step *t* on the carry templet 1155 moved from alignment with the sensing finger 1154 and the step *u* moved into alignment therewith. Such advancing of the carry templet is effected very rapidly, as stated hereinabove, and as soon as the step *u* was aligned with the finger 1154 the slide 1148 moved downwardly and in so doing the pinion 1147 rolled over the rack 1159. During this time downward movement of the rack slide 1160 was interrupted and this interrupted rotation of the pinions 1162 and 1180 and movement of the rack slide 1178. However, as the pinion 1147 rolled over the rack 1159 the receiver 1141 advanced in an amount equivalent to one digit, this being the carry-over from the tens order. Then, as soon as the finger 1154 seated on the step *u*, movement of the sensing finger 1183 resumed so that by the time this finger has attained the position shown in Fig. 54, which is equivalent to having moved the amount of one digital space across the templet 1106—T, the arrow MA will be in alignment with the eleven position on the associated scale and the receiver 1141 is in a digital position representative of 11, the parts being shown in this position in Fig. 54.

When, however, the sensing finger 1183 engages the step Z on the templet 1106—T aligned therewith, the pinion is prevented from rolling over the teeth of the rack 1186 and any further movement effective on this pinion will cause the pinion 1180 to rotate which will be effective on the rack 1186 and therefore the rack slide 1187, on which the rack 1186 is formed, to move upwardly. Such movement imparted to the slide 1187 will be effective, through rack 1188 thereon, on pinion 1189 on the slide 1190. If the sensing finger 1191 on this slide is aligned with a step Z on the templet 1105—H pertaining to zero, further movement of any of the racks and pinions of this summation means will be interrupted. If movement of the receiver 1141 were interrupted at this time it would be in a position representative of 19 as is shown by the arrow MA in Fig. 55, wherein the position of the parts at this time is shown.

However, in the present instance, the step Z on the templet 1105—H aligned with the sensing finger 1191 pertains to the digit 1 so that the sensing finger 1191 and therefore the slide 1190 will continue to move until this sensing finger seats on this seat. Then since the rack 1194 is fast, further tendency toward movement imparted through the various racks and pinions will not be effective since the engagement of the teeth of the pinion 1189 with the teeth of the fixed rack 1194 will lock the parts against further movement. At this time the receiver 1141 comes to rest in a position representative of 20 as shown by the arrow MA in Fig. 56.

It will be understood that each sensing finger starts out from a position representative of zero and moves until it engages a step Z on the cooperating templet. It will be recalled that these steps are located in positions which pertain to digital values and that these steps are located, in so far as the sensing fingers cooperating therewith are concerned, in the ascending order of digits so that the movement of any sensing finger until it engages a step Z is equal to the value of whatever digit is represented by the step. Thus since the amount of movement any receiver as 1141 may make is determined by the amount of the various fingers associated therewith, it will be seen that the result of movement of a receiver 1141 is the production of a total and that such total is equal to the combined depth of the steps Z engaged by the sensing fingers. Attention is called to this at this time for it is important in the universal multiplying apparatus described hereinafter.

Hereinabove those parts indicated by the reference characters 1105 to 1107 have been referred to as being templets produced from sectors for the reason that in the particular embodiment of the invention illustrated this is the configuration of these templets prior to the imparting of individual characteristics thereto. It should be noted however that it is not essential that the intermediate products and the multiplier digits which, as described above, are represented by the steps Z and Z', respectively, be represented in sectors for a wide variety of devices other than sectors could be used for this purpose and, by way of example, blocks could be provided into which holes could be drilled to different depths to afford the full equivalents of the steps Z and Z'. It is in view of the foregoing that the parts indicated by the reference characters 1105 to 1117 are referred to herein as templets and in this connection it is to be noted that "templets" is not used in the sense of thin plates but rather in a broader or generic sense somewhat synonymous with "pattern" and is intended to describe parts which bear representations of either intermediate products or digits of the multiplier.

It will be noted that reference has been made to the rack 1194 being fast and it should be noted that this rack is the last device in the summation means associated with the receiver 1141. The making fast of the last of such devices is the equivalent of the seating of a sensing finger on a step Z. Hence, the last device, that is, the most remote device away from a receiver is always made fast for so to do brings about the proper arresting of movement of the operative parts of a summation means and the receiver associated therewith.

It is the positioning or arresting of movement of the receivers as 1141, in the above described manner, in selected of vertical positions, to be representative of the digits in the respective orders of a to be ascertained final product, that controls the positioning of the type segments as 247 and punches as 1407 in a manner and for the purposes that will now be explained. First it should be noted, however, that it is the operation of the summation means associated with each receiver that determines the vertical positioning thereof, such operation of the summation means being determined by the positions at which the sensing fingers therein are held in at rest position or come to rest in the course of movement of a receiver as 1141. It has also been explained that those sensing fingers, except those pertaining to carries, engage steps Z on templets in various ones of the templet-gangs, it being remembered that each templet-gang pertains to an order of the multiplier. Thus, each summation means performs an operation like that effected by addition in longhand multiplication wherefore, in effect, the operation of the present apparatus closely resembles longhand multiplication.

Sensing of the final product

Mention has been made that positioning members as 1320, Fig. 42, are provided at the upper ends of the receivers as 1141 and that the fingers 1320—I, 1320—II or 1320—III are disposed in operative position upon movement of the receivers. Such movement of the receivers is that induced by the springs 1271 under control of the cam 1287, Fig. 11, and the aforesaid disposing of the fingers on the members 1320 in operative positions representative of significant digits results from the seating of sensing fingers of the above described summation means on aligned steps Z of the templets, this all having been described previously.

Since the above referred to sensing bars 1324, Fig. 7, of the multiplying apparatus M forcibly engage positioned of the fingers on the members 1320, the upper ends of the receivers are passed between teeth 1320a, Fig. 13, of a comb 1320b, Figs. 7, 13 and 27, secured at the upper edges of the side plates 1124 and 1125. This not only effectively guides the receivers as 1141 at their upper ends but resists the forcible engagement of the sensing bars 1324 with the fingers on the members 1320 which is described presently.

Each of the positioning fingers on the positioning member as 1320 has four steps as 1325, Figs. 27, 42 and 43, thereon and the forward end of each sensing bar 1324, in the present instance, has ten steps as 1326 thereon. It is the inter-engagement of the steps 1326 and 1325 that determines the position assumed by the sensing bars 1324, such positioning of the sensing bars representing a digital count. It will be understood that there are as many sensing bars 1324 as there are positioning members 1320 and therefore receivers as 1141, each sensing bar being aligned with a receiver, or better, the positioning member on the receiver.

The sensing bars 1324 are mounted in comb blocks 1327 and 1328, Fig. 10, these comb blocks being mounted between the side frames 1134 and 1135. The comb blocks have as many slots therein as there are sensing bars 1324, there being six such bars in the present instance, as shown in Fig. 13. The slots in the comb bars are deeper than the vertical height of the sensing bars 1324 and mounted on each comb block is a bracket as 1329, Fig. 10, in which a roller as 1330 is journaled, the upper part of the peripheries of such rollers lying above the bottom of the slots in the comb blocks so that the sensing bars as 1324 ride on these rollers.

The steps 1326 on the ends of the sensing members 1324 are adapted to be moved into cooperating relation with the steps 1325 on the fingers of the aligned positioning members 1320 in order to determine the digital positions in which the sensing members 1325 are to be disposed, these digital positions being determined by the cooperation of the steps 1326 and 1325 in a manner to be described presently. The sensing bars 1324 are urged toward the positioning members 1320 by springs as 1331, Fig. 10, one end of each such spring being connected to a lug 1331' on the punch slide 1400 engaging the sensing bar 1324 as described hereinafter, and the other end of each spring being connected to a pin as 1332 carried by blocks as 1333 secured to the side frames 1134 and 1135.

A lug as 1334 depends from each sensing bar 1324 and engages a roller 1335, Fig. 10, mounted between the arms as 1336 of a rocker 1337 that is fast on a shaft 1338 journaled in the side frames 1134 and 1135. An arm 1339, Figs. 7 and 8, is fast on the shaft 1338 outwardly of the side frame 1135, this arm 1339 being adjustably connected to the shaft 1338, as shown best in Fig. 8, by a clamp plate 1340. A cam follower 1341 is carried by the arm 1339 and is urged into engagement with the periphery of a cam 1342 by a spring 1343 extended between the arm 1339 and a spring anchor on the side frame 1135. The cam 1342 is fast on the cam shaft 1280 and, as best shown in Fig. 8, includes a substantially radially extending edge 1344 which extends through the cam substantially to the hub thereof and provides a sharp drop on this cam.

In the course of operation of the machine the shaft 1280 rotates counterclockwise, as viewed in Fig. 8, and when the edge 1344 moves into alignment with the roller 1341 the spring 1343 causes the shaft 1338 to be rotated counterclockwise, as viewed in Figs. 7 and 8, and upon such counterclockwise movement of this shaft the roller 1335 starts to move to the left, as viewed in Fig. 10, and thereupon the springs as 1331 start to move the sensing bars 1324 in a direction such that the steps 1326 are moved into cooperating relation with the steps 1325.

If the positioning member 1320 aligned with a particular one of the sensing bars 1324 has not been moved downwardly and is in its uppermost position, it is representative of 0 and therefore the leading of the steps 1326 on this sensing bar 1324 engages the leading of the steps 1325 on the aligned positioning finger 1320—1 immediately after the sensing bars 1324 are freed to the action of the springs 1331 with the result that only the operating clearance between these steps is taken up. The movement incidental to this is not sufficient to cause the sensing bar to assume a position representative of a significant digit wherefore the sensing bar remains in its normal or at rest position which is indicative of 0, such positioning of the parts being shown in Fig. 51A.

Figure 51A:
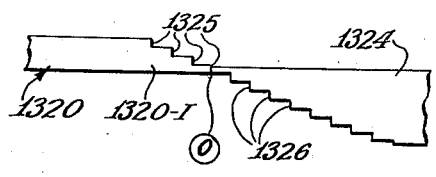
Figure 51F:
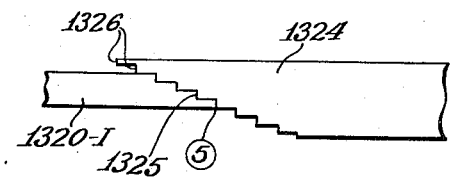
Figure 51B:
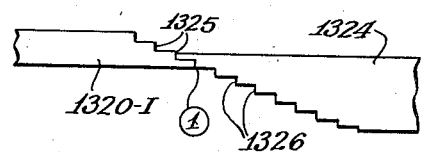
Figure 51G:
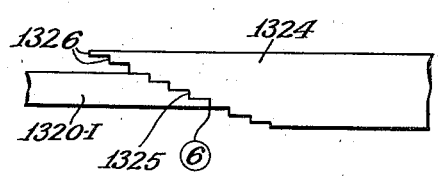
Figure 51C:
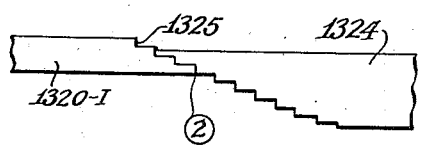
Figure 51H:
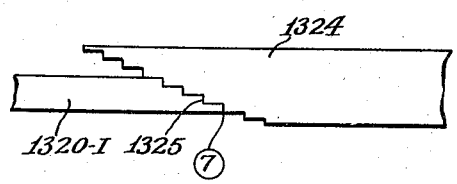
Figure 51D:
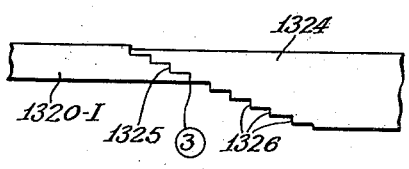
Figure 51I:
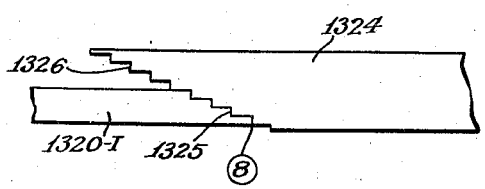
Figure 51E:
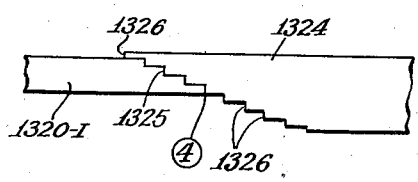
Figure 51J:
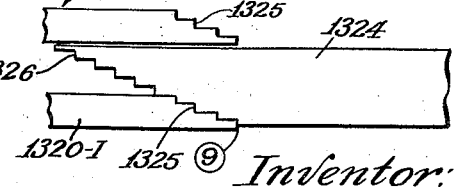

If, however, the aligned receiver has been moved into a digital position representative of 1, then the aligned positioning finger 1320—1 is in such a position that the second of the steps 1325 thereon is in position to cooperate with the leading step 1326 on the sensing bar 1324 and the engagement of these two steps arrests the sensing bar 1324 in a digital position representative of 1, the parts being shown in such position in Fig. 51B. The vertical extent of the series of steps 1326 is greater than the vertical extent of the series of steps 1325. Now as the positioning finger 1320—1 moves downwardly, as the receiver on which it is mounted moves downwardly, into positions representative of succeeding significant digits, the leading steps of the steps 1325 move below a position in which they may be engaged by the leading step 1326 and in such event the leading step of the steps 1326 engages the succeeding of the inward steps of the steps 1325. Depending upon how the steps 1326 and 1325 move into cooperative relation, the sensing bar 1324 is arrested in positions representative of the digits, such cooperation of the steps being such that the sensing bar 1324 successively comes to rest in positions representing significant digits in ascending order as more inwardly disposed of the steps on both the member 1320 and the bar 1324 interengage, the magnitude of downward movement of the associated receivers determining the particular digital value in each instance. The varying interrelation between the steps 1326 and 1325 to dispose the bar 1324 in positions representative of the various digits is shown in Figs. 51A to 51J. The numerals enclosed in circles in these views signify the digit which the bar 1324 is set to represent.

When a receiver moves downwardly in such an amount that it is in a position representative of ten digits, then the leading step 1325 on the positioning finger 1320—II moves into alignment with the leading step 1326 and in this instance again the aligned sensing bar 1324 is prevented from moving forward and is maintained in its zero position. However, the cooperation of the other of the steps 1325 on the positioning finger 1320—II with the steps 1326 on the aligned step 1325 again arrests this bar in positions representative of significant digits depending upon which of the steps 1325 or 1326 interengage in each instance.

What has been said with respect to the positioning finger 1320—II applies with equal force with regard to the positioning finger 1320—III, for when the leading step 1325 on this positioning finger is disposed in a position to engage the leading step 1326 the sensing bar 1324 is again arrested in a position representative of 0, for when this leading step 1325 is in this position the receiver carrying this positioning member is in a position representative of 20. It will of course be understood that cooperation of other of the steps 1325 on the positioning finger 1320—III with the steps 1326 on the aligned sensing bar disposes this sensing bar in positions representative of significant digits.

*Setting up and printing means of the variable printer*

It is the disposition of each sensing bar 1324 in a digit representing position that positions the digit printing type characters on the type segments 247 in printing relation with the platens 250, the operation of the platens 250 printing the variable data V on the sheets S from type characters on the type segments 247. Positioning of the type characters on the type segments 247 in printing position is effected through racks 1345, Fig. 10, slidably mounted, for the purpose to be explained presently, on each of the sensing bars 1324 but connected thereto through pin and slot connections, gear segments 1346 meshing with these racks. The gear segments 1346 are mounted on the shaft 248 for pivotal movement thereabout. Each type segment 247 includes an arm 1347, Fig. 10, which has an enlarged opening therein at the free end thereof through which a screw 1348 is freely passed, such screw being tapped into an adjacent gear segment 1346, this arrangement connecting the respective type segments and gear segments and affording adjustment therebetween to insure that the digit printing type characters on the type segments will be aligned in proper printing relation with the platens 250 when the related sensing bar is disposed in its various digital positions and also to insure proper alignment of the blanking character printing type characters, as will be explained. The arrangement is such that when the connected sensing bar 1324 is in its 0 position the type character on the connected type segment 247 for printing 0 will be in printing position, the type segments pivoting clockwise, as viewed in Fig. 10, to successively bring the type characters for printing the digits 1 to 9 into printing relationship with the platens 250.

In the present instance the variable data V which is printed on the sheets S is a sum of money which, of course includes two orders of cents and in the present instance four orders of dollars, the illustrated multiplying apparatus M being capable of printing only in six orders. A pin 247′, Figs. 10 and 14, is fast in one of the collars on which the type segments pivot and the upper end thereof lies in the printing plane of the type characters on the type segments 247 and serves to print a period (.) between the tens order of cents and the units order of dollars.

Now it is always desirable to print zeros in so far as cents are concerned when no significant digit appears in these orders, but in those instances where the sum of money does not extend into as many orders of dollars as there are type segments for printing orders of dollars, there being four such type segments in the present instance, it is desirable that blanking characters as stars or dollar signs be printed in those orders higher than that in which the first significant digit appears. In the present instance all type segments 247 from which digits in an order of dollars may be printed bear a blanking character BC, Fig. 14, which in the present instance is a star. Such a star is provided on these type segments in a position beyond the zero type character thereon and means are provided for bringing these blanking characters into printing position when the need so to do arises.

It is to be noted that the blanking character printing type characters are located in a position beyond zero position which requires, to position these characters in printing position, movement of the type segments 247 in a direction opposite to that in which such segments move to dispose the significant digit printing type characters in printing position. However, if the sensing bars 1324 were moved from their zero positions, in the direction required to bring the blanking character printing type characters into printing position, then punching means, described hereinafter and which are set up by the sensing bars, would be incorrectly positioned. Hence in order to permit the type segments 247 to be moved in the direction required to bring the blanking character printing type characters, hereinafter referred to as the blanking characters BC, into printing position without requiring corresponding movement of the sensing bars 1324, the following arrangement is provided.

The racks 1345, with which the gear segments 1346 mesh, and which gear segments operate to position the type segments, are mounted on the sensing bars 1324 for limited movement relative thereto, in a direction such that when a rack moves along the sensing bar on which it is mounted the associated gear segment acts to position the blanking character BC on the associated type segment 247 in printing position. To this end the lower edges of the blocks 1345′, Figs. 10A and 11A, on which the racks 1345 are formed, are slotted, as indicated at 1360′. Slots 1346′ are provided in the upper edges of the sensing bars 1324 and the slots in the bottoms of the blocks 1345′ embrace the bottoms of such slots so that the blocks 1345′ are movable along the sensing bars 1324 between the ends of the slots 1346′. Each block 1345′ also includes a depending leg 1347′ which overlies one face of the associated sensing bar 1324 and which has slots 1348′ therein. Pins 1349′ extend through the slots 1348′ and in cooperation with the slot in the lower edge of the block 1345′ holds the block against displacement.

The blocks 1345′ are normally held in the position, shown in Figs. 10, 10A and 12A, by springs 1350′ that are mounted in slots 1351′ provided in the sensing bars 1324. When a blanking character BC is to be disposed in printing position the associated block 1345' is moved against the action of the connected spring 1350' but at all other times the springs 1350' retain the blocks 1345' in such position that the blocks move with the sensing bars as if they were integral parts thereof.

The means which position the blanking characters BC in printing position include pawls as 1350, Figs. 10, 10A, 12A, 42 and 45, such pawls being provided for only in orders that pertain to dollars, it being understood that blocks 1345' are provided only for such orders, the racks 1345 being directly provided in the sensing bars 1324 for the orders pertaining to cents wherein 0, rather than a star or blanking character is printed. The pawls 1350 are pivotally mounted on a shaft 1351, Figs. 10, 10A, 12A and 45, carried by an arm 1352, Figs. 10 and 10A, of a bell crank lever, generally indicated by 1353, that is mounted on a stub shaft 1354 carried by the side frame 1134. The arm 1355 of the bell crank lever 1353 has a cam surface 1356, Figs. 10, 10A and 12A, thereon with which there is aligned a roller 1356', Figs. 9 and 12A, that is mounted on the shaft carrying the roller 1335, which shaft is mounted at the upper ends of the arms 1336 of the rocker 1337 and which rocker, as stated heretofore, is pivoted counterclockwise, as viewed in Figs. 10 and 10A, when the roller 1341, Fig. 8, travels down the edge 1344. Shoulders 1357, Figs. 10, 10A and 45, on the pawls 1350 are urged toward lugs 1349 on the racks 1345 on the sensing bars 1324 by the teeth of a comb spring 1358, Fig. 45, that is carried by a bracket 1359, secured to the side frame 1134, as shown, for example, in Figs. 7 and 10A. When the parts are in at rest position however the tapered ends 1357' on the pawls 1350 engage a pin 1358' carried by the bracket 1359' mounted on the frame, Fig. 10A.

The shoulders 1357 and the lugs 1349 are so spaced and located with respect to each other that when any dollar sensing bar 1324 is moved into a position representative of a significant digit the lug 1349, on the rack 1345 on this bar is disposed, to the left as viewed in Figs. 10 and 10A, beyond a position in which the shoulder 1357 on the aligned pawl 1350 can engage such lug. When, however, a sensing bar remains in its zero position, the lug 1349 on the rack 1345 on this bar remains substantially in the position shown in Figs. 10 and 10A, in which position the shoulder 1357 on the aligned pawl 1350 may engage therewith unless this pawl is rendered inoperative in a manner that will be described presently.

Each shoulder 1357 is adapted to seat on a lug 1349 on the aligned sliding block 1345' of the corresponding sensing bar 1324 in the event such bar remains in zero position at a time in the cycle of operation when this sensing bar should have attained a position representative of a significant digit, and such interrelation in timing of the parts is attained by reason of the fact that the roller 1356' is mounted on the same rocker as that which permits the springs 1331 to move the sensing bars 1324. This roller 1356' acts on the cam surface 1356 to pivot the bell crank lever 1353 in an amount sufficient to disengage the tapered side 1357' from the pin 1358' and thereby enable the teeth of the comb spring 1358 to seat the shoulders 1357 on the lugs 1349 on the racks 1345 on the sensing bars 1324 that are in zero position at the time described above. If a shoulder 1357 is seated on a lug 1349 the roller 1356' continues to move across the cam surface 1356 and in so doing pivots the bell crank 1353 in such a manner that the engaged lug and rack of which it is a part is moved to the right, as viewed in Figs. 10 and 10A. Such movement of the rack will act through the aligned gear segment 1346 to pivot the connected type segment 247 counterclockwise, as viewed in Fig. 10, which will bring the type character for printing the blanking character BC into printing position with the aligned platen 250, there being a dwell on the cam surface 1356 which retains this type character in this printing position until an impression has been made therefrom.

It will be recognized that when the pawls 1350 operate to move the racks 1345 in a direction such that a blanking character will be brought into printing position the power necessary for effecting this may be derived from the spring 1343, Fig. 8. If the pawls 1350 were moving several of the racks 1345, the spring 1343 would need overcome the effect of the several springs 1350'. In order to avoid making the spring 1343 sufficiently strong to enable this to be accomplished, I have provided an arrangement whereby, at a time when the pawls 1350 will be moving racks engaged thereby, direct drive may be imparted to the rocker 1337 to enable the necessary number of the racks 1345 to be moved. To this end a roller 1364, Fig. 8, is provided on the cam 1342 and at the time the racks should be moved by the spring 1343 this roller moves into engagement with a foot portion 1365 on an arm 1366, pivotally mounted on the shaft 1338 and having an arm 1367 fast to the arm 1339. The roller 1364 remains in engagement with the foot portion 1365 for a period of time sufficient to effect the necessary rearward movement of any racks 1345 connected to pawls 1350 and when the racks have been moved into the rearward position to be attained thereby, which is to say, at the time the roller 1356' is on the dwell of the cam surface 1356, the roller 1364 moves from the foot portion 1365 and again places the rocker 1337 under control of the spring 1343 and the cam 1342. A spring 1360, Figs. 7 and 10, acts on the bell crank 1353 to maintain the cam surface 1356 in engagement with the roller 1356' and insures proper positioning of the bell crank 1353 and therefore the pawls 1350 in the various operative positions attained by these parts in the operation of the machine.

In an instance where an amount such as 103.65 is to be printed, pawls 1350 will act in the just described manner to dispose the type segments pertaining to orders above the hundreds order of dollars in such position that the blanking characters thereon will cooperate with the aligned platens 250, and if some means were not provided for suppressing the action of the pawls 1350 the type segment pertaining to the tens order of dollars would be moved by the pawls to dispose the blanking character thereon in printing position. Therefore, in such an instance where a zero is to be printed in an order below the highest order in which a significant digit appears the pawls 1350 aligned with the sensing bars 1324 pertaining to such lower orders are rendered ineffective. To this end each pawl 1350 has a lug 1361, Figs. 10A, 12A, 44 and 45, thereon which extends beneath the pawl pertaining to the next lower order. Now it will be understood that when a lug 1349 passes beyond a position in which the shoulder 1357 on the aligned pawl 1350 can seat thereon then the lower edge of the pawl seats on the top edge of the associated lug 1349 and is therefore maintained in what may well be called an upper position. When any such pawl is retained in such an upper position the lug 1361 thereon engages the underside of the pawl cooperating with the sensing bar 1324 pertaining to the next lower order, this progressing on down to and including the units order of dollars from any pawl cooperating with any sensing bar pertaining to any order above the units order of dollars. The engagement of these lugs 1361 with the underside of these pawls 1350 holds all of such pawls 1350 in an upper position and prevents the shoulders 1357 thereon from seating on their cooperative lugs 1349 and therefore those type segments pertaining to orders of dollars below the highest order in which the significant digit appears remain with their type characters from which 0 may be printed in position to have zeros printed therefrom. No lug 1361 is provided on the pawl pertaining to the units order of dollars and no pawls 1350 are aligned with the sensing bars pertaining to cents. Therefore 0 will always be printed by the type characters on the type segments 247 pertaining to cents when these type segments are not set to print significant digits.

A type segment 247 is provided for each sensing bar 1324 but it is desirable to print a blanking character in the order above the highest order in which a significant digit will appear, this being particularly desirable in instances where checks are being printed to prevent "raising" thereof. In the present instance a type segment 247a, Fig. 14, is mounted in a position to print in what would be the ten thousands order of dollars and it is retained in a stationary position in which it disposes a type character for printing a star, that is, a blanking character, each time the platens 250 are operated.

By referring to Fig. 10 it will be seen that a sector 1362 is provided on each gear segment 1346 and that a notch 1363 is provided therein. In an instance wherein an arrangement such as that hereinabove described for printing blanking characters as BC is not to be included in the apparatus then it is desirable, in many instances, to suppress the printing of zeros in those orders above that in which the highest significant digit appears. For example, if the apparatus is being utilized to print bills, statements, payrolls or the like, where the likelihood of amounts printed being raised is remote, then the blanking character printing means is not employed and in such instances a zero suppressing mechanism is employed. The sector 1362 and the notch 1363 therein are part of a device operable to so suppress printing of zeros and the manner in which such sector and notch could be used for this purpose may be ascertained by reference to my aforesaid co-pending application Serial No. 221,841, wherein a zero suppressing mechanism is fully described, the sector 1362 shown herein corresponding to the sector 804 therein described and the notch 1363 in the sector 1362 corresponding to the notch 803 in the aforesaid sector 804. The sector 804 is part of the apparatus included in the auxiliary printing mechanism 672, Figs. 1 and 2, which is fully described in my aforesaid co-pending application and which will be described hereinafter with reference to the utilization of cards C that are characterized, by being punched, in the multiplying apparatus M, as will be described.

The sector 1362 is included in the present apparatus merely for the sake of uniformity in manufacture, for so to do enables identical parts to be used either in an apparatus where a zero suppressing mechanism is to be employed or in an apparatus such as that herein shown and described where means for printing blanking characters are provided, it being understood that one or the other of such arrangements is provided so as to care for impressions from type sectors pertaining to those orders above that in which the first significant digit appears.

After an impression has been made from the type characters on the type segments disposed in printing relation with the platens 250, in a manner to be described presently, the sensing bars 1324 and the type segments 247 are returned to their normal at rest or zero positions and in the present instance this is effected by engagement of the roller 1364, Fig. 8, with the arm 1339, this occurring in so far as the timing of the machine is concerned shortly after the roller 1364 has moved from engagement with the foot portion 1365. When the roller 1364 engages the arm 1339 it drives the rocker 1337 in a clockwise direction, as viewed in Figs. 8 and 10, and in so doing insures that the roller 1335 will engage the depending lugs or blocks 1334 and return the various sensing bars 1324 and the type segments 247 to their normal at rest, which is to say, zero positions.

The pawls 1350 are returned to a normal at rest position out of engagement with the racks 1345 in the course of movement of the rocker 1337 clockwise, as viewed in Fig. 10, and in the course of such movement tapered ends 1357' on these pawls ride into engagement with the pin 1358' which causes the pawls to ride up into the position shown in Fig. 10, which is the at rest position thereof.

When type characters on the type segments 247 are disposed in printing position they are located with respect to the platens 250, there being a platen 250 in alignment with each type segment. These platens are mounted for pivotal movement about a shaft 251, as has been previously stated. Each platen 250 includes an arm 1371, Fig. 10. Springs 1372 extend between these arms and pins as 1373 extend between the side frames 1134 and 1135, these springs serving to urge the arms 1371 into engagement with a roller 1374 mounted between the arms 1375 and 1376, Fig. 9, of a rocker, generally indicated by 1377. The rocker 1377 is pivoted on a shaft 1378, Fig. 10, that extends between the side frames 1134 and 1135 and springs as 1379 are effective thereon to urge the arm 1380 on this rocker into engagement with an abutment 1381 at the upper end of a lever 1382 that is pivotally mounted on a stub shaft 1383 carried by the side frame 1135. The lever 1382 has a cam follower 1384, Fig. 7, at the lower end thereof and the action of the spring 1379 urges this cam follower into engagement with the periphery of a cam 1385 fast on the cam shaft 1280.

In the course of rotation of the cam shaft 1280 the substantial radial edge 1386 thereon moves into alignment with the cam follower 1384 and thereupon the platens 250 are freed to the action of the springs 1372 that so act on the arms 1371 thereof that the platens are snapped toward the type characters on the type segments 247 in printing position to strike a sharp blow and thereby make a clear impression from these type characters through the ink ribbon IRa, thus printing the variable data V on the check S engaged with the stop finger 191, Fig. 2, the check having been so disposed by operation of the sheet feeding means disclosed in my co-pending application Serial No. 268,182, filed April 17, 1939, now Patent No. 2,211,772, patented August 20, 1940, which application is also a division of my aforesaid co-pending application Serial No. 221,841. After the cam follower 1384 has ridden down the edge 1386 a rise on the cam 1385 moves into engagement with the cam follower 1384 and thereupon the platens 250 are restored to their upper at rest position. A comb 1387 mounted on a block 1388 carried by the side frames 1134 and 1135 is arranged to have the platens 250 positioned in the slots between the teeth thereof, and this serves as a guide for the platens 250 in the movement thereof to effect a printing operation.

It is of course essential that the impression of the variable data V on a check S be neatly effected and to this end it is desirable that the various characters appearing in this data be accurately aligned one with the other. To this end notches 1389, Figs. 7 and 10, are provided in the face of the gear segment 1346 beyond the extent of the gear teeth therein and these notches are accurately located with respect to the type characters on the type segments 247, the uniform spacing of the type characters and notches and the adjustable interconnection between the type segments 247 and the gear segments 1346 afforded by the screw 1348 enabling this to be effected. A substantially V-shaped block 1390 extends between and ties together the arms as 1391 of a rocker that is pivotally mounted on the shaft 1392 and which rocker is acted on by a spring 1393 that urges an apex on the V-shaped block 1390 toward the notches 1389. A pin 1394 is provided in one of the arms 1391 and is passed through a slot 1395 at the upper end of a lever 1396 whereby a pin and slot connection is afforded between the lever 1396 and the arm 1391 carrying the pin 1394. The lever 1396 is mounted for pivotal movement about the shaft 1338 and has a cam follower 1397 at the lower end thereof which, under the influence of the spring 1393, is urged into engagement with the periphery of a cam 1398.

At a time in the cycle of operation after the type characters on the type segments 247 have been disposed in printing relation with the platens 250 and prior to the time these platens are freed to the action of the springs 1372, the substantially radially extending edge 1399 on the cam 1398 moves into alignment with the cam follower 1397 and thereupon the spring 1393 snaps the apex on the V-shaped block 1390 into the V-shaped notches 1389 related to the type characters in printing position, and since all of these notches are engaged by the same straight edged member and since, as has been stated heretofore, these notches are accurately positioned with respect to the type characters, it follows that the type characters on the type segments 247 are brought into accurate alignment one with the other so that a neat impression may be made therefrom.

*The punching mechanism*

In the present instance the sensing bars 1324 not only set up the type segments 247 so that an impression can be made from these type segments of an amount determined by an operation of the multiplying mechanism M but a card C, Fig. 105, is perforated for use, in the present instance, in the auxiliary printing mechanism 672, Fig. 1, a card perforated in the multiplying mechanism M being fed from this mechanism to the auxiliary printing mechanism 672 through a card guideway 1487. This affords a very flexible arrangement for it enables an auxiliary printing mechanism as 672 or the like to be located in any desired position along the course of travel of the sheets S through the machine and avoids the necessity of affording a direct mechanical connection between the auxiliary printing mechanism M and in fact avoids the need for having any type of interconnection between a record producing means such as the multiplying mechanism M and a record reproducing means such as the auxiliary printing mechanism 672 being built into the machine.

In the present instance where the additional record produced by the multiplying mechanism M is in the form of perforated cards C, such cards are fed into the proper relation with punch slides as 1400, Fig. 17, one such punch slide being connected to the forward end of each sensing bar 682 by having a key 1401 provided at the rear end thereof which fits into a complementarily formed socket (see Fig. 15) at the forward end of the sensing bar. Such slides are mounted in side by side relation in a block 1402, Fig. 16, which includes upstanding edges between which the punch slides 1400 are mounted for relative reciprocation, the block 1402 being fast in the bed plate 1403 of the punch unit.

Each punch slide 1400 is slotted at its forward end, as indicated at 1404, Fig. 18, this slot being enlarged inwardly of the forward edge of the punch slide and being arranged to define a die face 1405 and a punch face 1406 on opposite edges thereof. A punch as 1407 is passed through an opening 1408 leading to the punch face 1406, and a die opening 1409 is formed in the die face in alignment with the punch 1407. Each punch 1407 has a T-head 1410 at the upper end thereof, and these T-heads are mounted for reciprocal movement in T-shaped slots 1411, Fig. 16, provided in a block 1412 that is carried by a plate 1413 to which the upper ends of posts as 1414 are secured, the posts as 1414 extending through openings in the bed plate 1403 and having collars 1415 fast thereon, springs 1416 being disposed about the posts 1414 between the collars 1415 and the bottom of the bed plate 1403.

The punches 1407 are operated to produce perforations in the card C in accordance with the chart shown in Fig. 103 and in accordance therewith if a sensing bar 1324 remains in its zero or at rest position and the punch 1407 is moved toward a card C disposed between this punch and the aligned die opening 1409, a perforation will be made in a particular row on the card C in a position indicative of zero. Likewise, if a sensing bar 1324 is moved into a position representative of a significant digit, the punch 1407 in the connected punch slide 1400 will be moved across the column C' on the card C aligned therewith to produce a perforation in this column in a particular row across the card C at a position indicative of whatever digital value the connected sensing bar 1324 is set to represent.

Thus in the course of operation of the multiplying mechanism M, a cord C is fed into association with the punches 1407 and after it has come to rest to dispose the various columns thereon, in which perforations representative of digits are to be made, in a predetermined relation with the punches, the sensing bars 1324 are operated in the manner above described to be disposed in digit representing positions and after the bars have been disposed in such positions, which of course correspondingly positions the punches 1407, these punches are operated to produce the proper perforations in the card C.

Such operation of the punches 1407 is effected by a cam 1417, Fig. 12, fast on the cam shaft 1280 and having a substantially radially extending edge 1418 therein. In the course of rotation of the cam 1417 with the cam shaft 1280, the radial edge 1418 moves into alignment with a cam follower 1419 on the lever 1420. The lever 1420 is pivotally mounted at 1421, Fig. 10, on the side frame 1134 and has a roller 1422 at the end thereof opposite the end at which the cam follower 1419 is mounted, this roller engaging an abutment 1423 on a screw 1424 fast to a plate 1425 mounted at the lower ends of the posts 1414.

At the time the cam follower 1419 rides down the edge 1418, the springs 1416 act on the collars 1415 and force the plate 1413 and the block 1412 downwardly and thereupon the punches 1407 are forced downwardly to perforate the card C. When the dwell on the cam 1417 engages the cam follower 1419, the roller 1422 acts on the abutment 1423 and forces the posts 1414 upwardly and thereupon the punches 1407 are retracted back up into the openings 1408 and thereafter the card C that will have been perforated by the descent of the punches 1414 is ejected from the slot 1404.

The bed plate 1403 of the punch unit is supported in position to dispose the block 1402 thereon in such position that the punch slides 1400 will be aligned with the sensing bars 1324 and to this end two bars 1426 and 1427 are secured to the outer faces of the side frames 1134 and 1135, respectively, and these bars project forwardly into a position such that keyways 1428 and 1429 in the bottom of the bed plate 1403 may be fitted thereon. The keyways 1428 and 1429 are located accurately with respect to the location of the block 1402 and the connection of the bars 1426 and 1427 to the side frames 1134 and 1135 insures accurate positioning of the punch slides 1400 in alignment with the sensing bars 1324. In order that the digital positions in which the punches come to rest under control of the sensing bars 1324 may be accurately located with respect to the cards C, the bed plate 1403 is clamped onto the bars 1426 and 1427 and to this end a clamp plate 1430 is disposed on the other side of these bars and bolts 1431 pass through this clamp plate and are threaded into the bed plate 1403, the adjustable mounting resulting from this clamping permitting the necessary adjustment.

A supply of cards C is stored in a magazine 1432, Figs. 7, 13 and 16, which magazine corresponds in cross-section to the outline of the card C so that the cards may be neatly stacked in this magazine, a weighted follower 1433 resting on the cards to force the lowermost card in the magazine into cooperating relation with the card ejector now to be described.

A pair of posts 1434 project outwardly from the bed plate 1403 and afford a support for the slide 1435 of the card ejector. The top surface of this slide includes an inclined edge 1436, Fig. 19, at the inner end of which a plate 1437 is disposed, this plate being secured to the upper face of the slide 1435. At the point of merger of the inclined edge 1436 with the plate 1437 a shoulder 1438 is defined, which is of a height slightly less than the thickness of a card C. The slide 1435 is reciprocated along the posts 1434 in timed relation with the operation of the punch slides 1400 to insure ejecting of a card C from the magazine 1432 at a proper time in a cycle of operation of the machine, and to insure such timed operation of the slide 1435 it is operated under control of the cam shaft of the punching unit.

This cam shaft, which is indicated by 1439, Fig. 13, is journaled in brackets as 1440, Fig. 15, and has a bevel gear 1441, Fig. 13, fast thereon. This bevel gear 1441 meshes with a bevel gear 1442 fast to a shaft 1443 journaled in a swivel bearing 1444, Figs. 7 and 13, carried by the cam shaft 1439. A bar 1445 is secured to the swivel bearing 1444 and to a swivel bearing 1446 supported by the cam shaft 1280. A shaft 1447 is journaled in the bearing 1446 and is connected to the shaft 1443 by a sleeve 1448, the sleeve 1448 enabling adjustment of the bed plate 1403 along the bars 1426 and 1427 in the manner above described. A bevel gear 1449 on the shaft 1447 meshes with a bevel gear 1450 fast on the cam shaft 1280. Thus each time the cam shaft 1280 is rotated the cam shaft 1439 is rotated, the ratio of the gears in the train of mechanism interconnecting these cam shafts one to one so that the cam shafts 1280 and 1439 rotate in synchronism with each other.

A crank 1451, Fig. 13, is fast on the cam shaft 1439 and one end of a link 1452 is connected to this crank, the other end of this link being connected by a universal joint 1453 to the arm 1454 of a bell crank 1455 that is pivotally mounted on a block 1456 which is carried by the bed plate 1403. The arm 1457 of the bell crank 1455 has a slot 1458 therein in which a roller 1459 on a pin 1460 depending from the slide 1435 is arranged.

In each revolution of the cam shaft 1439 the crank 1451 acts through the link 1452 and universal joint 1453 to rock the bell crank 1455 whereupon the roller 1459 travels through the slot 1458 and a reciprocatory movement is imparted to the slide 1435. The normal at rest position of the slide 1435 is shown in Fig. 16 and in the first part of the reciprocatory movement imparted thereto this slide retracts to a position such that the shoulder 1438 lies behind the lowermost card in the magazine 1432. This shoulder is of less height than the thickness of the card and in the remaining portion of the reciprocatory movement of the slide this shoulder advances the lowermost card out of the magazine 1432 into the bite of a pair of feed rollers described presently. As the lowermost card passes from the magazine 1432 it travels below a stripper finger 1461 carried by a cross bar 1462, Figs. 13 and 16, and this stripper finger serves to prevent any save the lowermost card in the magazine 1432 being advanced therefrom by the shoulder 1438 on the slide 1435.

A recess 1463 is formed in the upper surface of the bed plate 1403 slightly forward of the discharge end of the magazine 1432 and a roller 1464 is mounted in this recess. A shaft 1465, Figs. 13 and 16, is journaled in suitable bearings provided on the upper surface of the bed plate 1403 in vertical alignment with the roller 1464 and a roller 1466 having a friction surface is carried by this shaft to have the periphery thereof maintained in clamping relation with the roller 1464, and to this end the bearings in which the shaft 1465 are journaled are carried by a substantially U-shaped bracket 1467, Figs. 13 and 15, which is acted on by a leaf spring 1468 that is secured to the bed plate 1403, this leaf spring acting through the bracket to apply sufficient tension on the roller 1466 to insure tight clamping of a card C between the rollers 1464 and 1466 when a card is ejected from the magazine 1432 by the shoulder 1438. The rollers 1464 and 1466 are disposed in such position with respect to the magazine 1432 that a card C ejected from the magazine 1432 moves into the bite between these rollers prior to the time the shoulder 1438 has attained its forwardmost or at rest position, and when a card is passed into this bite it is rapidly fed forward to engage a stop finger 1469, Fig. 13.

The stop finger 1469 is carried by a leaf spring 1470 which, as are the other leaf springs referred to herein, is clamped between a pair of blocks that is secured to the rear edge of the bed plate 1403, as indicated at 1471, Fig. 10. A cam 1472, Fig. 21, is fast on the shaft 1439 and a pin 1473 rides on the periphery of this cam and engages the underside of the stop finger 1469 and at a predetermined time in the course of rotation of the cam shaft 1439 a rise on the cam 1472 engages the pin 1473 and elevates the stop finger 1469 whereupon a card C which has been engaged thereby is ejected into a suitable card receiver or, as in the present instance, is fed into a card guideway to pass to some other position in the machine where an operation will be performed under control of this card, as is done in the present instance in the auxiliary printing mechanism 672. The stop finger 1469 is normally in lowered position to insure engagement of a card C fed from the magazine 1432 therewith, this stop finger only being raised when a card is to be ejected from association with the punches 1407, it being understood that when a card is engaged with the stop finger 1469 the respective columns thereon are properly aligned with the respective punches in the various punch slides 1400.

In order to insure that a card will pass from association with the stop finger 1469, when this stop finger is elevated, another recess 1474 is provided in the upper surface of the bed plate 1403 and a roller 1475 is journaled therein. A substantially U-shaped bracket 1476, Fig. 22, has oilless bearings as 1477 provided therein and a shaft 1478 is journaled in these bearings in vertical alignment with the roller 1475, a roller 1479 having a friction periphery being carried by this shaft for engagement with the roller 1475. The bearing structure provided for the roller 1479 is like that provided for each of the other card feeding rollers employed in the machine. A bracket 1476 is connected to the bed plate 1403 by a leaf spring 1480, this mounting corresponding to the mounting 1471 described hereinabove.

Another cam 1481, Fig. 13, is provided on the cam shaft 1439 and a pin 1482 extends between the periphery of this cam and the underside of the bracket 1476. At a predetermined time in the cycle of operation of the cam shaft 1439 and after the stop finger 1469 has been elevated, the pin 1482 rides off a rise on the cam 1481 and thereupon the bracket 1476 is pivoted by the spring 1480 to urge the roller 1479 toward the roller 1475 whereby a card C clamped in the bite between these rollers will be rapidly ejected from the position in which it is disposed when it is engaged with the stop fingers 1469. It will of course be understood that the rollers 1466 and 1479 are rapidly rotated in the course of operation of the machine, as will be explained presently.

When a card C is ejected from the magazine 1432 by the shoulder 1438 and is picked up by the rollers 1464 and 1466, the card passes into oppositely faced bifurcations 1483 and 1484, Fig. 21, respectively provided in strips 1485 and 1486 secured to the top of the bed plate 1403, the bifurcations 1483 and 1484 providing a card guideway. If the cards C are to be utilized in some machine other than that in which they are perforated, the guideway afforded by the bifurcations 1483 and 1484 leads to a suitable card collector, but in the present instance where the cards C are to be utilized in controlling the operation of another mechanism, as the auxiliary printing mechanism 672 in the present instance, a guideway for the cards leads from the mechanism in which the cards are perforated (the mechanism associated with the punches 1407 in this instance), to a card guideway in the mechanism in which the cards C are to control the operation of another mechanism (the auxiliary printing mechanism 672 in this instance).

Thus in the present instance a card guideway 1487, Figs. 1 and 2, leads from the card guideway afforded by the bifurcations 1483 and 1484 to a card guideway, generally indicated by 673, Fig. 2, of the auxiliary printing mechanism 672. Cards passed into the guideway 673 move into engagement with a stop finger 674 to be held in position to have the perforations thereof sensed by the sensing means of the auxiliary printing mechanism 672.

Rollers as 1488, Fig. 2, are provided at suitably spaced intervals along the card guideway 1487 to insure that the cards will rapidly pass through this guideway 1487. The spacing of the rollers as 1488 is preferably such that as the momentum imparted to the card by one roller is being lost the card will be engaged with the succeeding roller. This arrangement avoids the necessity of providing rollers in such positions that a card will pass directly from engagement with one roller and into engagement with another for so to do would entail variation of the position of the rollers as 1488 each time the card size was varied. It will be understood that the rollers 1488 are carried by shafts as 1489 which are journaled in a manner similar to that in which the shaft 1465 is journaled.

The rollers as 1466, 1479 and 1488 are rotated rapidly in order to insure rapid feeding of the cards through the guideway, and to this end a pulley as 1507, Figs. 1 and 2, is fast on the end of each shaft carrying such a roller at the end of the shaft opposite the end thereof on which such a roller is mounted. A belt 1508 is passed about all of these pulleys preferably in the manner illustrated in Figs. 1 and 2, and belt tightener pulleys as 1509 act on this belt at suitable positions to insure proper engagement thereof with the peripheries of the pulleys as 1507. A pulley 1510 is fast on the shaft 221, Figs. 1 and 2, that receives power from the pulley 220 fast on the main drive shaft 19, through a belt 218, so that as long as the main drive shaft 19 is in operation the belt 1508 is operated to thereby rapidly rotate the rollers 1466, 1479 and 1488.

FORM PRINTING UNIT, FIGS. 107 TO 112

The multiplying apparatus thus far described is particularly, though not necessarily, adapted for use in the machine shown in the accompanying drawings and when so used the apparatus as a whole is operated in timed relation with other operative parts in the machine and the various operative devices in the apparatus are operated in timed relation with each other, such timed relation of such devices being correlated with the timing of other operative parts in the machine. The timing of the operation of the various operative parts in the machine, as well as the timing of the various operative devices in such operative parts, is under control of means associated with the form printing unit U. Thus, while the present invention primarily pertains to the multiplying apparatus M and while this apparatus may be used in other ways than in the particular machine shown in the accompanying drawings, the form printing unit and its operative functions are now to be described for so to do will facilitate describing the operation of the multiplying apparatus, both in so far as the operative devices included therein are concerned and in so far as the operation of the multiplying apparatus is related to the operation of other operative parts in the machine. This will also facilitate utilization of this multiplying apparatus in ways other than in the machine illustrated in the accompanying drawings should this be desired.

Constantly reoccurring data such as the form F on the sheet S. Fig. 5, may be printed on the sheets in a vide variety of ways and, for example, this might be done in a printing mechanism such as disclosed in U. S. Letters Patent No. 1,955,814, or in a printing mechanish such as is shown U. S. Letters Patent No. 2,165,535, patented July 11, 1939, but in the present instance I have employed a well-known printing unit, one form of which is indicated at U, Fig. 1, and which is illustrated for the purpose of the present description in Figs. 1, 2 and 107 to 112. Reference may be made to, for example, U. S. Letters Patent 816,311, 970,411, 990,207, 1,031,311, 1,094,065, 1,148,940, and 1,647,560 for a disclosure of the full details of a printing unit such as the unit U.

The unit U is mounted on bars as 243, Figs. 1 and 107, in a fixed position longitudinally of these bars which have recesses as 244 provided therein to receive a bar 245, this bar being tightly clamped in the recesses by clamps as 246. The bar 245 is mounted on the upright 259 of the frame 15 in a fixed position and, by loosening the clamps as 246, the bars as 243 and, therefore, the printing unit U may be slid therealong to properly locate the printing means in the printing unit U to make impressions on the sheets at the proper and required positions thereon. The printing unit U is prevented from pivoting about the bar 243 by a bar 1042 that depends from the frame thereof and which engages the adjacent end of the frame 15 as shown in Fig. 1.

The printing means of the printing unit U includes a rotatable drum 1043, Fig. 110, which, in the manner described, for example, in U. S. Letters Patent No. 816,311, patented March 27, 1906, has suitable impression means or printing members secured on the periphery thereof. Such printing members may be located on the periphery of the drum 1043 as required and in the present instance are located on the periphery of the drum in such positions that when sheets are admitted into the bite between this drum and its cooperating platen roller 1044, Fig. 110, the form F will be printed on the checks or sheets S at the proper and required positions thereon. This of course entails locating the impression means on the periphery of the drum in such locations that as the drum starts from its at rest position and a sheet starts to pass thereto from a given position, the leading edge of the sheet will engage the bite between the drum 1043 and the platen roller 1044 at a time when the leading impression means on the drum is spaced from the bite in the same amount as the portion of the sheet that is to receive such impression, all of the foregoing being standard practice in the art and for further description reference may be made to U. S. Letters Patent 816,311 or 990,207.

Sheets are admitted into the bite between the drum 1043 and the platen roller 1044 from the aforesaid given position, by a gate generally indicated by 1045 which in the present instance embodies a plate including a depending lip that is adapted, when it is in stopping position, to rest on a roller 1046, sheets passing from the guideway through which they move to and from association with the platen P into engagement with the gate 1045 when the stop finger 211, Fig. 2, is retracted from stopping position with respect to the leading edge of a sheet disposed beneath the platen P.

It will be manifest from the foregoing that the gate 1045 must operate in properly timed relation with the rotation of the drum 1043 in order to insure that sheets stopped by the gate will be admitted into the bite between the drum 1043 and the platen roller 1044 at the proper time and to this end a cam 1047 is fast to one end of the drum 1043, Fig. 111. This drum 1043 is mounted on a shaft 1048 that is journaled in the side plates 1040 and 1041 and is rotated in the manner now to be described.

A gear 1049, Fig. 110, is fast to one end of the drum 1043 and meshes with a pinion 1050 that is mounted on a stub shaft 1051 carried by one of the arms 243. The pinion 1050 in turn meshes with a pinion 1052 rotatably mounted on a shaft 1053 fast in the arms as 243. A pulley 1054 is also rotatably mounted on the shaft 1053 and is interconnected with the pinion 1052 in such a way as to enable adjustment of the position of the pulley 1054 along the shaft 1053 without interrupting driving connection between the pinion 1052 and this pulley. An endless belt 1055 is passed about the pulley 1054 and over guide pulleys 1056 and 1057, Fig. 107, mounted on a bracket 1058 carried by the upright 259, and from the guide pulleys 1056 and 1057 the belt passes to and about a pulley 1059 fast on the main drive shaft 19. It will therefore be seen that the drum 1043 is driven, as are other operative mechanisms in the machine, from the main drive shaft 19.

The drum 1043 is rotated continuously whenever the main drive shaft 19 is in operation and therefore the cam 1047 fast on this drum also rotates continuously. This cam includes a dwell 1060 and a rise 1061. A roller 1062 mounted on an arm 1063 is engageable with this dwell and rise to operate the gate 1045. This is accomplished by securing the arm 1063 to a shaft 1064 journaled in the side plates 1040 and 1041 and securing an arm 1065 to this shaft 1064. The arm 1065 has an abutment 1066 thereon that is engaged by an adjusting screw 1067 carried by an arm 1068 which is mounted on a shaft 1069 that is also journaled in the side plates 1040 and 1041. Brackets as 1070 are also secured to this shaft 1069 and the gate 1045 is carried by these brackets.

Thus, whenever the roller 1062 moves from the dwell 1060 onto the rise 1061, the gate 1045 is pivoted from stopping position shown in Fig. 110 into open position shown in Fig. 111, and such elevation of the gate releases a sheet engaged therewith into the bite between the drum 1043 and the platen roller 1044.

In order to insure that a sheet S will feed forwardly when the gate 1045 is moved from sheet stopping position into the bite between the drum 1043 and the platen roller 1044, a roller 1071 is mounted on a shaft 1072, also journaled in the side plates 1040 and 1041. The roller 1071 is engaged with the roller 1046, on which the gate 1045 rests when it is in sheet stopping position, to clamp the sheet between the rollers 1046 and 1071 and thereby insure feeding of the sheet. The roller 1046 moves upwardly into clamping relation with the roller 1071 whenever the gate 1045 is raised by reason of the fact that this roller 1046 is carried by the arm 1065 which carries the abutment 1066 that causes elevation of the gate 1045. The roller 1071 is of course driven and in this regard attention is directed to Fig. 112 wherein it will be seen that a pinion 1073 is fast on the shaft 1072 which carries the roller 1071. This pinion 1073 meshes with an idler pinion 1074 carried by the side plate 1040, which idler pinion in turn meshes with a gear 1075 fastened to the platen roller 1044 to rotate therewith, this gear 1075 also meshing with the main driving gear 1049 that is secured to the drum 1043 and which drives the entire mechanism. The interposition of the idler pinion 1074 between the gear 1075 and the pinion 1073 insures that the roller 1071 will rotate in such a direction that it will accurately and effectively feed a sheet freed from the gate 1045, when the gate is moved to open position, into the bite between the drum 1043 and the platen roller 1044. These parts operate in such a manner that a sheet S fed by the roller 1071 moves at the peripheral speed of the drum 1043 to insure that the sheet will be properly engaged in the bite between the drum 1043 and the platen roller 1044.

The shaft 1076 on which the platen roller 1044 is mounted is eccentric so as to support the platen roller 1044 for movement toward and away from the periphery of the drum 1043. Movement is imparted to this shaft through the cam and link arrangement illustrated in Fig. 1 to prevent the formation of offsets on the platen roller, this being standard construction in printing units of this kind and being described in detail in U. S. Letters Patent 1,148,940 and 1,647,560.

In Fig. 110 an arrangement is illustrated for applying ink to the impression means or printing members carried on the drum 1043, such inking means also being well understood in the art, a detailed description of an inking means suitable for this purpose being set forth in U. S. Letters Patent 1,031,311.

It is to be noted that, of the various operative mechanisms provided in the machine, the only one which is constantly operated when the machine is in operation is the printing unit U and, more specifically, the drum 1043 and its associated mechanisms in this unit. This drum rotates at a constant given speed which is selected according to the productive capacity desired of the machine. For example, if it should be desired that one hundred sheets, such as the checks S, Fig. 5, each bearing but a single impression of changeable data, are to be produced per minute, then the drum 1043 is rotated at a speed of 100 revolutions per minute. In any event, however, the speed of rotation of the drum 1043 is such that the drum will make a complete revolution each time the platen P is to be operated to make an impression so that if, for example, as in the present instance, the drum 1043 is operated at the rate of 100 revolutions per minute and a sheet as the check S receives an impression only in every other operation of the platen P, then the productive capacity is fifty sheets per minute in the condition where the drum is rotating at this speed of 100 revolutions per minute. This same thing would be true if two impressions were made on this sheet and if in this instance the speed of the drum 1043 were maintained at 100 revolutions per minute the productive capacity of the machine would again be fifty sheets per minute. By way of further example, if four impressions were made on each sheet and the drum speed were 100 revolutions per minute, then the productive capacity would be twenty-five sheets per minute.

From the foregoing it will be apparent that the productive capacity of the machine in so far as the number of sheets produced is concerned, is based upon the speed of rotation of the drum 1043, and it is therefore advantageous to operate this drum at as high a speed as possible consistent with the production of satisfactory work in the printing unit U.

If the machine of the present invention only printed sheets such as the checks S and no proof sheets were produced therein and but one impression of changeable data were made from each printing and control device fed into printing position below the platen P, the machine, in the nomenclature of this art, would be set for consecutive work. However, if two impressions are to be made on each sheet, such as the check S, from each printing and control device or if, as in the present instance, one impression is made from each printing and control device onto sheets S and another impression is made onto a proof sheet such as 901, then in this instance the machine is set for what is known as duplicate work. In other words, the number of impressions that are to be made from each printing and control device fed into printing position below the platen P determines whether the machine is to be set for consecutive, duplicate, triplicate, quadruplicate or other type of work, and in the present instance where two impressions are made from each printing and control device that comes to rest in association with the platen P, the machine is set for duplicate work. This means that the drum 1043, in the present instance, makes two revolutions for each sheet ejected from the machine but nevertheless, as will always be the case, the drum 1043 makes one revolution for each impression operation of the platen P.

Thus in order to insure that sheets will pass through the machine and have operations performed thereon in such a way that sheets will be produced consistent with the type of work being performed, that is, consecutive, duplicate, triplicate, and so forth, the various mechanisms in the machine are timed to operate in accordance with the speed of rotation of the drum 1043 and, in order that this may be effected, the devices which control operation of the various mechanisms in the machine are placed under control of the drum 1043 and mechanisms associated therewith.

In connection with the foregoing it should be noted that in most instances heretofore where printing machines, of the class to which this invention pertains generally, were arranged to operate under conditions of consecutive, duplicate, triplicate and similar work, variations in the operative speed of the machine and variations in the time of operation of the various mechanisms provided in the machine were usually accomplished by altering gear ratios for usually the various operative mechanisms in machines of this type were operated from a common source and in timed relation with each other and usually geared interconnections were employed to insure the maintenance of proper timed relation. In contradistinction to this, in the present machine the various operative mechanisms in the machine, while in most instances deriving power from a common source, are not interconnected by gear interconnections. Instead of resorting to such a construction, each of the various operative mechanisms has an independent control for connecting the operative portions in the mechanism with the source of power and in this connection it should be noted that if so desired a separate source of power could be provided for each and every one of the various operative mechanisms in the machine, the utilization of a main drive shaft such as the main drive shaft 19 merely being an expeditious way of affording a source of power.

Since, in the present machine, the various operative mechanisms receive power through suitable controls, and more specifically clutches, provided in each of the mechanisms, and since these clutches are electrically controlled, by means of solenoids, it is possible to associate the regulating means, for the controls or clutches of the mechanisms to be timed relative to the printing unit U, directly with the printing unit U, these regulating means being in the form of switches for controlling the closing of the circuit to the solenoids of the clutches. To this end a shaft 1078, Fig. 107, is journaled in suitable bearings provided on the outer face of the side plate 1041. This shaft has a bevel gear 1079 thereon that meshes with a bevel gear 1080 fast to a gear 1081 that meshes with the pinion 1077 rotatably mounted on the shaft 1048 to which the drum 1043 is fast. Cam discs 1082, 1083, 1085 to 1087 and 1087S are fast on the shaft 1078 to be rotatable therewith. These cam discs, as will be explained in further detail hereinafter, operate the switches that control operation of various operative mechanisms in the machine.

In the present instance where the machine is set for duplicate work, as has been explained hereinabove, the ratio between the gears 1077 and 1081 is two-to-one and, since the ratio between the bevel gears 1080 and 1079 is one-to-one, the shaft 1078 and the various discs fast thereon make one revolution for each two revolutions of the drum 1043 and its shaft 1048.

It will be remembered that the gate 1045 in the printing unit U is moved to and from sheet stopping position under control of a cam 1047 fast to the drum 1043 and it will therefore be understood that the gate 1045 is opened at predetermined times in the course of rotation of the drum 1043. Now in order that sheets passing from the sheet guideway G to the gate 1045 will be fed into engagement with this gate when it is in sheet stopping position, so that when the gate is elevated a sheet may be fed into the bite between the drum 1043 and the platen roller 1044 at the proper time, it is of course essential that the means controlling the feed of sheets to the gate 1045 be operated in timed relation with the operation of this gate and it will be manifest that it is essential that such timed relation be maintained, it also being understood that the various operating mechanisms in the machine are timed to operate in definite timed relation with the means which feed or release the sheets for passage to the gate 1045.

Therefore, in order to insure that definite timed relation between the operation of the gate 1045 and the various other operating mechanisms in the machine will be assured, an arrangement is provided such that the angular relation between the shaft 1078 and the drum 1043 will always be the same at the beginning and at the end of a complete rotation of shaft 1078, which is to say, such that there will exist a definite relation between a given point on a member fixed on the shaft 1078 and a given point on the drum 1043 and, by way of further example, the angular relation between the lobe or lobes on the cam discs 1082, 1083, 1085 to 1087 and 1087S, and the inclination adjacent the rise 1061 on the cam 1047 will have a fixed value at the beginning of each and every 360 degrees of rotation of shaft 1078.

This is accomplished in the present instance by providing a clutch generally indicated by 1088, Figs. 107 and 108, which functions in such a manner that the shaft 1078 is always connected to the shaft 1048 in an identical manner. The clutch 1088 in the present instance includes the gear 1077 which, as stated heretofore, is rotatably mounted on the shaft 1048, this gear including a hub 1089 having clutch teeth 1090 thereon that are urged toward clutch teeth 1091 on a collar 1092 fast on the shaft 1048. The clutch teeth 1090 are urged toward the clutch teeth 1091 by springs 1093 disposed about pins 1094, that are fast in a disc 1095 and axially slidable in the gear 1077. The springs 1093 are disposed between the disc 1095 and the gear 1077 and serve to urge the disc into engagement with the side plate 1041 as well as to urge the clutch teeth 1090 toward the clutch teeth 1091.

A pin 1096 fast in the hub 1089 engages a cam surface on the plate 1097, pivotally mounted as indicated at 1098 and urged toward the periphery of the hub 1089 by a spring 1099. This arrangement affords a clutch structure equivalent to that disclosed in my co-pending application Serial No. 239,561, filed November 8, 1938, now Patent No. 2,265,133, patented December 9, 1941. The plate 1097 extends between spaced pins 1100 provided on the core 1101 of the solenoid 1102. When the solenoid is energized the plate 1097 is retracted from engagement with the pin 1096 and thereupon the springs 1093 urge the gear 1077 and hub 1089 and the clutch teeth 1090 on the hub toward the clutch teeth 1091 on the collar 1092.

Urging of the clutch teeth 1090 toward the clutch teeth 1091 does not necessarily promptly connect the gear 1077 with the shaft 1048 for, as has been explained heretofore, it is essential that the angular relation between the shaft 1048 and the shaft 1078 be maintained. In view of this the clutch teeth 1090 are provided on but one-half of the end of the hub 1089 and likewise the clutch teeth 1091 are provided on but one-half of the adjacent face of the collar 1092. The remaining portions of the adjacent faces of the hub and collar are flat and, until each and every one of the clutch teeth 1090 are aligned with each and every one of the clutch teeth 1091, the flat faces on the hub and collar prevent the clutch teeth from interengaging. When the clutch teeth are all aligned the shaft 1078 is connected to the shaft 1048 to rotate therewith. This can only occur at one point in the revolution of the shaft 1048 and, therefore, each time the clutch teeth 1090 engage the clutch teeth 1091 to establish interconnection between the shafts 1048 and 1078, these shafts are interconnected in the same angular relation and, since the angular relation between these shafts is maintained constant, it follows that the timing of the mechanisms under control of the cam discs 1082 to 1087 fast on the shaft 1078 is always in the same relation with the operation of the gate 1045.

The sheet feeding unit includes a cam shaft 195, Fig. 2, that controls the raising and lowering of the stop fingers 191 and 211 and the operation of means which feed the sheets, as the check S, to and from association with such stop fingers. This cam shaft 195 must, of course, operate in timed relation with other operative devices in the machine. Hence this cam shaft has a bevel gear 288, fast thereon which meshes with a bevel gear 229 fast on the shaft 230 journaled in suitable bearings on the frame of the printing unit U. Another bevel gear 1103 is fast on the shaft 230 and this bevel gear meshes with a bevel gear 1104 fast on the shaft 1078. The angular relation between the cam shaft 195 and the shaft 230 is always maintained constant and a definite angular relation is established between the shafts 230 and 1078 at the time the gears 1103 and 1104 are respectively fast to these shafts and it therefore follows that the angular relation between the cam shaft 195 and the shaft 1078 will be maintained constant. Thus the operative devices under control of the cam shaft 195 are also operated in timed relation with the drum 1043, which is to say, the gate 1045.

It is to be noted that the only geared interconnection between operative devices in the machine and the drum 1043 is that established with the cam shaft 195 and therefore when the machine is initially placed in operation, which is to say, when the main motor 14 is set in operation, this motor need only pick up the drum 1043. Moreover, when the clutch 1088 is closed it only picks up the shaft 1078 and the shafts 230 and 195, all of which parts are relatively light, and from the foregoing it will be seen that shocks incident to placing the machine of this invention in operation are reduced to a minimum, which is in contradistinction to arrangements that have heretofore been resorted to in printing machines of the above described type and wherein geared interconnections were established between various operative mechanisms in the machine for it will be appreciated that there is considerable shock incident to the picking up of a plurality of operative mechanisms interconnected by geared interconnections.

PAGER AND PROOFER, FIG. 106

While the pager and proofer apparatus is fully illustrated and described in my co-pending application Serial No. 221,841, filed July 28, 1938, it is nevertheless briefly described herein with particular reference to the relation thereof, in the present machine, with the multiplying apparatus M.

In instances where, for example, as in the present instance, checks are being printed and in many other operations, it is desirable to preserve a record of what has been printed on sheets as S and to this end what is known as a proof sheet is prepared. Such proof sheet is usually prepared in the form of a web and this web is subsequently divided at predetermined intervals to afford sheets or pages of uniform size that may be conveniently bound, as in loose leaf binders or the like, to thereby afford a permanent record of what is printed in the course of a run of the machine. Mechanisms which so print on webs and which divide the webs into pages affording proof sheets have come to be known as pagers and proofers and such mechanism may be included in the present machine.

A pager and proofer is not utilized in all instances and it may therefore be viewed as an attachment, and for this reason the pager and proofer is not shown in the general views, Figs. 1 and 2. The pager and proofer is eliminated from these views not only because it may be considered to be an attachment but for the additional reason that the illustration of this mechanism would have concealed other of the operative portions of the machine and more would have been lost by illustrating the pager and proofer in these general views than would have been gained by such illustration. However, it will be understood that the pager and proofer, in the present instance, is arranged in such a manner that impressions are made on the web handled thereby by the platen P and by referring to the general views to determine the general location of the platen P it may be determined at what position in the machine the pager and proofer would be provided.

The pager and proofer shown in Fig. 106 is generally indicated by 900 and operates to produce a proof sheet such as is fragmentally illustrated in Fig. 6 and which is indicated by 901, this proof sheet passing through the machine in the form of a web 901—W, Fig. 106.

In the present instance the web 901—W is withdrawn from a roll 901—R which is rotatably mounted in a stand 902. This stand comprises spaced upright brackets which have bifurcations as 903 in the upper edges thereof and pairs of rollers as 904 are mounted on the stand adjacent the bottom of these bifurcations so that a shaft 905 on which the roll 901—R is supported may rest on these rollers to thereby afford a frictionless support for the roll, and in this way inertia incident to the withdrawal of the web 901—W from the roll is substantially reduced.

In the present instance the web 901—W is withdrawn from the roll 901—R and passed about a roller 906 in the stand 902 and from this roller the web is led across the bottom of the machine to a roller 907 carried by brackets as 908 which are secured to uprights as 258 of the frame 15. From the roller 907 the web passes to a roller 909 mounted between side plates as 910 which depend from the side plates as 912 of the pager and proofer unit. From the roller 909 the web is led under a roller 917 which is the movable part of a web looper that also includes a roller 919 being carried by the shaft 918 over which the web 901—W is led from the roller 917. The roller 909 has friction means such as rubber bands provided on the periphery thereof to insure good frictional engagement thereof with the web 901—W. Suitable means are provided for setting the roller 909 in operation to withdraw the web 901—W from the roller 901—R to thereby feed the web to the looping roller 917, such operation occurring whenever the loop in the web between the rollers 909 and 919 is reduced in size.

The web 901—W is led from the roller 919 to a roller 928 which is supported by the side plates as 649 of the platen structure. The web is also led around other rollers in the platen structure and is then led to means, described in my last above referred to co-pending application, which divide the web into proof sheets as 901.

As the web 901—W passes from the roller 928 it is led over the impression face of the platen P, the web being of such a width and so extending across such impression face that impressions may be made thereon from a printing and control device D disposed on the anvil 264, Fig. 69, the type characters on the type wheels of the numbering device 652, Fig. 70 (described in my aforesaid co-pending application Serial No. 221,841), and from the type on the type segments of the auxiliary printing mechanism 672, Fig. 1. Such impressions are made on the proof sheet web 901—W in the second of the operations of the platen P on a printing and control device moved into co-operating relation therewith. In the first of such operations of the platen an impression is made from such a printing and control device onto the sheet, as the check S, which has had the variable data V printed thereon, in the multiplying apparatus M, under control of the particular printing and control device now associated with the platen. After such impression has been made on the check S, the stop finger 211 is raised by a cam on the cam shaft 195 and the check then moves to the printing unit U thus exposing that part of the web 901—W on the impression face of the platen P to the printing and control device and other printing members associated therewith including the type characters of the auxiliary printing mechanism 672 which, by the time the platen P makes a second impression from the particular printing and control device, will be set up under control of the card C, Fig. 105, perforated at the time the aforesaid printing of the variable data V on the check S was effected. Thus, since the card C is perforated in accordance with the value of the data V, the impression as V', Fig. 6, made on the web 901—W will correspond to the impression V made on the check S. Furthermore, the address A' and the number N' printed on the web 901—W at this time will correspond to the address A and the number N printed on the aforesaid check S. Thus, the web 901—W bears a record of the individual data printed on the particular check S.

Suitable means, described in my aforesaid co-pending application, Serial No. 221,841, advance the web 901—W across the impression face of the platen P each time a new printing and control device moves into association with the platen whereby the impressions made on this web are properly spaced one from the other.

ELECTRICAL CONNECTIONS, FIG. 113, AND SAFETY DEVICES

The operation of the machine is under control of a main switch 51, Figs. 2 and 113, which, when closed, closes circuit to the line wire 526, Fig. 113, and the various electrically operated mechanisms in the machine are connected between this line wire 526 and the other line wire 527.

Thus when the main switch 51 is closed circuit is closed from the line wire 526 through the conductor 1610 to one terminal of the motor 14 which drives the main drive shaft 19, the other terminal of this motor being connected to the line wire 527 through a conductor 1611. Closure of the main switch 51 also closes circuit to one terminal of a motor as 1012, Figs. 106 and 113, of the pager and proofer unit as 900, when such a unit is employed in the machine, one terminal of this motor 1012 being connected to the line wire 526 through a conductor 1612, the other terminal of this motor being connected to the line wire 527 through a conductor 1613. Furthermore, when the main switch 51 is closed circuit is also closed to a conductor 1614 which leads to one terminal of a motor 922, Fig. 113, which when set in operation operates the roller 909 to withdraw the web 901—W from the roll 901—R of a pager and proofer unit, the other terminal of the motor 922 being connected by a conductor 1615 to the switch blade 926. A conductor 1616 connects the co-operating switch blade 927 to the line wire 527. Closure of the main switch 51 also applies potential on the conductor 1617 which interconnects the line wire 526 with the blade 84 of the switch that controls withdrawing of the web W from the roll R, a conductor 1618 leading from the blade 85 of this switch to one terminal of the motor 50, that drives the devices which withdraw the web W, and the other terminal of this motor being connected through a conductor 1619 to the line wire 527. Thus, closure of the main switch 51 either sets the various motors in the machine in operation or prepares the motors which operate to withdraw webs for operation, circuit being closed through these motors under control of the loop formed in the web withdrawn thereby.

It will be remembered that energization of the solenoid 310, Figs. 68 and 113 engages the clutch teeth 305 with the clutch teeth 307, Fig. 69, and that thereby the shaft 301 is set in operation. The solenoid 310 may be energized to effect such an operation in any one of three ways. For example, when the machine is initially placed in operation it is necessary that a printing and control device D be advanced into position II before automatic operation of the machine can continue and to this end a switch, generally indicated by 1620, is provided which is under control of a push button 1621 which when pushed downwardly engages a contact on the blade 1622 with a contact on the blade 1623 of the switch 1620, these contacts being normally disengaged. Upon the engagement of these contacts circuit is closed from the line wire 526 (provided the switch 51 is closed) through conductors 1624 and 1625, the switch blades 1623 and 1622, conductors 1626 and 1627 to one terminal of the solenoid 310. The other terminal of the solenoid 310 is connected to the line wire 527 through a conductor 1628 that leads to the switch blade 1629 of the switch 1630, Figs. 7 and 113, and through switch blade 1631 of this switch and a conductor 1632. Thus it will be seen that by depressing the push button 1621 when the contacts on the blades 1622 and 1623 are engaged the solenoid 310 may be energized to effect the advancing of a printing and control device.

The contacts on the blades 1629 and 1631 are held engaged when the machine is at rest by a pin 1633, Fig. 10, on the rocker 1274, which controls lowering movement of the feet as 1261 on the receivers as 1141, by the springs 1271, as aforesaid, it being remembered that when the machine is at rest the rocker 1274 holds the feet 1261 in an upper position. In event, however, the rocker 1274 should not return the receivers as 1141 to their upper or zero positions, then the pin 1633 does not engage the contacts on the blades 1629 and 1631 so that the switch 1630 remains open, and it will therefore be seen that the provision of the switch 1630 affords a safety device inasmuch as it prevents operation of the printing and control device feeding means when the receivers as 1141 of the multiplying apparatus M are not in their upper or at rest positions.

In normal operation of the machine circuit is closed to the solenoid 310 under control of a cam 1082 on the cam shaft 1078, Fig. 107, a rise on this cam engaging the blade 1634 of the switch 1635 at a predetermined time in the cycle of operation of the machine, explained in detail hereinafter, to engage a contact on this blade with a contact on the blade 1636 of this switch. Thereupon circuit is closed from the line wire 526 (since the main switch 51 is closed when the cam shaft 1078 is operating) through a conductor 1637, the then closed switch 1635, the conductor 1627, solenoid 310, and through the switch 1630 and the conductor 1628 to the line wire 527.

In some instances it may be desirable to make a test operation of the multiplying apparatus M and in such an operation the switch 1638 may be closed by pressing down on the push button 1639 to engage a contact on the blade 1640 with a contact on the blade 1641, this closing circuit from the line wire 526 (if the main switch 51 is closed) through the conductors 1624 and 1642, switch 1638 and conductor 1643 to the conductor 1627 and thence through the solenoid 310, conductor 1632, switch 1630 and conductor 1628 to the line wire 527.

In addition to feeding a printing and control device into position II, when the machine is initially set in operation it is necessary that a sheet S be fed into association with the stop finger 191 pertaining to the multiplying apparatus M. To this end a switch 1644 is provided which includes blades 1645 and 1646 having contacts thereon that may be engaged when the push button 1647 is pushed downwardly, this closing circuit from the line wire 526 (when the main switch 51 is closed) through conductors 1624 and 1648, switch 1644 and conductor 1649 to terminal 1650, and thence, through conductor 1651, winding of the solenoid 70 and conductor 1652, circuit is closed to the line wire 527 and thereupon the web withdrawing and sheet severing means are set in operation to sever a sheet S from the web W which is then picked up by the sheet feeding means and fed into association with the stop finger 191, if, when and as such means are in operation.

In automatic operation of the machine circuit is closed to the solenoid 70 through a switch generally indicated by 1653, Figs. 7, 13 and 113. Contacts on the blades 1654 and 1655 of the switch 1653, in the automatic operation of the machine, are closed by a rise on a cam 1656, Fig. 13, on the shaft 1443 which, as explained hereinabove, is rotated to make one revolution each time the multiplying apparatus M is set in operation and the engagement of these contacts closes the switch 1653 whereupon circuit is closed from the line wire 526 through a conductor 1657, switch 1653, conductor 1658 to terminal 1650 and thence through conductor 1651, winding of solenoid 70, and conductor 1652 to the line wire 527.

The multiplying apparatus M is set in operation by energizing the solenoid 1305, Figs. 9 and 113, and this may be done in one of several ways.

It has been stated hereinabove that when the push button 1639 engages the contacts on the blade 1640 and 1641 that this sets the multiplying apparatus M in operation, and the same means which sets the multiplying apparatus M in operation upon pressing of the push button 1639 also sets this apparatus in operation in the course of automatic operation of the machine and this is effected by engaging contacts on the blades 1659 and 1660 of a switch 1661, Figs. 69 and 113, this being effected by engagement of an arm 1662 at the lower end of the shaft 301 with the blade 1660 of the switch 1661 and the engagement of this arm with this blade engages contacts on the blades 1659 and 1660 with each other whereupon the following circuit is closed:

From line wire 526 through conductors 1624 and 1625 to the blade 1623 and through a contact on this blade to a contact on the blade 1663, these contacts normally being engaged and only being separated in a manner that will be described presently. Circuit is closed from the blade 1663 through a conductor 1664 and through closed switch 1661 and conductor 1665 to terminal 1666 and conductor 1668 to line wire 527.

The contacts on the blades 1623 and 1663 are only separated when the push button 1621 is pushed downwardly, in which event, as explained hereinabove, it is desirable that only the printing and control device feeding mechanism be operated. Normally, whenever the printing and control device feeding mechanism is set in operation, the arm 1662 engages the contacts on the blades 1659 and 1660 and this should prevail when the push button 1621 is pushed downwardly. When the push button 1621 is pushed downwardly, a pin 1669 thereon engages the forward end of the blade 1663 and separates the contact on this blade from the cooperating contact on the blade 1623 wherefore circuit from line wire 526 is opened and thus even though the arm 1662 engages contacts on the blades 1659 and 1660 the solenoid 1305 is not energized.

When it is desired to manually set the multiplying apparatus M in operation the push button 1670 is pushed downwardly to engage a contact on the blade 1671 with a contact on the blade 1672 of the switch 1673. The engagement of these contacts closes circuit from the line wire 526 (if the main switch 51 is closed) through conductors 1624 and 1674, switch 1673, conductor 1675 to terminal 1666 and thence through conductor 1667, winding of solenoid 1395, and conductor 1668 to line wire 527.

It may be desirable to operate the platen P other than in a normal operation of this platen in the course of automatic operation of the machine and to this end a switch 1676 is provided that includes a push button 1677 which when pushed downwardly engages a contact on the blade 1678 with a contact on the blade 1679 and thereupon circuit is closed from the line wire 526 (if the main switch 51 is closed) through conductors 1624 and 1689, switch 1676 and conductor 1681 to terminal 1682 and thence through conductor 1683, winding of solenoid 620, and conductor 1684 to line wire 527.

In the present machine wherein two impressions are to be made by the platen P from each printing and control device D fed into printing position therebelow and when one such impression is to be made on a sheet S and the other impression is to be made on a web as 901—W of a pager and proofer, two switches are provided for closing circuit to the solenoid 620 which brings about operation of the platen P. One of these switches, generally indicated by 1685 is, in the present instance, closed by a rise on the cam 1083 on the cam shaft 1078. If two impressions were to be made on each sheet S, rather than one on the sheet S and another on a web as 901—W, the cam 1083 would include two lobes or rises so that the switch 1685 would be closed twice each time a printing and control device D was moved into printing position beneath the platen P. However, in the present instance, where one of the two impressions made from each printing and control device is to be made on a web 901—W of a pager and proofer, the solenoid 620 is energized in one operation by closure of the aforesaid switch 1685 and in another operation by closure of the switch 897' included in the auxiliary printing mechanism 672 from which an impression is made on the web 901—W of the pager and proofer.

In the course of automatic operation of the machine the solenoid 620 is once energized by closure of the switch 1685 and this is effected by engagement of the lobe on the cam 1083 with a switch blade 1687 whereupon a contact on this blade is engaged with a contact on the blade 1688 and thereupon circuit is closed from the line wire 526 through conductor 1690, switch 1685 and conductor 1692 to terminal 1691 and thence through conductor 1689, terminal 1682, conductor 1683, winding of solenoid 620, and conductor 1684 to line wire 527.

Also in the course of operation of the machine the pin 898' on an operative part in the auxiliary printing mechanism 672 engages a contact on the blade 899' with a contact on the blade 896' and thereupon circuit is closed from line wire 526 through conductor 1693, switch 897', conductor 1694 to terminal 1691 and thence through conductor 1689, terminal 1682, conductor 1683, winding of solenoid 620, and conductor 1684 to line wire 527.

When the solenoid 620 is energized by closure of the switch 1685, the resulting operation of the platen P is to make an impression on a sheet S but when the solenoid 620 is energized by closure of the switch 897' an impression is to be made on the web 901—W of the pager and proofer. A pin 585 is associated with the platen P so that, in the course of downward movement of the platen P, if a sheet S does not lie therebelow, this pin engages a block 588 of insulating material on a blade 589 to engage a contact on this blade with a contact on the blade 590 to thereby close circuit to the solenoid 592 to retract a pin 598 on the core 597 of this solenoid from alignment with a plunger 599 whereby capacity of the hydraulic system, which applies pressure on the platen P, is increased in such degree that printing pressure is not applied by the platen, the mechanisms for accomplishing the foregoing being described in detail in my co-pending application, Serial No. 221,841, of which this application is a division. It will be recognized, however, that when an impression operation is made by the platen P on the web 901—W a sheet S will not lie beneath the platen P and that therefore the pin 585 will act to engage contacts on the blades 589 and 590. In this instance however circuit to the solenoid 592 is not to be closed because so to do would prevent the platen P from making an impression on the web 901—W.

In view of the foregoing circuit is established through the blades 589 and 590 only when an impression is to be made on a sheet as S so that if the pin 585 engages the contacts on these blades in any other impression operation of the platen P the solenoid 592 will not be energized to increase the capacity of the hydraulic system and prevent a printing operation of the platen P. The manner in which this is accomplished can best be ascertained by reference to the wiring diagram, Fig. 113, and it is as follows:

The switch 1685 includes a third blade 1686 and when the cam 1083 acts to engage contacts on the blades 1687 and 1688 to close circuit to the solenoid 620 circuit is also closed from the line wire 526 through conductor 1690, the contacts on the blades 1688 and 1687 to a contact on the blade 1686 and thence through a conductor 596 to the blade 589. The dwell on the cam 1083 is of sufficient length that it maintains the various contacts on the blades of the switch 1685 engaged until after the platen P should have made an impression from a printing and control device D on the anvil 264 and hence, if the pin 585 engages the contacts on the blades 589 and 590, when circuit is closed to blade 589, as just described, then circuit is closed from the blade 590 through a conductor 594, the winding of the solenoid 592 and a conductor 583 to the line wire 527. Thereupon the capacity of the hydraulic system is increased and the platen P is prevented from making an impression, it being understood that the pin 585 engages the contacts on the blades 589 and 590 and the solenoid 592 energizes prior to the time the platen P has attained impression making position with respect to the printing and control device on the anvil 264. It will of course be understood that if two impressions were to be made on a sheet as S then both of the two lobes that would be provided on the cam 1083 in this instance would be sufficiently prolonged to enable the just described operation of the solenoid 592.

When the plate 393 seats on a tab Y, the pin 395 engages a contact on the blade 396 with a contact on the blade 398 to thereby close the switch 397 and thereby circuit is closed from the line wire 526 through conductor 1695, switch 397, conductor 1696 to a terminal 1697 and thence through conductor 1698, winding of solenoid 399, and conductor 1699 to line wire 527. Thereupon the disc 412 is set in rotation to extinguish one lamp as 524 and illuminate the other lamp as 525. This same operation may be brought about manually by closing the switch 1700, this being effected by pushing down the push button 1701 to engage a contact on the blade 1702 with a contact on the blade 1703 to close circuit from the line wire 526 (if the main switch 51 is closed) through conductors 1624 and 1704, closed switch 1700 and conductor 1705 to terminal 1697 and thence through conductor 1698, winding of solenoid 399, and conductor 1699 to line wire 527.

The auxiliary printing mechanism 672 is set in operation by energization of the solenoid 717 and this may be effected manually by closing the switch 1706, this being effected by depressing the push button 1707 to engage a contact on the blade 1708 with a contact on the blade 1709 and thereupon circuit is closed from the line wire 526 (if the main switch 51 is closed) through conductor 1710, closed switch 1706 and conductor 1711 to terminal 1712 and thence through conductors 1713 and 1713', winding of solenoid 717, and conductor 1714 to line wire 527.

In the course of automatic operation of the machine the solenoid 717 is energized by the engagement of a lobe or rise on the cam 1085, Figs. 107 and 113, with a blade 1715 of a switch 1716 whereupon a contact on this blade is engaged with a contact on the blade 1717 of this switch and thereupon circuit is closed from the line wire 526 through a conductor 1718, closed switch 1716 and conductor 1719 to terminal 1712 and thence through conductor 1713, winding of solenoid 717, and conductor 1714 to the line wire 527.

The numbering mechanism 652 is operated in each cycle of operation of the machine in such a way that an impression may be made therefrom each time the platen P makes an impression from a printing and control device D fed into printing position therebelow and to this end a cam 1086, Figs. 107 and 113, is provided on the cam shaft 1078. When the parts are at rest a relief on the cam 1086 engages the blades 1720 of a switch 1721 so that a contact on this blade is disengaged from a contact on the blade 1722. However, in the course of rotation of the cam shaft 1078 the rise on the cam 1086 engages the blade 1720 to close the switch 1721 and when this occurs circuit is closed from line wire 526 through conductor 1723, closed switch 1721 and thence through conductor 1724, winding of solenoid 662, and conductor 1725 to line wire 527.

When a pager and proofer, such as described in my aforesaid co-pending application Serial No. 221,841, is employed it may be desirable to make a test operation thereof and to this end means are provided for manually energizing the solenoid 1006 which controls operation of the pager and proofer and to this end a switch 1726 is provided, and when the push button 1727 of this switch is forced downwardly a contact on the blade 1728 is engaged with a contact on the blade 1729 and thereupon circuit is closed from the line wire 526 (if the main switch 51 is closed) through conductor 1730, closed switch 1726 and conductor 1731 to terminal 1732 and thence through conductor 1733, winding of solenoid 1006, and conductor 1734 to line wire 527. In automatic operation of the machine the solenoid 1006 is energized by engagement of a lobe on the cam 1087, Figs. 107 and 113, on the cam shaft 1078, with a blade 1735 of a switch 1736, thus engaging a contact on the blade 1735 with a contact on the blade 1737 and thereupon circuit is closed from the line wire 526 through conductor 1738, closed switch 1736 and conductor 1739 to terminal 1732 and thence through conductor 1733, winding of solenoid 1006, and conductor 1734 to line wire 527.

At predetermined times in the course of operation of the machine a pin 1033 on the ratchet 1022 engages a block 1032 on the blade 1031 and thereupon a contact on this blade engages a contact on the blade 1030 to close the switch 1029, and at the proper time in the operation of the machine the cam 1087 closes circuit from line wire 526 to the terminal 1732, as aforesaid, and thence circuit is completed through conductor 1740, winding of solenoid 988, conductor 1741, closed switch 1029, and conductor 1742 to the line wire 527 whereupon the solenoid 988 is energized concurrently with the aforesaid energization of solenoid 1006 and operates the severing means of the pager and proofer, the operation of the parts being so timed that the web is first given a step of feeding movement and is then severed.

After a printing and control device D has been fed into position II and a sheet has been severed from the web and fed into engagement with the stop finger 191, automatic operation of the machine may be commenced and this is done by pushing down on the central push button 1743, of the start-stop switch SS, Figs. 2 and 113, whereupon a contact on the blade 1744 of the switch 1745 is engaged with a contact on the blade 1746 of this switch. At this time a contact on the blade 1747 of the switch 1748 is engaged with a contact on the blade 1749 of the switch 1748 and thereupon (if the main switch 51 is closed) circuit is closed from the line wire 526 through a conductor 1750, the contact on the blade 1749, a contact on the blade 1747, which blade is in electrical connection with the blade 1744, and thence through a contact on the blade 1744 engaged with a contact on the blade 1746, circuit is closed through the conductor 1751 to a terminal 1752 and thence through conductor 1753, winding of the relay 1754, and conductor 1755 to blade 1756 and a contact thereon which is normally engaged with a contact on the blade 1757 associated with the relay 1758 and a conductor 1759 to line wire 527. Thereupon the relay 1754 is energized to attract the armature 1760 of this relay into engagement with the contact 1761 and the armature 1762 of this relay into engagement with the contact 1763.

The engagement of the armature 1762 with the contact 1763 closes circuit from the line wire 526 through a conductor 1764, armature 1762 and contact 1763, conductor 1765, and thence through the winding of the solenoid 1102 and conductor 1766 to line wire 527 whereupon the solenoid 1102 is energized to cause the clutch teeth 1091 to engage the clutch teeth 1090, at the predetermined time hereinabove described, to set the cam shafts 1078 and 195 in rotation.

Shortly after the relay 1754 is energized the push button 1743 may be released for a stick circuit, described in detail hereinafter in connection with the safety devices, is established through the winding of this relay to maintain it energized and therefore the solenoid 1102 is maintained energized. When, however, circuit is broken to the relay 1754 by disengaging the contact on the blade 1747 from the contact on the blade 1749 by pushing down on the shell 1767 of the start-stop switch SS, circuit to the winding of relay 1754 is opened and thereupon the solenoid 1102 deenergizes with the result that the clutch teeth 1090 and 1091 disengage to stop rotation of the cam shafts 1078 and 195.

The movable blade 529 is moved into engagement with either the fixed contact 531 or the fixed contact 532 to illuminate one of the lamps 524 or 525 and extinguish the other. The circuit in this instance is through conductor 528 from line wire 526, a contact on blade 529 to a contact on blade 532, and thence through conductor 534, filament of lamp 525 and conductor 535 to line wire 527, or from a contact on blade 529 through a contact on blade 531, conductor 536, filament of lamp 524, and conductor 537 to line wire 527.

Whenever circuit is closed to conductor 1626, Fig. 113, potential is applied on terminal 1626′ and conductor 1627′ to thereby apply potential on one terminal of the solenoid 1628′, Figs. 26 and 113. The core 1629′ of this solenoid is connected as indicated at 1630′, Fig. 26, to the rockers 1589 and 1596 which carry the pins 1590 and 1599 that are operable on the plates as 1591 to restore the Bowden cables 1532 as described hereinabove. Whenever the printing and control device feeding means are manually set in operation, as by pushing down on the push button 1621, the shaft 301 is set in operation and, furthermore, the detector 1511, Fig. 67, pushes the Bowden cables 1532. In such an operation the push button 1621 should be held down long enough to enable the arm 1662′ on the shaft 301 to act on the blade 1660′ so as to engage a contact on the blade 1660′ with a contact on the blade 1659'. When this is done, circuit is closed from line wire 526, through conductors 1624 and 1625, blades 1623 and 1622, and conductors 1626 to terminal 1626', and thence through conductor 1627', winding of solenoid 1628', conductor 1665', blades 1659' and 1660', and conductor 1664' to line wire 527, which energizes the solenoid 1628' to thereby restore the Bowden cables pushed as aforesaid.

When it is desired to perform a total taking operation from an accumulator of the kind described hereinafter but included in the auxiliary printing mechanism 672, the key lever 862, Fig. 106, is depressed and thereupon the adjusting screw 872, Fig. 113, acts to engage a contact on the blade 873 with the contact on the blade 875 to thereby close the switch 874. By referring to the wiring diagram, Fig. 113, it will be seen that the effect of this is to close a circuit from the line wire 526 through the conductor 1718', closed switch 874, and conductor 1719' to the conductor 1713' and thence through the winding of solenoid 717 and conductor 1714 to line wire 527. Thereupon the solenoid 717 is energized with the effect of setting the auxiliary printing mechanism 672 in operation, in the course of which operation a total is printed. It is because it is essential that the platen P move into printing position in a total taking operation that the pin 858' is included in the auxiliary printing mechanism 672 so that in a total taking operation a contact on the blade 899' will be engaged with a contact on the blade 896' to close circuit to the solenoid 620 and effect an operation of the platen P so that the platen will move into position to serve as a backing member in the printing operation incidental to the total taking operation.

If a sheet does not move into engagement with the stop finger 191 the sensing finger 203, Fig. 2, moves into a notch and thereupon a finger 208 engages a contact on the blade 209 with a contact on the blade 210 and in this manner circuit controlled by the switch 1768 is closed. A similar switch 1769 is associated with the stop finger 211. The switches 1768 and 1769 are normally open but potential is supplied to the blades 209 and 1771 of these switches through a conductor 1772 that leads from the line wire 526. A conductor 1773 leads from the blade 1774 of the switch 1769 to a terminal 1775 while a conductor 1776 leads to this terminal from the blade 210 of the switch 1768. Thus, whenever the fingers as 203 indicate the absence of a sheet in association with either the stop finger 191 or the stop finger 211, either the switch 1768 or the switch 1769 is closed and thereupon potential is supplied to the terminal 1775 from the line wire 526 and thence through conductor 1777, winding of relay 1758, and conductor 1778, circuit is closed through the winding of said relay 1758, whereupon the contact on the blade 1756 is separated from the contact 1757 and in this way circuit to the line wire 527, from the winding of relay 1754, is broken, whether this be the hereinafter described stick circuit or the circuit closed to the relay 1754 by pressing down of the push button 1743.

In event the arm 373, Fig. 66, does not return to its normal at rest position which is indicative of jamming in the printing and control device feeding mechanism, a contact on the blade 1779, Figs. 66 and 113, is not engaged with a contact on the blade 1780 and thereupon the stick circuit for the relay 1754 is opened for at this time the rise on the cam 1087s, Figs. 107 and 113, will be engaging the block 1781 on the contact 1782 of the switch 1783, and thereupon through the posts 1784 a contact on the blade 1785 is separated from a contact on the blade 1786. So long as the contacts on either the blades 1786 and 1785 are engaged or on the blades 1780 and 1779 are engaged, a stick circuit is established to the winding of the relay 1754 as follows:

From the line wire 526 through conductor 1750, a contact on blade 1749, a contact on blade 1747, conductor 1787 to terminal 1788. When the machine is at rest potential is applied on the contact 1761 so that a stick circuit will be established when the armature 1760 engages the contact 1761 in the following manner.

Either from terminal 1788 through conductor 1789, contact on blade 1786, contact on blade 1785, conductor 1790, terminal 1791 and conductor 1792 to contact 1761 or from terminal 1788 through conductor 1793 to a contact on blade 1779, a contact on blade 1780 to terminal 1791 and thence through conductor 1792 to contact 1761. Hence, when the push button 1743 is pushed downwardly to energize the relay 1754 to attract the armature 1760 into engagement with the contact 1761, circuit is established through the conductor 1794 to the terminal 1752 and thereupon a stick circuit is established to the winding of the relay 1754.

However, prior to the time the printing and control device feeding means come to rest in a cycle of operation of the machine, the arm 373 should engage and close circuit through contacts on the blades 1779 and 1780 and at this time the rise on the cam 1087s will engage the block 1781 and separate the contacts on the blades 1785 and 1786. If the arm 373 is in its at rest position this will not open the stick circuit for the relay 1754 but if the arm 373 is not in its at rest position at this time the stick circuit will be opened. It will be recognized that at all times in the course of operation of the machine, except at the time the rise on the cam 1087s engages the block 1781, the contacts on the blades 1785 and 1786 are engaged and hence a stick circuit for the relay 1754 is established.

The arrangement including the blades 1779 and 1780 and 1785 and 1786, which is to say, the provision of parallel circuits, is typical of other safety devices that could be associated with parts in the machine that are to attain a definite at rest position. Additional blades as 1779 and 1780 would be provided, in such an instance, as well as additional blades 1785 and 1786. The time of separation of blades as 1785 and 1786 would be the time at which the part with which the contacts on the blades as 1779 and 1780 cooperate should be in its at rest position.

It will be understood that in the complete machine many other safety devices would be provided, the need for the provision of such safety means being understood in the art. Among such other safety devices may be cited a switch in association with the magazine H to interrupt operation of the machine at the end of a cycle of operation following that in which the last printing and control device is fed from the magazine. Another safety could be provided in association with the drawers J to prevent the passage of more printing and control devices into a drawer than such drawer is adapted to contain, the need for such safety means arising in event a full drawer is not removed and another substituted therefor after a change from one drawer to another has been effected, in the manner described hereinabove, and the drawer which remains, but which should have been removed, is entirely filled with printing and control devices. Many other safeties for kindred purposes could be provided in the machine and it will be recognized that all such safeties would not need to be timed to operate at some particular time in the course of operation of the machine and such safeties would be connected to open the circuit through the relay 1758 to prevent improper operation of the machine.

OPERATION OF THE MACHINE

*Preliminary description*

A detail description of the operation of the multiplying apparatus, as thus far described, follows but this is preceded by a brief résumé of the manner in which the machine in which the apparatus is included is arranged in order that it will perform the desired work.

In setting up and arranging the machine the dimensions of the particular sheet to be produced are first ascertained and the sheet feeding mechanism is so adjusted that the particular sheet, such as the sheet S, Fig. 5, will properly pass therethrough and then the various parts of this mechanism are secured together to afford a unit. This unit is then located on the bed plate 108, Fig. 2, relative to the printing position at the platen P. The web handling unit including the frame 10 is next positioned so as to insure that a sheet severed from the web and fed forwardly will properly pass into the sheet feeding mechanism to be so handled thereby that impressions will be made on the sheets at proper positions.

It is also ascertained what data are to be printed in the printing means carried by the frame 10 and the printing cylinders thereof and their cooperating impression or platen cylinders are arranged to cooperate to produce impressions, such as the date E and signature B and sometimes, though not in the present instance, the number N, at proper locations on the sheets, these impressions being made prior to severance of the sheets from the web. The feeding rollers cooperating with the web and the operating means therefor are adjusted to feed the web in an amount slightly more than the desired width of the sheet as S, this insuring that, after the leading end of the web is fed forwardly and clamped by a finger as 106, Fig. 2, and then moved rearwardly, the knife 89 will sever the desired width of sheet from the web.

The multiplying apparatus M is mounted in position and is located transversely of the line of travel of the sheets in such position that the variable data V or the like printed therefrom will be printed at the proper position transversely across the sheet, a stop finger as 191, Fig. 2, being provided and adjusted to insure proper location of the impression made by the impression means of the multiplying mechanism M at the desired position longitudinally of the sheet.

A stop finger as 211, Fig. 2, is next positioned to properly locate the sheet with respect to the devices from which impressions will be made by the platen P and in the present instance this stop finger is located to insure that the address A will be printed on the sheets S at the position desired. Furthermore, as in the present instance, a numbering machine as 652, Fig. 70, if such a device is to be utilized, is adjusted relative to the anvil, with which the platen P cooperates, to insure that a number as N will be printed on a sheet as S at the desired position if this number is not to be printed by the printing means carried by the frame 10. Likewise the position of an auxiliary printing mechanism as 672 is adjusted to insure production of impressions at desired locations.

In addition to the foregoing, the impression or printing members which print the form F on the sheets as S are properly located on the printing drum 1043 of the printing unit U to print the form F at the proper position on a sheet as S. If, as in the present instance, it is desired to produce a proof sheet as 901, Fig. 6, a pager and proofer mechanism, such as is disclosed in Fig. 106, is associated with the machine in proper location to receive impressions upon operation of the platen P.

If, as in the present instance, two impressions are to be made from each printing and control device D fed into printing position, the machine is to be arranged for what is called duplicate work, and in such an instance the ratio between gears as 1077 and 1081, Fig. 107, is two-to-one so that the shaft 1078 will make one revolution for each two revolutions of the drum 1043 which, as has been explained hereinabove, is the part of the machine that is constantly operated in the course of operation of the machine.

With the machine arranged as above, a roll of paper R, of a width equal to the length desired of the sheets S, is mounted in the frame 10 on the arms as 25 and the web W is withdrawn therefrom and passed through the devices carried by the frame 10, the web W being led beneath the knife 89 which operates to divide the web W into sheets S. Where a pager and proofer is employed, a roll of paper as 901—R is mounted in the stand as 902 and a web as 901—W is withdrawn therefrom and led through the device which operates to divide the web 901—W into proof sheets as 901.

With the machine so arranged a supply of printing and control devices D is introduced into the magazine H and the drawer from which these devices were removed is placed in either the chute 360 or 361, Fig. 1, as indicated by the illuminated of the lamps 524 or 525, Fig. 2, this arrangement being described in my co-pending application Serial No. 221,841.

The machine is now ready to be set in operation and this is done by closing the main switch 51, Figs. 2 and 113. Next the push button 1621, Fig. 113, is pushed downwardly to close the switch 1620 to thereby set the printing and control device feeding means in operation to cause the leading printing and control device D, which will be at position I, Fig. 70, to be advanced to position II. Furthermore, the button 1647, Fig. 113 is pushed to set the devices carried by the frame 10 in operation to cause the web W to be advanced past the knife 89 whereupon a sheet S is severed from the web and such sheet is fed into position to be engaged with the stop finger 191.

The key lever 862 is depressed to bring about a total taking operation of the accumulator included in the auxiliary printing mechanism 672 whereby the accumulator wheels 806 are returned to zero position.

The machine is now ready to be operated automatically as will now be described, reference being made to first, second, third and so on cycles of operation, which, it will be understood, refer to rotations of the drum 1043, the constantly operating part of the machine when the machine is in automatic operation, this also causing continuous rotation of the cam shaft 1078, Fig. 107, and the cam shaft 195, Fig. 2. In the early operations of the machine certain of the operative mechanisms will be set in operation, but such operation will be idle since no sheet or printing and control device, for example, will be in operative relation therewith. Hence, in the following description only those operations which are actually effective in a particular cycle of operation are described and the idle operations are disregarded.

In this description of operation reference is made to the timing charts, Figs. 114 to 117, each of which depicts a particular cycle of operation as will be explained presently. In these timing charts, as in the description of the various cycles, only those operations which are actually effective are shown and the idle operations are disregarded. Furthermore, if an operation in a particular cycle is identical with an operation in a particular cycle, it is omitted in the chart, and in the following description reference will be made back to the chart in which such additional operations are to be found.

Each cycle of operation will now be explained separately with reference to the separate illustration of the particular cycle being described.

*First cycle*

The first cycle of operation of the machine, which is to say, the first rotation of the drum 1043, is shown in Fig. 114 and by referring thereto it will be seen that no operations are illustrated as occurring in this cycle for the reason, as explained above, that while various operative mechanisms may function in this cycle of operation, the resulting operations are idle. What operative mechanisms there are that do function in this cycle of operation will appear when corresponding cycles of operation are explained hereinafter.

It is to be noted that in this first cycle of operation and until later in the course of automatic operation of the machine, as will be explained it will be necessary to manually hold the bar 212, Fig. 2, upwardly (this bar serving to detect the presence or absence of a sheet S in association with the platen P), to prevent the contacts under control of this bar from being closed and energizing relay 1758, Fig. 113, inasmuch as at this time no sheet S is disposed below the platen P.

*Second cycle*

The second cycle of operation is shown in Fig. 115 and there it will be noted that the first operations after the start of this cycle relate to the detector 1511, Fig. 67, and the carrier bars 252 and 253, Fig. 75. The detector 1511 starts to move toward the control area on card 6 on the printing and control device D disposed at detecting position II, Fig. 70, at the point 1804, Fig. 115.

In the present description, the first printing and control device described as passing through the machine is that shown in Fig. 3 which, it will be seen, is perforated to represent shareholdings of 999 so that the Bowden cables 1532, Figs. 67 and 32, for the digit 9 in the units, tens and hundreds orders of the multiplier will be pushed in this operation of the detector 1511. Such pushing of the Bowden cables and resultant positioning of the pins 1547—9, Figs. 26 and 27, will be completed at the point indicated at 1805.

Simultaneously with the initiation of movement of the detector 1511, the carrier bars 252 and 253 start to move rearwardly, the initiation of such movement being indicated at the point 1804'. The carrier bars attain their rearwardmost position, without having moved the printing and control devices, at the point 1803 but in the meantime other operations are effected.

As stated above, the pins 1547—9 will have been pushed forwardly by the time the point 1805 is attained in the second cycle of operation. Shortly after this, at the point 1805', the templet-gangs X of the multiplier apparatus M start their swinging movement and the positioning templets 1117 thereon start to move toward the pushed pins 1547—9 in each order of the multiplier and by the time the point 1809 is attained the templet-gangs will have been positioned with the steps Z on the various templets thereof pertaining to 9 in operative position with respect to the sensing fingers of the summation means of the multiplying apparatus M.

Hence at the point 1810, by which time the steps Z will have been positioned, the summation means are set in operation, and this operation is completed by the time the point 1811 is attained, the templet-gangs X remaining in their set-up position from the point 1809 to the point 1829 in the second cycle of operation, and the operation of the summation means, which takes place between the points 1810 and 1811, and which is controlled by the set-up of the templet-gangs, is therefore completed while the templet-gangs are set up. The present operation of the summation means is that shown in Fig. 85 and results in setting the receivers of the summation means to represent 998001.

The set-up of summation means is completed by the time the points 1811 and 1811' are attained and at the point 1811' the sensing bars 1324 are set in operation, the set-up of these bars being completed by the time the point 1812' is reached. During the movement of the sensing bars 1324 intermediate the points 1811' and 1812', the type segments 247 and the punch slides 1400 are set up, these type segments and punches being fully set up in operative position by the time the point 1812' is attained.

Thus at the point 1851, in this second cycle of operation, the punches 1407 start downwardly and by the time the point 1851' is attained a card C, which will have been positioned in operative relation with the punches 1407, will have been punched. By the time the point 1852' is attained the punches will be restored. After the punches are restored at the point 1852', and at the point 1820, the card stop finger 1469, Fig. 15, raises and during the interval between the points 1820 and 1826 the stop finger 1469 moves up and down and releases the punched card C. At the time the stop finger 1469 starts upwardly at the point 1820 the punched card C, at the point 1817', starts to move forwardly and this card is free to move until a point in the third cycle of operation, as will be described, it being noted that no arrow is provided, at the end of the cycle in Fig. 115, on the chart line pertaining to such card movement and this indicates that the operation is not yet completed.

Intermediate the points 1812' and 1817, in the second cycle of operation, the type segments 247, Fig. 7, remain in printing position and it is during this time that the platens 250 make the impression V on the sheet S engaged with the stop finger 191. Thereafter, at the point 1820' the stop finger 191 starts to raise and does not return to its completely lowered position until the point 1826' and during the interval between points 1820' and 1826' the sheet S that has been engaged with the stop finger 191 moves forwardly into engagement with the stop finger 211 to be positioned relative to the platen P. At the time a sheet S attains this position the bar 212, Fig. 3, may be released for if it is lowered at this time it will engage the sheet S engaging the stop finger 211 and it will therefore be prevented from closing circuit to the magnet 1753, Fig. 113, to interrupt operation of the machine.

After the carrier bars attain their rearwardmost position at the point 1803 they start to move forwardly and hence intermediate the points 1803 and 1840 the carrier bars advance the printing and control device that has been in position II, Fig. 70, to position III and they also advance the printing and control device which has been in position I to position II. It will be noted that the printing and control device which has been in detecting position II and which controlled set-up of the multiplying apparatus M is now in printing position III above the anvil 264. Likewise, the sheet which was printed in the multiplying apparatus M is now in position above the anvil 264 so that upon the next operation of the platen P an impression will be made on the sheet or check S from the printing and control device under control of which the multiplying apparatus M was set up to print the variable data V on the check. The variable data V printed from the type segments 247 by the platens 250 in this second cycle of operation pertain to the amount of money to be paid pursuant to the check and since the holdings represented on the first printing and control device were 999 shares and since the templet-gangs X included in the machine pertain to a reoccurring factor 999, a dividend rate of $9.99, the product ascertained in the aforesaid operation of the summation means is 998001, and hence *9980.01 is printed on the first check or sheet S by the aforesaid operation of the platens 250. It is to be noted particularly that the point 1840, by which time the carrier bars attain their forward position, is located at the 360 degree point in the second cycle of operation.

By the time the point 1817 is attained the card C will have been punched and the sheet S will have been printed and therefore intermediate the points 1817 and 1814' the sensing bars 1324, the type segments 247 and the punch slides 1400 are restored, this restoration being completed by the time the point 1814' is attained. Moreover, at the point 1812 by which time the sensing bars 1324, type segments 247 and punch slides 1400 will be substantially in their at rest positions, the summation means starts to restore and this is completed by the time the point 1814 is attained.

It will be recalled that a switch 1653, Fig. 7, is provided in the multiplying apparatus M to close circuit to the solenoid 70 that sets the mechanisms carried by the frame 10 in operation. When these devices are set in operation the web W starts to feed forwardly and this is initiated in the second cycle of operation at point 1848' and the web continues to move forwardly until the point 1849 is attained. Shortly prior to the point 1849 and at the point 1849' the clamping finger 106, Fig. 2, engages the leading edge of the web W which may thereupon be pulled rearwardly to be stretched taut so that by the time the point 1815 is attained the knife 89 may start downwardly to sever the sheet, a clamping bar 103 engaging the web W and clamping it at the point 1816 and thereafter at the point 1818 the clamping finger 106 is released. It should be noted that the bar 103 and knife 89 have not completed their function at the end of the second cycle, this being completed in the third cycle.

The card C comes to rest in engagement with the stop finger 674 at the point 1822 in the third cycle of operation to be ready for use in the fourth cycle of operation.

It will of course be understood that during the time the web W is being fed intermediate the points 1848' and 1849 a date E and a signature B are printed on the web W. It is also to be understood that when the sheet was advanced into position in the multiplying apparatus M manually the machine was turned over at least twice to insure that the first sheet disposed in the multiplying apparatus M bore such date and signature impressions, any sheet fed into the multiplying apparatus in such operations and not bearing a signature being manually removed from the machine. It will also be understood that in automatic operation each and every sheet which attains printing position in the multiplying apparatus M will bear signature and date impressions and in those instances where a number N is also printed on the sheets in this position this impression would likewise appear on the sheets.

The foregoing are the operations which take place in the second cycle of operation and at this time it should be noted that similar operations take place in every even cycle of operation of the machine as well as additional operations, that are idle in this second cycle, as will be described hereinafter.

Third cycle

Figure 116:
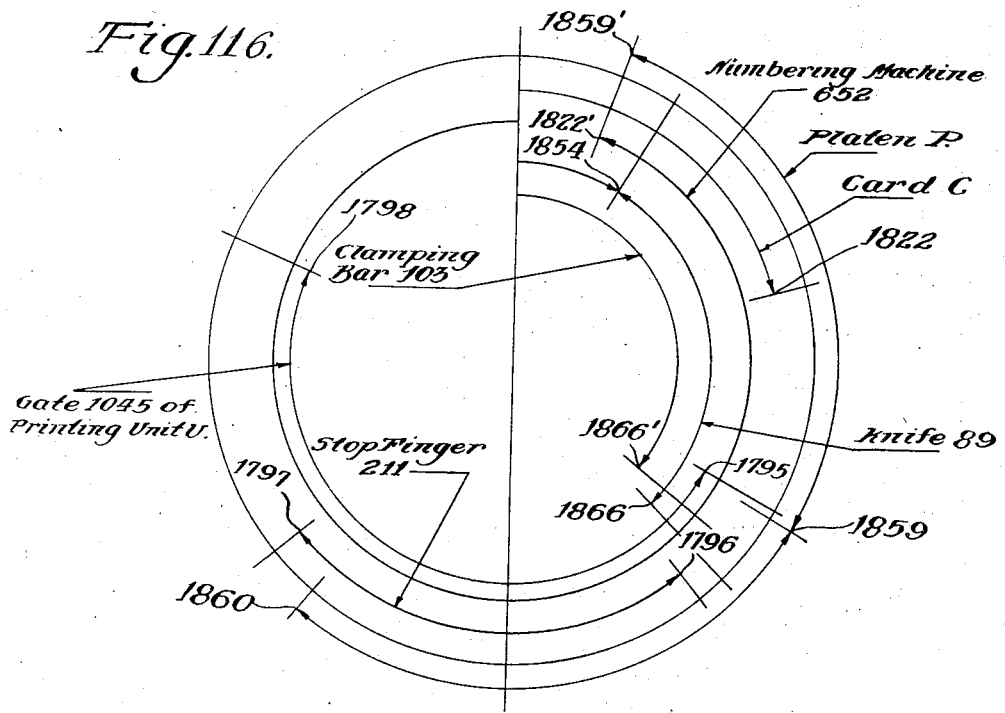

In the third cycle of operation, which is shown in Fig. 116, at the point 1859' the platen P starts downwardly and at the point 1859 the platen will be in printing position.

Furthermore, at the point 1822' the numbering machine 652, Fig. 70, starts upwardly and has accumulated and is in printing position by the time the point 1859 is attained.

Thus when the platen P attains its lowermost or printnig position at the point 1859 it operates to print the number N, which in this instance is "2370", on the first check S and at the same time the platen operates to print from the type characters T on the plate 2 of the first printing and control device D and thereupon the address A is printed on the first check S.

The platen P starts upwardly at the point 1859 and attains its upper position at the point 1860 in the third cycle of operation. Furthermore, at the point 1796 the stop finger 211 starts upwardly and remains in its upper position until the point 1797 is attained in this third cycle of operation.

At the point 1795 the gate 1045 on the printing unit U is lowered to sheet stopping position whereupon the first sheet S, which fed toward the form printing unit U upon the raising of stop finger 211 at point 1796, will be stopped by the gate 1045 on the printing unit U. At point 1798 the gate 1045 is retracted to its normally open position, whereupon the first sheet S passes into the bite between the drum 1043 and the platen roller 1044 and the form F is printed on this sheet which then passes to the sheet collector at the discharge end of the machine.

In the third cycle of operation at the point 1854 the knife 89 attains its lowermost position to complete the severing of the second sheet S from the web W and the knife 89 is returned to its upper position by the time the point 1856 is attained, the clamping bar 103 releasing at point 1866' in this return of the knife. After the second sheet is severed from the web W the roller 165, Fig. 2, lowers into engagement therewith and feeds it forwardly into engagement with the stop finger 191.

The foregoing are typical of the odd cycles of operation of the machine and every odd cycle is identical with this third cycle, it of course being remembered that, while the above described mechanisms functioned in the first cycle of operation, the operations were idle and were not therefore discussed in the description of the first cycle of operation and are not shown on the chart pertaining to this first cycle.

*Fourth cycle*

Figure 117:
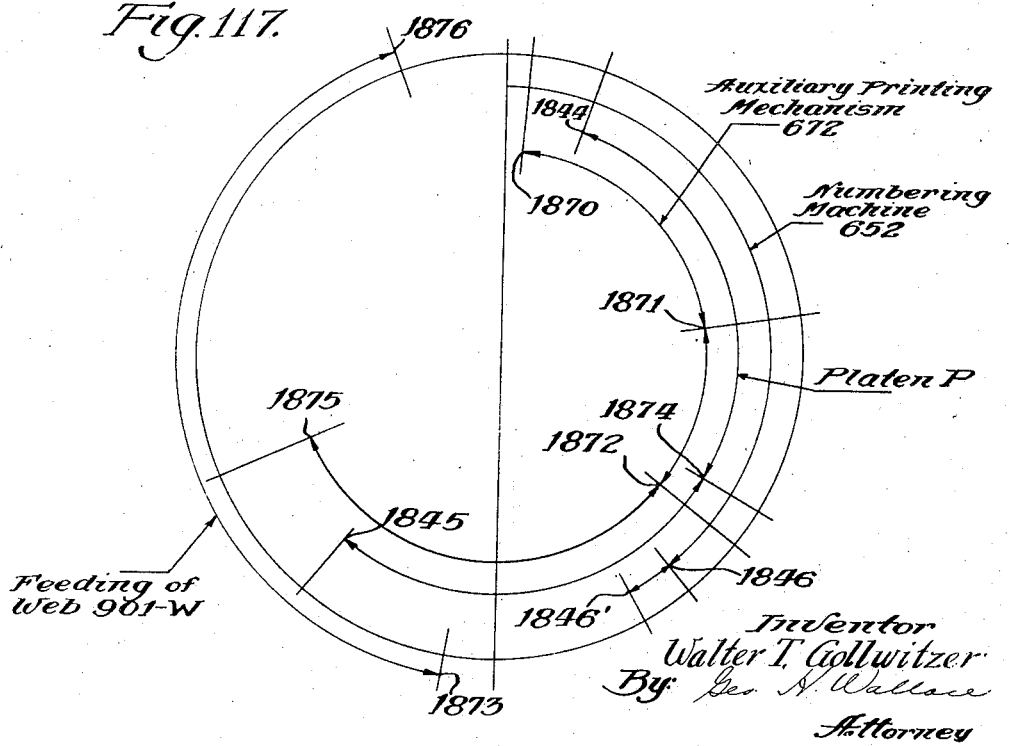

The fourth cycle of operation is shown in Fig. 117 and by the time the point 1870 is attained in this cycle the auxiliary printing mechanism 672 will have been set in operation. When the auxiliary printing mechanism 672 is set in operation at the point 1870 the sensing bars thereof start cooperation with the card C, which will have been engaging the stop finger 674 since the point 1822 in the third cycle of operation, and by the time the point 1871 is attained the type segments of the auxiliary printing mechanism 672 will have been set up.

It is a switch 897', Fig. 113, in the auxiliary printing mechanism 672 that closes circuit to the solenoid 620 that sets the platen P in operation. Hence at the point 1844 the platen P starts to move downwardly.

Furthermore, the numbering machine 652 is still elevated so that by the time the platen P attains its downward position at the point 1874 the number N, the variable data V' and the address A from the first printing and control device, that is now on the anvil 264, will be printed on the web 901—W that is to be divided into proof sheets or pages as described hereinabove, it being understood that the platens in the auxiliary printing mechanism operate to produce the impression V'.

The type segments of the auxiliary printing mechanism remain set up until the point 1872 is attained at which time the sensing bars 682 start to return to their initial or at rest position and in so doing the amount of the variable data V and V' is entered on the accumulator wheels of the auxiliary printing mechanism 672, the mechanism 672 being restored to at rest position by the time the point 1875 is attained. Furthermore, the platen P starts to raise at the point 1874 and attains its upper position at the point 1845. Likewise, at the point 1846 the numbering machine 652 starts to lower and is returned to its lowered position by the time the point 1846' is attained.

Additionally at the point 1873 the web feed of the pager and proofer is set in operation and as a result, during the fourth cycle of operation the web 901—W advances, this web coming to rest at the point 1876.

In these respects the fourth cycle is identical with all other even numbered cycles of operation except the second cycle for in the second cycle of operation the just described operations are idle. Furthermore, as will be explained presently, another operation might be initiated in an even cycle of operation, but this will not occur in the second and fourth cycles of operation inasmuch as it will not appear until a predetermined number of impressions have been made on the web 901—W.

In the course of the fourth cycle of operation it will be understood that the third printing and control device is advanced from position I to position II, the second printing and control device is advanced from position II to position III and the first printing and control device near the end of this fourth cycle of operation is moved from position III and dropped down through the printing and control device discharge chute 346. It will also be understood that the second printing and control device which was so advanced from position II to position III is that which controls the set-up of the multiplying apparatus M to print the variable data V on the second of the sheets S, such second of the sheets S now being in printing position with respect to the platen P.

*Fifth cycle*

In the fifth cycle of operation the address A and number N are printed on the second sheet S inasmuch as the second printing and control device is now in printing position. Likewise, the other operations which occur in the third cycle of operation are effected in this fifth cycle of operation.

*Sixth cycle*

The sixth cycle, which is not illustrated separately, is identical with the fourth cycle except in so far as certain pawls, in the mechanism which directs the printing and control devices back into whichever drawer they are stored in prior to being introduced into the magazine, are concerned. This is not important in so far as the present invention is concerned and hence is not now described in detail.

*Eighth cycle*

The seventh cycle is identical with the fifth cycle and for this reason no chart thereof is shown but in the eighth cycle of operation certain gates in the aforesaid printing and control device returning mechanism operate but here again since this is not important to the present invention, it is not described in detail.

*Severing of web 901-W*

It will be recalled that at the point 1876 in the fourth cycle of operation the web 901-W ceases advancing movement and if the number of impressions, determined by the counting device in the pager and proofer, is that desired on a particular proof sheet, then the severing means of the pager and proofer are set in operation at point 1876 to sever the web.

*Summary of operation*

Thus, to summarize what has been stated hereinabove, in so far as operations of the mechanisms are concerned, the first cycle of operation is idle but in the second cycle of operation the variable data V are printed on the first check or sheet S, the date and signature having been printed on this sheet prior to the time it passed into printing position in the multiplying apparatus M. Likewise, in this second cycle of operation the severance of the second sheet from the web was initiated. Furthermore, the first printing and control device, which had been advanced to position II, was advanced to position III and the second printing and control device advanced to position II.

Then in the third cycle of operation the number N and the address A are printed on the first sheet S which passed into printing position below the platen P during the second cycle of operation. After these impressions have been made the first sheet advances to the gate 1045 of the printing unit U by reason of elevation of the stop finger 211 and in this cycle of operation the gate 1045 on the printing unit U opens and the first sheet has the form F printed thereon whereupon this completely printed sheet passes into the sheet collector.

Then in the fourth cycle of operation the variable data V are printed on the second sheet S after which this sheet passes to printing position below the platen P and engages the stop finger 211. Likewise, the first printing and control device is discharged from the anvil and the second printing and control device is advanced from position II to position III, and the third printing and control device advances to position II. Also in this fourth cycle of operation and prior to the printing devices advancing as just described, the address A', the variable data V' and the number N' are printed on the web 901–W that is to be divided into pages affording proof sheets, and after this impression is made the web 901–W advances to dispose the succeeding portion thereof in printing position beneath the impression face of the platen P.

In the fifth cycle of operation the address A, number N and form F are printed on the second sheet.

In the sixth cycle of operation the variable data V are printed on the third sheet or check S. Th address A', variable data V' and number N' are printed on the proof sheet to afford impressions pertaining to the second sheet. Furthermore, in this cycle of operation the fourth printing and control device attains position II, the the third printing and control device attains position III, and the second printing and control device is discharged from the anvil 264.

It will be apparent from the foregoing that the various operative functions of the machine are timed to occur in such manner that the production of business instruments in a rapid yet accurate manner is assured.

MULTIPLYING MECHANISM INCLUDING AN ACCUMULATOR, FIGS. 76 TO 83

In the embodiment of my invention thus far described the multiplying apparatus M has been described as being arranged to make an impression on sheets as S and to produce perforations in control cards as C. It has been explained that the control cards C passed from the multiplying apparatus M to the auxiliary printing mechanism 672 where, under control of the cards, type characters on type segments are moved into printing position and impressions are made therefrom, in the present instance, on the proof sheet 901. Furthermore, the auxiliary printing mechanism 672 may be arranged to include an accumulator, and after a desired number of operations of the machine have been performed this accumulator may be actuated, by a key lever as 862, Fig. 106, to perform a total taking operation in the course of which operation a total may be printed either on the proof sheet 901 or on some other sheet, if so desired, and the accumulator wheels may then be returned to zero.

An arrangement such as the foregoing enables the accumulation of a total of the amounts printed on the proof sheets as 901 and since the auxiliary printing mechanism is set up under control of cards C produced in the multiplying apparatus M, such a total also represents the total value of the various sums to which the type characters on the multiplying apparatus have been set to represent. There may be instances as where an additional check on the total of amounts printed in the machine is desired and in such an instance an accumulator mechanism may be included in the multiplying apparatus M.

In Figs. 76 to 83 I have illustrated a multiplying apparatus, similar to the multiplying apparatus M, as including an accumulator. Since there is a substantial similarity in parts, I have, where the parts employed in the multiplying apparatus shown in Figs. 76 to 83 correspond to parts shown in Figs. 7 to 61, applied the same reference characters, but in Figs. 76 to 83 I have applied the suffix m to these reference characters.

Thus the multiplying apparatus Mm, Figs. 76 to 83, includes side frames 1134m and 1135m in which a cam shaft 1280m is journaled and on which cams similar to the cams provided on the cam shaft 1280 hereinabove described are arranged, the cams on the cam shaft 1280m being for the same purpose as the correspondingly numbered cams provided on the cam shaft 1280. A clutch including clutch teeth 1295m and 1296m is provided which, under control of a solenoid 1305m, may be engaged to cause the cam shaft 1280m to make a complete revolution each time a multiplying operation is to be performed.

In Figs. 76 to 83 I have not illustrated the summation means of the multiplying apparatus inasmuch as such means would be identical with the summation means hereinabove described. Such summation means would include receivers as the receiver 1141, and positioning members 1320m corresponding to the positioning members 1320 hereinabove described would be included at the upper ends of these receivers. In the course of a multiplying operation steps 1325m on the fingers 1320—IIm or 1320—IIIm will be selectively positioned to cooperate with steps 1326m at the forward end of sensing bars 1324m.

In the course of a multiplying operation of the multiplying apparatus Mm, the sensing bars 1324m move forwardly toward the steps 1325m on positioning fingers as 1320—Im to be disposed in digit representing positions, the digital value represented by each sensing bar 1324m, when it comes to rest, being determined by the particular cooperation between the aligned steps 1326m and 1325m. The sensing bars 1324m include depending blocks 1334m, Figs. 78 and 79, which engage a roller 1335m carried by the rocker 1337m fast on a shaft 1338m. An arm 1339m carries a cam follower 1341m which engages a cam 1342m so that when the steps 1326m are to move toward the steps 1325m the cooperation of the cam follower 1341m with the periphery of the cam 1342m enables the springs 1331m to urge the sensing bars 1324m forwardly.

The sensing bars 1324m have racks as 1345m thereon that mesh with the teeth of gear segments 1346m which, in the manner hereinabove described, are connected to arms 1347m of type segments corresponding to the type segments 247 and which have type characters thereon that are selectively moved into printing position, by the digital positioning of the sensing bars 1324m, to be in cooperating relation with platens 250m which, in the course of operation of the multiplying apparatus Mm, are tripped to strike a sharp blow and thereby produce an impression on a sheet resting on the top surface of the bed plate 108m between the ink ribbon IRam and the platens 250m, such tripping of the platens 250m corresponding to and being effected in the same manner as the tripping of the platens 250 hereinabove described.

Punch slides as 1400m are connected to the forward ends of the sensing bars 1324m as indicated at 1401m and, in the manner hereinabove described with reference to the punch slides 1400, punches in the punch slides 1400m are operated to make perforations in cards Cm associated therewith. The cards Cm are withdrawn from a magazine as 1432m, a cam shaft 1439m being operated from the cam shaft 1280m and in synchronism therewith to effect feeding of the cards Cm in the manner described hereinabove with reference to the card magazine 1432 and the cards C. Also, as described hereinabove, the cards Cm may be passed to a suitable card collector or they may be passed through a guideway to be utilized to control the operation of another mechanism or mechanisms in the machine such as, for example, the auxiliary printing mechanism 672.

Additional description of the multiplying aspects of the multiplying apparatus Mm is not presented herein particularly because, as stated hereinabove, the various parts included in the multiplying apparatus Mm, in so far as multiplying is concerned, correspond to the multiplying apparatus M and, as stated hereinabove, parts in the multiplying apparatus Mm which correspond to parts in the multiplying apparatus M bear he same reference character but have the suffix m applied thereto, and these parts in the multiplying apparatus Mm perform the same function in the same manner as the corresponding parts in the multiplying apparatus M.

The accumulator included in the multiplying apparatus Mm comprises a cam shaft 816m which is slidable axially in bearings 1900 and 1901 provided in the side frame members 1134m and 1135m. A gear 1902 is fast on the cam shaft 816m and is meshed with a wide gear 1903 fast on the shaft 1904 that is also journaled in the side frames 1134m and 1135m as well as in an outboard bearing 1905 on a bearing bracket 1906 secured on the side frame member 1134m, Fig. 77. The gear 1903 is of sufficient width that the gear 1902 will remain in constant mesh therewith in sliding movement of the cam shaft 816m effected in a manner to be described presently. A bevel gear 1907 on the shaft 1904 meshes with a bevel gear 1908 fast on a shaft 1909 journaled in bearing lugs 1910 and 1911 on the bearing bracket 1906. Another bevel gear 1912 on the shaft 1909 meshes with a bevel gear 1913 fast on the cam shaft 1280m so that in each operation of the cam shaft 1290m the cam shaft 816m will be set in operation, the ratio between the various gears being such that the cam shafts 1280m and 816m rotate synchronically.

The accumulator includes a plurality of accumulator wheels 806m, there being an accumulator wheel 806m for each sensing bar 1324m. These accumulator wheels, in the present instance, are in the form of gears and are rotatably mounted on shouldered collars, these collars each including a shoulder of sufficient thickness to accommodate an accumulator wheel. The collars are mounted on a shaft 807m about which therefore the accumulator 806m are supported for rotation, the shaft 807m being fast to the outer ends of the arms as 809m which are pivotally mounted on a shaft 810m which in turn is carried by the bars 1427m that support the punching unit of the apparatus Mm.

The accumulator gear wheels 806m are respectively adapted to mesh with racks as 820m which are formed in the underside of the sensing bars 1324m. In the course of a multiplying operation, when the cam shaft 816m is set in operation, a rise on the cam 815m, Fig. 79, engages a roller 814m mounted on one of the arms 809m and thereupon the accumulator gear wheels 806m are respectively meshed with the aligned of the racks 820m. This occurs at a time in a cycle of operation when the sensing bars 1324m are set to represent a digital count so that, when the roller 1335m returns the sensing bars 1324m to their at rest positions, the accumulator gear wheels 806m are set to represent a digital count.

It will be manifest that as successive digital values are entered into the accumulator wheels, more than ten digits will be entered onto a particular wheel and as the tenth digit is entered into a particular wheel it is necessary that a carry-over be made into the order next higher to that to which a particular wheel pertains, and hence an arrangement, now to be described, is provided which will effect such carry-overs.

Each accumulator gear wheel 806m has twenty teeth thereon and teeth at diametric positions thereon, which is to say, each of the teeth pertaining to the number "10" is thickened as shown in Fig. 78 where such thickened teeth are indicated by 821am and 821bm. A lug is provided on each of the arms 809m and a shaft 824m extends between and is carried by these lugs and dogs as 825m are pivotally mounted on this shaft 824m, there being a dog 825m at a side of each accumulator wheel 806m to lie in the line of movement of the thickened portions of the teeth 821am and 821bm. The dogs 825m have relatively enlarged openings 826m therein near the upper ends thereof and a rod 827m, carried by the arms 809m extends through all of the openings 826m to limit the pivotal movement of the dogs 825m about the shaft 824m.

Another shaft 828m is provided and mounted at spaced intervals therealong are pawls as 829m, there being a pawl 829m in alignment with each dog 825m. Springs as 830m are effective on the pawls 829m to engage the upper ends of these pawls with the dogs 825m and to urge the shoulders as 831m on the lower ends of the pawls into engagement with the lugs as 832m on the arms 833m of the carry segments generally indicated by 834m which are mounted on a shaft 835m, there of course being a carry segment 834m for cooperation with each pawl 829m. Each carry segment 834m includes an upstanding arm 836m having a gear segment 837m at the free end thereof, the gear segments 837m being respectively adapted to mesh with the accumulator gear wheels 806m. Each carry segment 834m also includes an arm 838m which projects above a pin 839m carried by the arms as 840m of a rocker 1915 pivotally mounted on the shaft 841m. A spring 842m is effective on the arms as 840m to urge these arms and therefore the pin 839m downwardly as the parts are viewed in Fig. 79.

Springs 851m, Fig. 79, extend directly between the carry segments 834m and spring anchors 1914 and these springs are effective, as will be explained, to bring about a carry-over when required, the carry segments being restored after a carry-over operation against the effect of the springs 851m through the medium of a rocker 1915 which is positively driven by a cam 1916 fast on the cam shaft 816m, Fig. 78, the rocker 1915 including a cam follower 1917 which cooperates with the periphery of the cam 1916 to operate the pin 839m to restore the carry segments.

When an accumulator wheel 806m is in one of its two zero positions, either the wide tooth 821am or 831bm is located with respect to the dog 825m in the position in which the tooth 821am is shown in Fig. 79 which is the position immediately beyond that in which the tooth 821am would be effective, upon movement of the accumulator wheel 806m counterclockwise, as viewed in Fig. 79, to pivot the dog 825m. In this position the springs 830m act through the pawls 829m to engage the dogs 825m with the rod 827m in the manner shown in Fig. 79 which positions the dogs 825m in the most right-hand position thereof, as they are viewed in this Fig. 79.

Figure 83A:
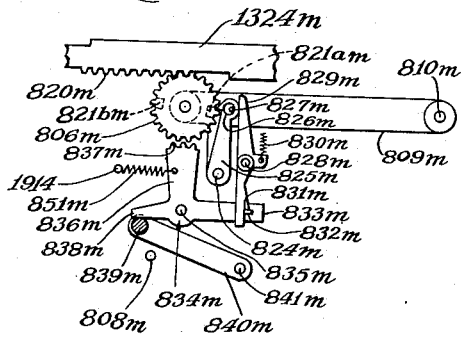
Figure 83B:
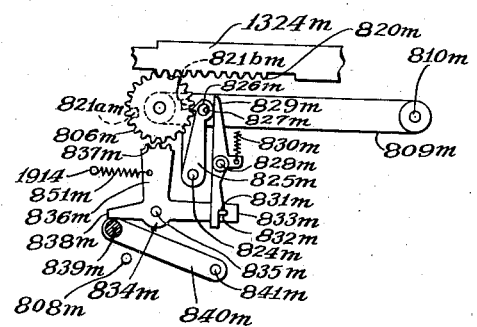

In Fig. 83A the accumulator wheel 806m there shown is still in its zero position but the rise on the cam 815m has caused the gear teeth of this wheel to be meshed with the teeth of the rack 830m. The sensing bar 1324m was moved into a position representative of the digit 9 prior to the time the gear and rack teeth were meshed as aforesaid, and this bar is still shown in this position in Fig. 83A. In Fig. 83B the parts are shown in the position assumed thereby when the sensing bar 1324m is restored to its zero position and by comparing the positions of the parts as respectively shown in Figs. 83A and 83B it will be seen that the wheel 806m has been rotated clockwise, as viewed in these views, so that the thickened tooth 821bm has moved from its 0 to its 9 position from which it will move, as soon as further movement (which the entry of a further value on the wheel 806m will effect) is imparted to the wheel 806m and in such movement it will engage the nose of the dog 825m.

Figure 83C:
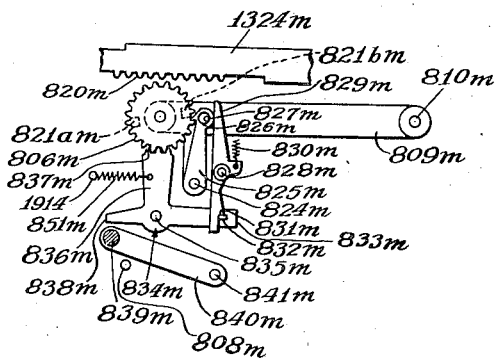

Immediately after the parts attain the positions thereof shown in Fig. 83B the roller 814m rides off the rise on the cam 815m and thereupon the accumulator gear wheels 806m disengage the teeth of the aligned racks 820m and move into a lower position wherein the teeth of these gears engage the teeth of the gear segments 827m, such engagement of these teeth being shown in Fig. 83C which shows the movably mounted parts in the lower position attained thereby when a wheel 806m is disengaged from a rack 820m.

Figure 83D:
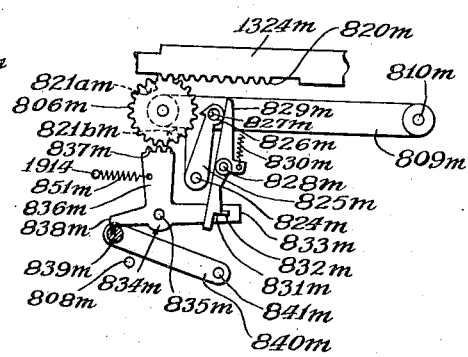

In Fig. 83D the parts are shown in positions similar to those in which the parts are shown in Fig. 83B, but as having been advanced in an amount equivalent to the entry of the digit 4 on the wheel 806m.

In the course of the advancing of the wheel 806m from the position in which it is shown in Fig. 83C into the position in which it is shown in Fig. 83D, the wide tooth 821bm engaged the tapered nose at the upper end of the illustrated dog 825m and pivoted this dog to the right as it is viewed in Fig. 83D. Such pivotal movement of the illustrated dog 825m is effective on the upper end of the illustrated pawl 829m to pivot the shoulder 831m thereon from engagement with the lug 832m on the arm 833m of the illustrated carry segment 834m. This frees the carry segment 834m of its latch connection with the pawl 829m for a very slight movement to the unlatched position thereof shown in Fig. 83D. This movement is so slight in practice that the teeth of the gear segment 837m are maintained in substantially the same relation with the teeth of the accumulator wheel 806m with which they cooperate as these teeth would have occupied had not the shoulder 831m been disengaged from the lug 832m.

The dog 825m and cooperating pawl 829m shown in Figs. 83A to 83E, inclusive, may be assumed to be those that cooperate with the accumulator wheel 806m which pertains to the lowermost or units order. The carry segment 834m, however, shown in these views, while it is under control of the aforesaid dog and pawl, is aligned with the next higher accumulator wheel 806m or, in this instance, the accumulator wheel 806m which pertains to the tens order.

When the accumulator wheel 806m with which the dog 825m cooperates advanced from the position in which it is shown in Figs. 83B and 83C into the position in which it is shown in Fig. 83D, four digits were added to the nine already standing therein so that when the accumulator wheel 806m attains the position in which it is shown in Fig. 83D it is representing "13." However, this accumulator wheel is only capable of representing the digits appearing in a single order so that when the accumulator wheel 806m advanced from the "9" position thereof shown in Fig. 83C into the "3" position thereof shown in Fig. 83D it was necessary to carry the "1" in the tens order of "13" into the next higher or tens order. It was for this purpose that the shoulder 831m was disengaged from the lug 832m, and when this shoulder disengaged this lug the arm 838m of the carry segment pertaining to the tens order moved from a position substantially like that shown in Fig. 83B into engagement with the pin 839m to close the gap or clearance between the arm 838m and the pin 839m, and it is the engagement of the arm 838m with the pin 839m that maintains the teeth of the gear segment 837m in proper relation with the teeth of the accumulator wheel 806m that pertains to the tens order or, in other words, insures that upon lowering of the arms as 809m a particular tooth on the accumulator wheel 806m pertaining to the tens order which would have engaged a particular tooth on the gear segment 837m will engage this particular tooth notwithstanding the delatching of the shoulder 831m from the lug 832m.

Figure 83E:
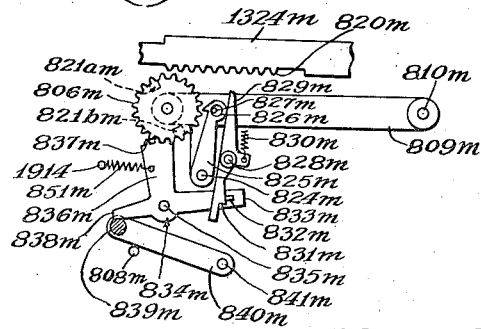

Subsequent to the time the parts attain the position shown in Fig. 83D the arms 809m pivot downwardly in the manner above described and in the course of this downward pivotal movement the teeth on the accumulator wheel 806m move into meshing relation with the teeth of the gear segment 837m aligned therewith. By the time this intermeshing is established the cam follower 1917 will have ridden off the rise on the cam 1916, Fig. 78, and the rocker 1915 is thereupon freed to the action of the spring 842m. Thereupon the arm 840m, Fig. 79, of the rocker 1915 is moved by the spring 842m downwardly until it engages the stop pin 808m. In the course of such movement of the arm 840m the pin 839m moves downwardly and in this interval the spring 851m is effective on the carry segment 834m to rock it from the position in which it is shown in Fig. 83D into the position in which it is shown in Fig. 83E. Such movement of the carry segment is sufficient to advance the accumulator wheel 806m pertaining to the tens order in an amount equivalent to the representation of one digit thereon whereby the "1" of the above described entry of "13" is entered in the tens order.

There may be instances in which long carries are to be effected. To illustrate, an accumulator wheel 806m may be standing in a position representative of the digit 9 prior to the time a carry-over into such a wheel occurs. Upon entry of such a carry digit, the aforesaid accumulator wheel will thereupon move into a position representative of zero, and a carry must then be effected into the accumulator wheel 806m in the next higher order of the final product. In this event, the carry segment 836m which was tripped when the lower order accumulator wheel 806m passed from a position representative of the digit 9 to a position representative of zero will immediately be rocked by its spring 851m from the position shown in Fig. 83C into its extreme operative position shown in Fig. 83E, without having paused at the intermediate position shown in Fig. 83D. This is because the pin 839m will have already descended into the position shown in Fig. 83E prior to the time the carry segment 836m is released by disengagement of the shoulder 831m on the pawl 829m from the lug 832m on the segment 836m, the pin 839m having been lowered to initiate the carry entering operation, as explained hereinabove. Hence, when a long carry is to be entered into a higher order accumulator wheel, such a carry will take place immediately upon passage of the lower order accumulator wheel from a position representative of the digit 9 into a position representative of zero.

The above described operation of entering a carry into a next higher order occurs after the accumulation of any digital values that are to be accumulated in the order into which the carry is made and it also occurs prior to the end of a cycle of operation of the multiplying apparatus Mm. Hence, by the time a cycle of operation of the multiplier apparatus is completed the accumulator wheels stand in positions representative of whatever values were entered into in the course of such cycle of operation plus any values which were previously entered therein.

In the course of a cycle of operation succeeding that in which any carry or carries have been entered into the next higher order, in the manner above described (it being understood that a carry-over arrangement similar to that hereinabove described is associated with each lower order from which a carry may be made and with each higher order into which a carry may be entered), the carry segments which were rocked into the position which is shown in Fig. 83E, to effect entry of such a carry, and the dog 825m which unlatched the pawl 829m to bring about such a carry operation are restored to the position thereof shown for example in Fig. 83A, this being brought about in the following manner:

Shortly after the start of the cycle of operation succeeding that above described and subsequent to the time in such succeeding cycle at which the accumulator gear wheels 806m have been moved from the position such as that shown in Fig. 78 (wherein they are disengaged from the racks 820m) into a position such as that shown in Fig. 83A (wherein they are engaged with the racks 820m), the rise on the cam 1916 engages the cam follower 1917 and pivots the arm 840m of the rocker 1915 upwardly and in so doing the pin 839m engages the arms 838m to so dispose the arms 833m that the lugs 832m are below all of the shoulders 831m. Therefore, the pawls 829m are all freed to the action of their springs 830m and this insures that the shoulders 831m will be disposed in latching position above the lugs 832m. It will be noted that a rise 847m on the cam 1916 extends slightly beyond the outer dwell surface of the cam and that is brief so that the cam follower 1917 is quickly freed therefrom. When the nose of the cam follower 1917 is in engagement with the rise 847m of the cam 1916 the pin 839m assumes the position in which it is shown in Fig. 83B. This position of the pin is such that if a shoulder 831m is disengaged from a lug 832m the relationship between the teeth of the gear segment 837m of the freed carry segment will be maintained with the aligned gear 806m, as has been described hereinabove.

The accumulator included in the multiplying mechanism Mm may be operated so that a total may be taken therefrom and to this end a key lever 862m, Figs. 80 and 81, is provided, this key lever being mounted on the cam shaft 816m. Furthermore, posts 1918 and 1919, which extend outwardly from the side frame member 1135m and which carry a plate 1920, are provided. The plate 1920 has a boss 1921 provided thereon in which a cylinder 1922 is formed, a plunger 1923 being reciprocal in this cylinder and being acted on by a spring 1924 to be urged into engagement with the adjacent end of the cam shaft 816m. The effect of this is to force the cam shaft 816m into the position in which it is shown in Fig. 77 to align the cam 815m with the roller 814m. Movement of the cam shaft 816m in this direction is limited by the engagement of a collar 1925 fast thereon with a disc 1926. The disc 1926 is slidably mounted on pins 1927 and 1928 that extend inwardly from the plate 1920 through openings in the disc 1926. The disc 1926 in turn bears on the key lever 862m which in turn rests against a plate 1929 carried by the posts 1918 and 1919, Fig. 77.

The disc 1926 has conical openings 1930 and 1931, Fig. 82, therein. The key lever 862m has a pair of cones 1932 and 1933 thereon and when the key lever is in its upper at rest position shown, for example, in Fig. 76, the cone 1932 seats in the opening 1930 and the cone 1933 seats in the opening 1931. When however the key lever 862m is pressed downwardly to effect a total taking operation, the cones 1932 and 1933 ride out of the openings 1930 and 1931 and thereupon move into engagement with the face of the disc 1926 which thereupon is forced toward the left as viewed in Fig. 77 and thereupon the cam 815m is moved out of alignment with the roller 814m and the cam 860m is moved into alignment therewith, it being understood that the upper edge of an opening 816m, Fig. 79, seats on a pin 877m to support the roller 814m out of engagement with the dwells on the cams 815m and 860m. At the time a total taking operation is to be initiated the parts are in their at rest position so that the roller 814m will be aligned with the dwells on the cams 815m and 860m.

Also the cams 815m and 860m are complementary but are fast on the shaft 816m in one hundred eighty degree relation. Hence, if the cam shaft 816m is set in operation in a total taking operation the cam 860m will engage the accumulator gear wheels 806m with the racks 820m prior to the time the sensing bars 1324m start to move toward the steps 1325m so that the digital position assumed by the sensing bars in a total taking operation will be determined by one or the other of the thickened teeth 821*am* or 821*bm* as will now be explained.

In a total taking operation the key lever 862*m* is locked in the lower position into which it is moved in order to maintain the cam shaft 816*m* in the above described position assumed thereby in such an operation, and to this end a pin 1934, Fig. 76, is provided on the key lever 862*m*. When the key lever is moved downwardly to initiate a total taking operation a flattened portion on this pin moves into alignment with a notch 1935 in an arm 1936 that is pivotally mounted on the post 1919 and which is urged toward the key lever 862*m* by a spring 1937. When the key lever 862*m* attains its lower position the spring 1937 seats a shoulder defined by the notch 1935 on the flattened portion on the pin 1934 and this latches the key lever 862*m* in a lowered position.

Near the end of a total taking operation, a rise on the cam 1938, Figs. 77, 78 and 80, engages a roller 1939, Fig. 80, on a bracket 1940 unitary with the arm 1936. The engagement of the rise on this cam 1938 with the roller 1939 pivots the arm 1934 against the action of the spring 1937 and releases the key lever 862*m* whereupon it is returned to its upper position by the spring 1941, Fig. 76, an opening 1942, Figs. 76 and 81, being provided in the key lever, and a pin 1943 on the plate 1929 extending into this opening to limit not only upward movement of the key lever 862*m* but also downward movement thereof.

In a total taking operation it is necessary to energize the solenoid 1305*m* so that the cam shaft 1280*m* will be set in operation as well as other parts of the multiplying apparatus M*m* and to this end a pin 1944, Fig. 83, is provided on the key lever 862*m* and in the course of downward movement of the key lever this pin engages a blade 1945 of a switch 1946 that corresponds to the switch 874 in circuit with the solenoid 717, the switch 1946 being of course in circuit with the solenoid 1305*m*, and it is to be recognized that the engagement of the pin 1944 with the aforesaid blade 1945 of the switch 1946 engages a contact on this blade with a contact on a cooperating blade to close circuit to the solenoid 1305*m* and thereby the multiplying apparatus M*m* is set in operation.

In a total taking operation of the multiplying apparatus M*m* the product receivers are held against downward movement and to this end notches as 1947, Fig. 76, are provided in the receivers 1320*m* at the upper ends of these receivers. A rocker as 1948 is pivotally mounted on bearing lugs provided on the brackets supporting the guiding comb 1320*bm*. A rod 1949 is passed through a swivel block 1950 on the rocker 1948, a spring 1951 being disposed between the swivel block 1950 and nuts 1952 on the adjacent end of the rod 1949. The other end of the rod 1949 is pivotally mounted in an opening 1953, Fig. 81, in the key lever 862*m*. Hence, when the key lever 862*m* is moved downwardly the rod 1949 is pulled forwardly and seats a latch member in the rocker 1948 in the notches as 1947 wherefore the positioning members 1320*m* and the receivers connected thereto are held against downward movement.

In Fig. 76 I have shown in side elevation a ribbon advancing means which is driven by an eccentric 1954 fast on the cam shaft 1280*m* and which, through a link 1955, operates the mechanisms of this ribbon advancing means to cause the ribbon IRA*am* to be advanced intermediate impression operations of the platens 250*m*. It will be recognized that ink ribbon advancing means of this type are associated with each of the ink ribbons employed in the machine but, inasmuch as such ink ribbon advancing means constitute no part of the present invention, further description thereof is not presented herein.

UNIVERSAL MULTIPLYING APPARATUS, FIGS. 84 TO 102

The multiplying apparatus M described hereinabove is adapted for use in those instances where a plurality of multiplications are made in which there is a reoccurring factor and upon a change in this reoccurring factor the set of templet-gangs X pertaining to one factor is removed and another set is substituted therefor. An arrangement such as this kind will have wide application and entails a very marked advantage in that the likelihood of error by reason of incorrect setting up of factors is reduced to a minimum particularly since it is only necessary in such a circumstance to set up one factor. This is effected automatically in the course of operation of the machine as described above but it will of course be recognized that the positioning of the positioning templets 1117 could be effected manually if this should be desired or advantageous in some circumstance.

There are many instances, however, where printing machines of the kind to which this invention pertains may be called upon to perform multiplications where one of the factors of the multiplications instead of being reoccurring, as hereinabove, will need to be varied frequently. In the use of a multiplying apparatus such as that hereinabove described this would require frequent changing of the templet-gangs, so that it will be appreciated that it is most advantageous to employ an apparatus, such as the multiplying apparatus M, in those instances where several multiplications were to be made, each involving the same factor especially since, as a practical matter, it would be objectionable if it were required that the templet-gangs as X be changed for each multiplication.

Therefore I have provided what I refer to as a universal multiplying apparatus. This apparatus is capable of handling variations in both factors even in successive multiplications. One of the factors (the multiplier) of multiplications in the universal multiplying apparatus UM, Figs. 84 to 102, is illustrated as being set up in the same way as that in which the varying factor is set up in the multiplying apparatus M. In the present instance I have shown the other factor (the multiplicand) as being set up manually under control of manually operable keys in a keyboard, Fig. 100. It is to be understood, however, that the use of a keyboard to effect set-up of this particular factor of the multiplications is merely a convenient way of so doing and if desired identical means could be employed for setting up both factors, which is to say, both factors could be set up under control of a detector as 1511 which would be responsive to perforations provided, for example, in cards 6, Fig. 3, on printing and control devices D.

Along this line it is to be noted that while I have shown what was the reoccurring factor (the multiplicand) in the multiplying apparatus M as being set up by keys, which control electrical circuits, it is to be understood that mechanical means could be substituted. For example, as will be described presently, the electrical means in the present instance include solenoids which, when energized, move pins. I have shown these solenoids and the controls therefor as operating in accordance with the code illustrated in Fig. 4 because this is demonstrative of the fact that both factors of the multiplications could be derived from perforated fields, such as the cards 6 on the printing and control devices D. In this connection it should be noted that an arrangement under the aforesaid code is quite advantageous because it enables compactness in the mechanism. Thus, it is to be understood that the aforesaid pins which are shown as being operated by the solenoids under control of the perforations could be operated by mechanical means equivalent to those which operate the pins 1547 in the multiplying apparatus M, and other kindred arrangements could be resorted to, if so desired.

Referring specifically to the drawings and more particularly to Fig. 100 it will be seen that I have provided a plurality of manually operable keys 1975 which are conveniently shown. These keys include shoulders 1976 which, when a key is depressed, move into position beneath retaining plates as 1977 that are pivotally mounted on shafts as 1978 and which plates through suitable pin and slot connections are connected to a bar 1979 so that under the influence of a spring 1980 the retaining plates 1977 are urged into position to engage the shoulders 1976. There is a retaining plate 1977 for each bank of keys 1975 and the lugs on which the shoulders 1976 are formed have beveled edges that ride over the edge of the retaining plate upon depression of the key to move the retaining plate from retaining position. The result of this structure is that if an improper key is pushed in any row, it is released upon the depression of another key in the same row, the keys being normally urged into an upper position by springs as 1981.

When it is desired to set up a particular factor the proper keys in the various banks or orders pertaining to the respective orders of what will be referred to hereinafter as the multiplicand are depressed and locked down whereupon electrical circuits are closed, as will be explained presently. When it is desired to restore depressed keys to knock down a set-up multiplicand, the key 1982 is pressed whereupon the bar 1979 is moved against the action of the spring 1980 and the retaining plates are thereupon retracted from retaining position whereby locked down keys are released.

As I have stated hereinabove, the mechanism for setting up the multiplicand is arranged so that it operates in accordance with the code illustrated in Fig. 4 and to this end each key pertaining to an odd digit 1, 3, 5 or 7 has associated therewith two sets of contacts as 1983 and 1984, and when a key pertaining to these digits is moved downwardly the contacts of both sets are engaged, which is to say, circuit is closed therethrough. The keys pertaining to the even digits 2, 4, 6 and 8 have one set of contacts as 1985 associated therewith and when such an even key is depressed the contacts of the associated set are closed. Each key pertaining to the digit 9 also has a set of contacts 1986 associated therewith which are engaged when this key is depressed.

A suitable source of current such as the line wires 526—S and 527—S is utilized and a conductor 1987 leads from the line wire 526—S to conductors 1988, 1989 and 1990 which branch off from the conductor 1987 and lead to one contact of each set of contacts associated with the keys in the units, tens and hundreds orders, respectively. Each other contact of the set of contacts is connected to conductors which lead to solenoids as 1991 which, in a manner described more fully hereinafter, effects set-up of of the multiplicand.

The solenoids 1991 are arranged in sets of five under the code shown in Fig. 4, so that, as shown in Fig. 100, there is a set of five of such solenoids for each order of the multiplicand. There is a solenoid 1991—1—2—U which pertains to the digits 1 and 2 of the units order of the multiplicand, a solenoid 1991—3—4—U which pertains to the digits 3 and 4 in the units order of the multiplicand, a solenoid 1991—5—6—U which pertains to the digits 5 and 6 in the units order of the multiplicand, a solenoid 1991—7—8—U that pertains to the digits 7 and 8 in the units order of the multiplicand, and a solenoid 1991—9—U that pertains to the digit 9 in the units order of the multiplicand. A similar arrangement of the solenoids is provided for the tens and hundreds orders, that is, these solenoids being indicated in Fig. 100 by reference characters similar to those just set forth and bearing suffixes T and H depending upon whether they pertain to the tens order or the hundreds order.

The particular arrangement of solenoids shown in Fig. 100 is for a three-order multiplicand with but a single-order multiplier. Where the capacity of the machine is to be extended to accommodate additional orders in the multiplier, as will appear hereinafter, additional sets of solenoids will be required. Those sets of solenoids in the higher-order groups which are to be under control of the most right-hand row of keys 1975, Fig. 100, will be connected in parallel to the solenoids in the 1991—U sets; while those sets of solenoids which are to be under control of the middle row of keys 1975 in Fig. 100 will be connected in parallel to the solenoids in the 1991—T sets; and those sets which are under control of the most left-hand row of keys are connected in parallel to the 1991—H set.

When each solenoid from 1991—1—2 to 1991—7—8 is energized alone it designates the even digit to which it pertains but when the solenoid as 1991—9 is energized along with one of the other solenoids then the other solenoid operates to designate the odd digit to which it pertains. It will be apparent from this that the foregoing is in accordance with the code shown in Fig. 4.

When a zero appears in any order of the multiplicand the means which are operative to select a significant digit in the particular order in which zero appears are prevented from operating and to this end solenoids 1992 are provided. Whenever a significant digit is set up in a particular order circuit is closed to this solenoid to energize it, but if a significant digit is not set up in the particular order of the multiplicand, by the depressing of a key pertaining to a significant digit in the particular bank or order in which zero is to appear, then the solenoid as 1992 is not energized. To this end a pivotally mounted bar as 1993' is provided below each bank of keys. Each such bar carries a pin 1995' that extends over a contact of a set of contacts as 1993. One contact of each of such sets of contacts is connected by a conductor as 1994 to the conductor 1990 of the particular bank of keys in which the set of contacts is included, and a conductor as 1995 leads from the other contact of the set to one terminal of the solenoid 1992 pertaining to the particular order. In Fig. 100 the conductor 1995 is shown as leading to the solenoid 1992—U. The other terminal of each such solenoid is connected by a conductor as 1996 to a conductor 1997 that leads to the line wire 527—S. It will be seen from the foregoing that whenever a key in any of the banks is depressed the bar 1993' of this bank is pivoted downwardly whereupon the pin 1995' closes the contacts 1993 and therefore circuit is closed to the solenoid 1992 of the particular bank in which the key has been depressed.

A conductor as 1998 leads from one contact of each set of contacts 1986 associated with the "9" keys and such conductor leads to one terminal of the solenoid 1991—9 pertaining to the particular bank in which the key with which the particular contact is associated appears. Furthermore, one contact of each set of contacts 1984 associated with each key pertaining to the odd digits 1, 3, 5 and 7 has a conductor as 1999 connected thereto which leads to a conductor 2000 that in turn is connected to the conductor 1998 so that each time a key pertaining to the digits 1, 3, 5 or 7 is depressed circuit is closed to the solenoid 1991—9 of the particular order, the other terminal of each such solenoid being connected to the conductor 1997 so that when potential is applied on the conductor 1998 the solenoid 1991—9 is energized.

As can be ascertained by reference to Fig. 100, four conductors as 2001, 2002, 2003 and 2004 are connected to contacts in the sets of contacts 1983 and 1985 associated with the keys in each bank respectively pertaining to the digits 7 and 8, 5 and 6, 3 and 4, and 1 and 2. The conductors 2001, 2002, 2003 and 2004 respectively lead to one terminal of the solenoids 1991—1—2, 1991—3—4, 1991—5—6, 1991—7—8, the other terminal of these solenoids being connected to the conductor 1997. Hence, depression of a key pertaining to the digit 8 will, through a conductor as 2001, energize the solenoid 1991—7—8 of the particular order in which the key is depressed. This is also effected by depressing the "7" key but depression of the "7" key also energizes solenoid 1991—9 of the particular order.

It will be seen from the foregoing that whenever a multiplicand is to be set up by an arrangement such as that shown in Fig. 100 it is only necessary to depress the proper keys pertaining to the significant digits appearing in the multiplicand and that thereupon solenoids are energized and, as will be explained presently, these solenoids operate to effect set-up of the multiplicand.

The universal multiplying apparatus UM utilizes representations of intermediate products just as does the multiplying apparatus M, and the intermediate products are represented in the illustrated form of the universal multiplier UM on templets by steps Zs, Fig. 99. The steps Zs, however, do not directly represent the digits in each intermediate product but rather represent the numerical value of the intermediate product, which is to say, the various steps Zs that are disposed in operative position, in the manner described hereinafter, collectively represent the value of an intermediate product, not as the digits, but rather the values which enter into determining the digital value of the intermediate product. This is due to the fact that it is not possible to represent the precise digits of each and every intermediate product that may be ascertained in the course of the multiplications of which the universal multiplying apparatus UM is capable. However, the representations of steps Zs which are formed on the templets employed in the universal multiplier cooperate with sensing fingers of summation means similar to those employed in the multiplying apparatus M and in the course of operation of this summation means intermediate products are added to ascertain the final product. The primary difference in the representation of the intermediate products in the templet-gangs employed in the universal multiplying apparatus UM and the multiplying apparatus M is that the carry-overs incidental to the digit by digit multiplication are carried over in the templets that are employed in the multiplying apparatus M but in the universal multiplying apparatus UM these carry-overs are made by the summation means along with carries that are incidental to the summation of the intermediate products.

The summation means of the universal multiplying apparatus UM include plates 1126—S to 1131—S, Fig. 84, which are similar to the plates 1126 to 1131, Figs. 26 and 31, employed in the multiplying apparatus M. The plates 1126—S to 1131—S are mounted between side plates 1124—S and 1125—S to provide a unit which may be mounted between the side frames 1134 and 1135 just as was the unit between the side plates 1124 and 1125, Fig. 13, of the multiplying apparatus M. However, as will be explained in detail presently, the spacing between the plates 1126—S to 1131—S is greater than that between the plates 1126 to 1131 so that if a universal multiplying apparatus is substituted for the multiplying apparatus M it will be necessary to space apart the side frame members 1134 and 1135 in an amount greater than that described hereinabove.

Sensing fingers, similar to the sensing fingers employed in the summation means including the plates 1126 to 1131 are provided on the plates 1126—S to 1131—S, there being a difference in the structural characteristics of the sensing fingers, but the sensing fingers associated with the plates 1126—S to 1131—S function in the same manner as the sensing fingers on the plates 1126 to 1131 and are carried on finger or pinion slides to be movable across the plates as has been described in detail hereinabove.

It will be recalled that in the multiplying apparatus M the distance of travel of any receiver as 1141 was determined by the amount of movement of the various sensing fingers associated therewith. The result of travel of a receiver as 1141 is the production of a total and the magnitude of the total is equal to the combined depth of the various steps Z on the templets as 1105, Fig. 62. This is also true in the universal multiplying apparatus UM, which is to say, the amount of movement of which any sensing finger of a summation means is capable of performing is determinative of the value of a digit appearing in an intermediate product and pertaining to the same order of the final product as that to which the particular summation means pertains.

The templets which are employed in the universal multiplier are formed on this principle, which is to say, the steps Zs, Fig. 99, are formed on these templets inwardly from a standard position corresponding to the edge a on the templets as 1105, such standard position being indicated as as in Fig. 99.

The steps Z on the templets in the universal multiplying apparatus do not, when in operative position, represent the digits of an intermediate product as do the templets as 1105. Moreover, provision must be made for varying digits in the multiplicand and hence instead of there merely being a templet of each gang in association with each plate there is a set of templets, each templet in each set pertaining to a particular digit in the multiplicand. Each such templet in each such set has steps $Zs$ provided thereon at positions thereacross corresponding to the digits of the multiplier. Thus when a particular product is to be represented by a set of templets, the templet in the set pertaining to the digit of the multiplicand is moved into cooperating relation with a sensing finger and all of the templets in the set are arranged, as were the templets in the templet-gangs X, to dispose the particular step $Zs$ pertaining to the digit of the multiplier in association with the sensing finger. A step so moved into cooperating relation with a sensing finger is so spaced away from the zero or at rest position of the sensing finger that the movement of the sensing finger from such zero position into engagement with such step will advance the receiver of the summation means of which the sensing finger is a part in an amount representative of whatever value is represented by the particular step $Zs$.

It will be recognized that each set of templets must be capable of representing any value that may be determined within the capacity of the machine and it will also be recognized that varying values will appear in any of the templet sets. Hence each templet set is identical with each other templet set or, in other words, the templet set shown in Fig. 99 is illustrative of each and every templet set included in the universal multiplying apparatus UM. The set of templets illustrated in Fig. 99 includes the templets 2010 to 2019, these templets respectively pertaining to the digit last appearing in the reference character applied thereto, which is to say, the templet 2010 pertains to 0 in the multiplicand and the templet 2019 pertains to 9 in the multiplicand.

Inasmuch as any multiplication involving 0 results in the product of 0, no steps $Zs$ are formed on the templet 2010, which is to say, the initial edge $as$ thereon is intact and in reality the templet 2010 is a blank such as that from which all other templets are formed.

In any multiplication in any order, multiplications of the digit 1 in the multiplicand by the significant digits as the multipliers results in products of from 1 to 9. Now since the templet 2011 must be susceptible of being used in any position in the machine and since this templet pertains to the digit 1 in the multiplicand the steps that are formed thereon represent the digits that can be ascertained when the digit 1 is multiplied by the significant digits and the formation of the steps $Zs$ on this templet to represent such products is effected under the following system.

First it is ascertained how much movement a receiver as 1141 is to make to represent a single digit. When this is ascertained the first step $Zs$—1 on the templet 2010 is formed to lie on an arc $cs$ spaced inwardly from the initial edge $as$ in such an amount that when the receiver with which the templet 2011 is used moves in an amount representative of one digit, a sensing finger will seat on the steps $Zs$—1. Continuing on across the templet 2011 the step $Zs$—9 thereon is located in such a position that when a sensing finger seats thereon the product receiver associated with the summation means of which this sensing finger is a part will move in an amount equivalent to nine digits. In other words, the spacing between the arcs $cs$ on the templet 2011 is in increments of 1 and the steps $Zs$ formed in this templet respectively lie on these arcs. Hence the step $Zs$—1 lying on the first inward of the arcs $cs$ represents 1, the next step on the next inward of the arcs represents 2 and so on so that the step $Zs$—9 on the inwardmost of the arcs represents 9.

Now when the digit 2 is the multiplicand and it is multiplied by the significant digits the results are the same irrespective of the order of the multiplicand in which the digit 2 appears. If 2 is multiplied by a multiplier of 2, the product is 4; if it is multiplied by a multiplier of 4, the product is 8, if it is multiplied by a multiplier of 8, the product is 16. Thus the first step $Zs$—1 provided on the templet 2012 is located on an arc $cs$ struck on this templet representative of two units since 1 times 2 is 2, and this first step $Zs$—1 pertains to a multiplier of 1. The inwardmost step $Zs$—9 on the templet 2012, which pertains to a multiplier of 9, represents 18. Hence, the arcs $cs$ on the templet 2012 are spaced apart in increments of two units and this is true of all arcs $cs$, which is to say, the spacing of the arcs $cs$ on each templet is in increments equal to the value of the digit of the multiplicand to which the templet pertains, the increments being equal to four units on the templet 2014, five units on the templet 2015, and so on.

If a sensing finger moved from its zero position into engagement with the step $Zs$—9 on the templet 2012, the receiver of the summation means of which this sensing finger is a part will advance in an amount equivalent to eighteen units or digits to come to rest in a position representative of 8 in the units order and, in the manner explained hereinabove, in attaining this position a carry-over is effected into the next higher or tens order, where the multiplication is being performed in the units order. In view of the carry-over so effected the product receiver pertaining to the tens order would be in a position representative of 1 and since the product receiver pertaining to the units order would be in the position of 8, the product of 18 or 2 times 9 would be represented.

By way of further illustration the first step $Zs$—1 on the templet-gang 2019 is, in effect, in the same position as the step $Zs$—9 on the templet 2011. The templet 2019 pertains to the digit 9 in the multiplicand and the step $Zs$—1 thereon pertains to the digit 1 in the multiplier. The templet 2011 on the other hand pertains to the digit 1 in the multiplicand and the step $Zs$—9 thereon pertains to the digit 9 in the multiplier. However, the product of 9 times 1 and 1 times 9 is 9 in both instances so that therefore the step $Zs$—1 on the templet 2019 is in a position which will enable a receiver to advance nine units as is the step $Zs$—9 on the templet 2011.

Still further, by way of example, the step $Zs$—9 on the templet 2019 is in a position such that a sensing finger in moving from its zero position into engagement with this step will enable the product receiver of the summation means of which such sensing finger is a part to advance in an amount representative of 81 so that if the multiplication 9 times 9 were being performed the product receiver pertaining to the units order would be in a position representative of 1 and the product receiver pertaining to the tens order would be in a position representative of 8.

It is believed that the foregoing will suffice to explain the manner in which the various templets 2010 to 2019 are formed for, as will be understood from the above, every step Zs on any one of these templets is in such a location that it will enable a sensing finger moving thereto-ward to cause the product receiver of the summation means of which this particular sensing finger is a part to advance in an amount equivalent to the product of whatever digit of the multiplicand the particular templet pertains to times whatever digit in the multiplier is represented by the location of the steps Z across the templet.

Sets of templets as 2010 to 2019 are designated hereinafter as templet sets SX. Such templet sets are brought together to afford templet-gangs SXs which so far as the utility thereof is concerned are identical with the templet-gangs X in the multiplying apparatus M. There is a marked distinction, however, between the arrangement of templet-gangs SXs and templet-gangs SX which is, that only as many templet sets SX are provided in each templet-gang as there will be products in the digit-by-digit multiplications. By way of example as to what is meant by the foregoing, reference is made to the following example of multiplication in my novel universal multiplying apparatus UM.

```
789  Multiplicand
123  Multiplier
─────
 27 ⎫
 24 ⎬ ─────────── 2367—First intermediate product
 21 ⎭
 18 ⎫
 16 ⎬ ─────────── 1578 —Second intermediate product
 14 ⎭
  9 ⎫
  8 ⎬ ─────────── 789  —Third intermediate product
  7 ⎭
─────
97047              97047—Final product
```

As can be seen from the foregoing example, instead of directly ascertaining the intermediate product 2367 the products 27, 24 and 21 are ascertained. It will be noted that the value of these products is 2367 even though those precise digits are not represented. It is these products 27, 24 and 21 that are represented and that are disposed on the lines LS, Figs. 101 and 102, which lines LS correspond to the lines L on Fig. 65 and which represent the operative positions into which the templets of the templet sets SX of the templet-gangs SXs are moved. By reference to Figs. 101 and 102 it will be seen that the above set forth example of the multiplication of 789 by 123 is represented thereon.

Now it so happens that the multiplication of 789 by 123 does not result in a digit appearing in the hundred thousands order such as would appear in the following multiplication:

```
789  Multiplicand
654  Multiplier
─────
 36 ⎫
 32 ⎬ ─────────── 3156—First intermediate product
 28 ⎭
 45 ⎫
 40 ⎬ ─────────── 3945—Second intermediate product
 35 ⎭
 54 ⎫
 48 ⎬ ─────────── 4734 —Third intermediate product
 42 ⎭
─────
516006             516006—Final product
```

However, it should be noted that in the above multiplication the first or most left-hand digit 5 is, in reality, a carry-over from the ten thousands order into the hundred thousands order. This is explanatory of why, in no instance, in assembling a templet-gang SXs is a templet set SX provided for the highest order into which the intermediate products may extend. It is not necessary so to do inasmuch as digits which are to appear in such highest order are represented in the templet set pertaining to the next to the highest order. It will be seen from this that the primary difference between assembling a templet-gang SXs and a templet-gang X, in so far as multiplications of a three-order number by a three-order number are concerned is that but three templet sets are provided in the templet gangs SXs while four templets as 1105 to 1108 are provided in each templet-gang X in such an instance.

In my novel universal multiplying apparatus UM the templet-gangs SXs, Figs. 101 and 102, are mounted for swinging movement to enable disposition of intermediate product representation in operative position under control of the multiplicand digit just as in the case of the templet-gangs X where swinging movement of each templet-gang X disposed the representations of the proper intermediate product in operative position.

Thus to refer to the illustrated form of the universal multiplying apparatus UM, attention is first directed to Figs. 84, 85 and 86. It should be first noted, however, that in the universal multiplying apparatus UM there are many parts which are substantially similar to parts in the multiplying apparatus M and in this description where there are corresponding parts the suffix s is added to a reference character where it appears in the universal multiplying apparatus UM and where the reference character designates a part in this apparatus that corresponds to a part in the multiplying apparatus M, it being recognized that in this system the same reference character is used to designate similar parts.

Plates 1126s to 1131s, Fig. 84, are mounted between side plates 1124s and 1125s but these plates are spaced much farther one from the other than are the plates 1126 to 1131 in the multiplying apparatus M, this being done to accommodate templet sets SX between the plates, these templet sets of course being thicker than the templets as 1105 to 1108. Furthermore, the templet sets SX, as will be explained presently, are capable of movement relative to the respective plates with which they are associated, this enabling selection of the multiplicand digit.

Inasmuch as it will not be necessary to remove one set of templet-gangs and substitute another therefor in the universal multiplying apparatus UM, shafts 1193s, 1185s and 1172s are provided instead of the pins 1193, 1185 and 1172. These shafts, as can be ascertained by reference to Figs. 101 and 102, carry the templet-gangs respectively pertaining to the units, tens and hundreds orders of the multiplier. The shafts 1193s, 1185s and 1172s are square and the openings os provided in the hubs hs of the templets 2010 to 2019 are also square which facilitates mounting of these templets on the templet carrying shafts and insures against the templets in the various sets thereof getting out of alignment with each other as well as insuring proper alignment between templet sets in the same templet-gang.

The shafts 1193s, 1185s and 1172s are mounted in the mechanism to be capable of axial as well as swinging movement. Thus bearings as 2023, Fig. 86, are formed in the side plate 1125s and collars as 2024 are rotatably mounted in these bearings, these collars having a groove as 2025 therein into which a pin 2026 extends to prevent axial movement of the collars in the bearings but, at the same time, to enable rotation of the collars. The collars as 2024 have square openings therein to receive a shaft as 1172s and it will therefore be seen that a slidable mounting for each shaft as 1172s through the side plate 1125a is afforded and at the same time the shaft is capable of rotating, that is, swinging.

Likewise, bearings as 2027 are formed in the side plate 1124s and collars as 2828 are rotatably mounted in these bearings, these collars having grooves 2029 therein into which plates 2030 are extended to prevent axial displacement. The collars as 2028 also have square openings therein and thus a slidable but yet rotatable mounting is afforded for the shaft as 1172s in the side plate 1124s. It will, of course, be understood, that the shafts 1193s and 1185s are mounted in the just described manner in the side plates 1124s and 1125s.

The shafts 1193s, 1172s and 1185s are mounted with respect to the plates 1124s to 1131s in the same relative locations as the pins 1193, 1172 and 1185 are mounted with respect to the plates 1124 to 1131 so that, as in the case of the templet-gangs X, the steps Zs on the templets in the templet sets SX on the shafts 1193s and 1172s face downwardly whereas the steps Zs on the templets in the templet sets on the shaft 1185a face upwardly. This arrangement, as explained hereinabove, enables certain of the sensing fingers of the summation means to be moved downwardly and other fingers of the summation means to be moved upwardly. In this connection it is to be noted that the summation means on the plates 1126s to 1131s are similar to the summation means on the plates 1126 to 1131 in structure and functions in an identical manner.

The plates 1126s to 1131s pertain to the units to the hundred thousands orders, respectively, of the final product just as the plates 1126 to 1131 pertain to these orders. The plates 1126s to 1131s are respectively illustrated in Figs. 87 to 92. By referring to Fig. 87 it will be seen that a carry pinion and finger slide 1228s is provided in this plate, which pertains to the units order of the final product, and that this slide is permanently fixed against movement by having a block 1227s associated therewith. The reason for such permanent fixing is that no carries will be made into the units order but carries are made from this order in the apparatus UM, as will be explained. This plate also has a sensing finger 1231s thereon that is movable toward the steps Zs on templets in the templet set SX pertaining to the units order of the final product and which is included in the templet-gang SXs that pertains to the units order of the multiplier, such templet-gang being indicated by SX—U—1 in Fig. 87.

Before proceeding with further discussion of various other of the plates included in the universal multiplying apparatus UM, reference is again made to Figs. 101 and 102 wherein, as stated hereinabove, lines Ls are shown which relate to the operative positions into which steps Zs are to be moved. Furthermore, just as in the case of the lines L on Fig. 65, each line Ls also shows the line of summation or, in other words, each line Ls represents a summation means. Thus, the most right-hand line Ls in Fig. 102 pertains to the summation means that relates to the units order of the final product which is the above referred to plate 1126s. Successively on across Figs. 101 and 102 to the left, the lines respectively relate to the plates 1127s to 1130s. Figs. 101 and 102 are a convenient way of illustrating what templet sets are associated with what plates.

As stated above, the templet set SX—U—1 is associated with the plate 1126s. Further, the templet sets SX—U—2 and SX—T—1 are associated with the plate 1127s. The templet sets SX—U—3, SX—T—2 and SX—H—1 are associated with the plate 1128s. The templet sets SX—T—3 and SX—H—2 are associated with the plate 1129s while the templet set SX—H—3 is associated with the plate 1130s. It will be understood that the suffixes "U," "T" and "H" associated with the reference character "SX" in the above description, pertain to the order of the multiplier to which the particular templet set relates, the U, T and H of course indicating units, tens and hundreds orders respectively. Furthermore, the numeral suffixes indicate the position of the templet set in the templet-gang SXs in which it is arranged, the lowest of the three templet sets being the most right-hand in the templet-gang.

Now returning to the plates of the summation means of the universal multiplying mechanism UM and referring particularly to Fig. 88, it will be seen that this plate is equipped with a sensing finger 2009 which is on a carry pinion and finger slide 1237s. The plate 1127s, unlike the plate 1127 of the multiplying apparatus M, has active carry means thereon inasmuch as there may be carry-overs from the units order to the tens order in the universal multiplying apparatus UM due to the manner in which digits are represented on the templets 2010 to 2019, it having been explained above that in the case of the multiplication of 9 by 9 in the units order it is necessary to make a carry of 8 into the tens order.

The plates 1128s, 1129s, 1130s and 1131s respectively pertain to the hundreds, thousands, ten thousands and hundred thousands orders of the final product and are illustrated respectively in Figs. 89 to 92. These plates all include active carry means both for receiving carries from a lower order and for effecting carries into a higher order, except that no means are provided which will receive carries from the plate 1131s, there being no need for such means in a machine of the capacity of the illustrated apparatus. The carry means associated with the various plates in the universal multiplying apparatus UM are identical with those employed in the multiplying apparatus M and function in a similar manner, the summation means of the universal multiplying apparatus UM also functioning, as has been stated, like the summation means of the multiplying apparatus M. However, in so far as the carry means are concerned, it will be necessary, in the universal multiplying apparatus UM, to make far more carries than will be required in the multiplying apparatus M and hence the sets of teeth 1221s and 1224s on the ratchet member 1211s have far more teeth therein than are provided in the corresponding sets of teeth in the carry means of the multiplying apparatus M. A further distinction between the summation means of the universal multiplying apparatus UM and the multiplying apparatus M is that bars as 2008, Fig. 90, are fastened by means of screws to the face of the plate beneath a sensing finger with which no templet set SX is associated, this being different from the blocks positioned below the pinion and finger slides in the multiplying apparatus M, but serving the same purpose, which is, to prevent unrequired movement of a sensing finger.

Furthermore, the summation means of the universal multiplying apparatus UM include receivers 1232s, 1195s, 1141s, 1238s, 1148s, and 1257s, and these receivers have positioning members 1320s at the upper ends thereof, and these positioning members include fingers as 1320—1s, there being such a positioning finger for each series of numbers by which is meant, as explained above, each series of numbers as from 0 to 9, 10 to 19, 20 to 19, and so on. It will be recognized that in the apparatus UM more such positioning fingers will be required than in the multiplying apparatus M in view of the fact that the receivers as 1141s are capable of much greater movement than the receivers as 1141 of the apparatus M, this being due to the manner in which the steps Zs are provided on the templets as 2010 to 2019.

The templet-gangs SXs include positioning templets as 1117s which, just as the positioning templets 1117 were arranged to position steps Z on the templets as 1105, are arranged to position steps Zs on the templets 2010 to 2019, and by disposing such steps in position is meant locating the steps relative to the sensing finger of the summation means under control of the digits appearing in the multiplier.

Each templet-gang SXs includes a positioning templet as 1117s which is mounted on the outwardly disposed face of the plate 1125s just as the positioning templets 1117 were so mounted on the plate 1125. These positioning templets 1117s—U, 1117s—T and 1117s—H, Fig. 85, which respectively pertain to the units, tens and hundreds orders of the multiplier, are respectively urged toward pins as 1561s, 1563s and 1562s by springs 1558s, 1560s and 1559s, the pins 1561s and 1563s being provided on a slide 1548s and the pin 1562s being provided on the slide 1549s. The parts just described correspond to similar parts provided in the multiplying apparatus M and function in a like manner.

It will be recalled that springs as 1542, Figs. 31 and 32, were effective to swing the steps Z' on the positioning templets 1117 toward pushed pins 1547, which are the pins pushed forwardly by the Bowden cables 1532 by push pins 1530, Fig. 67, engaged by detecting pins 1515. Similar pins 1547s are provided in the apparatus UM and are under control of a detecting means similar to that shown in Fig. 67, these pins being pushed to represent the digit appearing in the related order of the multiplier. Those pins which are pushed forwardly cooperate with steps Zs' on the associated positioning templet 1117s in the same manner as that in which the pins 1547 cooperate with steps Z' on the positioning templets 1117, this being in accordance with the code shown in Fig. 4 and having been explained in detail hereinabove.

The respective steps Zs' on the positioning templets 1117s are respectively related to the steps Zs provided on the templets 2010 to 2019 in each templet-gang. Thus, when a step Zs' engages a pin as 1547s—1—2 when a pin as 1547—9 is also pushed, the steps Zs on the templets 2010 to 2019 pertaining to the digit 1 are located in operative positions with respect to their cooperating sensing fingers of the sensing means and, further, if a step Zs' engages a pin as 1547s—1—2 and when a pin as 1547s—9 is not pushed then the steps Zs on the templets 2010 to 2019 pertaining to the digit 2 are arranged in the aforesaid operative position. It will of course be understood that when a step Zs' pertaining to a particular digit in the multiplier engages pins 1547s in the manner above described, all of the steps Zs on all of the templets in the particular templet-gang of which the particular positioning templet 1117s is a part and related to the same digit as the engaged step Zs' are disposed in operative position. All of this corresponds to the positioning of the templet-gangs X hereinabove described and will not therefore be described in further detail at this time except that the manner in which the templet-gangs SXs are swung to dispose the steps Zs in operative position so far as the multiplier digits are concerned will now be described.

Arms 1539s, which correspond to the arms 1539, Fig. 32, are fast on shafts 1540s, Fig. 84, which are acted on by torsion springs 1543s, the arrangement here provided corresponding to that shown in Fig. 31. The arms 1539s are movable into alternative positions and this is controlled by the stop pins 1545s and 1577s, Fig. 85, the pushing of the pins 1547, and the cooperation with shoulders 1566s, as described hereinabove with reference to corresponding parts shown of the apparatus M and which are shown in Figs. 31 and 32. The shafts as 1540s are respectively aligned with, but are independent of, the shafts 1172s and 1185s just as the pins 1540 are respectively aligned with but are independent of the pins 1193, 1172 and 1185.

In the course of operation of the machine movement is imparted to the rocker 1556s from a cam like the cam 1289, Fig. 11, through a rod 1570s, an arm as 1569s and a shaft as 1557s, Fig. 85, so that the pins as 1561s, 1563s and 1562s are retracted from engagement with the edges es' of positioning templets and thereupon the springs 1558s, 1560s and 1559s, respectively, swing the positioning templets 1117s—U, 1117s—H and 1117s—T to engage the steps Zs' on these positioning templets with pushed of the pins 1547s or with the shoulder 1566s to thereby dispose the steps Zs on the templets of the particular templet-gang in operative position.

The foregoing explains the manner in which the templets in the various templet-gangs are swung into positions pertaining to the digits of the multiplier and constitutes the means by which proper of the steps Zs are disposed in operative position in so far as the digit of the multiplier is concerned.

Now as to the multiplicand, in each templet set SX there is a templet pertaining to each digit that may appear in each order of the multiplicand that may enter into a particular multiplication and therefore in order to dispose the step Zs in operative cooperation with a sensing finger of the sensing means which pertains to the order of the final product related to such digit in the multiplicand it is necessary to move the templet set SX relative to the sensing finger and to this end the templet sets SX are mounted on the shafts as 1172s in the following manner.

Square shafts as 1193s are passed through the openings as os in the templets 2010 to 2019 of each templet set SX. When a set of such templets is to be mounted on a shaft as 1172s it is first ascertained with what plates the templet sets on the particular shaft are to be associated. Thus, referring to Figs. 101 and 102, it will be seen that templet sets are to be provided for the units, tens and hundreds orders of the final product on the shaft 1193s that pertains to units order of the multiplier, that templet sets are to be provided for the tens, hundreds and thousands orders of the final product on the shaft 1185s that pertains to the tens order of the multiplier, and that templet sets are to be provided for the hundreds, thousands and ten thousands orders of the final product on the shaft 1172s that pertains to the hundreds order of the multiplier.

Thus, to specifically refer to the shaft 1172s, Fig. 86, a collar 2034 is fast thereon in a position adjacent to, but forwardly of, the plate 1128s that pertains to the hundreds order of the final product. A templet set SX is then arranged on the shaft 1172s to lie between the plate 1128s and the collar 2034. A clearance opening 2035 about the shaft 1172s is provided in the plate 1128s and a spring 2036 is extended through this opening to bear against the templet 2019 in the so positioned templet set SX that pertains to the digit 9 in the templet set, this spring reacting against a collar 2037 fast on the shaft 1172s rearwardly of the plate 1128s and forwardly of the plate 1129s that pertains to the thousands order of the final product. Another templet set SX abuts this collar 2037, forwardly of the plate 1129s, and another spring 2038 disposed about the shaft 1172s passes through a clearance opening 2039 in the plate 1129s and urges the templet set adjacent the plate 1129s toward the collar 2037. The spring 2038 reacts against a collar 2040 fast on the shaft 1172s adjacent the plate 1130s that pertains to the ten thousands order of the final product, a spring 2041 extending through a clearance opening 2042 in the plate 1130s and reacting against a collar 2043 fast on the shaft 1172s rearwardly of the plate 1130s to urge this templet set toward the collar 2040. The foregoing is typical of the mounting of the templet sets SX on the shafts 1172s to 1103s.

Mention has been made that the shafts as 1172s are mounted for sliding movement and such movement is imparted thereto through a thrust collar as 2044, Fig. 84, fast on each shaft as 1172s outwardly of the side plate 1124s. A roller as 2045 is positioned between the flanges of the collar as 2044, such roller being carried on the arm as 2046 of a bell crank as 2047 pivotally mounted as indicated at 2048 on a bracket as 2049 on the outer face of the side plate 1124s. A link as 2050 is pivotally connected to the arm as 2051 of the bell crank as 2047 and to the core as 2052 of the solenoid 2053 carried by a bracket as 2054 secured to the adjacent side plate 1124s.

When the positioning templets as 117s and the templets connected thereto are to be freed to the action of the springs as 1143s effective thereon to swing the product representations into operative position, the link 1570s moves the rocker 1569s counterclockwise, as viewed in Fig. 85, this being effected by a cam on the cam shaft 1280s that corresponds to the cam shaft 1280, this movement of the rocker 1569s being effected in the same manner as movement of the rocker 1569 is effected, as described hereinabove, and being brought about under the control of a roller corresponding to the roller 1574 that is actuated by a cam corresponding to the cam 1289 on the cam shaft 1280 (see Fig. 11). However, prior to the time a cam corresponding to the cam 1289 causes the rocker 1569s to swing as aforesaid, the cam 2022', Fig. 118, on the cam shaft 1280s moves with the cam shaft and thereupon the notch 2023' in the periphery thereof moves out of contact with the rider 2024' on the contact 2025' and the rider 2024' thereafter rides on the periphery of the cam 2022'. The cam 2022' is mounted on the shaft 1280s immediately adjacent the side frame 1134s and the contact 2025' is mounted on the underside of a block 2026' mounted on the inner side of the side frame member 1134s. When the rider 2023' is on the periphery of the cam 2022', the contact 2025' is forced into engagement with the contact 2021'. These contacts are included in the circuit to the solenoids as 2053. Thus immediately after the cam shaft 1280s is set in operation, the contacts 2025' and 2021' are engaged and these contacts remain in engagement until near the end of a complete rotation of the cam shaft 1280s, for at the end of a complete rotation the rider 2024' moves back into the notch 2023' and separates the contacts 2025' and 2021'. Thus immediately after the cam shaft 1280s is set in operation, circuit is closed to the solenoids as 2053 which thereupon energize.

Upon energization of the solenoid as 2053 the core as 2052 thereof is attracted whereupon the bell crank as 2047 is pivoted and thereupon the roller as 2045 acts on the member as 2044 to move, in this instance, the shaft 1172s to the right as viewed in Fig. 84 and to the right as viewed in Fig. 94. The effect of such movement is to shift the templet sets on the shaft as 1172s away from the plates with which they are associated, the templet set SX being in its at rest position in Fig. 94 and in Fig. 95 this set is shown as having been shifted into a position representative of a multiplicand digit 5.

The templets in each templet set are of course tied together as by being brazed, soldered or the like, so that each templet set SX is a unit. Each templet set includes an opening 2055, Fig. 94, and when the templet-gang is in its at rest position, shown in Fig. 94, the end of a pin 2056 is extended thereinto. The pin as 2056 passes through a block 2057 secured to the adjacent plate as 1128s. As can be ascertained by reference to Fig. 97, the pin 2056 is a continuation of the core of the zero solenoid 1992—H which, as explained hereinabove, is energized each time a key representative of a significant digit in the hundreds order of the multiplicand is depressed. Unless the solenoid as 1992—H is energized and the pin 2056 retracted, the templet set SX—H—1, in which the opening 2055 is shown as being formed and in which the free end of the pin 2056 seats, does not shift from its at rest position shown in Fig. 94, and in such an instance the spring as 2036 is merely compressed, when the shaft 1172s is shifted axially as above described. It is to be understood that the shafts 1193s and 1185s are similarly shiftable and that the specific description with reference to the templet set SX—H—1 is typical of all other sets SX. If the pin 2056 remains seated in the opening 2055 which, as stated, retains the templet-set SX—H—1 from shifting, then the sensing finger 1191s that is adapted to cooperate with the templets in this particular templet set will seat on the zero templet 2010 of the templet set and will be prevented from moving and as a result the product receiver 1141s of the summation means of which the sensing finger 1191s is a part will be prevented from moving in so far as this movement is under control of the sensing finger 1191s.

When, however, a key pertaining to a significant digit in the hundreds order of the multiplicand is depressed, then, as explained hereinabove, at least one of the solenoids 1991, Figs. 84, 97 and 100, is energized. Now, if the "5" key, for example, in the hundreds order of the multiplicand is depressed, the solenoids 1991—5—6—H are energized as well as the solenoid 1991—9—H. The energization of these two solenoids, pushed pins 2058—5—6 and 2058—9 downwardly from the position shown in Fig. 94 into the position shown in Fig. 95, this pin and other pins 2058 being continuations of cores of the solenoids 1991. The lower ends of the pins 2058—1—2 to 2058—9 extend through a block 2059, Figs. 94 to 97, that is slidably mounted in the block 2057.

The extension of the pins as 2058—1—2 through the block 2059 is such that if the pin 2058—1—2 is forced downwardly in the absence of any other pin being pushed downwardly, which would indicate that the digit 2 was to be selected, then the lower end of the pin 2058—1—2 lies in the path of movement of the associated templet-gang SX when the shaft as 1172s is moved axially and this pin 2058—1—2 is engaged by the adjacent of the templets in the templet-gang which would be the templet 2010, and when this pin is engaged the block 2059 slides until it engages the adjacent plate as 1127s. Such movement would dispose the templet 2012 of the templet set in position to be engaged by the sensing finger as 1191s upon downward movement of the receiver as 1141s. If, however, the pin 2058—9 had been forced downwardly along with the pin 2058—1—2, the pin 2058—9 would have been extended over a block 2060 fast on the plate 1127s. In this circumstance when the templet-gang SX moves with the shaft 1172s on which it is mounted and engages the pin 2058—1—2, the block 2059 is prevented from sliding by reason of the engagement of the pin 2058—9 with the block 2060 and therefore the templet-gang can only move far enough to dispose the templet 2011 pertaining to the digit 1 in alignment with the sensing finger 1191s. It will of course be understood that if only the pin 2058—9 is pushed that the templet set will make its full movement so as to bring the templet 2019 into cooperating relation with the sensing finger 1191s.

In Fig. 95 the pins 2058—5—6 and 2058—9 are shown as having been pushed downwardly which resulted from the aforesaid energization of the solenoids 1991—5—6—H and 1991—9—H and in this instance the templet 2015 pertaining to the digit 5 of the multiplicand which relates to the hundreds order of the final product is disposed in position to cooperate with the sensing finger 1191s.

Such disposition of a selected one of the templets 2010 to 2019 in alignment with the sensing finger 1191s selects the digit of the multiplicand. It will be understood that, while in the present instance the pins 2058 are extensions of the solenoids as 1991s, other means could be provided for pushing the pins downwardly so that the templet positioning would correspond to the related digit of the multiplicand. It will be manifest also that the arrangement pertaining to the selection of the digit of the multiplicand is under the code shown in Fig. 4 since the selection of the odd digits 1, 3, 5 and 7 is controlled by the simultaneous pushing of the pin 2058—9, while if only a pin as 2058—5—6 is pushed the even digit, 6 in this instance, will be selected. It will be seen from this that the arrangement provided for selecting the templet related to the digit of the multiplicand is amenable to use with a detector such as the detector 1511, Fig. 67, and its cooperating mechanisms.

If the digit appearing in the multiplicand related to any particular templet set is zero, the templet 2010 of this set will remain in cooperating relation with the cooperating sensing finger as 1191s. However, if the digit in the order of a multiplier to which a particular templet-gang relates is zero, the templet-gang will swing until the last step Zs' thereon engages the associated shoulder 1566s. In this circumstance if any of the templet sets of this particular templet-gang were shifted from their zero or at rest position, then the sensing finger as 1191s would be capable of moving. It will be apparent however that wherever the digit in the related order of the multiplier is zero no multiplications should be made since the product of any significant digit by 0 is 0.

Therefore, to prevent movement of a sensing finger as 1191s in event the associated templet on the related templet-gang is swung to its zero position by reason of a zero appearing in the related order of the multiplier, a lug 2070, Fig. 93, is provided on the finger and pinion slide 2071 in this instance on which the finger 1191s is mounted. A rocker 2072 pivotally mounted as indicated at 2073 on the plate 1128s is adapted to move above the lug 2070 and prevent upward movement of the finger and pinion slide 2071 in each and every instance where the templet-gang SX—H—1 is swung to its zero position, and to this end a pin 2074 is provided on the rocker 2072 to lie in the path of the templet set SX—H—1. As the templet set moves into its zero position it engages the pin 2074 and pivots the rocker 2072 to dispose the opposite end of this rocker above the lug 2070. This effectively prevents upward movement of the sensing finger as 2071. However, when the templet-gang SX—H—1 returns to its at rest position upon restoration of the shafts as 1172s, which is effected in the manner described hereinabove in connection with the multiplying apparatus M, the spring 2074' pulls the rocker 2072 back into engagement with the stop pin 2075, Fig. 93, which disposes the upper end of this rocker in such position that the lug 2070 may freely move thereby. It will be understood that, and as can be ascertained by reference to Figs. 87 to 91, every active sensing finger has an arrangement such as the rocker 2072 associated therewith, such arrangements of course being unnecessary in connection with inactive or blocked sensing slides.

The manner in which the universal multiplying apparatus UM operates can probably best be explained by reference to a specific problem and by reference to Figs. 101 and 102 wherein the parts are shown as set up in the manner in which they would be set up to solve the following problem.

```
 789 Multiplicand
 123 Multiplier
 ───
  27 ⎫
  24 ⎬──────────── 2367—First intermediate product
  21 ⎭
  18 ⎫
  16 ⎬──────────── 1578 —Second intermediate product
  14 ⎭
   9 ⎫
   8 ⎬──────────── 789 —Third intermediate product
   7 ⎭
  ────
 97047                97047—Final product
```

In solving this problem in the universal multiplier UM, the "7" key 1975, Fig. 100, in the hundreds order, the "8" key in the tens order and the "9" key in the units order are pressed downwardly to thereby energize the connected solenoids 1991 in a manner hereinabove described, whereupon the pins 2058 are positioned upwardly in the manner described. Furthermore, since a significant digit is set up in each order of the multiplicand all of the solenoids 1992 are energized wherefore all of the pins as 2056 are retracted.

It is to be recalled that the universal multiplier UM may be substituted for and used in place of the reoccurring factor multiplier M fully described hereinabove, and those parts of these two multipliers which correspond are not repeated in the illustration or description of the universal multiplier UM except in those instances where these parts differ from those included in the multiplier M, and also in those instances where a showing of the parts in the universal multiplier UM illustrate interconnection with cooperating parts illustrated in connection with the multiplier M.

Thus, as in the instance of the multiplier M, the machine is set in operation and in so far as the operation of the universal multiplier UM is concerned, the first thing which occurs after the initiation of a cycle of operation at the point 2101, Fig. 119, is the initiation of operation of the detector as 1511 at point 2102 and by the time the point 2103 is attained, the detector 1511 will have completed its operation and through the Bowden cables will have positioned the pins for proper cooperation with the positioning templets as 1117s.

Again, as in the instance of the multiplier mechanism M, once the Bowden cables have thus been positioned, the detector as 1511 starts to move out of cooperative relation with the control area on the printing and control device that has been determinative of the positioning of the Bowden cables and the pins connected thereto. Hence, restoration of the detector 1511 is initiated at the point 2103 and is completed at the point 2103' but the Bowden cables and the pins connected thereto remain in the operative positions into which they are thus moved until a later time in the cycle of operation, as will be described presently.

When the pins are positioned for cooperation with the positioning templets, as in the case of the multiplier M, the cam shaft 1289s is set in operation and, as explained hereinabove, this results in engagement of the contact 2025', Fig. 118, with the contact 2021' whereupon circuit is closed to the solenoids as 2053 which then energize whereupon the shafts 1193s, 1172s and 1185s at the point 2103a start to move axially to dispose the proper templets in the various templet sets in operative position, and with regard to what templets would be disposed in operative position by this movement, attention is directed to Figs. 101 and 102, such axial movement of the templet sets being completed at the point 2104, Fig. 19. Inasmuch as the digit 9 appears in the units order of the multiplicand the templets 2019 in the sets SX—U—1, SX—T—1 and SX—H—2 are disposed in operative position. Since the digit 8 appears in the tens order of the multiplicand the templets 2018 in the templet sets SX—U—2, SX—T—2 and SX—H—2 are disposed in operative position. Furthermore, since the digit 7 appears in the hundreds order of the multiplicand the templets 2017 in the templet sets SX—U—3, SX—T—3 and SX—H—3 are disposed in operative position.

After the templet sets have been shifted axially to be disposed as just described, the multiplier is set up. This entails swinging of the templet sets about the axes thereof, and this swinging movement is initiated at point 2104a and is completed at point 2105. Since the digit 3 appears in the units order of the multiplier, the shaft 1193s is swung to its third position to dispose all of the steps Zs on the templets therein pertaining to the digit 3 in operative position. It will be understood, however, that the step on the templet that has been positioned by selection under control of the value of the multiplicand digit is actually in operative position, all other steps on the templets in the respective steps lying on the same plane as this operative step but being out of the position in which the positioning finger can cooperate therewith by reason of the aforesaid positioning of the templets under control of the digit of the multiplicand. In a like manner, and simultaneously with the setting up of the shafts 1193s, the shafts 1185s and 1172s are respectively disposed in their second and first positions to dispose steps Zs on the templets thereon respectively pertaining to the digits 2 and 1 in the tens and hundreds orders of the multiplier in operative position.

As stated, the axial and swinging movement of the templet sets is completed by the time the point 2105, Fig. 119, is attained and shortly thereafter at the point 2106, the summation means of the multiplier UM is set in operation, this being initiated, in the case of the multiplier M, by the lowering of the pin as 1262, the pin 1262s being lowered in so far as the universal multiplier UM is concerned. This places the summation racks as 1185s under the tension of the springs 1271s and by the time the point 2107 is attained, the summation movement of the summation racks will be completed, the summation racks remaining in the position thus attained until the point 2111 is attained. In the course of this summation movement of the summation means, the sensing fingers thereof cooperate with the templets which are positioned as a result of the positioning movements of the templets initiated at the points 2103a and 2104a, it being understood that once the axial and rotative movements thus initiated in the templet sets are completed respectively at the points 2104 and 2105, the templet sets remain in such position until the point 2108 is attained when restoration of the templet sets, by swinging about the axes thereof, is initiated at the point 2108, this restoration being completed at the point 2109, and when the swinging restoration is completed at the point 2109, axial restoration of the templet sets is initiated at the point 2109a at which time the rider 2024' has so moved into the notch 2023' that the contact 2025' has been separated from the contact 2021' so that by the time the point 2110 is attained, the templet sets are restored to their normal at rest positions.

The result of the aforesaid positioning of the templets is as follows: The templet 2019 in the templet set SX—U—1 that pertains to the units order is arranged in position to dispose a step thereon representative of 27 digits in position to be engaged by a sensing finger on the plate 1128s pertaining to the units order of the first product wherefore the receiver 1232s will move into a position representative of 7 and in so doing will attain a position in the third series of numbers which means that a carry-over of 2 is made into the tens order.

A step on the templet 2018 in the set SX—U—2 representative of 24 and a step on the templet 2019 in the set SX—T—1 representative of 18 are associated with the sensing finger on the plate 1127s pertaining to the tens order of the final product. Thus when the sensing fingers on the plate 1127s function, twenty-four digits and eighteen digits as well as the carry-over of two digits from the units order are entered on the receiver 1195s, this resulting in this receiver being set to represent four digits and a carry-over of four digits into the hundreds order.

A step on the templet 2017 representative of 21 in the set SX—U—3, a step on the templet 2018 in the set SX—T—2 representative of 16 and a step on the templet 2019 in the set SX—H—1 representative of 9 are associated with sensing fingers on the plate 1128s that pertain to the hundreds order of the final product. When the sensing fingers on the plate 1128s function, the receiver 1141s associated therewith is moved into a position representative of zero and there is a carry-over of 5 into the thousands order.

A templet 2017s in the set SX—T—3 representative of 14 and a templet 2018 in the set SX—H—2 representative of 8 are moved into cooperating relation with sensing fingers on the plate 1129s pertaining to the thousands order of the final product and when these sensing fingers operate, the 14, 8 and 5 carry-over from the hundreds order are totalized so that the receiver 1172s comes to rest at the position 7 with a resulting carry-over of 2 in the ten thousands order.

A step on the templet 2017 in the set SX—H—3 representative of 7 is associated with a sensing finger on the plate 1130s that pertains to the ten thousands order of the final product and when this sensing finger moves into cooperating relation with this step the receiver 1248s associated with this plate is moved into a position controlled by the step representing 7 on the templet 2017 and the carry-over of 2 from the thousands order or, in other words into a position representative of 9.

As explained hereinabove, the multiplication of 789 by 123 does not result in a digit appearing in the hundred thousands order, but if the summation effected on the plate 1130s had resulted in such a carry-over or carry-overs it or they would have been transferred over to the hundred thousands order and the receiver 1257s of the summation means for this order would have been positioned to represent whatever digit should be represented by reason of such carry-overs.

In the foregoing it will be seen that the receivers 1248s, 1238s, 1141s, 1195s and 1232s, respectively, came to rest in positions representative of 9, 7, 0, 4, 7 or 97047, the product of 789 times 123. In so far as the timing of the apparatus is concerned, the aforesaid receivers will attain the just described positions by the time the point 2107, Fig. 119, is attained, and these receivers remain in this position until the point 2111 is attained.

When the receivers are positioned as just described and at the point 2107a the sensing bars as 1324s are set in operation in the same manner as that in which the sensing bars 1324 are set in operation and for the same purposes. The sensing bars as 1324s attain their set-up positions by the time the point 2112 is attained at which time the respective sensing bars 1324s are set in digital positions corresponding to the digital positions of the receivers as 1248s with which they respectively cooperate. Thus by the time the point 2112 is attained, the punches in the punching mechanism and type on type segments, corresponding to the type segments 241, are disposed in operative position and thus at the point 2113 hammers, corresponding to the hammers 250, are released to effect printing, and the punching mechanism is operated in the manner hereinabove described to perforate a card corresponding to the card C, these printing and punching operations being completed by the time the point 2114 is attained and thereafter in the interval between the points 2114 and 2115 the operated parts of the printing and punching means are restored to their at rest positions which are attained by the time the point 2115 is attained.

As can be ascertained by reference to Fig. 119, during the time the operated parts of the printing and punching mechanisms are being restored and prior to the time the point 2115 is attained, namely, at the point 2116, restoration of the sensing bars 1324s is initiated and the restoration of these bars is completed by the time the point 2117 is attained. Further, as can be ascertained by reference to Fig. 119, the restoration of the receivers and the summation means as a whole is initiated at the point 2111 as aforesaid, this being initiated prior to the time the sensing bars as 1324s are completely restored to their normal at rest positions at the point 2117. This restoration of the receivers and other operated parts of the sensing means is completed by the time the point 2118 is attained.

Furthermore, concurrently with the initiation of the axial restoration of the templet sets at the point 2108, a rocker corresponding to the rocker 1585, Fig. 7A, is actuated by a cam block corresponding to the cam block 1583 and hence at the point 2108a restoration of the Bowden cables is initiated, this restoration being completed by the time the point 2119 is attained.

It will be seen from the foregoing that the universal multiplier UM operates in a manner corresponding to the multiplier M and in a period of time like that required for operation of the multiplier M. It is because of such correspondence in time of operation of these two multipliers that the universal multiplier UM may be substituted for the multiplier M.

It will be understood that the printing and control devices will be grouped when they are to be passed through a machine including the universal multiplier UM so that the manually settable keys shown in Fig. 100 may be set up intermediate the passage of different groups of printing and control devices through the machine, it being understood that the grouping of printing and control devices is such that all of those entailing the use of a corresponding factor will be in the same group. If each printing and control device differs from the other in so far as the required factor is concerned, then operation of the machine is interrupted after each cycle of operation of the universal multiplier UM so as to permit a new factor to be set up under control of the arrangement shown in Fig. 100.

It will be apparent from the foregoing description that while the actual digits of the various intermediate products are not represented by steps Zs, that intermediate products are nevertheless represented for the values thereof are represented and it may therefore be said that both the multiplying apparatus M and the universal multiplying apparatus UM are responsive to representations of intermediate products and that the summation means in both of these multiplying apparatus serve to totalize representations of intermediate products.

SUMMARY

It is believed that it will be apparent from the foregoing description that the machine of the present invention represents a marked advance over previous machines, examples of which are shown in United States Letters Patent 2,041,183 and 2,183,061 and in my co-pending applications Serial Nos. 65,376 and 78,682, now Patents Nos. 2,132,411 and 2,132,413, respectively, all of which have been referred to hereinabove.

In connection with the description of this machine it is to be noted that while the machine has been described as severing sheets from the web W and feeding these sheets through the machine, preprinted sheets could be used and in such an event it would not be necessary to rely upon printing means such as are included in the unit carried by the frame 10 nor would a printing unit such as the printing unit U be employed. Previously printed and cut sheets of this type would be stored on a rack to be withdrawn therefrom by suction means and fed to a roller as the roller 165 in the present machine. For a more detailed description of the manner in which this could be accomplished attention is directed to, for example, United States Letters Patent No. 2,002,773.

Furthermore, it is to be understood that the form printed on the sheets in this instance could be printed thereon in a printing mechanism such as that shown in United States Letters Patent No. 2,041,183 prior to the time the sheets are severed from the web although, as will be recognized, the printing means in the present instance which operate on the web prior to its division into sheets are of more simple construction than that shown in the last mentioned patent.

In event preprinted and pre-cut sheets were employed and it was desired to print data such as the date E and the signature B on the sheets, suitable means for this purpose could be associated with the platen P, just as the numbering device 652 is associated therewith, such an arrangement being common in the art and for that reason not being further described.

The severance of sheets from the web is under control of operation of the multiplying apparatus M so that each time this apparatus is operated a sheet is severed from the web and fed forward into position in this apparatus. This same arrangement would be utilized in event a universal multiplying apparatus, such as the apparatus UM described hereinabove, was employed, but along this line it should be noted that if desired severance of the sheet from the web could be placed under control of a cam on the control cam shaft, such as the cam shaft 1078, Fig. 107. In fact all operative mechanisms in the machine could be placed under control of cams on this shaft and, if desired, the control of the platen P in the operation of producing a proof sheet could likewise be controlled from a cam on this cam shaft although, for reasons hereinabove set forth, such as is the case in a total taking operation wherein an accumulator is included in an auxiliary printing mechanism such as the auxiliary printing mechanism 672, it is advantageous to control a proof sheet impression making operation of the platen from a means such as the auxiliary printing mechanism 672.

It will be manifest also that the provision of controls on a cam shaft such as the control cam shaft 1078 enables positive timed relation to be maintained between various operative mechanisms in the machine without resorting to geared interconnections between the various operative mechanisms. This is advantageous because it materially reduces the inertia that must be overcome when the machine is initially placed in operation and it avoids overloading of the driving motor which, of course, will be sufficiently powerful to insure that it will care for the maximum load that will be impressed thereon, which is to say, this motor is of sufficient power to insure proper driving of all mechanisms that may be simultaneously connected to a main drive shaft such as the main drive shaft 19.

The utilization of the printing unit U, which is a well-known commercial form of printing means, is particularly advantageous especially since it is particularly adaptable for producing a wide variety of impressions and also because the positions at which various impressions are to be made can be quite expeditiously adjusted.

The production and utilization of the control cards C is of course a marked advance in the art for it will be recognized that the cards may be passed to a wide variety of positions in the machine where auxiliary printing mechanisms, such as the auxiliary printing mechanism 672 disclosed herein, or equivalent means may be provided. The use of cards C avoids the necessity of providing fixed mechanical or electrical connections between devices such as the auxiliary printing mechanism 672 and operative means such as the multiplying apparatus M, MM or UM. Along this line it should be noted that the provision of an accumulator in a multiplying apparatus such as is included in the multiplying apparatus MM is especially advantageous for not only does such an arrangement enable the production of control cards for controlling other operations in the machine in which they are produced or in some other machine, as has been explained hereinabove, but it also enables a summary total to be punched in a control card, such as the control card C or the like, the utilization of summary totals so represented being common in the art and being especially advantageous.

Furthermore, the provision of accumulators either as in the multiplying apparatus Mm or in the auxiliary printing mechanism 672, or in both such apparatus, is advantageous for it enables an accurate check to be maintained on what variable data, such as the variable data V, are printed in the machine.

For example, in a particular instance where dividend checks of a corporation are being prepared, the accumulation of a total enables a check against the amount of money printed on the checks to be made against the amount of money that should be paid pursuant to the declaration of the dividend that can be ascertained from the books of the corporation. It is to be noted, however, that the present machine is by no means limited to the production of dividend checks and, as stated hereinabove, a wide variety of business instruments or the like may be produced in machines of this kind.

One of the primary reasons why the production of business instruments is facilitated in the present machine is that data represented as in the present instance in the control areas of printing and control devices may be interpolated in a multiplying apparatus as M. This enables comparatively stable data to be represented in the control areas and permits such stable data to be interpreted into widely varying data. In the present instance the data represented in printing and control devices are utilized as a factor in multiplications but it will be understood that a summarizing means such as is included in the multiplying apparatus M might be utilized to determine other data, such as the quantity of consumption by the respective customers of a public utility either directly in units of consumption or as sums of money to be charged for such consumption. It is especially to be noted that the novel multiplying apparatus M of this invention, and especially the summation means thereof, need not be mechanically controlled as is done in the present instance for it is susceptible of being electrically controlled, one instance of this being illustrated by the manner in which the multiplicand representation is effected in the universal multiplying apparatus UM.

Furthermore, as has been explained hereinabove with reference to the selection of the setting up of the multiplicand in the universal multiplying apparatus UM, the arrangement of the various multiplying apparatus is such that various types of controls could be utilized if desired. For example, the control of the multiplicand provided in the universal multiplying apparatus UM could be employed to effect set-up of the multiplier in this apparatus or in the apparatus M and Mm and, as stated above, the selection of the multiplicand could be effected by means such as provided herein for selecting the multiplier.

It is particularly to be noted that while I have shown the control of the various multiplying apparatus as being included in what I call printing and control devices, such control could be derived from a wide variety of other devices including keyboards, perforated record cards or the like.

However, the utilization of printing and control devices is particularly advantageous because by reason of the manner in which sheets are fed through the various printing positions in the machine and the relation of these printing positions to each other and the relation of the printing and control devices to such printing positions as they pass through the machine, accuracy in the production of business instruments and the like is assured.

It is also to be noted that while I have referred to the devices D herein as being printing and control devices, such devices could well be what are commonly known in the art as printing devices and these devices could bear either stencil printing means or embossed type characters. This is particularly true of those means in the machine which are not related to the multiplying apparatus M for, as will be recognized by those skilled in the art, the various means disclosed hereinabove especially with reference to impressions made by the platen P, marked advances in the art are represented. This is particularly true of the manner in which the devices are fed through the machine.

On the whole it is believed that it will be apparent from the foregoing description that I have provided a machine which well responds to what has been stated hereinabove is an important object of this invention, which is to say, the machine will materially expedite the preparation of business instruments or the like.

Thus while I have illustrated and described various embodiments of my invention it is to be understood that these are capable of variation and modification and I therefore do not wish to be limited to the precise details set forth but desire to avail myself of such changes and alterations as fall within the purview of the following claims.

I claim:

1. A multiplying apparatus employing a device consisting of a support, a plurality of members mounted on said support in predetermined positions thereon, said members respectively bearing aligned representations of the digits that may appear in the intermediate products determined upon multiplication of a given factor by the digits 0 to 9, means for retaining said members in position on said support with the various representations pertaining to a particular intermediate product in definite relation with each other, a control member connected to said support for conjoint movement therewith and having a plurality of digit-representations, certain of said digit-representations pertaining to at least two digits and all of said digit-representations being in predetermined relation with the intermediate product determined by multiplication by the particular digit or digits represented thereby, and means in said apparatus positioned in accordance with the value of the digit for which a represented intermediate product is to be positioned in operative position and cooperating with the digit representations on said control member to selectively dispose one or the other of the intermediate products related to the representations on said control member in operative position.

2. A multiplying apparatus employing a device consisting of a support, a plurality of members mounted on said support in predetermined positions thereon, said members respectively bearing representations of the digits that may appear in the intermediate products determined upon multiplication of a given factor by the digits 0 to 9, means for retaining said members in position on said support with the various representations pertaining to a particular intermediate product in definite relation with each other, a control member connected to said support for conjoint movement therewith and bearing group-representations of the various digits, the said group-representations being in predetermined relation with the intermediate products determined by multiplication by the particular digit or digits represented thereby, one of the group-representations of said control member pertaining to the digits 1 and 2, another to the digits 3 and 4, another to the digits 5 and 6, another to the digits 7 and 8 and still another to the digit 9, and means in said apparatus positioned in accordance with the digit for which a represented intermediate product is to be positioned in operative position and cooperating with the group-representations on said control member to selectively dispose the intermediate product related to the digits 1, 3, 5 or 7 in operative position in one manner of operation, the intermediate product related to the digits 2, 4, 6 or 8 in operative position in another manner of operation, or for positioning the intermediate product related to the digit 9 in operative position in still another manner of operation.

3. A calculating apparatus including a summation means for each order of a result that may be ascertained in the course of an operation of the apparatus, each summation means comprising a series of movable amount ascertaining members each normally disposed in a determined position, an amount representing member for each ascertaining member and operable to limit movement of the associated ascertaining member from its determined position to a distance proportionate to the amount represented by the representing member, reaction means at one end of said series, an amount manifesting member at the other end of said series normally disposed in a predetermined position, and a geared interconnection between the members in said series, said reaction means and said amount manifesting member and through which the aforesaid limited movement of said ascertaining members from their determined positions is effective to limit movement of the amount manifesting member from its determined position to a distance proportionate to the total movement of said ascertaining members, each amount manifesting member being constituted and arranged to manifest the digits that may appear in the order of the result to which it pertains, each summation means that may receive a carry from the next lower order including carry over means having an amount representing member for representing such carries and having an amount ascertaining member included in its series of such members and associated with such representing member and also having operating means for the amount representing member, means in the summation means from which a carry may be made into the next higher order for actuating said operating means for the amount representing member in such next higher order each time the amount manifesting member for such lower order moves through a distance equal to a notation in the system under which amounts are represented on said amount representing members, and yielding means connected individually to said amount manifesting members for imparting summation movement thereto whereby to maintain said geared interconnection and said summation means under tension and insure accurate summation movement of said amount manifesting members.

4. In a summation means for use in a multiplying mechanism or the like, a summation member, means supporting said summation member for movement, a reaction member mounted in spaced relation with said summation member, a plurality of sensing members mounted in spaced relation to each other intermediate said reaction member and said summation member for movement in opposite directions along predetermined sensing paths, differential gearing means operatively interconnecting said reaction member with said sensing members in succession and then with said summation member, the geared connections thus formed being adapted, when said summation member is moved, to impart sensing or retracting movement in opposite directions to said sensing members, settable means including amount representing abutments adapted by shifting movement in a direction generally normal to the path of movement of said sensing members to be variantly set up in the paths of sensing movement of said sensing members to variantly limit the extent of movement of said sensing members selectively to zero-sensing positions or to positions wherein significant digits are sensed, thereby to control summation movement of said summation member, digit representing means on said summation member operative to represent different digits in accordance with the position of said summation member, stop means cooperating with the summation member to determine a normal position of said summation member wherein said sensing members are retracted beyond zero-sensing positions to afford clearance for set-up movement of said settable means, means for moving said summation member into engagement with said stop means to thereby retract said sensing means beyond said zero positions, and spring means through which movement is imparted to said summation member in a summation operation thereof and operable to place said gearing means under tension from said reaction member to said summation member to thereby insure accurate summation of the amounts set up by said variantly settable amount representing means.

5. In a multiplying mechanism wherein a final product is obtained by a single operation of a summation means, a plurality of sets of representing members, one set for each denominational order of the multiplier and each set including a plurality of digital representing members mounted in predetermined relation with each other in the set and jointly bearing representations of all single digit multiples of a given multi-digit multiplicand, the number of members in each set being equal to the number of possible digits in the multiples which the set represents, means supporting the digital representing members of each set in a displaced denominational relation with respect to denominationally related members of the other sets so that the representations on the denominationally related members of the different sets represent digits pertaining to the same denominational order of the final product, and control means for each set of members assembled in fixed relation with the digital representations on the respective members of the set and positionable in accordance with the value of the digit in the related order of the multiplier to dispose the representations of the multiple of the multiplicand, determined by the value of such digit, in operative relation with representations on denominationally related members in other of the sets likewise positioned in accordance with the value of the digits in orders of the multiplier to which such other sets respectively pertain.

6. In a multiplying mechanism wherein a final product is obtained by a single operation of a summation means, a plurality of sets of representing members, one set for each denominational order of the multiplier and each set including a plurality of numerical value representing members mounted in predetermined relation with each other in the set and jointly bearing representations of all single digit multiples of a multi-digit multiplicand, means supporting the numerical value representing members of each set in a displaced denominational relation with respect to denominationally related members of the other sets so that the representations on the denominationally related members of the different sets represent numerical values pertaining to the same denominational order of the final product, the number of members in a set for a particular multi-digit multiplicand being such that there is but one member in each set for a denominational order of the final product, and means associated with each set of members for positioning each such set of members in accordance with the value of the digit in the related order of the multiplier to dispose the representations of the multiples of the multiplicand determined by the values of such digits in the various orders of the multiplier in operative relation with respect to each other.

7. In a multiplying mechanism wherein a final product is obtained by a single operation of a summation means, a plurality of sets of representing members, one set for each denominational order of the multiplier and each set including a plurality of digital representing members mounted in predetermined relation with each other in the set and jointly bearing representations of all single digit multiples of a given multi-digit multiplicand, the number of members in each set being equal to the number of possible digits in the multiples which the set represents, means supporting the digital representing members of each set in a displaced denominational relation with respect to denominationally related members of the other sets so that the representations on the denominationally related members of the different sets represent digits pertaining to the same denominational order of the final product, control means in fixed relation to each set, and positioning means for the control means of each of said sets including stop means actuatable selectively to effective positions to cooperate with the related control means in positioning the associated set of representing members.

8. In a multiplying mechanism wherein a final product is obtained by a single operation of a summation means, a plurality of sets of representing members, one set for each denominational order of the multiplier and each set including a plurality of digital representing members mounted in predetermined relation with each other in the set and jointly bearing representations of all single digit multiples of a given multi-digit multiplicand, the number of members in each set being equal to the number of possible digits in the multiples which the set represents, means supporting the digital representing members of each set in a displaced denominational relation with respect to denominationally related members of the other sets so that the representations on the denominationally related members of the different sets represent digits pertaining to the same denominational order of the final product, control means in fixed relation to each set including spaced stops respectively pertaining to different values of a multiplier digit, and positioning means for the control means of each of said sets including a plurality of stop pins actuatable selectively to effective positions to cooperate with the related stops on the control means in positioning the associated set of representing members.

9. In a multiplying mechanism wherein a final product is obtained by a single operation of a summation means, a plurality of sets of representing members, one set for each denominational order of the multiplier and each set including a plurality of digital representing members mounted in predetermined relation with each other in the set and jointly bearing representations of all single digit multiples of a given multi-digit multiplicand, the number of members in each set being equal to the number of possible digits in the multiples which the set represents, means supporting the digital representing members of each set in a displaced denominational relation with respect to denominationally related members of the other sets so that the representations on the denominationally related members of the different sets represent digits pertaining to the same denominational order of the final product, control means in fixed relation to each set, positioning means for the control means of each of said sets including a plurality of Bowden cable controlled stop pins actuatable selectively to effective positions to cooperate with the related control means in positioning the associated set of representing members, sensing means, means for feeding records bearing representations of multipliers to the sensing means, and means for operating the sensing means in response to representations of digits of the multipliers in the records and effective through said Bowden cables to selectively actuate said stop pins.

10. In a multiplying mechanism wherein a final product is obtained by a single operation of a summation means, a plurality of sets of representing members, one set for each denominational order of the multiplier and each set including a plurality of digital representing members mounted in predetermined relation with each other in the set and jointly bearing representations of all single digit multiples of a given multi-digit multiplicand, the number of members in each set being equal to the number of possible digits in the multiples which the set represents, means supporting the digital representing members of each set in a displaced denominational relation with respect to denominationally related members of the other sets so that the representations on the denominationally related members of the different sets represent digits pertaining to the same denominational order of the final product, control means in fixed relation to each set, and positioning means for the control means of each of said sets comprising a shiftable carrier member, a plurality of shiftable stops mounted on said carrier for selective actuation to positions wherein an actuated stop is adapted to cooperate with said control means of the related set, and additional stop means governing the position of said carrier member and operable through the resulting variation in the position of said carrier member to vary the positioning action of said selectively actuatable stops upon the related set of representing members.

11. In a multiplying mechanism wherein a final product is obtained by a single operation of a summation means, a plurality of sets of representing members, one set for each denominational order of the multiplier and each set including a plurality of digital representing members mounted in predetermined relation with each other in the set and jointly bearing representations of all single digit multiples of a given multi-digit multiplicand, the number of members in each set being equal to the number of possible digits in the multiples which the set represents, means supporting the digital representing members of each set in a displaced denominational relation with respect to denominationally related members of the other sets so that the representations on the denominationally related members of the different sets represent digits pertaining to the same denominational order of the final product, control means in fixed relation to each set, and positioning means for the control means of each of said sets comprising a shiftable carrier member, abutment means operable to limit movement of said carrier in one direction, a plurality of shiftable stop pins mounted in said carrier for selective actuation to positions wherein an actuated stop is adapted to cooperate with said control means of the related set, and an additional stop on said carrier adapted when actuated to supersede said abutment means in limiting movement of said carrier to thereby vary the effect of said first mentioned stop pins.

12. In a multiplying mechanism wherein a final product is obtained by a single operation of a summation means, a plurality of sets of templets of which each set pertains to a single order of the multiplier and includes a plurality of stepped templets adjustable selectively to a controlling position, the respectively aligned steps of the templets constituting digital representations of all single digit multiples of a given multiplicand, means supporting the templets of each set in a displaced denominational relation with respect to denominationally related templets of the other sets so that the digital representations on the denominationally related templets of the different sets pertain to the same denominational order of the final product, a control member in fixed relation to each set of templets having portions related to the digits of related order of the multiplier in such a manner that at least certain of said portions pertain to two digits of the related order of the multiplier and said portions being disposed in predetermined relation with the steps on the templets representing two multiples of the multiplicand, and means operable to position said members and cooperating with each of such portions of each control member in accordance with the value of the digit in the related order of the multiplier to dispose the related representations on the templets in controlling positions with correspondingly positioned representations on the denominationally related templets of the other sets.

13. In a multiplying mechanism wherein a final product is obtained by a single operation of a summation mechanism having a summation means for each order of the largest final product to be obtained with said mechanism, a plurality of gangs of representing means, one for each order of the multiplier, each gang including a plurality of sets of numerical value representing members with one set allocated to each order of the multiplicand and each set of each gang including a plurality of such representing members which are respectively allocated one to each of the significant digits and zero, each such member bearing numerical representations of zero and of the multiples of the digit to which it pertains times all the significant digits, means supporting the sets in each gang in a displaced denominational relation with respect to denominationally related sets of the other gangs so that the sets of each gang are adapted for operative association with the summation means of that order of the final product to which such sets respectively pertain, means operable to shift all the sets pertaining to each order of the multiplicand to operatively relate the numerical value representing members thereof with the summation means in accordance with the digital value of the various orders of the multiplicand, and means for adjusting the various gangs of representing means in accordance with the digital value of the orders of the multiplier to which they respectively pertain.

14. In a multiplying mechanism wherein a final product is obtained by a single operation of a summation mechanism having a summation means for each order of the largest final product to be obtained with said mechanism, a plurality of gangs of representing means, one for each order of the multiplier, each gang including a plurality of sets of numerical value representing members with one set allocated to each order of the multiplicand and each set of each gang including a plurality of such representing members which are respectively allocated one to each of the significant digits and zero, each such member bearing numerical representations of zero and of the multiples of the digit to which it pertains times each of the significant digits and so formed and arranged that zero and each such multiple are represented by a single value representing abutment, means supporting the sets in each gang in a displaced denominational relation with respect to denominationally related sets of the other gangs so that the sets of each gang are adapted for operative association with the summation means of that order of the final product to which such sets respectively pertain, means operable to correspondingly shift all the sets pertaining to each order of the multiplicand to operatively set the numerical value representing members thereof in operative relation to the summation means in accordance with the digital value of the various orders of the multiplicand, and settable control means for adjusting the various gangs of representing means in accordance with the digital value of the orders of the multiplier to which they respectively pertain.

15. In a multiplying mechanism wherein a final product is obtained by a single operation of a summation mechanism having a summation means for each order of the largest final product to be obtained with said mechanism, a plurality of gangs of representing means, one for each order of the multiplier, each gang including a plurality of sets of numerical value representing members with one set allocated to each order of the multiplicand and each set of each gang including a plurality of such representing members allocated one to each of the significant digits and zero, each such member bearing numerical representations of zero and of the multiples of the digit to which it pertains times each of the significant digits so formed and arranged that zero and each such multiple are represented by a single value representing abutment, means supporting the sets in each gang in a displaced denominational relation with respect to denominationally related sets of the other gangs so that the sets of each gang are adapted for operative association with the summation means of that order of the final product to which such sets respectively pertain, means operable to correspondingly shift all the sets pertaining to each order of the multiplicand to operatively set the numerical value representing members thereof in operative relation to the summation means in accordance with the digital value of the various orders of the multiplicand, settable control means for adjusting the various gangs of representing means in accordance with the digital value or zero value of the orders of the multiplier to which they respectively pertain, and means associated with the sensing means pertaining to each set operable when a set is disposed in a position representative of zero in the related order of the multiplier to prevent sensing movement of the related sensing means.

16. In a multiplying mechanism wherein a final product is obtained by a single operation of a summation mechanism having a summation means for each order of the largest final product to be obtained with said mechanism, a plurality of gangs of representing means, one for each order of the multiplier, each gang including a plurality of sets of numerical value representing members with one set allocated to each order of the multiplicand and each set of each gang including a plurality of such representing members allocated one to each of the significant digits and zero, each such member bearing numerical representations of zero and of the multiples of the digit to which it pertains times all the significant digits, means supporting the sets in each gang in a displaced denominational relation with respect to denominationally related sets of the other gangs so that the sets of each gang are adapted for operative association with the summation means of that order of the final product to which such sets respectively pertain, means operable to shift all the sets pertaining to each order of the multiplicand to operatively relate the numerical value representing members thereof with the summation means in accordance with the digital value of the various orders of the multiplicand, means for adjusting the various gangs of representing means in accordance with the digital value of the orders of the multiplier to which they respectively pertain, a single differential gear train for each order of the final product originating in a reaction member and terminating in a geared connection with the summation means of the order of the final product to which it pertains, each differential gear train having one or more sensing elements associated therewith for movement as an incident to movement of the associated summation means, a single sensing element being provided for cooperation with each of said sets to sense the value represented by the setting thereof, means for introducing carries into the gear trains pertaining to the tens and higher orders under the control of the summation element of the next lower order in each instance, and yielding means for imparting summation movement to said summation elements to produce tension in the gear trains and thereby insure accuracy of summation.

17. In a multiplying mechanism employing representing means having a support mounted for movement in one direction and at least one set of numerical value representing members mounted on said support for movement therewith in said one direction and for movement along said support in a second direction at right angles to said one direction, said members of said set being allocated one to each of the significant digits and zero, each such member bearing numerical representations of the multiples of the digit to which it pertains times all the significant digits, yielding means urging said set in said second direction, means for returning said set against the force of said yielding means, and control means for variantly governing the yieldingly induced movement in said second direction comprising a shiftable carrier member, a plurality of normally inactive stops mounted on said carrier and adapted to be rendered selectively effective to variantly limit movement of said set in said second direction, and additional stop means operable to variantly control the position of said carrier member to thereby vary the effect of said selectively effective stops.

18. In a multiplying mechanism employing representing means having a support mounted for movement in a first direction and in a second direction at right angles to said first direction, at least one set of numerical value representing members mounted on said support for movement therewith in said first direction and for movement along and relative to said support in said second direction, said members of said set being allocated one to each of the significant digits and zero, each such member bearing numerical representations of zero and of the multiples of the digit to which it pertains times all the significant digits, a sensing member with which any one of said representing members may cooperate upon selective setting thereof along said support in said second direction, yielding means urging said set in said second direction, means on said support for engaging said set in a restoring movement of said support against the force of said yielding means to restore said set to a normal position, said support having a release movement in said second direction to permit yielding movement of said set by said yielding means, and control means for variantly governing the yieldingly induced movement of said set in said second direction comprising a shiftable carrier member, a plurality of normally inactive stops mounted on said carrier and adapted to be rendered selectively effective to limit movement of said set in said second direction, and additional stop means operable to variantly control the position of said carrier member to thereby vary the effect of said selectively effective stops.

19. In a summation or like means for use in a multiplying or like apparatus, a summation member supported for movement in opposite directions away from and to a normal position, a reaction member supported in spaced relation with the summation member, differential gear means interconnecting the reaction member and the summation member, a sensing element supported for movement away from and to a normal position, variantly settable means including amount representing portions adapted to be selectively set in the path of movement of said sensing element away from the normal position thereof and having all such portions spaced from the sensing element when said element is in the normal position thereof in an amount sufficient to afford operative clearance between such portions and the sensing element, means connecting the sensing element to an intermediate element of said differential gearing to enable conjoint movement of said sensing element and said summation member, yieldable means through which summation movement is imparted to said summation member and operable to maintain the gear means under tension between said summation member and said reaction member to eliminate backlash and insure accurate movement of the summation member under control of the sensing element subsequent to any movement thereof sufficient to take up said operative clearance, and restoring means operating on said summation member to restore the same to normal position and effective through said gear means to move the sensing element to the normal position thereof.

20. In a summation or like means for use in a multiplying or like apparatus, a summation member supported for movement in opposite directions away from the and to a normal position, a reaction member supported in spaced relation with the summation member, differential gear means interconnecting the reaction member and the summation member, a sensing element supported for movement away from and to a normal position, variantly settable means including amount representing portions adapted to be selectively set in the path of movement of said sensing element away from the normal position thereof and having all such portions spaced from the sensing element when said element is in the normal position thereof in an amount sufficient to afford operative clearance between such portions and the sensing element, means connecting the sensing element to an intermediate element of said differential gearing to enable conjoint movement of said sensing element and said summation member, restoring means operating on said summation member to restore the same to normal position and effective through said gear means to move the sensing element to the normal position thereof when the restoring means is moved to the at-rest position thereof, and spring means extended between said restoring member and said summation member and effective, upon retraction of said restoring member from the at-rest position thereof, to urge the summation member from the normal position thereof in a summation operation and operable to maintain the gear means under tension between said summation member and said reaction member to eliminate backlash and insure accurate movement of the summation member under control of the sensing element subsequent to any movement thereof sufficient to take up said operative clearance.

21. In a summation or like means for use in a multiplying or like apparatus, a plurality of supports, a summation member mounted on each support, a reaction member mounted on each support in spaced relation with the summation member thereon, differential gear means on the support and interconnecting the reaction member and the summation member on the support, a plurality of said sensing elements disposed on at least selected of the supports for movement away from and to normal positions, variantly settable means respectively allocated to the sensing elements and each including amount representing portions adapted to be selectively set in the path of movement of the associated sensing element and having all such portions spaced from the sensing element when said element is in the normal position thereof in an amount sufficient to afford operative clearance between such portions and the sensing element, means connecting the sensing elements on each support to intermediate elements of the differential gearing on the support to enable conjoint movement of the sensing elements and the summation member, yieldable means effective on said summation members and through which summation movement is imparted to such members and operable to maintain the gear means on each support under tension between the summation member on the support and the reaction member on the support to eliminate backlash and insure accurate movement of the summation member under control of each sensing element connected to an intermediate element of the gear means associated with such summation member, and restoring means operating on said summation members simultaneously to restore the same to the normal positions thereof and effective through the gear means associated with each summation member to move each sensing element connected to an intermediate element of such gear means to the normal position thereof.

22. In a multiplying mechanism wherein a final product is obtained by a single operation of a summation means, a plurality of sets of representing members, one set for each denominational order of the multiplier and each set including a plurality of representing members mounted in predetermined relation with each other in the set, each of said members having a plurality of representing portions thereon, certain of the representing portions on the members in each set being related one with the other to jointly afford a representation of the product ascertained upon multiplication of a selected multi-digit multiplicand by a particular digit in the order of the multiplier to which the set pertains, means supporting the representing members of each set in a displaced denominational relation with respect to denominationally related members of the other sets so that the representing portions on the denominationally related members of the different sets afford representations pertaining to the same denominational order of the final product, control means in fixed relation to each set, positioning means for the control means of each set and including positioning devices actuatable selectively to effective positions to cooperate with the related control means and thereby dispose in operative position the representing portions that are related to the particular digit in the order of the multiplier to which the control means and the representing members pertain and which the positioning devices are set to represent, a sensing element associated with each of said representing members, a summation member for each order of the final product, a reaction member associated with each summation member, a geared interconnection between each associated reaction member and summation member, means connecting each sending element to an intermediate element in the geared interconnection associated with the summation member for the order of the final product to which such element and its associated representing member are related, a carry-over means operatively related to each summation member higher than that pertaining to the lowest order of the final product, each carry-over means embodying a representing member for representing carries and having a sensing element associated with such representing member and also including operating means for such representing member, a connection between such sensing element and an intermediate element of the geared interconnection associated with the related summation member, means associated with a lower order for operating the operating means for the representing member in the carry-over means in the next higher order and operable to actuate such representing member each time the summation member for the lower order is advanced through a distance equal to a notation in the system under which the representations are formed on the representing members to thereby actuate the associated sensing element and effect immediate entry of the carry-over into the summation member for the next higher order through the geared interconnection of the higher order, and yieldable means connected to said summation members for imparting summation movement thereto whereby to maintain the geared interconnections associated with the summation members under tension and thereby insure accurate summation movement of the summation members under control of the associated sensing elements and the representing portions in operative positions relative to such sensing elements.

23. In a multiplying or like mechanism, a plurality of support plates, means supporting said plates in predetermined spaced relation, a summation member mounted on a corresponding face of each of said plates for movement relative to a normal position, the summation members being mounted at corresponding positions on the respective plates, a reaction member supported on each of said plates on the same face thereof as the summation member mounted thereon and in spaced relation with such summation member, certain of said plates having a plurality of spaced apart openings therein disposed intermediate the reaction and summation members thereon and each of said plates having at least one such opening therein, sensing members respectively allocated to said openings and disposed on the faces of said plates opposite the faces on which the reaction and summation members are mounted, differential gear means mounted on said plates on the same faces as the reaction and summation members and interconnecting such members, means respectively disposed in said openings and connecting said sensing members to intermediate elements of the differential gearing on the associated plate, variantly settable means respectively allocated to the sensing means and each including amount representing portions adapted to be set selectively in the path of movement of the associated sensing member away from the normal position thereof and having all such portions spaced from the sensing member when the sensing member is in the normal position thereof in an amount sufficient to afford operative clearance between such portions and the sensing member, yieldable means through which summation movement is imparted to said summation members and operable to maintain the gear means on each support plate under tension between the summation and reaction members to thereby eliminate backlash and insure accurate movement of the summation members under control of the sensing members connected thereto after any movement of the sensing members sufficient to take up the aforesaid operative clearance, and common restoring means operating on said summation members and effective to simultaneously restore the same to the normal position thereof and further effective through the associated gear means to restore the movable sensing members on each plate to the normal position thereof.

24. A calculating apparatus including a summation means for each order of a result that may be ascertained in the course of an operation of the apparatus, each summation means comprising a series of movable amount ascertaining members each normally disposed in a determined position, an amount representing member for each ascertaining member and operable to limit movement of the associated ascertaining member from its determined position to a distance proportionate to the amount represented by the representing member, reaction means at one end of said series, an amount manifesting member at the other end of said series normally disposed in a predetermined position, and a geared interconnection between the members in said series, said reaction means and said amount manifesting member and through which the aforesaid limited movement of said ascertaining members from their determined positions is effective to limit movement of the amount manifesting member from its determined position to a distance proportionate to the total movement of said ascertaining members, each amount manifesting member being constituted and arranged to manifest the digits that may appear in the order of the result to which it pertains, a carry-over means associated with the geared interconnection of the amount manifesting members higher than the lowest order of the final product, each carry-over means having an amount representing member for representing such carries and having an amount ascertaining member included in its series of ascertaining members and associated with such representing member and also having operating means for the amount representing member, means associated with the summation means from which a carry may be made into the next higher order for actuating said operating means for the amount representing member in such next higher order each time the amount manifesting member for such lower order moves through a distance equal to a notation in the system under which amounts are represented on said amount representing members to thereby cause the associated amount ascertaining member to move to effect immediate entry of the carry-over into the geared interconnection of the higher order, and yielding means connected individually to said amount manifesting members for imparting summation movement thereto whereby to maintain said geared interconnection and said summation means under tension and insure accurate summation movement of said amount manifesting members.

25. In a device of the class described, a support, a positionable member mounted on said support for movement relative thereto from a predetermined position, a reaction member fast to said support in spaced relation with said positionable member, a differential gear train mounted on said support intermediate said positionable and reaction members and interconnecting the same and having elements included therein, each arranged for variable movement relative to said support from a predetermined position to a plurality of variable positions whereby movement of said elements relative to said support may be effective through said gear train to control movement of said positionable member, and yieldable means effective on said gear train to take up backlash therein and urge said positionable member in one direction and thereby insure accurate movement of said member under control of said elements, said gear train also enabling conjoint movement of said positionable member and said elements during movement of such member in a restoring direction opposite to said one direction to thereby enable such member and elements to be restored to the aforesaid predetermined positions thereof as said member is moved in said restoring direction.

26. In a device of the class described, a support, a positionable member mounted on said support for movement relative thereto from a predetermined position, a reaction member fast on said support in spaced relation with said positionable member, a plurality of movable members mounted on said support intermediate said positionable and reaction members for movement relative to said support from a predetermined position to a plurality of variable positions, a differential gear train interconnecting said positionable, movable and reaction members and including elements connected to said movable members and mounted for movement relative to said support and operative to connect said positionable and movable members for related movement, and yieldable means effective on said gear train to take up backlash therein and urge said positionable member in one direction and thereby insure accurate movement of said positionable member under control of said movable members, said gear train also enabling conjoint movement of said positionable member and said movable members during movement of such positionable member in a restoring direction opposite to said one direction to thereby enable such positionable member and said movable members to be restored to the aforesaid predetermined positions thereof as said positionable member is moved in said restoring direction.

27. In a device of the class described, a relatively thin plate affording a support, a positionable member mounted on said plate for movement relative thereto from a predetermined position, a reaction member fast to said plate in spaced relation with said positionable member, said plate having a plurality of spaced slots formed therein parallel to said positionable member and located intermediate said positionable and reaction members, a differential gear train mounted on said plate intermediate said positionable and reaction members and interconnecting the same, a plurality of movable members mounted and guided in respective slots and operatively connected to intermediate elements of said differential gear train, each of said movable members being arranged for variable movement in its slot and relative to said plate from a predetermined position to a plurality of variable positions whereby movement of said movable members relative to said plate may be effective through said gear train to control movement of said positionable member, and yieldable means effective on said gear train to take up backlash therein and urge said positionable member in one direction and thereby insure accurate movement of said member under control of said movable members, said gear train also enabling conjoint movement of said positionable member and said movable members during movement of such positionable member in a restoring direction opposite to said one direction to thereby enable such positionable member and said movable members to be restored to the aforesaid predetermined positions thereof as said positionable member is moved in said restoring direction.

28. In a device of the class described, a support, a positionable member mounted on one face of said support for movement relative thereto from a predetermined position, a reaction member on the same face of said support as said positionable member and disposed thereon in spaced relation with such member, a differential gear train on the same face of said support as that on which said positionable and reaction members are disposed and interconnecting such members, said support having a plurality of openings therein in the form of elongated slots, a plurality of movable members mounted on the face of said support opposite that on which said gear train is disposed and connected through respective of said openings to intermediate elements of said gear train, said movable members each being movable relative to said support from predetermined positions to a plurality of variable positions whereby movement of said movable members relative to said support is effective through said gear train to effectively control positioning of said positionable member, and means accurately guiding said movable members and including the edges of said slots, and yieldable means effective on said gear train to take up backlash therein and urge said positionable member in one direction and thereby insure accurate movement of said positionable member under control of said movable members, said gear train also enabling conjoint movement of said positionable member and said movable members during movement of such positionable member in a restoring direction opposite to said one direction to thereby enable such positionable member and said movable members to be restored to the aforesaid predetermined positions thereof as said positionable member is moved in said restoring direction.

29. In a device of the class described, a support, a positionable member mounted on said support for movement relative thereto from a predetermined position, a reaction member mounted on said support and disposed thereon in spaced relation with said positionable member, a differential gear train on said support and interconnecting said positionable and reaction members, a plurality of movable members mounted on said support and connected to intermediate elements of said gear train, said movable members being movable relative to said support from predetermined positions to a plurality of variable positions whereby movement of said movable members relative to said support is effective through said gear train to effectively control movement of said positionable member from its predetermined position, yieldable means for actuating said positionable member and said movable members, one of said movable members having stop means associated therewith comprising a shiftable stop member mounted on said support and having a plurality of steps thereon effective to govern movement of said one of said movable members, spring means urging said stop member to a normal position wherein a predetermined one of said steps is effective, a ratchet means connected to said stop member, a pawl means mounted on said support to actuate said ratchet means and the stop member from said normal position to render others of said steps effective on said one of said movable members, and means mounted on said support for operating said pawl means.

30. In a device of the class described, a support, a positionable member mounted on said support for movement relative thereto from a predetermined position, a reaction member mounted on said support and disposed thereon in spaced relation with said positionable member, a differential gear train on said support and interconnecting said positionable and reaction members, a plurality of movable members mounted on said support and connected to intermediate elements of said gear train, said movable members being movable relative to said support from predetermined positions to a plurality of variable positions whereby movement of said movable members relative to said support is effective through said gear train to effectively control movement of said positionable member from its predetermined position, yieldable means for actuating said positionable member and said movable members, one of said movable members having stop means associated therewith comprising a shiftable stop member mounted on said support and having a plurality of steps thereon effective to govern movement of said one of said movable members, said stop member having a normal position wherein a predetermined one of said steps is effective, a ratchet member connected to said stop member and having a pair of ratchets formed therein, a rocking member mounted for rocking movement on said support and having a spring biased actuating pawl movably mounted thereon and urged into cooperating relation with one of said ratchets, a control pawl formed on said rocking member and adapted to cooperate with the other of said ratchets to control movement of said ratchet member and the stop member, means mounted on said support and operable to rock said rocking member to effect controlled actuation of said stop member from said normal position by said actuating pawl and said control pawl, and means mounted on said support for returning said stop member to its normal position.

WALTER T. GOLLWITZER.

CERTIFICATE OF CORRECTION.

Patent No. 2,296,276. September 22, 1942.

WALTER T. GOLLWITZER.

It is hereby certified that error appears in the printed specification of the above numbered patent requiring correction as follows: Page 77, first column, line 58, claim 17, after the word "of" first occurrence, insert --zero and of--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.